(12) United States Patent
Grosso Giordano et al.

(10) Patent No.: US 12,023,602 B2
(45) Date of Patent: Jul. 2, 2024

(54) DEVICES FOR EFFICIENT SORBENT UTILIZATION IN LITHIUM EXTRACTION

(71) Applicant: Lilac Solutions, Inc., Oakland, CA (US)

(72) Inventors: Nicolás Andrés Grosso Giordano, Oakland, CA (US); David Henry Snydacker, San Francisco, CA (US); David James Alt, North Vancouver (CA); Eric Nathan Guyes, Oakland, CA (US); Alysia Lukito, Emeryville, CA (US); Amos Indranada, Emeryville, CA (US); Edson Barton Packer, Alameda, CA (US)

(73) Assignee: LILAC SOLUTIONS, INC., Oakland, CA (US)

( * ) Notice: Subject to any disclaimer, the term of this patent is extended or adjusted under 35 U.S.C. 154(b) by 0 days.

(21) Appl. No.: 18/365,090

(22) Filed: Aug. 3, 2023

(65) Prior Publication Data

US 2023/0381687 A1    Nov. 30, 2023

Related U.S. Application Data

(63) Continuation of application No. PCT/US2023/016443, filed on Mar. 27, 2023.
(Continued)

(51) Int. Cl.
*B01D 15/22* (2006.01)
*B01D 15/10* (2006.01)
(Continued)

(52) U.S. Cl.
CPC ............. *B01D 15/22* (2013.01); *B01D 15/10* (2013.01); *B01D 15/203* (2013.01);
(Continued)

(58) Field of Classification Search
CPC .... B01D 15/10; B01D 15/1807; B01D 15/22; B01D 15/361; B01D 15/362; B01D 25/164; B01D 25/302; B01D 2251/302; B01D 2259/4146; B01D 2313/40; B01J 39/02; B01J 39/10; B01J 39/12; B01J 47/018;
(Continued)

(56) References Cited

U.S. PATENT DOCUMENTS 2,608,465 A    8/1952   Henderson
2,609,341 A    9/1952   Walter
(Continued)

FOREIGN PATENT DOCUMENTS

AR    092617 A1    4/2015
CN    101764209 A   6/2010
(Continued)

OTHER PUBLICATIONS

Belharouak et al. Synthesis and electrochemical analysis of vapor-deposited carbon-coated LiFePO4. Electrochemistry Communications 7(10):983-988 (2005).
(Continued)

*Primary Examiner* — John Kim
(74) *Attorney, Agent, or Firm* — WILSON SONSINI GOODRICH & ROSATI

(57) ABSTRACT

The present disclosure relates to the extraction of lithium from liquid resources such as natural and synthetic brines, leachate solutions from clays and minerals, and recycled products.

30 Claims, 5 Drawing Sheets

Related U.S. Application Data

(60) Provisional application No. 63/401,453, filed on Aug. 26, 2022, provisional application No. 63/324,559, filed on Mar. 28, 2022.

(51) Int. Cl.

| | | |
|---|---|---|
| *B01D 15/20* | (2006.01) | |
| *B01D 15/36* | (2006.01) | |
| *B01D 25/164* | (2006.01) | |
| *B01D 25/30* | (2006.01) | |
| *B01J 39/02* | (2006.01) | |
| *B01J 39/10* | (2006.01) | |
| *B01J 47/018* | (2017.01) | |
| *B01J 47/022* | (2017.01) | |
| *B01J 49/06* | (2017.01) | |
| *B01J 49/57* | (2017.01) | |
| *B01J 49/60* | (2017.01) | |
| *C01D 15/00* | (2006.01) | |
| *C22B 3/06* | (2006.01) | |
| *C22B 3/22* | (2006.01) | |
| *C22B 3/42* | (2006.01) | |
| *C22B 3/44* | (2006.01) | |
| *C22B 26/12* | (2006.01) | |

(52) U.S. Cl.
CPC ......... *B01D 15/361* (2013.01); *B01D 15/362* (2013.01); *B01D 25/164* (2013.01); *B01D 25/302* (2013.01); *B01J 39/02* (2013.01); *B01J 39/10* (2013.01); *B01J 47/018* (2017.01); *B01J 47/022* (2013.01); *B01J 49/06* (2017.01); *B01J 49/57* (2017.01); *B01J 49/60* (2017.01); *C01D 15/00* (2013.01); *C22B 3/06* (2013.01); *C22B 3/22* (2013.01); *C22B 3/42* (2013.01); *C22B 3/44* (2013.01); *C22B 26/12* (2013.01); *B01D 2251/302* (2013.01); *B01D 2259/4146* (2013.01); *B01D 2313/40* (2013.01)

(58) Field of Classification Search
CPC . B01J 47/022; B01J 47/10; B01J 47/14; B01J 49/06; B01J 49/57; B01J 49/60; C01D 15/00; C22B 3/06; C22B 3/02; C22B 3/42; C22B 3/44; C22B 26/12
See application file for complete search history.

(56) References Cited

U.S. PATENT DOCUMENTS

| | | |
|---|---|---|
| 3,207,577 A | 9/1965 | Mizuma |
| 3,793,433 A | 2/1974 | Seeley et al. |
| 3,920,544 A | 11/1975 | Weiss |
| 4,058,585 A | 11/1977 | MacKay et al. |
| 4,116,858 A | 9/1978 | Lee et al. |
| 4,159,311 A | 6/1979 | Bauman et al. |
| 4,291,001 A | 9/1981 | Repsher et al. |
| 4,347,327 A | 8/1982 | Lee et al. |
| 4,382,124 A | 5/1983 | Meitzner et al. |
| 4,665,049 A | 5/1987 | Miyai et al. |
| 4,747,949 A | 5/1988 | Barkey |
| 5,039,382 A | 8/1991 | Suzuki et al. |
| 5,242,119 A | 9/1993 | Jariyasunant |
| 5,626,750 A | 5/1997 | Chinn |
| 5,639,861 A | 6/1997 | Steffier |
| 6,048,507 A | 4/2000 | Amouzegar et al. |
| 6,171,489 B1 | 1/2001 | Ballard et al. |
| 6,325,976 B1 | 12/2001 | Small et al. |
| 7,390,466 B2 | 6/2008 | Boryta et al. |
| 7,435,477 B2 | 10/2008 | Adachi et al. |
| 7,541,016 B2 | 6/2009 | Gorshkov et al. |
| 7,820,327 B2 | 10/2010 | Yumoto et al. |
| 8,454,816 B1 | 6/2013 | Harrison et al. |
| 8,506,851 B2 | 8/2013 | Ravet et al. |
| 8,574,519 B2 | 11/2013 | Harrison et al. |
| 8,679,224 B2 | 3/2014 | Brown et al. |
| 8,741,150 B2 | 6/2014 | Chung et al. |
| 8,778,289 B2 | 7/2014 | Chon et al. |
| 8,926,874 B2 | 1/2015 | Chung et al. |
| 9,034,294 B1 | 5/2015 | Harrison |
| 9,598,291 B2 | 3/2017 | Chon et al. |
| 9,677,181 B2 | 6/2017 | Bourassa et al. |
| 9,795,943 B2 | 10/2017 | Chung et al. |
| 9,994,931 B2 | 6/2018 | Chon et al. |
| 10,017,838 B2 | 7/2018 | Chon et al. |
| 10,056,656 B2 | 8/2018 | Song |
| 10,150,056 B2 | 12/2018 | Snydacker |
| 10,322,950 B2 | 6/2019 | Snydacker et al. |
| 10,336,624 B2 | 7/2019 | Song |
| 10,392,258 B2 | 8/2019 | Song |
| 10,439,200 B2 | 10/2019 | Snydacker et al. |
| 10,478,751 B2 | 11/2019 | Chung et al. |
| 10,505,178 B2 | 12/2019 | Snydacker et al. |
| 10,604,414 B2 | 3/2020 | Featherstone et al. |
| 10,648,090 B2 | 5/2020 | Snydacker et al. |
| 10,695,694 B2 | 6/2020 | Snydacker |
| 11,253,848 B2 | 2/2022 | Snydacker |
| 11,339,457 B2 | 5/2022 | Snydacker |
| 11,358,875 B2 | 6/2022 | Snydacker et al. |
| 11,365,128 B2 | 6/2022 | Marston et al. |
| 11,377,362 B2 | 7/2022 | Snydacker et al. |
| 11,583,830 B2 | 2/2023 | Brown |
| 11,638,916 B1 | 5/2023 | Jones |
| 2003/0231996 A1 | 12/2003 | Shiu et al. |
| 2004/0005267 A1 | 1/2004 | Boryta et al. |
| 2005/0139549 A1 | 6/2005 | Yoshida et al. |
| 2005/0196370 A1 | 9/2005 | Yu et al. |
| 2007/0138020 A1 | 6/2007 | Balagopal et al. |
| 2009/0013829 A1 | 1/2009 | Harris et al. |
| 2010/0116748 A1 | 5/2010 | Rasmussen et al. |
| 2011/0044882 A1 | 2/2011 | Buckley et al. |
| 2011/0067230 A1 | 3/2011 | Tan et al. |
| 2011/0174739 A1 | 7/2011 | Chung et al. |
| 2013/0001168 A1 | 1/2013 | Kim et al. |
| 2013/0306565 A1 | 11/2013 | Davis |
| 2014/0113197 A1 | 4/2014 | Xiao et al. |
| 2014/0239221 A1 | 8/2014 | Harrison et al. |
| 2015/0013499 A1 | 1/2015 | Asano et al. |
| 2015/0083667 A1 | 3/2015 | Stouffer |
| 2015/0152523 A1 | 6/2015 | Sharma |
| 2015/0197830 A1 | 7/2015 | Chon et al. |
| 2015/0203542 A1 | 7/2015 | Bagnoli et al. |
| 2015/0258501 A1 | 9/2015 | Chung et al. |
| 2016/0115040 A1 | 4/2016 | Yi et al. |
| 2016/0161453 A1 | 6/2016 | De Los Reyes |
| 2016/0230250 A1 | 8/2016 | Chung et al. |
| 2016/0289154 A1 | 10/2016 | Scates et al. |
| 2017/0022617 A1 | 1/2017 | Magnan et al. |
| 2017/0028395 A1 | 2/2017 | Bewsey |
| 2017/0175228 A1 | 6/2017 | Hunwick |
| 2017/0189855 A1 | 7/2017 | Xiang et al. |
| 2017/0217796 A1 | 8/2017 | Snydacker et al. |
| 2017/0233261 A1 | 8/2017 | Sharma |
| 2018/0016153 A1 | 1/2018 | Sharma |
| 2018/0080133 A1 | 3/2018 | Smith |
| 2018/0133619 A1 | 5/2018 | Snydacker |
| 2018/0222760 A1 | 8/2018 | Reed |
| 2018/0245180 A1 | 8/2018 | Cheng et al. |
| 2018/0304202 A1 | 10/2018 | Kariveti |
| 2018/0318755 A1 | 11/2018 | Aines et al. |
| 2018/0339286 A1 | 11/2018 | Bazzi et al. |
| 2019/0024212 A1 | 1/2019 | Lien |
| 2019/0044126 A1 | 2/2019 | Snydacker et al. |
| 2019/0062207 A1 | 2/2019 | Jin |
| 2019/0225854 A1 | 7/2019 | Harrison et al. |
| 2019/0233297 A1 | 8/2019 | Kim et al. |
| 2019/0256987 A1 | 8/2019 | Snydacker et al. |
| 2019/0273245 A1 | 9/2019 | Snydacker et al. |
| 2019/0276327 A1 | 9/2019 | Brown |
| 2020/0165699 A1 | 5/2020 | Snydacker et al. |
| 2020/0189925 A1 | 6/2020 | Featherstone et al. |

(56) References Cited

U.S. PATENT DOCUMENTS

| | | | |
|---|---|---|---|
| 2020/0232105 A1 | 7/2020 | Snydacker et al. |
| 2020/0289958 A1 | 9/2020 | Snydacker |
| 2020/0399137 A1 | 12/2020 | Harrison |
| 2021/0077990 A1 | 3/2021 | Snydacker et al. |
| 2021/0206651 A1 | 7/2021 | Napier et al. |
| 2021/0222270 A1 | 7/2021 | Napier et al. |
| 2021/0300774 A1 | 9/2021 | Kim et al. |
| 2021/0380429 A1 | 12/2021 | Snydacker et al. |
| 2022/0121470 A1 | 4/2022 | Saxena et al. |
| 2022/0194796 A1 | 6/2022 | Kim et al. |
| 2022/0212184 A1 | 7/2022 | Snydacker |
| 2022/0235436 A1 | 7/2022 | Snydacker |
| 2022/0290272 A1 | 9/2022 | Kölbel et al. |
| 2022/0340440 A1 | 10/2022 | Wang |
| 2022/0348475 A1 | 11/2022 | Snydacker et al. |
| 2022/0349027 A1 | 11/2022 | Snydacker et al. |
| 2022/0372594 A1 | 11/2022 | Chon |
| 2023/0019776 A1 | 1/2023 | Bishkin |
| 2023/0047281 A1 | 2/2023 | Bhattacharyya et al. |
| 2023/0064968 A1 | 3/2023 | Smith et al. |
| 2023/0079295 A1 | 3/2023 | Matsumoto et al. |
| 2023/0405492 A1 | 12/2023 | Snydacker |
| 2024/0017250 A1 | 1/2024 | Snydacker et al. |
| 2024/0018008 A1 | 1/2024 | Snydacker et al. |
| 2024/0026495 A1 | 1/2024 | Snydacker et al. |

FOREIGN PATENT DOCUMENTS

| | | |
|---|---|---|
| CN | 101961634 A | 2/2011 |
| CN | 102872792 A | 1/2013 |
| CN | 103794779 A | 5/2014 |
| CN | 105238927 A | 1/2016 |
| CN | 105251436 A | 1/2016 |
| CN | 105289455 A | 2/2016 |
| CN | 205151853 U | 4/2016 |
| CN | 105555978 A | 5/2016 |
| CN | 106311190 A | 1/2017 |
| CN | 106622103 A | 5/2017 |
| CN | 106673023 A | 5/2017 |
| CN | 107043116 A | 8/2017 |
| CN | 209123481 U | 7/2019 |
| DE | 102016212048 A1 | 1/2018 |
| EP | 0551002 A1 | 7/1993 |
| EP | 2945211 B1 | 11/2018 |
| FR | 3034781 A1 | 10/2016 |
| JP | H0626661 B2 | 4/1994 |
| JP | H08236114 A | 9/1996 |
| JP | 2002167626 A | 6/2002 |
| JP | 2003500318 A | 1/2003 |
| JP | 2004230215 A | 8/2004 |
| JP | 2005296811 A | 10/2005 |
| JP | 2006159039 A | 6/2006 |
| JP | 2009507839 A | 2/2009 |
| JP | 2010042395 A | 2/2010 |
| JP | 2014055312 A | 3/2014 |
| JP | 2015020090 A | 2/2015 |
| JP | 5898021 B2 | 4/2016 |
| JP | 2017131863 A | 8/2017 |
| JP | 2018535309 A | 11/2018 |
| JP | 2019099874 A | 6/2019 |
| KR | 20120015658 A | 2/2012 |
| KR | 20120063424 A | 6/2012 |
| KR | 20140082065 A | 7/2014 |
| KR | 20160126314 A | 11/2016 |
| WO | WO-2010035956 A2 | 4/2010 |
| WO | WO-2010056322 A1 | 5/2010 |
| WO | WO-2010103173 A1 | 9/2010 |
| WO | WO-2011133165 A1 | 10/2011 |
| WO | WO-2012005545 A2 | 1/2012 |
| WO | WO-2014047347 A1 | 3/2014 |
| WO | WO-2015123762 A1 | 8/2015 |
| WO | WO-2015171109 A1 | 11/2015 |
| WO | WO-2016064689 A2 | 4/2016 |
| WO | WO-2016172017 A1 | 10/2016 |
| WO | WO-2017005113 A1 | 1/2017 |
| WO | WO-2017020090 A1 | 2/2017 |
| WO | WO-2017039724 A1 | 3/2017 |
| WO | WO-2017136328 A1 | 8/2017 |
| WO | WO-2017137885 A1 | 8/2017 |
| WO | WO-2018089932 A1 | 5/2018 |
| WO | WO-2018129949 A1 | 7/2018 |
| WO | WO-2019000095 A1 | 1/2019 |
| WO | WO-2019028148 A1 | 2/2019 |
| WO | WO-2019028174 A2 | 2/2019 |
| WO | WO-2019126862 A1 | 7/2019 |
| WO | WO-2019160982 A1 | 8/2019 |
| WO | WO-2019168941 A1 | 9/2019 |
| WO | WO-2021142147 A1 | 7/2021 |
| WO | WO-2021204375 A1 | 10/2021 |
| WO | WO-2021212214 A1 | 10/2021 |
| WO | WO-2021252381 A1 | 12/2021 |
| WO | WO-2022084145 A1 | 4/2022 |
| WO | WO-2022109156 A1 | 5/2022 |
| WO | WO-2022226219 A1 | 10/2022 |
| WO | WO-2022260542 A1 | 12/2022 |
| WO | WO-2023081448 A1 | 5/2023 |
| WO | WO-2023192192 A1 | 10/2023 |
| WO | WO-2023192195 A1 | 10/2023 |
| WO | WO-2023192623 A2 | 10/2023 |
| WO | WO-2023205073 A1 | 10/2023 |
| WO | WO-2023215313 A1 | 11/2023 |
| WO | WO-2024077269 A2 | 4/2024 |

OTHER PUBLICATIONS

Chitrakar et al., A New Type of Manganese Oxide ($MnO_2 \cdot 0.5H_2O$) Derived from $Li_{1.6}Mn_{1.6}O_4$ and Its Lithium Ion-Sieve Properties. Chem. Mater. 12:3151-3157 (2000).

Chitrakar et al. Lithium recovery from salt lake brine by $H_2TiO_3$. Dalton Trans 43:8933-8939 (2014).

Chitrakar et al. Selective Uptake of Lithium Ion from Brine by $H_{1.33}Mn_{1.67}O_4$ and $H_{1.6}Mn_{1.6}O_4$. Chem Lett 41:1647-1649 (2012).

Cho et al. High-Performance $ZrO_2$-Coated $LiNiO_2$ Cathode Material. Electrochem Solid-State Lett 4(10):A159-A161 (2001).

Department of Energy. Ion Exchange Materials for Lithium Extraction (Topic: 15, Subtopic: e)—Abstract. Available at https://www.sbir.gov/sbirsearch/detail/1307793 (3 pgs.) (2017).

Doan et al. Preparation of carbon coated $LiMnPO_4$ powders by a combination of spray pyrolysis with dry ball-milling followed by heat treatment. Advanced Powder Technology 21(2):187-196 (2010).

Larumbe et al. Effect of a $SiO_2$ coating on the magnetic properties of $Fe_3O_4$ nanoparticles. J Phys Condens Matter 24(26):266007 (2012).

Liu et al. Recent developments in electrolytic devices for ion chromatography. J Biochem Biophys Methods 60(3):205-232 (2004).

Lu et al. Soft chemical synthesis and adsorption properties of $MnO_2$ center dot $0.5H(2)O$, a high performance ion sieve for lithium. Acta Chimica Sinica 65(12):1135-1139 (2007).

Miyai et al. Bench scale studies on lithium recovery from sea water. Nippon Kaisui Gakkai-Shi—Bulletin of the Society of Sea Waterscience, Japan 49(4):226-230 (1995) (English Abstract).

Nishihama et al. Selective recovery process of lithium from seawater using integrated ion exchange methods. Solvent Extraction and Ion Exchange 29:421-431 (2011).

Oh et al. Double Carbon Coating of $LifePO_4$ as High Rate Electrode for Rechargeable Lithium Batteries. Adv. Mater. 22:4842-4845 (2010).

Ooi et al., Mechanism of lithium (1+) insertion in spinel-type manganese oxide. Redox and ion-exchange reactions. Langmuir 7:1167-1171 (1991).

Pareja et al. Corrosion behaviour of zirconia barrier coatings on galvanized steel. Surface and Coatings Technology 200(22-23):6606-6610 (2006).

Patel et al. Ionic and electronic conductivities of atomic layer deposition thin film coated lithium ion battery cathode particles. RSC Advances 6:98768-98776 (2016).

PCT/US2017/061384 International Search Report and Written Opinion dated Feb. 14, 2018.

(56) References Cited

OTHER PUBLICATIONS

PCT/US2018/044821 International Search Report and Written Opinion dated Oct. 12, 2018.
PCT/US2018/044868 International Search Report and Written Opinion dated Mar. 6, 2019.
PCT/US2019/017885 International Search Report and Written Opinion dated Jun. 14, 2019.
PCT/US2019/019780 International Search Report and Written Opinion dated Jun. 14, 2019.
PCT/US2021/012534 International Search Report and Written Opinion dated Apr. 27, 2021.
PCT/US2021/036227 International Search Report and Written Opinion dated Nov. 2, 2021.
PCT/US2021/059921 International Search Report and Written Opinion dated Mar. 14, 2022.
PCT/US2022/025810 International Search Report and Written Opinion dated Sep. 30, 2022.
PCT/US2022/025810 Invitation to Pay Additional Fees dated Jul. 5, 2022.
PCT/US2023/016438 International Search Report and Written Opinion dated Jun. 27, 2023.
PCT/US2023/016443 International Search Report and Written Opinion dated Jul. 25, 2023.
PCT/US2023/018806 International Search Report and Written Opinion dated Jun. 30, 2023.
Reichel et al. Lithium recovery from lithium-containing micas using sulfur oxidizing microorganisms. Minerals Engineering 106:18-21 (2017).
Rioyo et al. Lithium Extraction from Spodumene by the Traditional Sulfuric Acid Process: A Review. Mineral Processing and Extractive Metallurgy Review 43(1):97-106 (2020).
Tarakina et al. Defect crystal structure of new TiO(OH)2 hydroxide and related lithium salt Li2TiO3. Dalton Trans 39:8168-8176 (2010).
Thackeray et al., Li 2 MnO 3-stabilized LiMO 2 (M=Mn, Ni, Co) electrodes for lithium-ion batteries. J Mat Chem., 17:3112 (2007).
Umeno et al. Preparation and Adsorptive Properties of Membrane-Type Adsorbents for Lithium Recovery from Seawater. Ind Eng Chem Res 41(17):4281-4287 (2002).
Xiao et al. Adsorption and desorption behavior of lithium ion in spherical PVC-MnO2 ion sieve. Industrial & engineering chemistry research, 51(33):10921-10929 (2012).
Xiao et al. Lithium ion recovery from brine using granulated polyacrylamide-MnO 2 ion-sieve. Chemical Engineering Journal 279:659-666 (2015).
Xie et al. Preparation and Lithium Extraction of Li1.6Mn1.6O4/PVDF Porous Film. Chinese Journal of Chemical Engineering pp. 1-3 2014) Retrieved from the Internet: URL:https://d.wanfangdata.com.cn/periodical/ChlQZXJpb2RpY2FsQ0hJTmV3UzlwMjlwNDE1Eg10Z3hiMjAxNDAxMDMxG ghva3phOTl2ZQ°/O3D°/O3D.
Yang et al., TiO2 Coating Modification for Lithium Ion Sieve. Material Reports 31:435-438 (2017) (English Abstract).
Zaghib et al. Safe and fast-charging Li-ion battery with long shelf life for power applications. J Power Sources 196:3949-3954 (2011).
Zandvakili et al. Preparation and characterisation of lithium ion exchange composite for the recovery of lithium from brine. Mineral Processing and Extractive Metallurgy 127(3):176-181 (2017).
Zhang et al. Li2SnO3 derived secondary Li—Sn alloy electrode for lithium-ion batteries. J. Alloys Compd. 415:229-233 (2006).
Anonymous. Pure Energy Minerals Reports High Lithium Recoveries From Successful Mini- Pilot Testing Campaign. (Dec. 13, 2016) Retrieved from the Internet: URL:https://pureenergyminerals.com/pure-energy-minerals-reports-high-lithium-recoveries-from-successful-mini-pilot/.
Co-pending U.S. Appl. No. 18/200,306, inventor Snydacker; David Henry, filed on May 22, 2023.
Co-pending U.S. Appl. No. 18/484,213, inventors Snydacker; David Henry et al., filed on Oct. 10, 2023.
Co-pending U.S. Appl. No. 18/484,217, inventors Snydacker; David Henry et al., filed on Oct. 10, 2023.
Dlamini et al. Polymeric ion exchanger supported ferric oxide nanoparticles as adsorbents for toxic metal ions from aqueous solutions and acid mine drainage. J Environ Health Sci Eng 17(2):719-730 (2019).
Ma et al. CN 105251436 A Supplemental Machine Translation, original document published Jan. 20, 2016, translated Aug. 10, 2023.
Molnar et al. Preliminary Economic Assessment (Rev. 1) of the Clayton Valley Lithium Project. (Jan. 28, 2019) Retrieved from the Internet: URL:https://wp-pureenergyminerals- 2023.s3.ca-central-I.amazonaws.com/media/2018/04/PureEnergy_ClaytonValleyPEA_Rev1_23March2018.pdf.
PCT/US2023/017172 International Search Report and Written Opinion dated Sep. 19, 2023.
PCT/US2023/020726 International Search Report and Written Opinion dated Aug. 25, 2023.
PCT/US2023/080369 International Invitation to Pay Additional Fees dated Jan. 26, 2024.
Renew et al. Geothermal Thermoelectric Generation (G-TEG) with Integrated Temperature Driven Membrane Distillation and Novel Manganese Oxide for Lithium Extraction. (Jun. 1, 2017) Retrieved from the Internet: URL:https://www.osti.gov/servlets/purl/1360976.
Schultze et al. Recovering Lithium Chloride From a Geothermal Brine. US Department of the Interior, Bureau of Mines. Vol. 8883 (18 pgs) (1984).
Song et al. Lithium extraction from Chinese salt-lake brines: opportunities, challenges, and future outlook. Environ. Sci.: Water Res. Technol., 3:593-597 (2017).
Xu et al. Extraction of lithium with functionalized lithium ion-sieves. Progress in Materials Science 84:276-313 (2016).
Herrmann, Laura., et al., Lithium recovery from geothermal brine—an investigation into the desorption of lithium ions using manganese oxide adsorbents. Energy Adv 1: 877-885 (2022).

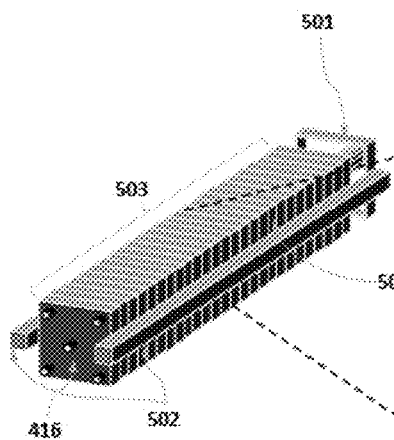
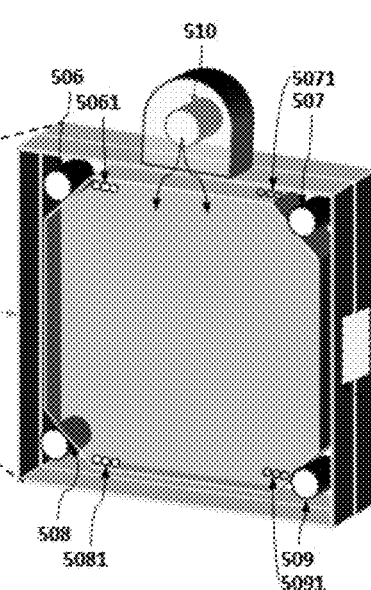
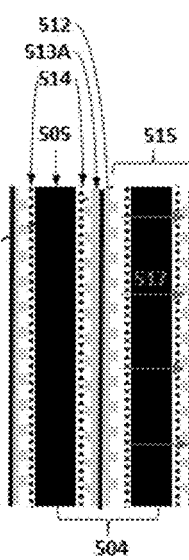
FIG. 5A            FIG. 5B            FIG. 5C
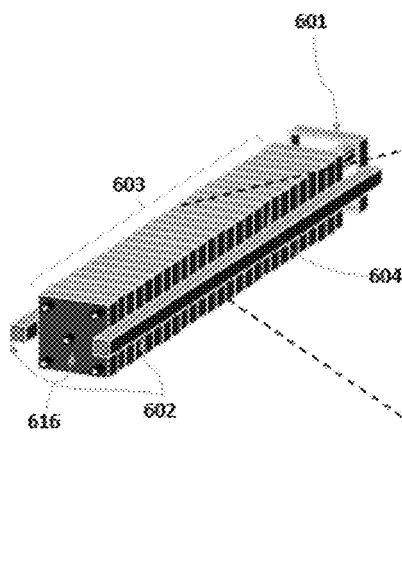
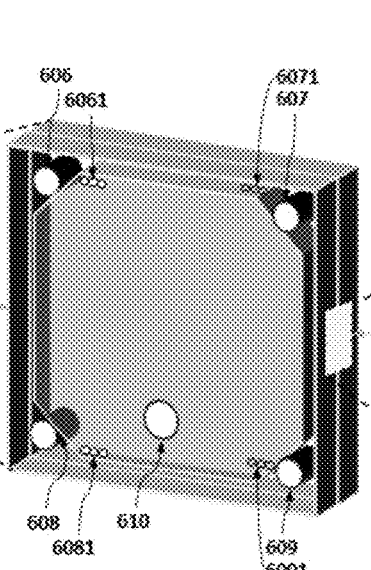
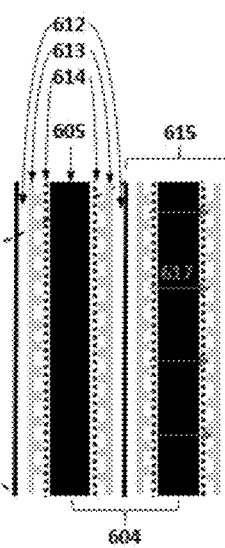
FIG. 6A            FIG. 6B            FIG. 6C

DEVICES FOR EFFICIENT SORBENT UTILIZATION IN LITHIUM EXTRACTION

CROSS-REFERENCE

This application is a continuation of International Application No. PCT/US2023/016443 filed Mar. 27, 2023, which claims the benefit of U.S. Provisional Application Ser. No. 63/401,453 filed Aug. 26, 2022, and U.S. Provisional Application Ser. No. 63/324,559 filed Mar. 28, 2022, each of which is hereby incorporated by reference in its entirety.

BACKGROUND OF THE DISCLOSURE

Lithium is an essential element for high-energy rechargeable batteries and other technologies. Lithium is found in a variety of liquid solutions, including natural and synthetic brines and leachate solutions from minerals and recycled products.

SUMMARY OF THE DISCLOSURE

Lithium can be extracted from liquid resources using inorganic lithium-selective sorbents with absorb lithium preferentially over other ions. These lithium-selective sorbents include lithium-selective ion exchange materials.

Disclosed herein is a device for lithium extraction from a liquid resource, the device comprising: (i) sorbent material that selectively absorbs lithium from the liquid resource; and (ii) one or more filter banks; wherein each of the one or more filter banks comprises: (a) two opposing filter plates that, when placed together, form a compartment; (b) one or more permeable partitions, wherein the one or more permeable partitions line the interior of the compartment and contain the sorbent material; (c) one or more flow distributors optionally joined to the surface of one or both of the two opposing filter plates, (d) one or more inlets and one or more outlets, wherein the one or more inlets and one or more outlets are configured to allow the liquid to flow through the one or more filter banks. In some embodiments, the one or more flow distributors and one or more filter banks are configured to uniformly distribute the flow of liquid through the sorbent material contained in the filter bank. In some embodiments, the one or more flow distributors and one or more filter banks are configured such that each volume of sorbent material within the device is contacted with the same volume of liquid resource within a given time period. In some embodiments, said flow distributor comprises a deformable component. In some embodiments, deformable component mechanically compresses the sorbent material. In some embodiments, uniform distribution of flow through the sorbent material results in a higher lithium absorption capacity of the sorbent material. In some embodiments, uniform distribution of flow through the sorbent material results in a higher selectivity for lithium ab sorption by the sorbent material over other ions present in the liquid resource. In some embodiments, uniform distribution of flow through the sorbent material results in minimizing the distance required to flow the liquid through the one or more filter banks. In some embodiments, minimizing the distance required to flow the liquid through the one or more filter banks reduces the change in pressure when flowing liquid across the one or more filter banks. In some embodiments, the ratio of thickness to cross-sectional length is from about 1:1 to about 1:500, wherein the thickness of said filter bank is the distance which the liquid resource travels across the sorbent material from said inlet to said outlet flow distributors, and wherein the cross-sectional length of the filter bank is the longest distance that is geometrically orthogonal to said thickness. In some embodiments, the thickness of said filter bank comprising a sorbent material is from about 5 to about 75 mm. In some embodiments, the thickness of said filter bank comprising a sorbent material is from about 10 to about 75 mm. In some embodiments, the thickness of said filter bank comprising a sorbent material is from about 18 to about 60 mm. In some embodiments, the cross-sectional length of said filter bank comprising a sorbent material is from about 5 to about 5000 mm. In some embodiments, the cross-sectional length of said filter bank comprising a sorbent material is from about 100 to about 5000 mm. In some embodiments, the cross-sectional length of said filter bank comprising a sorbent material is from about 2000 to about 6000 mm. In some embodiments, the cross-sectional length of said filter bank comprising a sorbent material is from about 100 to about 2500 mm. In some embodiments, the cross-sectional length of said filter bank comprising a sorbent material is from about 250 to about 2500 mm. In some embodiments, two or more filter banks are connected. In some embodiments, said device comprises a single inlet and single outlet for said liquid resource. In some embodiments, the liquid resource flows from the single inlet of said device into a fluid conduit that distributes flow to each flow distributor and filter bank. In some embodiments, the liquid resource flows out of each filter bank and flow distributor, into a fluid conduit that collects flow from each filter bank and out of said device through a single outlet. In some embodiments, said device comprises a one or more inlets and one or more outlets for said liquid resource. In some embodiments, said device comprises from about 1 to about 250 filter banks. In some embodiments, said device comprises from about 1 to about 150 filter banks. In some embodiments, liquid flows across the sorbent material along the thickness of sorbent material contained in the filter bank. In some embodiments, the one or more filter banks are arranged such that the filter banks share a common axis of symmetry. In some embodiments, said axis is oriented parallel, perpendicular, or at an angle relative to the ground foundation onto which said device is mounted. In some embodiments, the one or more filter banks are mechanically compressed together. In some embodiments, said mechanical compression is applied at one end of the device. In some embodiments, said mechanical compression is applied by a hydraulic system. In some embodiments, the pressure of said compressive force is from about 1 psi to about 10,000 psi. In some embodiments, the pressure of said compressive force is from about 10 psi to about 100,000 psi. In some embodiments, each of the one or more filter banks contains a connection to one or more fluid conduits that delivers flow to and from each of the one or more filter banks. In some embodiments, the device further comprises void spaces between each of the filter banks and filter plates, wherein the void spaces are aligned to form one or more fluid conduits. In some embodiments, said one or more fluid conduits have an internal diameter of from about 0.125 to about 12 inches. In some embodiments, said one or more fluid conduits have an internal diameter of from about 0.5 to about 8 inches. In some embodiments, said one or more fluid conduits have an internal diameter of from about 6 to about 20 inches. In some embodiments, the ratio of the average cross-sectional area of each said one or more fluid conduits to the average cross-sectional area of the bed of sorbent in said filter bank is from about 0.01 to 1. In some embodiments, the ratio of the average cross-sectional area of each said one or more fluid conduits to the average cross-sectional area of the bed of sorbent in said filter bank is from about 0.01 to 0.15. In some embodiments, the one or more flow distributors comprise one or more slots, orifices, or openings that connect to a fluid conduit delivers flow to and from the filter plates. In some embodiments, the one or more flow distributors comprise textured flow distribution shapes comprising grooves, dimples, pips, protrusions, stay bosses, raised surfaces, or any other geometric shape that protrude from the surface on said filter plate. In some embodiments, the permeable partition lies on top of said textured flow distribution shapes such that a void exists between the surface of the filter plate and the cloth, wherein the void is flooded with fluid to form a fluid conduit. In some embodiments, the device is configured to maintain fluid communication through the permeable partition, the voids, the filter plate and any additional fluid conduits. In some embodiments, the thickness of said void between the bottom of the filter plate and the permeable partition is from about 2 mm to about 15 mm. In some embodiments, the liquid flows to and from a fluid conduit external to each filter bank. In some embodiments, the fluid flow to/from the filter bank and fluid conduit can occur from one or more locations in the filter bank. In some embodiments, one or more non-permeable components of the filter bank are deformable. In some embodiments, each of the one or more filter banks further comprises a non-porous deformable surface. In some embodiments, the flow distributor in the filter bank is deformable. In some embodiments, the deformation of said flow distributor mechanically compresses the sorbent material. In some embodiments, said mechanical compression reduces the volume that the sorbent material occupies within the filter bank. In some embodiments, said mechanical compression is applied by pressurizing a fluid or gas that is contained within a chamber opposite the side of the flow distributor through which the liquid resource flows. In some embodiments, said mechanical compression results in a more uniform distribution of flow of liquid through the sorbent material contained in the filter bank. In some embodiments, said mechanical compression is applied with a pressure of about 1 psi to about 250 psi. In some embodiments, the pressure of fluid flowing through the filter bank is from about 0.1 psi to about 100 psi. In some embodiments, the pressure of fluid flowing through the filter bank is from about 0.1 psi to about 250 psi. In some embodiments, said sorbent material is loaded into said filter banks prior to flow of said liquid resource. In some embodiments, the device is configured to allow a gas to flow through the one or more filter banks. In some embodiments, said gas comprises air, oxygen, nitrogen, combinations thereof. In some embodiments, the device further comprises at least two filter banks joined together with structural supports to form a filter press. In some embodiments, the filter plates are gasketed, non-gasketed, recessed, plate- and frame, membrane squeeze, diaphragm squeeze, or combinations thereof. In some embodiments, the filter plates are membrane squeeze plates. In some embodiments, the filter plates are diaphragm squeeze plates. In some embodiments, the structural supports comprise a mechanical frame for supporting the filter banks. In some embodiments, the device further comprises a hydraulic system for applying mechanical compressive force to hold all filter banks together. In some embodiments, the device further comprises a manual, semi-automatic, or automatic plate shifter, a drip tray, a cake discharge tray, an end plate, a blind plate, or combinations thereof. In some embodiments, the operation of said filter press does not require operator intervention. In some embodiments, the filter plates are comprised of a polymer or a metal. In some embodiments, the filter plates are comprised of a polymer comprising polypropylene, polyvinyl difluoride, EPDM, NBR, FKM, mixtures thereof or combinations thereof. In some embodiments, the filter plates are comprised of a metal comprising steel, stainless steel, titanium, Hastelloy, aluminum, mixtures thereof, alloys thereof, or combinations thereof. In some embodiments, the filter plates are fabricated by machining, molding, or a combination thereof. In some embodiments, the filter plates have an approximate cross-sectional length of about 100, 230, 320, 400, 470, 500, 630, 800, 900, 1000, 1100, 1200, 1300, 1400, 1500, 2000, 3000, 4000, 5000, 1500 by 2000, 2000 by 4000, 4000 by 5000 mm. In some embodiments, the sorbent material that selectively absorbs lithium comprises an ion exchange material. In some embodiments, the ion exchange material exchanges lithium ions and hydrogen ions. In some embodiments, the ion exchange material absorbs lithium while releasing hydrogen ions, and absorbs hydrogen ions while releasing lithium. In some embodiments, said ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof. In some embodiments, said ion exchange material is a coated ion exchange material with a coating that is selected from an oxide, a polymer, or combinations thereof. In some embodiments, said ion exchange material is a coated ion exchange material with a coating that is selected from $SiO_2$, $TiO_2$, $ZrO_2$, polyvinylidene difluoride, polyvinyl chloride, polystyrene, polybutadiene, polydivinylbenzene, or combinations thereof. In some embodiments, the ion exchange material is in the form of porous ion exchange beads. In some embodiments, the porous ion exchange beads comprise ion exchange particles that reversibly exchange lithium and hydrogen and a structural matrix material, and having a pore network. In some embodiments, the matrix material is selected from the group consisting of polyvinyl fluoride, polyvinylidene difluoride, polyvinyl chloride, polyvinylidene dichloride, polyethylene, polypropylene, polyphenylene sulfide, polytetrafluoroethylene, sulfonated polytetrafluoroethylene, polystyrene, polydivinylbenzene, polybutadiene, sulfonated polymer, carboxylated polymer, poly-ethylene-tetrafluoroethyelene, polyacrylonitrile, tetrafluoroethylene-perfluoro-3,6-dioxa-4-methyl-7-octene-sulfonic acid copolymer, copolymers thereof, and combinations thereof. In some embodiments, the sorbent material that selectively absorbs lithium comprises one or more of lithium, aluminum, chloride, hydroxide, combinations thereof, compounds thereof, or solid solutions thereof. In some embodiments, the sorbent material that selectively absorbs lithium comprises a crystalline lithium salt aluminate, a lithium aluminum intercalate, $LiCl \cdot 2Al(OH)_3$, crystalline aluminum trihydroxide ($Al(OH)_3$), gibbsite, beyerite, nordstrandite, alumina hydrate, bauxite, amorphous aluminum trihydroxide, activated alumina layered lithium-aluminum double hydroxides, $LiAl_2(OH)_6Cl$, combinations thereof, compounds thereof, or solid solutions thereof. In some embodiments, the sorbent material contains one or more of scandium, titanium, vanadium, chromium, manganese, iron, cobalt, nickel, copper, zinc, yttrium, zirconium, and niobium, mixtures thereof, compounds thereof, or combinations thereof. In some embodiments, the sorbent material is incorporated into a matrix comprising one or more of a zeolite, a resin, a polymer consisting of polyethylene, polypropylene, polyacrylate, polyvinylidene difluoride, polyvinyl chloride, polystyrene, polybutadiene, polydivinylbenzene, polytetrafluoroethylene, combinations thereof or mixtures thereof. In some embodiments, the permeable partition in the one or more filter banks comprises an embedded lithium selective sorbent. In some embodiments, one or more of the mechanical components of the filter bank comprises a lithium selective sorbent. In some embodiments, the sorbent material selectively absorbs lithium from a liquid resource, and releases said absorb lithium when treated with a dilute aqueous solution. In some embodiments, the dilute aqueous solution used to desorb lithium comprises one or more of lithium chloride, hydrogen chloride, lithium sulfate, sulfuric acid, water, solutions thereof or combinations thereof. In some embodiments, the particle size of the sorbent material is from about 0.1 microns to about 10 microns, from about 1 micron to about 100 microns, from about 10 microns to about 1000 microns, or from about 100 microns to about 1 cm. In some embodiments, the particle size of said sorbent material is from about 1 micron to about 100 microns. In some embodiments, the particle size of said sorbent material is from about 100 micron to about 1000 microns. In some embodiments, the particle size of said sorbent material is from about 100 micron to about 500 microns. In some embodiments, said liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the lithium-selective sorbent material is incorporated into the filter bank during manufacturing of the filter bank.

Disclosed herein is a method of loading any one of the devices described herein with a sorbent material, the method comprising (i) forming suspension of sorbent material; and (ii) conveying the suspension of sorbent material into the compartment lined with one or more permeable partitions, such that the sorbent material is contained within the compartment and one or more permeable partitions and the liquid passes through the compartment and one or more permeable partitions. In some embodiments, the suspension of sorbent materials is conveyed into one or more inlets in the device. In some embodiments, the sorbent material is uniformly distributed within the filter bank. In some embodiments, the suspension of sorbent material is conveyed through a pipe or conduit that is located at the center, corner, bottom-center, above, below, at the side, or at any other location within said filter bank. In some embodiments, conveying the suspension of sorbent material is continued until the available volume in said filter bank is occupied by the sorbent material. In some embodiments, conveying the suspension of sorbent material is stopped before the available volume in said filter bank is occupied by the sorbent material. In some embodiments, the pressure required to pump the suspension of sorbent material is from about 0.1 psi to about 250 psi. In some embodiments, the suspension of sorbent material is conveyed with a pump selected from a double-diaphragm pump, and air operated double-diaphragm pump, a diaphragm pump, a positive displacement pump, a centrifugal pump, a vortex pump, a slurry pump, or combinations thereof. In some embodiments, the sorbent material is unloaded from the filter banks by physical separating the plates comprising said filter banks, with the optional aid of a mechanical device. In some embodiments, at least a portion of said unloaded sorbent material is reused for lithium extraction. Disclosed herein A system for lithium extraction from a liquid resource, comprising (i) one or more devices for lithium extraction described herein; (ii) one or more tanks; (iii) one or more agitators; (iv) one or more valves; (v) one or more pumps; and (v) interconnecting pipes, wherein (i) through (vi) are configured to contact the sorbent material within the one or more filter banks with a liquid resource, a wash solution, and an eluent solution. In some embodiments, the eluent solution comprises water, hydrochloric acid, sulfuric acid, nitric acid, mixtures thereof, or combinations thereof.

Disclosed herein is a method of extracting lithium from a liquid resource, the method comprising: (i) conveying the liquid resource through a device disclosed herein; (ii) optionally conveying a wash solution or gas through the device; (iii) conveying an eluate solution through the device, wherein the eluate solution comprises an acid.

Disclosed herein is a method of extracting lithium from a liquid resource, the method comprising: (i) conveying the liquid resource through one or more filter banks to contact a sorbent material; (ii) optionally conveying a wash solution or gas through the device; (iii) conveying an eluate solution through the device, wherein the eluate solution comprises an acid; wherein each of the one or more filter banks comprises: (a) two opposing filter plates that, when placed together, form a compartment; (b) one or more permeable partitions, wherein the one or more permeable partitions line the interior of the compartment and contain the sorbent material; (c) one or more flow distributors optionally joined to the surface of one or both of the two opposing filter plates, (d) one or more inlets and one or more outlets, wherein the one or more inlets and one or more outlets are configured to allow the liquid to flow through the one or more filter banks.

Disclosed herein is a method of extracting lithium from a liquid resource, the method comprising: (i) contacting the liquid resource with a sorbent material; (ii) optionally contacting a wash solution or gas to the sorbent material; (iii) loading the sorbent material into one or more filter banks; (iii) conveying an eluate solution through the filter bank, wherein the eluate solution comprises an acid, wherein each of the one or more filter banks comprises: (a) two opposing filter plates that, when placed together, form a compartment; (b) one or more permeable partitions, wherein the one or more permeable partitions line the interior of the compartment and contain the sorbent material; (c) one or more flow distributors optionally joined to the surface of one or both of the two opposing filter plates, (d) one or more inlets and one or more outlets, wherein the one or more inlets and one or more outlets are configured to allow the liquid to flow through the one or more filter banks.

Disclosed herein is a method of extracting lithium from a liquid resource, the method comprising: (i) conveying the liquid resource through a device disclosed herein; (iii) unloading the sorbent material into a tank; (iv) contacting the sorbent material with an eluate solution through the filter bank, wherein the eluate solution comprises an acid.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 2A illustrates a filter press comprising filter plates stacked together; FIG. 2B illustrates the face of a filter bank; FIG. 2C illustrates the interior of the filter banks.

FIG. 3A illustrates a filter press comprising filter plates stacked together; FIG. 3B illustrates the face of a filter bank; FIG. 3C illustrates the interior of the filter banks.

FIG. 4A illustrates a filter press comprising filter plates stacked together; FIG. 4B illustrates the face of a filter bank; FIG. 4C illustrates the interior of the filter banks.

FIG. 5A-5C illustrates a lithium extraction device comprising a filter press loaded with ion exchange beads. FIG. 5A illustrates a filter press comprising filter plates stacked together; FIG. 5B illustrates the face of a filter bank; FIG. 5C illustrates the interior of the filter banks.

FIG. 6A-6C illustrates a lithium extraction device comprising a filter press loaded with lithium aluminum intercalate, wherein said filter press is equipped with membrane-squeeze plates. FIG. 6A illustrates a filter press comprising filter plates stacked together; FIG. 6B illustrates the face of a filter bank; FIG. 6C illustrates the interior of the filter banks.

FIG. 7A illustrates a filter press comprising filter plates stacked together; FIG. 7B illustrates the interior of the filter banks.

FIG. 11A illustrates a filter press comprising filter plates stacked together; FIG. 11B illustrates the face of a filter bank; FIG. 11C illustrates the interior of the filter banks.

DETAILED DESCRIPTION OF THE DISCLOSURE

Figure 1:
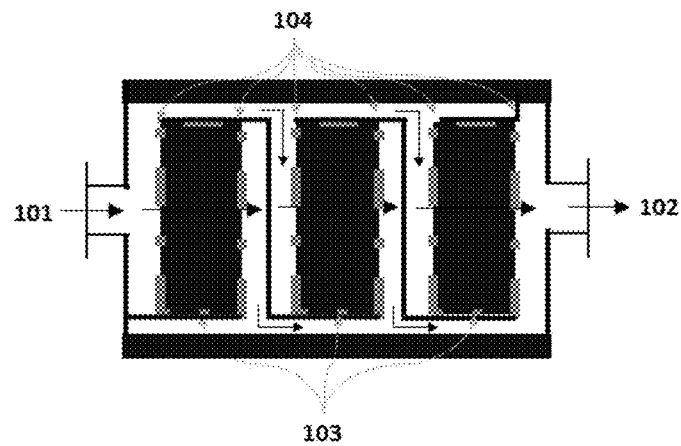
FIG. 1 illustrates a lithium extraction device comprising a vessel with one or more filter banks loaded with ion exchange beads.

Lithium is an essential element for batteries and other technologies. Lithium is found in a variety of liquid resources, including natural and synthetic brines and leachate solutions from minerals, clays, and recycled products. Lithium is extracted from such liquid resources using inorganic lithium-selective sorbents with absorb lithium preferentially over other ions. These lithium-selective sorbents include lithium-selective ion exchange materials.

For the purposes of this disclosure, the term lithium-selective sorbent includes all lithium-selective ion-exchange materials. In some embodiments, lithium-selective sorbents include other inorganic material that selectively absorb lithium over other ions. In some embodiments, said lithium selective sorbent is a crystalline lithium salt aluminate, a lithium aluminum intercalate, $LiCl \cdot 2Al(OH)_3$, crystalline aluminum trihydroxide ($Al(OH)_3$), gibbsite, beyerite, nordstrandite, alumina hydrate, bauxite, amorphous aluminum trihydroxide, activated alumina layered lithium-aluminum double hydroxides, $LiAl_2(OH)_6Cl$, combinations thereof, compounds thereof, or solid solutions thereof.

These lithium-selective ion exchange materials are used in an ion exchange lithium-extraction process. These inorganic ion exchange materials absorb lithium from a liquid resource while releasing hydrogen, and then elute lithium in acid while absorbing hydrogen. This ion exchange process is optionally repeated to extract lithium from a liquid resource and yield a concentrated lithium solution. The concentrated lithium solution is optionally further processed into chemicals for the battery industry or other industries.

Ion exchange beads, including ion exchange particles, ion exchange material, ion exchange media, porous ion exchange beads, and/or coated ion exchange particles, are loaded into ion exchange vessels. Alternating flows of brine, acid, and other solutions are optionally flowed through an ion exchange column or vessel to extract lithium from the brine and produce a lithium concentrate, which is eluted from the column or vessel using the acid. As brine flows through the ion exchange column or vessel, the beads absorb lithium while releasing hydrogen, wherein both the lithium and hydrogen are cations. After the beads have absorbed lithium, acid is used to elute the lithium from the ion exchange beads to produce an eluate or lithium-enriched solution.

Ion exchange beads may have small diameters less than about one millimeter or less, causing a high pressure difference across a packed bed of the beads during pumping of the liquid resource and other fluids through the bed. To minimize pressure across the packed bed and to minimize associated pumping energy, vessels with optimized geometries are used to reduce the flow distance through the packed bed of ion exchange beads. These vessels may be networked with pH modulation units to achieve adequate control of the pH of the liquid resource. In some embodiments a network of vessels loaded with ion exchange materials may comprise two vessels, three vessels, four vessels, five vessels, six vessels, seven vessels, eight vessels, nine vessels, 10 vessels, 11 vessels, 12 vessels, 13-14 vessels, 15-20 vessels, 20-30 vessels, 30-50 vessels, 50-70 vessels, 70-100 vessels, or more than 100 vessels.

Minimizing pressure across the packed bed is important for maximizing the efficiency of lithium extraction by ion exchange beads. For example, ion exchange beads of average particle diameter of about 0.5 mm are arranged in a bed with a flow bath of 1 m in length. When brine is flown through said bed, the resulting pressure drop is 75 psi, and 80% of the available lithium in the brine is recovered. As illustrated in example 4, if ion exchange beads of average particle diameter of about 0.25 mm are arranged in a bed with a flow bath of 1 m in length, the resulting pressure drop when brine is flown is 100 psi, making it impractical for commercial use. Instead, these beads are arranged into four 25 cm beds using a vessel designed for minimal flow distance, as described in this patent. When such a vessel is used, the pressure drop is of only 25 psi, and 90% of the lithium in the brine is recovered. Thus, the use of vessels designed for minimal flow distance across an ion exchange bed can improve performance and facilitate the successful commercial practice of lithium extraction by ion exchange.

The performance of lithium-selective sorbents, including ion exchange beads, for lithium extraction reflects the ability for said sorbents to capture lithium from liquid resources in high amounts, in high purity, and over long periods time. When a given amount of said ion-exchange material contacts a given amount of liquid resource, wash solution, eluent solution, or other process fluid, the effectiveness of selective lithium absorption, washing, lithium release/elution, or other treatment depends on effective contact of said process fluids with said ion-exchange material. In some embodiments, said effective contact implies that a given amount of ion exchange material is contacted with the same amount of fluid, and that the composition of said fluid is the same as that contacting the entirety of the ion exchange material. As such, in some embodiments, it is essential that devices for lithium extraction be designed in a manner that the lithium selective sorbent uniformly contact the fluid. In some embodiments, said uniform contact implies that the liquid resource from which lithium is extracted uniformly contacts an ion exchange material which absorbs lithium while releasing protons.

Maximizing the performance of the ion exchange is advantageous for lithium production by ion exchange. Disclosed herein is a device, and associated systems, methods and processes, for maximizing the performance of ion exchange by maximizing the uniformity of liquid flow through a bed of the lithium-selective sorbent material. Flow uniformity implies that each volume of sorbent material within the filter bank is contacted with the same volume of liquid within a given time.

Maximizing said flow uniformity results in the most optimal utilization of said material for lithium extraction, and helps ensure a prolonged material life. In some embodiments, maximizing flow uniformity involves minimizing the flow resistance of liquids to flow across the ion exchange beds, which include the liquid resource from which lithium is extracted, water used for washing of the ion exchange beads, and acid used to elute lithium, results in a lower energy associated for pumping through the ion exchange beds.

In some embodiments, maximizing flow uniformity results in improved process performance parameters. In some embodiments, such improved performance is manifested by a lower pressure drop for flow of the same amount of liquid across the ion exchange material using in the vessels and systems described herein. In some embodiments, such improved performance is manifested by a higher lithium production rate for flow of the same amount of liquid across the ion exchange material using in the vessels and systems described herein. In some embodiments, such improved performance is manifested by a higher lithium purity of lithium produced for flow of the same amount of liquid across the ion exchange material using in the vessels and systems described herein.

Vessels for Beds of Ion Exchange Beads

For commercial production of lithium using ion exchange, it is desirable to construct large-scale ion exchange modules containing large quantities of ion exchange beads. However, most large vessels capable of holding about one tonne or more of ion exchange beads have large fluid flow distances of about one meter or more. These fluid flow distances cause large pressure drops. To reduce the pressure drop across the ion exchange bed, the ion exchange beads are loaded into vessels facilitating flow across the ion exchange beads with a shorter fluid flow distance. These vessels are designed to evenly distribute flow of the liquid resource and other fluids through the ion exchange beads.

In some embodiments, the vessel are oriented vertically, horizontally, or at any angle relative to the horizontal axis. In some embodiments, the vessel are cylindrical, rectangular, spherical, another shape, or a combinations thereof. In some embodiments, the vessel can have a constant cross-sectional area or a varying cross-sectional area.

In some embodiments, the vessel has a height to diameter ratio of less than ab out 0.1, 0.5 less than about 1, less than about 2, less than about 5, less than about 10, more than about 0.1 more than about 0.5, more than about 1, more than about 2, more than about 5, more than about 10. In one embodiment, the vessel internal is coated with a polymeric or rubber material. In one embodiment the vessel is equipped with an outlet collector tray. In one embodiment the vessel has multiple injection ports for the inlet or outlet flow. In one embodiment the flow is introduced from the bottom, top, middle of the vessel, or a combination of thereof. In one embodiment the vessel is outfitted with baffles or plates to break fluid jets.

Ion Exchange Beads Contained within Vessels with Minimal Flow Distance

In some embodiments, the ion exchange beads contained within such a vessel have an average particle diameter less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the ion exchange beads have an average particle diameter more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the ion exchange beads have a typical particle size from about 10 μm to about 20 μm, from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm.

In some embodiments, the ion exchange beads contained within such a vessel are co-loaded with inert beads that do not undergo ion-exchange processes. Such co-loading of ion-exchange beads with inert beads may aid in more optimal flow distribution of process fluids, and/or in decreasing the resistance to flow through a bed of ion-exchange beads. In some embodiments, the inert beads may be loaded into the vessel adjacent to the ion exchange beads, mixed with the ion exchange beads, or a combination thereof. In some embodiments, inert beads consist of a polymer, a ceramic, a metal, a carbide, a nitride, an oxide, a phosphate, a fluoride, a polymer, carbon, a carbonaceous material, or combinations thereof. In a further aspect, the inert beads are coated. In some embodiments, the coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, the coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, the coating material comprises low density polyethylene, high density polyethylene, polypropylene, polyester, polytetrafluoroethylene (PTFE), types of polyamide, polyether ether ketone (PEEK), poly sulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly (chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In one embodiment, the coating material comprises low density polyethylene. In one embodiment, the coating material comprises polypropylene. In one embodiment, the coating material comprises polytetrafluoroethylene (PTFE). In one embodiment, the coating material comprises polyvinylidene fluoride (PVDF). In one embodiment, the coating material comprises polyvinyl chloride (PVC). In one embodiment, the coating material comprises ethylene tetrafluoroethylene polymer (ETFE).

In some embodiments, inert beads have an average particle diameter less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than ab out 300 µm, less than about 400 µm, less than about 500 µm, less than about 600 µm, less than about 700 µm, less than about 800 µm, less than about 900 µm, less than about 1000 µm, less than about 2000 µm. In some embodiments, inert beads have an average particle diameter more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, inert beads have a typical particle size from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the ion exchange beads contained within such a vessel are co-loaded with a dissolvable particle. In some embodiments, dissolvable particles can include a carbonate, a sulfate, a chloride, a fluoride, a bromide, a phosphate, a nitrate, an organic anion, a polymer, or a combination thereof. In some embodiments, dissolvable particles can include sodium, ammonium, potassium, magnesium, calcium, lithium, aluminum, or a combination thereof. In some embodiments, the dissolvable particles are dissolved from the ion-exchange bed after co-loading into the bed. In some embodiments, dissolution is achieved by treatment with water, acid, base or a combination thereof. In some embodiments, dissolution is achieved by treatment with water, acid, base, or a combination thereof at elevated temperature. In some embodiments, acid used for dissolution includes hydrochloric, phosphoric, sulfuric, citric, acetic, nitric, carbonic acids, or a combination thereof. In some embodiments, based use for dissolution includes sodium hydroxide, lithium hydroxide, potassium hydroxide, magnesium hydroxide, calcium hydroxide, or a combination thereof.

Embodiments Comprising Vessels for Beds of Ion Exchange Beads

In some embodiments, the vessel containing the above ion exchange beads or inert beads is comprised of a plurality of concentric walls: an outer-wall that contains all internal components of the vessel, an outer perforated wall, and an inner perforated wall. The dimensions of the outer wall is larger than the dimensions of the outer perforated wall, which is larger than the dimensions of the inner perforated wall. In some embodiments, ion exchange beads are contained in the compartment formed by the space between the inner- and outer-perforated walls. In some embodiments, flow of a liquid occurs through the space inside of the inner-perforated wall to and from the ion-exchange bead compartment. In some embodiments, liquid flow occurs through the space between the outer vessel wall and the outer perforated, to and from the ion-exchange bead compartment. Such a vessel is described in examples 3 and 11 and associated FIGS. 3 and 11.

In some embodiments, said vessel does not contain an inner perforated wall, such that all ion exchange media are contained within an outer perforated wall. In some embodiments, said vessel does not contain an outer perforated wall, such that all ion exchange media are contained within the outer wall of the vessel, surrounding an inner-perforated wall.

In some embodiments, flow of a liquid resource occurs in and out of the vessel as follows: from the top and bottom of the compartment formed by the outer-perforated wall the outer wall of the vessel, through the outer-perforated wall, into and through the compartment containing the ion-exchange beads, through the inner-perforated wall, and out of the top and bottom of the compartment formed by the inner-perforated walls. In some embodiments, flow of a liquid resource occurs in and out of the vessel as follows: from the top and bottom of the compartment formed by the inner-perforated wall, through the inner-perforated wall, into and through the compartment containing the ion-exchange beads, through the outer-perforated wall, and out of the compartment formed by the outer-perforated wall and the outside wall of the vessel.

In some embodiments, flow of an acidic solution occurs in and out of the vessel as follows: from the top and bottom of the compartment formed by the outer-perforated wall the outer wall of the vessel, through the outer-perforated wall, into and through the compartment containing the ion-exchange beads, through the inner-perforated wall, and out of the top and bottom of the compartment formed by the inner-perforated walls. In some embodiments, flow of an acidic solution occurs in and out of the vessel as follows: from the top and bottom of the compartment formed by the inner-perforated wall, through the inner-perforated wall, into and through the compartment containing the ion-exchange beads, through the outer-perforated wall, and out of the compartment formed by the outer-perforated wall and the outside wall of the vessel.

In some embodiments, the ion exchange beads are contacted with a liquid resource containing lithium, wherein flow occurs from the larger diameter perforated wall to the smaller diameter perforated wall through the shortest possible path across the ion exchange bead bed, resulting in absorption of lithium by said ion exchange beads. In some embodiments, the ion exchange beads are contacted with a liquid resource containing lithium, wherein flow occurs from the smaller diameter perforated wall to the larger diameter perforated wall, as illustrated in In some embodiments, the ion exchange beads that have absorbed lithium are contacted with hydrogen ions from acid, wherein flow occurs from the larger diameter perforated wall to the smaller diameter perforated wall, resulting in release of absorbed lithium to produce a lithium eluate. In some embodiments, the ion exchange beads that have absorbed lithium are contacted with hydrogen ions from acid, wherein flow occurs from the smaller diameter perforated wall to the larger diameter perforated wall, resulting in release of absorbed lithium to produce a lithium eluate.

In some embodiments, the ion exchange beads are contacted with a liquid resource containing lithium, wherein flow occurs from the top and bottom of the compartment containing the ion exchange beads, and into the smaller-diameter perforated wall, resulting in absorption of lithium by said ion exchange beads. In some embodiments, the ion exchange beads are contacted with a liquid resource containing lithium, wherein flow occurs from the smaller-diameter perforated wall to the top and the bottom of the compartment containing the ion exchange beads, resulting in absorption of lithium by said ion exchange beads. In some embodiments, the ion exchange beads are contacted with a liquid resource containing lithium, wherein flow occurs from the smaller-diameter perforated wall to the top or the bottom of the compartment containing the ion exchange beads, resulting in absorption of lithium by said ion exchange beads. In some embodiments, the ion exchange beads that have absorbed lithium are contacted with hydrogen ions from acid, wherein flow occurs from the top and bottom of the compartment containing the ion exchange beads, and into the smaller-diameter perforated wall, resulting in release of absorbed lithium to produce a lithium eluate. In some embodiments, the ion exchange beads that have absorbed lithium are contacted with hydrogen ions from acid, wherein flow occurs from the smaller-diameter perforated wall to the top and the bottom of the compartment containing the ion exchange beads, resulting in release of absorbed lithium to produce a lithium eluate. In some embodiments, the ion exchange beads that have absorbed lithium are contacted with hydrogen ions from acid, wherein flow occurs from the smaller-diameter perforated wall to the top or the bottom of the compartment containing the ion exchange beads, resulting in release of absorbed lithium to produce a lithium eluate.

In some embodiments, the compartment containing the ion-exchange beads consists of uniform inner- and outer-diameter perforated wall with constant radius along the vertical length of the vessel. In some embodiments, the compartment containing the ion-exchange beads consists of inner- and outer-diameter perforated walls with changing diameter to result in a fluid flow distance that varies along the vertical length of the vessel, thus facilitating the even distribution of fluid flow the compartment containing the ion exchange beads. In one embodiment, the length of the ion exchange bed at the center of the vessel (relative to its longitudinal axis) is at a minimum, whereas the length of the ion exchange bed at the top and bottom of the vessel (relative to its longitudinal axis) is at a maximum. In another embodiment, the length of the ion exchange bed at the top and bottom of the vessel (relative to its longitudinal axis) is at a minimum, whereas the length of the ion exchange bed at the center of the vessel (relative to its longitudinal axis) is at a maximum.

In some embodiments, the compartment containing the ion-exchange beads are contacted with fluid that flows across the shorter flow path, in the radial direction relative to the vessel. In some embodiments, the compartment containing the ion-exchange beads are contacted with fluid that flows across the longer flow path, in the axial direction relative to the vessel. In some embodiments, the compartment containing the ion-exchange beads are contacted with fluid in both the radial and the axial direction relative to the vessel.

In one embodiment, the ion exchange compartment is partially filled with ion exchange beads, such that ion exchange beads freely move within their containing compartment during contacting with fluid. In some embodiments, the ion exchange compartment within the reactor vessel is filled to its capacity with ion exchange beads, such that ion exchange beads are fixed in place and cannot freely move within the containing compartment during contacting with fluid. In one embodiment, the ion exchange compartment within the reactor vessel is partially filled, and becomes completely filled by the change in volume of ion exchange beads that occurs when contacting said beads with certain fluids. In some embodiments, the vessel is configured such that ion exchange beads may enter and leave the ion-exchange bead compartment conveyed by the fluid which they are contacting, whether this fluid flow happens in the axial or radial direction, in the out-in or in-out direction, in the top-down or down-top direction. In one embodiment, the ion exchange beads may be loaded into and unloaded from said compartments axially through the top or bottom, or radially through the inner- or outer-perforated walls.

In some embodiments, the typical length of the reactor vessel is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the reactor vessel is more than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of the reactor vessel is from about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the typical radius of the inner-perforated wall within the vessel is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the inner-perforated wall within the vessel is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the inner-perforated wall within the vessel is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m.

In some embodiments, the typical radius of the outer-perforated wall within the vessel is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the outer-perforated wall within the vessel is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical radius of the outer-perforated wall within the vessel is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m.

In some embodiments, the size of the openings in the inner-perforated walls are constant or almost-constant throughout the length and circumference of said wall. In some embodiments, the diameter of the openings in the inner-perforated walls vary along the length of said wall, being largest at the top and bottom and smallest at the center, largest at the center and smallest at the top and bottom, largest at the top and smallest at the bottom, smallest at the top and largest at the bottom, a combination thereof, or randomly distributed. In some embodiments, the dimension of the openings in the inner-perforated wall also vary along the circumference of said wall. In some embodiments, the choice of pore opening size along the length and circumference of inner-perforated wall, relative to the inlet- and outlet-streams, benefits the even distribution of flow throughout the bed of ion-exchange beads and ensures minimum flow resistance. In some embodiments, the number of perforations per square centimeter in the outer-perforated walls is varied along the outer-perforated walls to achieve optimal flow distribution through the vessel and through the ion exchange beads. In some embodiments, the openings on the outer-perforated walls are shaped as vertical or horizontal slits, squares, crosses, rectangles, triangles, irregular shapes, or a combination thereof. In some embodiments, the openings in inner-perforated walls are of dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the perforated openings in inner-perforated walls are of dimension of more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the perforated openings in inner-perforated walls are of dimension of about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the dimension of the openings in the outer-perforated walls are constant or almost-constant throughout the length and circumference of said wall. In some embodiments, the dimension of the openings in the outer-perforated walls vary along the length of said wall, being largest at the top and bottom and smallest at the center, largest at the center and smallest at the top and bottom, largest at the top and smallest at the bottom, smallest at the top and largest at the bottom, a combination thereof, or randomly distributed. In some embodiments, the dimension of the openings in the outer-perforated wall also varies along the circumference of said wall. In some embodiments, the choice of pore opening dimension along the length and circumference of outer-perforated wall, relative to the inlet- and outlet-streams, benefits the even distribution of flow throughout the bed of ion-exchange beads and ensures minimum flow resistance. In some embodiments, the number of holes per square centimeter in the outer-perforated walls is varied along the outer-perforated walls to achieve optimal flow distribution through the vessel and through the ion exchange beads. In some embodiments, the openings on the outer-perforated walls are shaped as circles, ovals, vertical or horizontal slits, squares, crosses, rectangles, triangles, irregular shapes, or a combination thereof.

In some embodiments, the openings in outer-perforated walls have an opening of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the perforated openings in outer-perforated walls are of dimension of more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the perforated openings in outer-perforated walls are of dimension of about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from ab out 2000 µm to about 4000 µm, from about 4000 µm to about 8000 µm, from about 6000 µm to about 10000 µm.

In some embodiments, the outer- and inner-perforated walls are surrounded by a porous partition that provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in polymer, a stainless steel mesh coated in ceramic, a titanium mesh, or a combination thereof, wherein the mesh is a coarse mesh, a fine mesh, or a combination thereof.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, the typical characteristic opening of the porous polymer partition varies along the length of the porous partition. In some embodiments, the variation in the characteristic opening of the porous partition is chosen such that uniform perpendicular flow is maintained along the entire length of the porous polymer partition. In some embodiments, the variation in the characteristic opening of the porous polymer partition is chosen to direct flow to certain areas of the ion exchange bed. In some embodiments, the pore size of the porous polymer partition varies along the porous partition. In some embodiments, the pore density of the porous polymer partition varies along the porous partition. In some embodiments, the flow resistance of the porous polymer partition varies along the porous partition. In some embodiments, the number of pores of the porous polymer partition varies along the porous partition. In some embodiments, the thickness of the porous polymer partition varies along the porous partition. In some embodiments, the porous polymer partition is varied along one or more axes to control pressure drop through the porous polymer partition.

In some embodiments, the dimension of openings in the porous partition varies along the length of the porous partition. In some embodiments, the variation in the dimension of openings in the porous partition is chosen such that uniform flow is maintained along the entire length of the porous partition. In some embodiments, the variation in the openings of the porous partition is chosen to direct flow to certain areas of the ion exchange bed. In some embodiments, the pore size of the porous partition varies along the porous partition. In some embodiments, the pore density of the porous partition varies along the porous partition. In some embodiments, the flow resistance of the porous partition varies along the porous partition. In some embodiments, the number of pores of the porous partition varies along the porous partition. In some embodiments, the thickness of the porous partition varies along the porous partition. In some embodiments, the porous partition is varied along one or more axes to control pressure drop through the porous partition.

In some embodiments, the porous partition is typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 μm. In some embodiments, the porous partition consists of openings in that are of a typical characteristic size of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition consists of openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition consists of openings in that are of a typical characteristic size of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. In some embodiments, the porous partition consists of openings in that are of a typical characteristic size of from about 1 μm to about 10 μm, from about 10 μm to about 100 μm, from about 100 μm to about 1000 μm, from about 1000 μm to about 10000 μm.

In some embodiments, the internal components of the vessel are configured to provide optimal distribution of fluid flow for the liquid resource containing lithium, the acid containing hydrogen ions, and any other fluid required for operation of the vessel. In some embodiments, the compartment formed between the outer-perforated wall and the outer wall of the vessel serves to distribute flow entering or exiting the ion exchange bead compartment through the outer-perforated wall; this compartment is hereby referred to as the outer-flow distribution compartment. In some embodiments, the compartment formed inside the inner-perforated wall serves to distribute flow entering or exiting the ion exchange bead compartment through the inner-perforated wall; this compartment is hereby referred to as the inner-flow distribution compartment.

In one embodiment, the outer-flow distribution and/or the inner-flow distribution compartments are empty, partially filled, or fully filled with fluid, or a combination thereof. In some embodiments, the outer-flow distribution and/or the inner-flow distribution compartments are cylindrical, rectangular, spherical, or a combination thereof. In some embodiments, the outer-flow distribution and/or the inner-flow distribution compartments have a constant cross-sectional area or a varying cross-sectional area.

In one embodiment, the outer-flow distribution and/or the inner-flow distribution compartments contain internal beams to provide structural support for the vessel, while also providing more optimal flow distribution. In one embodiment, the outer-flow distribution and/or the inner-flow distribution compartments contain pipes and tubes that direct flow into individual perforations in the inner- and outer-perforated walls. In one embodiment, the outer-flow distribution and/or the inner-flow distribution compartments contain trays that direct flow. In some embodiments, the In some embodiments, the outer-flow distribution and/or the inner-flow distribution compartments contain filler material to provide structural support for the vessel, while also providing more optimal flow distribution. In some embodiments, the filler material is comprised of a polymer, ceramic, metal, ion-exchange beads, or a combination thereof. In some embodiments, the filler material contained within the outer-flow distribution and/or the inner-flow distribution compartments have an average particle diameter of less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm; more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm; from about 10 μm to about 20 μm, from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm.

In some embodiments, flow into and out from the outer-flow distribution compartment occurs from the top, the side, the bottom of said compartment, or a combination thereof. In some embodiments, flow into and out from the inner-flow distribution compartment occurs from the top, the side, or the bottom of said compartment, or a combination thereof.

In some embodiments, the vessel contains an additional flow distribution manifold at the top, bottom, or side of the vessel. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In some embodiments, a single vessel contains one outer pressure-bearing wall, within which multiple ion exchange beds are contained, and wherein each ion-exchange bed is contained between two non-intersecting concentric porous walls, such that flow occurs radially from one of the porous walls to the other and across the ion-exchange bed. Example 17 exemplifies one embodiment of such a vessel. In some embodiments, flow occurs into the inner-flow distribution compartment of a plurality of ion-exchange beds, outwards through the inner-porous wall and the ion exchange bed, through the outer porous wall, and the fluid is collected inside a single vessel where it exits the vessel. In some embodiments, flow occurs into the vessel containing the plurality of ion-exchange beds, through the outer porous wall, inwards through the ion exchange bed, through the inner-porous wall, through the plurality of inner-flow distribution compartments, and out of the vessel.

In some embodiments, such a vessel contains more than 2, more than 4, more than 8, more than 16, more than 32, more than 100 individual ion-exchange beds. In some embodiments, such a vessel contains 2, 3, 4, 5, 8, 10, 15, 20, 25, 30, 40, 50, 60, 80, or 100 individual ion-exchange beds.

In some embodiments the inner-flow distribution compartment of one or more of these ion exchange-beds is in fluid communication with one or more inner-flow distribution compartment of another ion-exchange bed contained within the same vessel. In some embodiments the inner-flow distribution compartment of one or more of these ion exchange-beds is in fluid communication with one or more inner-flow distribution compartment of another ion-exchange bed contained within a different vessel.

Embodiments Comprising Vessels for Multiple Beds of Ion Exchange Beads

In some embodiments, the vessel containing ion-exchange beads is comprised of multiple and separate ion-exchange compartments arranged within a single vessel. These embodiments are described in examples 1, 4, 9, 12, and 17, and the associated figures.

In some embodiments, a liquid resource flows into one side of each ion-exchange compartment, and exits on the other side of exchange compartment, having undergone an ion-exchange process. In some embodiments, the vessel is constructed such that a flow distribution network delivers the liquid resource to each one of these ion-exchange compartments independently. In some embodiments, the vessel is constructed such that a flow distribution network recovers the liquid resource that underwent ion-exchange from each one of these ion-exchange compartments independently. In some embodiments, this allows for multiple simultaneous and concurrent ion exchange processes within the same vessel. In some embodiments, the separation of ion-exchange media into several independent ion-exchange compartments results in minimal flow distance through ion exchange beads.

In some embodiments, such a vessel are constructed by using a series of filter banks wherein the filters contain ion exchange beads, as exemplified in examples 1 and 9, and associated figures. In some embodiments, such a vessel are constructed where multiple ion-exchange compartments are arranged vertically or horizontally. In some embodiments, such filter banks are separated to load and unloaded the ion exchange beads. In some embodiments, the ion exchange beads are conveyed into the filter banks as a slurry to load the ion exchange beads into the ion exchange vessel. In some embodiments, loading of the ion exchange beads occurs in the same direction, opposite direction, orthogonal direction, or other direction relative the normal direction of flow during the ion exchange process. In some embodiments, the tension holding the filter bank together is increased, decreased, or maintained during the ion exchange process.

In one embodiment, there is only one ion-exchange compartment in the vessel for packed beds of ion exchange beads with minimal flow distance. In some embodiments, there is more than one ion-exchange compartments in the vessel for packed beds of ion exchange beads with minimal flow distance. In some embodiments, there are less than about two, less than about three, less than about five, less than about ten, less than about twenty, less than about thirty, less than about fifty, less than about one-hundred, more than about two, more than about three, more than about five, more than about ten, more than about twenty, more than about thirty, more than about fifty, more than about one-hundred ion-exchange compartments in the vessel.

In some embodiments, ion-exchange compartments are added or removed from the vessel by mechanical means, such that the number of ion-exchange compartments are adjusted. In some embodiments, ion-exchange compartments and their components are mechanically separated to clean out, replace, and fill in compartments and partitions between compartments.

In some embodiments, the devices, vessels, system, and methods described herein utilize a flow distribution compartment to optimize the flow of various solutions or gases through the devices, vessels, ad systems. In some embodiments, the flow distribution compartment is an inner flow distribution compartment and/or outer flow distribution compartment. In some embodiments, the flow distribution compartment are optionally treated with a lithium containing resource, hydrogen ion-containing acid, water, or other solutions for the purposes of adjusting the concentration, composition, pH, or contaminant level of the fluid flowing through the vessel. This is achieved by means of an optional inlet- and outlet-flows to and from the flow distribution compartment. In some embodiments, the inlet- and outlet flows to and from the flow distribution compartments are located at the top, bottom, or side of said compartments. In some embodiments, the inlet- and outlet flows to and from the flow distribution compartments are injected and remove from the internal space of said compartments by means of piping, tubing, or other internal components that protrude into said compartment.

In some embodiments, the compartment containing the ion-exchange beads are optionally treated with water or other solutions for the purposes of adjusting the concentration, composition, pH, or contaminant level of the fluid flowing through the vessel. This is achieved by means of an optional inlet- and outlet-flows to and from said compartment. In some embodiments, such inlet- and outlet flows are located at the top, bottom, or side of said compartments. In some embodiments, the inlet- and outlet flows to and from said compartment are injected and remove from the internal space of said compartments by means of piping, tubing, or other internal components that protrude into said compartment.

In one embodiment, the ion exchange compartment within each ion-exchange compartment is partially filled with ion exchange beads, such that ion exchange beads freely move within their containing compartment during contacting with fluid. In some embodiments, the ion exchange compartment is filled to its capacity with ion exchange beads, such that ion exchange beads are fixed in place and cannot freely move within the containing compartment during contacting with fluid. In one embodiment, the ion exchange compartment is partially filled, and becomes completely filled by the change in volume of ion exchange beads that occurs when contacting said beads with certain fluids. In some embodiments, the ion exchange compartment is configured such that ion exchange beads may enter and leave the ion-exchange compartment conveyed by the fluid which they are contacting, in the top-down or down-top direction. In one embodiment, the ion exchange beads may be loaded into and unloaded from said compartments through the top or bottom of the compartments, through the sides, or by mechanically separating and opening the ion-exchange compartment to expose the compartment and subsequently filling said compartment with ion-exchange beads.

In some embodiments, the typical length of the vessel containing the ion-exchange compartments is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the said vessel is more than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of said vessel is from about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the height and width of the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the height and width of the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the height and width of the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m.

In some embodiments, the typical thickness of the distribution compartment within the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the distribution compartment within the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the distribution compartment within the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m.

In some embodiments, the typical thickness of the compartment containing ion-exchange beads within the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the compartment containing ion-exchange beads within the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the compartment containing ion-exchange beads within the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m.

In some embodiments, the devices, vessels, system, and methods described herein utilize a flow distribution compartment to optimize the flow of various solutions or gases through the devices, vessels, ad systems. In some embodiments, the flow distribution compartment is an inner flow distribution compartment and/or outer flow distribution compartment. In some embodiments, there is a partition between the flow distribution compartment and the compartment containing the ion-exchange beads. In some embodiments, the partition is a permeable partition. In some embodiments, the permeable partition is a slitted partition that provides support for the ion-exchange bead bed, chemical protection, aids filtration, or a combination thereof. In some embodiments, the permeable partition is a porous partition that provides support for the ion-exchange bead bed, chemical protection, aids filtration, or a combination thereof. In some embodiments, the partition between the flow distribution compartment and the compartment containing the ion-exchange beads consists of a porous partition that provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a v-wire screen, a sintered metal screen, a sintered polymer screen, a flat screen, a cylindrical screen, a screen comprised of wire with cylindrical cross section, a screen comprised of wire with square cross section, a screen comprised of wire with rectangular cross section, a screen comprised of wire with rhomboidal cross section, a screen comprised of wire with triangular cross section, a screen comprised of wire with irregular cross section, a slotted wire screen, a mesh, or a combination thereof, wherein said porous partition is coarse, fine, or a combination thereof. In some embodiments, the porous partition comprises polyether ether ketone, polypropylene, polyethylene, poly sulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof. In some embodiments, the porous partition comprises ion exchange particles. In some embodiments, the porous partition comprises porous ion exchange particles. In some embodiments, the porous partition comprises a mixture of ion exchange particles with other polymers described above. In some embodiments, the porous partition comprises multiple layers.

In some embodiments, the porous partition consists of openings in that are of a typical characteristic size of less than about 1 μm, less than about 2 μm, less than about 5 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the porous partition consists of openings in that are of a typical characteristic size of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition consists of openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition consists of openings in that are of a typical characteristic size of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. In some embodiments, the porous partition consists of openings in that are of a typical characteristic size of from about 1 μm to about 10 μm, from about 10 μm to about 100 μm, from about 100 μm to about 1000 μm, from about 1000 μm to about 10000 μm.

In one embodiment, the flow distribution compartment and/or ion-exchange bead compartment is empty, partially filled, or fully filled with fluid, or a combination thereof. In some embodiments, the flow distribution compartment and/or ion-exchange bead compartment are cylindrical, rectangular, irregular, or a combination thereof. In some embodiments, the flow distribution compartment has a constant cross-sectional area or a varying cross-sectional area.

In one embodiment, the flow distribution compartment and/or ion-exchange bead compartment contains internal beams to provide structural support for the vessel. In some embodiments, internal beams are positioned to optimize flow distribution. In one embodiment, the flow distribution compartment and/or ion-exchange bead compartment contain pipes and tubes that direct flow into individual perforations in the inner- and outer-perforated walls. In one embodiment the flow distribution compartment and/or ion-exchange bead compartment contain trays that direct flow.

In some embodiments, the flow distribution compartment and/or ion-exchange bead compartment contain filler material to provide structural support for the vessel, while also providing more optimal flow distribution. In some embodiments, the filler material is comprised of a polymer, ceramic, metal, ion-exchange beads, or a combination thereof. In some embodiments, the filler material contained within the outer-flow distribution and/or the inner-flow distribution compartments have an average particle diameter of less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm; more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm; from about 10 μm to about 20 μm, from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm.

Embodiments Comprising Vessels Containing Flow Distributors

In some embodiments, the vessel containing ion exchange beads is comprised of a one or more ion-exchange compartments. In some embodiments, flow distributors are located at the top, bottom, and at one or more locations within each of these ion exchange compartments. Embodiments exemplifying such vessels re included in examples 4, 5, 6, 12, 13, 18, and associated figures.

In some embodiments, the number of flow distributors within the vessel is about one, about two, about three, about four, about five, about six, about seven, about eight, about nine, about ten, about fifteen, about twenty, about twenty-five, about thirty, about forty, about fifty. In some embodiments, the arrangement of these flow distributors are uniformly spaced or irregularly spaced.

In some embodiments, the fluid enters said vessel from multiple flow distributors, and exits said vessel from multiple flow distributors. One embodiment of such a vessel is exemplified in example 18 and associated figure. In some embodiments, flow enters the vessel from 1, from 2, from 4, from 8, from 12, from 20, from 1 to 2, from 2 to 4, from 4 to 8, from 8 to 12, from 12 to 20 independent flow distributors. In some embodiments, flow exits the vessel from 1, from 2, from 4, from 8, from 12, from 20, from 1 to 2, from 2 to 4, from 4 to 8, from 8 to 12, from 12 to 20 independent flow distributors.

In some embodiments, the flow distributor comprises perforated tubes or plates that are connected to each other. In some embodiments, these tubes or plates are of circular cross-section, oval cross-section, square cross-section, rectangular cross-section, cross-shaped cross-section, star-shaped cross-section, irregular cross-section, another geometric cross-section, or a combination thereof. In some embodiments, all flow distributors in the vessel are of the same shape and type. In some embodiments, different flow distributors in the vessel vary in their shape and size.

In some embodiments, the openings or perforations in the flow distributor are shaped as circles, ovals, vertical or horizontal slits, squares, crosses, rectangles, triangles, irregular shapes, or a combination thereof. In some embodiments, the openings in the flow distributor have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings in flow distributor are of dimension of more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings in the flow distributor are of dimension of about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, the tubes or plates of the flow distributor are surrounded by a porous partition that provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a v-wire screen, a sintered metal screen, a sintered plastic screen, a cylindrical wire screen, a slotted wire screen, a mesh, or a combination thereof, wherein said porous partition is coarse, fine, or a combination thereof. In some embodiments, the porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, one or more flow distributors are used to inject a liquid resource, hydrogen ion containing acid, water, or other process fluid into the ion exchange compartment. In some embodiments, one or more flow distributors are used to retrieve a liquid resource, hydrogen ion containing acid, water, or other process fluid from the ion exchange compartment.

In some embodiments, the vessel contains an additional flow distribution manifold at the top, bottom, or side of the vessel. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In some embodiments, the flow distributors described above comprise candles, wherein each comprises two concentric structures that are permeable to flow. One embodiment exemplifying such a vessel is described in example 6 and associated figure. In some embodiments, one or more candles are contained within each vessel. In some embodiments, said candles are act as flow distributors. In some embodiments, said candles are filled with ion exchange material. In some embodiments candles are shaped as cylinders, spheres, squares, rectangles, are scalloped, or a combination thereof. In some embodiments, said candles are oriented horizontally, vertically, at an angle with respect to the length of the vessel, or a combination thereof. In some embodiments said candles comprise a porous pipe, a polymer mesh, a filter bag, a screen, or a combination thereof. In some embodiments, said candles number more than two. In some embodiments, for a device described herein, said candles number more than four. In some embodiments, for a device described herein, said candles number more than eight. In some embodiments, for a device described herein, said candles number more than 20. In some embodiments, for a device described herein, said candles number more than 50. In some embodiments, for a device described herein, said candles number more than 100.

Embodiments Comprising Vessels Partially Filled with Ion Exchange Beads and Fluid In some embodiments, the vessel containing ion exchange beads is comprised of a tank partially filled with ion exchange beads.

In some embodiments, said tank contains a fluid which are a lithium containing resource, hydrogen ion-containing acid, water, or other solutions for the purposes of adjusting the concentration, composition, pH, or contaminant level of the fluid flowing through the vessel. In some embodiments, the fluid level is carefully controlled to maintain a fluid level that is higher than the level of ion-exchange beads in the tank.

In some embodiments, the level of fluid is monitored by visual inspection of the tank. In some embodiments, the level of fluid is monitored by measuring of a tank level based on a float sensor, capacitance sensor, infrared sensor, ultrasonic sensor, pressure sensor, radar sensor, any other fluid sensor or a combination thereof. In some embodiments, level control is achieved by careful control of fluid flow into the tank and out of the tank, by means of mechanical adjustment of valves, pumps, pressures, and any other parameters that affect fluid flow into and out of the vessel. In some embodiments, the pressure of gas inside of the tank is used to control the rate of discharge from the tank and therefore the fluid level in the tank.

In one embodiment, the ion exchange beads are agitated and can freely move within their containing compartment during contacting with fluid. In some embodiments, the agitation causes the ion exchange beads to be fluidized in the liquid in contact with said ion exchange beads. In some embodiments, agitation occurs with a mechanical agitator, an eductor, fluid recirculation, baffles, shaking, or a combination thereof. In some embodiments, the vessel contains one or more baffles arranged in parallel to the shaft of the mechanical agitator, to improve mixing. In some embodiments, the vessel is agitated with a mechanical agitator comprising a motor, a shaft, and one or more impellers mounted on said shaft. In some embodiments, said one or more impellers comprise propellers, anchor impellers, hydrofoils, pitched blade turbines, curved blade turbines, spiral turbine, flat blade turbines, radial blades, or a combination thereof. In some embodiments, said impellers contain one or more blades. In some embodiments, the shaft and impellers are comprised of carbon steel, stainless steel, titanium, Hastelloy, or a combination thereof. In some embodiments, the shaft and impellers are coated with glass, epoxy, rubber, a polymer coating, or combinations thereof.

In some embodiments, the ion exchange beads are not agitated, such that they remain fixed in place during contacting with fluid. In some embodiments, a screen, mesh or other partition is optionally included within the tank in order to control the location and restrict the movement of ion exchange beads during the contact with fluid. In some embodiments, the tank is configured such that ion exchange beads may enter and leave the ion-exchange compartment conveyed by the fluid which they are contacting, in the top-down or down-top direction. In one embodiment, the ion exchange beads may be loaded into and unloaded from said tank through the top or bottom of the tank or through its sides.

In some embodiments, the tank containing ion-exchange beads are optionally treated with a lithium containing resource, hydrogen ion-containing acid, alkali, water, or other solutions for the purposes of adjusting the concentration, composition, pH, or contaminant level of the fluid flowing through the vessel. This is achieved by means of an optional inlet- and outlet-flows to and from the tank. In some embodiments, the inlet- and outlet flows to and from the tank are located at the top, bottom, or side of said tank. In some embodiments, the inlet- and outlet flows to and from the tank are injected and removed from the internal space of said tank by means of piping, tubing, or other internal components that protrude into said compartment.

In some embodiments, the typical length of the tank containing the ion-exchange beads is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the tank containing the ion-exchange beads is less than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of the tank containing the ion-exchange beads is less than about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the typical radius or width of the tank containing the ion-exchange beads is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m. In some embodiments, the typical radius or width of the tank containing the ion-exchange beads is less than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m. In some embodiments, the typical radius or width of the tank containing the ion-exchange beads is less than about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m.

In some embodiments, the vessel containing ion exchange beads is comprised of a one or more ion-exchange compartments. In some embodiments, the vessel containing ion exchange beads is comprised of a one or more flow distribution compartments. In some embodiments, any of the compartments within the vessel are cylindrical, rectangular, spherical, cross-shaped, scalloped, concave, convex, torus-shaped, any another shape, or a combinations thereof. In some embodiments, the compartments can occupy the partial length of the vessel or only a sub-part.

In some embodiments, the number of compartments within the vessel is about one, about two, about three, about four, about five, about six, about seven, about eight, about nine, about ten, about fifteen, about twenty, about twenty-five, about thirty, about forty, about fifty. In some embodiments, the arrangement of compartments are uniformly spaced or irregularly spaced. In some embodiments, one or more flow distribution compartments are located within one or more of the ion-exchange compartments. In some embodiments, one or more flow ion-exchange compartments are located within one or more of the flow-distribution compartments.

In some embodiments, a screen, mesh or other partition is optionally included within the tank in order to control the location and restrict the movement of ion exchange beads during the contact with fluid. In some embodiments, said partition separates the ion-exchange compartments from the flow-distribution compartments. In some embodiments, said partition separates the flow-distribution compartments from the ion-exchange compartments. In some embodiments, this porous partition optionally provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises polyether ether ketone, polypropylene, polyethylene, polysulfone, polyester, polyamide, polytetrafluoroethylene, ethylene tetrafluoroethylene polymer, stainless-steel, stainless steel coated in polymer, stainless steel mesh coated in ceramic, coated steel, titanium, Hastelloy C276 mesh or a combination thereof, wherein the opening in the partition are coarse, fine, or a combination thereof. In one embodiment, the porous partition comprises a Hastelloy C276 screen. In one embodiment, the porous partition comprises a titanium screen. In one embodiment, the porous partition comprises a 316 stainless steel screen.

In some embodiments, said porous partition is fixed into the vessel-compartment walls. In some embodiments, the porous partition is flexibly and not physically bonded to the vessel-compartment walls. In some embodiments, the porous partition is free to move, shake, wave, rotate, expand, or contract within one or more of the compartments within the vessel. In some embodiments, the porous partition expands throughout operation. In some embodiments, the porous partition contracts throughout operation.

In some embodiments, the porous partition has a thickness of less than about 1 μm, less than about 2 μm, less than about 5 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the porous partition has a thickness of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition consists of openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition has a thickness of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. In some embodiments, the porous partition consists of openings in that are of a typical characteristic size of from about 1 μm to about 10 μm, from about 10 μm to about 100 μm, from about 100 μm to about 1000 μm, from about 1000 μm to about 10000 μm.

In some embodiments, the porous partition consists of openings in that are of a typical characteristic size of less than about 1 μm, less than about 2 μm, less than about 5 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the porous partition consists of openings in that are of a typical characteristic size of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition consists of openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition consists of openings in that are of a typical characteristic size of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. In some embodiments, the porous partition consists of openings in that are of a typical characteristic size of from about 1 μm to about 10 μm, from about 10 μm to about 100 μm, from about 100 μm to about 1000 μm, from about 1000 μm to about 10000 μm.

In some embodiments, the tank containing the ion-exchange beads contains internal beams to provide structural support for the vessel, while also providing more optimal flow distribution. In one embodiment, the flow distribution compartment and/or ion-exchange bead compartment contain pipes and tubes that direct flow into individual perforations in the inner- and outer-perforated walls. In one embodiment the flow distribution compartment and/or ion-exchange bead compartment contain trays that direct flow.

In some embodiments, tank containing the ion-exchange beads contains filler material to provide structural support for the vessel, while also providing more optimal flow distribution. Embodiments exemplifying the use of such filler material are included in examples 7 and 8 and associated figures. In some embodiments, the filler material is comprised of a polymer, ceramic, metal, ion-exchange beads, or a combination thereof. In some embodiments, the filler material contained within the outer-flow distribution and/or the inner-flow distribution compartments have an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm; from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the vessel contains an additional flow distribution manifold at the top, bottom, or side of the tank. In some embodiments, said flow distribution compartment contains pipes, tubing, or internal partition to direct flow into and from the inner-flow distribution compartment, and into and from the outer-flow distribution compartment. In some embodiments, the flow distribution manifold has inlets and outlets at the top, bottom, or side of said manifold.

In embodiments, the vessel is designed to evenly distribute flow throughout the ion exchange beads. In some embodiments, the vessel has flow distributors in the form of a hub and lateral distributor, header and lateral distributors, filter plates, spray nozzle, distributor trays, concentric perforated pipes, or a combination of thereof. In one embodiment the lateral distributors are outfitted with resin retaining mesh, membrane, screen, or filter nozzle. In one embodiment, the mesh is supported with a secondary support layer for strength. In one embodiment the porous mesh is wrapped around a cylindrical support at the center of the vessel. In one embodiment, the mesh is made out of a polymer, ceramic, or metal. In one embodiment, the flow distributor is located at the top, bottom, middle, at any other location within the vessel, or a combination of thereof. In one embodiment the vessel has a plate with nozzles attached to it.

In some embodiments, flow distribution within the ion-exchange vessel occurs via one or more of a pipe, tubing, channels, slits, beams, baffles, baskets, scallops, nozzles, or a mesh. In some embodiments, the components that direct flow within the vessel are perforated. In some embodiments, the openings or perforations in the components that distribute flow are shaped as circles, ovals, vertical or horizontal slits, squares, crosses, rectangles, triangles, irregular shapes, or a combination thereof.

In one embodiment, the vessel has an internal nozzle designed to distribute flow evenly. In one embodiment, the vessel has nozzles placed equidistant with each other on a support plate. In one embodiment the nozzles are spaced out so that each nozzle covers the same area. In one embodiment the nozzles have slits or holes of width of less than 0.1 µm, less than 1 µm, less than 10 µm, less than 100 µm, or less than 1 mm. In one embodiment, the vessel has mesh with holes less than 0.1 µm, less than 1 µm, less than 10 µm, less than 100 µm, or less than 1000 µm.

Other Embodiments Comprising Vessels with Optimal Flow Distribution

In some embodiments, vessels have flow distributors to direct flow to and from compartments within the vessel which contain ion exchange materials. In some embodiments, flow distribution occurs via flow distribution elements that have a characteristic opening through which fluid flows. In some embodiments, said flow distribution elements comprise one or more of a pipes, tubing, channels, slits, beams, baffles, baskets, scallops, nozzles, or a mesh. In some embodiments, the one or more of pipes, tubing, channels, slits, beams, baffles, baskets, scallops, nozzles, or a mesh comprise an opening or perforation. In some embodiments, the characteristic opening or perforation of said flow distribution elements have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings or perforation in one or more for the flow distribution components have a dimension of less than about 10 µm, more than about 20 µm, more than about 30 µm, more than about 40 µm, more than about 50 µm, more than about 60 µm, more than ab out 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings or perforation in one or more for the flow distribution components have a dimension of less than about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, efficient flow distribution within the ion-exchange vessel occurs via one or more shaped objects or particle that are packed within one or more of the compartments that comprise the ion-exchange vessel. In some embodiments, such shaped objects or particles are termed "filler material", "inert material", "packing material", or "packing"; these terms are used interchangeably. In some embodiments, the vessel is filled with filler material for bed support or flow distribution. In one embodiment, the filler material is made from glass, silica, gravel, activated carbon, ceramic, alumina, zeolite, calcite, polymers, copolymers, a mixture thereof or a combination of thereof. In some embodiments, the filler material could be made from polyvinyl chloride, high density polyethylene, low density polyethylene, polypropylene, polyvinylidene difluoride, polytetrafluoroethylene, polystyrene, Acrylonitrile butadiene styrene, Polyether ether ketone, copolymers thereof, mixture thereof, or combinations In one embodiment the filler material is placed on top of the vessel, on the bottom of the vessel, or both. In one embodiment the filler material is mixed with the ion-exchange resin. Another aspect described herein is a device for lithium extraction from a liquid resource, comprising a vessel loaded with one or more beds of ion exchange material and a filler material, wherein the filler material is mixed with the one or more beds of ion exchange material, thereby providing support for the one or more beds and/or enabling for better flow distribution for said liquid resource or another fluid entering the vessel. Said better flow distribution ensures that all of the ion exchange material within the ion exchange bed contacts the same amount of liquid across all of the ion exchange bead, and that the hydrostatic pressure required to drive fluid flow across the bed is uniform across the cross section of the ion exchange bed.

In some embodiments, efficient flow distribution within the ion-exchange vessel occurs via one or more shaped objects or particle that are packed within one or more of the compartments that comprise the ion-exchange vessel. In some embodiments, the filler material is shaped as a sphere, spheroid, ovaloid, cross, tube, torus, ring, saddle ring, tubes, triangles, other complex geometric shape, or a combination thereof. In some embodiments, the packing is distributed with a random particle density. In some embodiments, the filler material is distributed with uniform particle density. In some embodiments, the filler material consists of one of more types of filler material, randomly added and distributed within the distribution chamber. In some embodiments, the filler material consists of one of more types of filler material, added and distributed within the fluid distribution chamber within well-defined regions. In some embodiments, parts of the of fluid distribution chamber are empty, and parts of the same chamber contain filler material. In some embodiments, the filler material have an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm; from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, the ion exchange beads are loaded into the ion-exchange vessel as a slurry. In some embodiments, the liquid component of such slurry is water, acid, base, or a solvent. In some embodiments, the percentage of liquid in the slurry is less than about 1%, less than about, 2%, less than about 5%, less than about 10%, less than about 20%, less than about 50%, less than about 75%, less than about 90%, more than about 1%, more than about, 2%, more than about 5%, more than about 10%, more than about 20%, more than about 50%, more than about 75%, more than about 90%, between about 0% and 5%, between about 5% and 10%, between about 10% and 20%, between about 20% and 50%, between about 50% and 75%, between about 75% and 90%, between about 90% and 100%. In some embodiments, the ion exchange beads are loaded into the ion-exchange vessel as a dry powder.

In some embodiments, one or more of the vessels containing ion-exchange beads described above are arranged such that the outlet stream of one vessel is directed into the inlet of another vessel. In some embodiments, such streams are treated between ion exchange vessels. In some embodiments, the treatment occurs with a lithium containing resource, hydrogen ion-containing acid, water, or other solutions for the purposes of adjusting the concentration, composition, pH, or contaminant level of the fluid in the stream.

System for Loading Vessels with Ion Exchange Beads

It is desirable to achieve uniform flow distribution throughout the ion exchange bed to ensure optimal performance of ion exchange beads. In some embodiments, uniform flow distribution implies the same hydrostatic pressure drop for fluid flow across the entire cross-sectional area of the bed. In some embodiments, uniform flow distribution implies the same hydrostatic pressure drop for fluid flow across the entire cross-sectional area of the bed, perpendicular to the direction of flow. In some embodiments, such uniform pressure drop ensures that the same amount of liquid will flow through all sections of the ion exchange bed, thus ensuring uniform contact of the ion exchange material with the liquid resource, wash solution, acidic eluent, or any combination thereof.

The ion exchange beads is packed into uniform ion exchange beds to improve flow distribution uniformity. This packing ensures uniform structure of the ion exchange bed. The process of packing the ion exchange bed into a uniform ion exchange bed is termed "packing", "forming", or "shaping" the ion exchange bed. For the purposes of this disclosure, the terms "packing", "forming", or "shaping" are used interchangeably.

One embodiment of a system for shaping ion exchange beads into ion exchange beds with optimal flow distribution is described in example 16 and the associated figure.

In order to shape the ion exchange beads into ion exchange beds, said beads are first loaded into an ion exchange vessel. In some embodiments, the ion exchange beads are loaded into the vessel by flowing into the vessel as a slurry, applying vacuum through the vessel and pulling the beads into the vessel, pouring the slurry into the vessel with a slurry transfer device, pumping the slurry into the vessel with a slurry transfer device, or a combination thereof. In some embodiments, the ion exchange beads are loaded as a dry powder. In some embodiments, the ion exchange beads are loaded as a solid. In some embodiments, the ion exchange beads are loaded as a dry powder by pouring them into the ion exchange vessel as a powder. In some embodiments, the ion exchange beads are loaded as a dry powder by pouring them into the ion exchange vessel while tapping them loading container. In some embodiments, the ion exchange beads are loaded as a dry powder by pneumatically conveying them into the ion exchange vessel using a blower, a vacuum, compressed air, a conveyor belt, a fan, or combinations thereof.

In some embodiments, the loaded beads are packed to shape the ion exchange bed into an optimal flow distribution. In some embodiments, packing is done by flowing fluid through ion exchange beads. In some embodiments, a certain flow rate and pressure are maintained during flow across the ion exchange bed to achieve uniform packing of the ion exchange beads. In some embodiments, the fluid for packing is water, aqueous solution, brine, acidic solution, organic solvents, air, nitrogen gas, argon gas, or a combination thereof.

In some embodiments, the fluid velocity used for packing is less than 1 cm/min, less than 5 cm/min, less than 10 cm/min, less than 20 cm/min, less than 30 cm/min, less than 40 cm/min, less than 50 cm/min, less than 100 cm/min, less than 200 cm/min, less than 500 cm/min, less than 10 m/min, less than 100 m/min, or a combination thereof. In some embodiments, the fluid velocity used for packing is more than 1 cm/min, more than 5 cm/min, more than 10 cm/min, more than 20 cm/min, more than 30 cm/min, more than 40 cm/min, more than 50 cm/min, more than 100 cm/min, more than 200 cm/min, more than 500 cm/min, more than 10 m/min, more than 100 m/min, or a combination thereof. In some embodiments, the fluid velocity is from about 1 cm/min to about 5 cm/min, from about 5 cm/min to about 20 cm/min, from about 20 cm/min to about 100 cm/min, from about 100 cm/min to about 200 cm/min, from about 200 cm/min to about 500 cm/min, from about 500 cm/min to about 10 m/min, from about 10 m/min to about 100 m/min, or a combination thereof. In some embodiments, the fluid velocity is varied throughout the packing process to shape the ion exchange beds. In some embodiments, the fluid velocity is increased throughout the packing process. In some embodiments, the fluid velocity is decreased throughout the packing process. In some embodiments, the fluid velocity is first increased and then decreased. In some embodiments, the fluid velocity varies sinusoidally with time. In some embodiments, the fluid velocity is varied up, down, sinusodially, with varying speed, or a combination thereof.

In some embodiments, flow is directed in the same direction as fluid flow during the ion-exchange process, in the opposite direction as fluid flow during the ion-exchange process, in a tangential direction as fluid flow during the ion-exchange process, in an orthogonal direction as fluid flow during the ion-exchange process, in an intermediate direction as fluid flow during the ion-exchange process, or in a combination thereof. In some embodiments, the fluid is flown across ion exchange beads, axially along the longest orientation of the ion exchange bed. In some embodiments, the fluid is flown across ion exchange beads, radially across the radial orientation of the ion exchange bed. In some embodiments, the fluid is flown across ion exchange beads, along the shortest orientation of the ion exchange bed. In some embodiments, the fluid is flown in a combination of axially along the longest orientation of the ion exchange bed, along the shortest orientation of the ion exchange bed, or radially across the radial orientation of the ion exchange bed.

In some embodiments, the ion exchange beads are packed in the same chamber where the ion exchange process occurs. In some embodiments, the ion exchange beads are packed in a separate chamber from where ion exchange process occurs.

In some embodiments, the ion exchange beads are packed by applying pressure on the ion exchange bed. In some embodiments, pressure is applied to the ion exchange bed with weights or hydraulic force caused by fluid flow.

In some embodiments, the weight applied to the ion exchange bed is less than 1 kg, less than 5 kg, less than 10 kg, less than 50 kg, less than 100 kg, less than 500 kg or less than 1000 kg. In some embodiments, the weight applied to the ion exchange bed is more than 1 kg, more than 5 kg, more than 10 kg, more than 50 kg, more than 100 kg, more than 500 kg, or more than 1000 kg. In some embodiments, the weight applied to the ion exchange bed is from 1 kg to kg, from 5 kg to 10 kg, from 10 kg to 50 kg, from 50 kg to 100 kg, from 100 kg to 500 kg, or from 500 kg to 1000 kg.

In some embodiments the hydraulic force applied to the ion exchange bead is less than psi, less than 150 psi, less than 500 psi, less than 1000 psi, less than 2500 psi, or less than 5000 psi. In some embodiments the hydraulic force applied to the ion exchange bead is more than 50 psi, more than 150 psi, more than 500 psi, more than 1000 psi, more than 2500 psi, or more than 5000 psi. In some embodiments, the hydraulic force applied to the ion exchange bead is from 50 psi to 150 psi, from 150 psi to 500 psi, from 500 psi to 1000 psi, from 1000 psi to 2500 psi, from 2500 psi to 5000 psi.

An aspect described herein is a fluid diversion device that forms ion exchange beads into ion exchange beds with uniform and optimal flow properties for lithium extraction by ion exchange. An aspect described herein is a fluid diversion device that forms ion exchange beads into ion exchange beds with homogenous density or near-homogenous density. An aspect described herein is a fluid diversion device that forms ion exchange beads into ion exchange beds with homogenous density or near-homogenous density.

In some embodiments, said fluid diversion device is cylindrical, square, rectangular, triangular, oval-shaped, star-shaped, irregularly shaped, mixtures thereof or combinations thereof. In some embodiments, said fluid diversion device conforms to the shape of the vessel where it is used. In some embodiments, said fluid diversion device conforms to the shape of the pipe where it is placed. In some embodiments, said fluid diversion device changes shape depending on the fluid that is flowing into it, from it, or through it. In some embodiments, said fluid diversion device changes shape before, during, at several points, or after the ion-exchange bed shaping process. In some embodiments, said fluid diversion device changes shape depending on the pressure being applied on it by a fluid.

In some embodiments, the fluid diversion device blocks fluid flow by sealing compartments of the vessel. In some embodiments, this device blocks flow with o-rings, gaskets, expanding flexible rings, balloons, or a combination of thereof. In some embodiments, the fluid diversion device seals comprise polytetrafluoroethylene (PTFE), polychloroprene (neoprene), ethylene propylene dine monomer (EPDM), Viton, nitrile rubber (Buna-N), silicone, fluoropolymer, polyurethane, flouorosilicone, or a combination thereof.

In some embodiments, the fluid diversion device blocks sections of the ion exchange bed so as to direct flow to specific sections of the ion exchange bed that are to be formed and packed. In some embodiments, said fluid diversion device blocks flow by occupying the space inside a flow distributor in order to prevent flow through said flow distributor and into the ion exchange bed. In some embodiments, said fluid diversion device blocks flow through sections of the flow distributor that delivers fluid to the ion exchange bed. In some embodiments, said fluid diversion device blocks flow through sections of the flow distributor that collects fluid the ion exchange bed. In some embodiments, said fluid diversion device blocks flow by blocking the pores of the porous partition dividing compartments in the ion exchange vessel.

In some embodiments, one, two, three, four, five, six, seven, eight, nine, or ten fluid diversion devices are used within a single vessel, on their own, in combination, or changing in number and type throughout the duration of the packing treatment.

In some embodiments, more than one fluid diversion device is present within the same ion exchange vessel. In some embodiments, more than about two, more than about four, more than about six, more than about 10, more than about 20, more than about 50 fluid diversion device is present within the same ion exchange vessel. In some embodiments, less than about two, less than about four, less than about six, less than about 10, less than about 20, less than about 50 fluid diversion device is present within the same ion exchange vessel. In some embodiments, between about one and about two, between about two and about four, between about four and about six, between about four and about 10, between about 10 and about 20, between about 20 and about 50 fluid diversion device is present within the same ion exchange vessel.

In some embodiments, forming of the ion exchange bed occurs by using said fluid diversion device to pack sections of the ion exchange bed, until the entirety of the ion exchange chamber is packed. In some embodiments, forming of the ion exchange bed occurs by continuously moving the fluid diversion device along the length of the ion exchange vessel. In some embodiments, the ion exchange bed is packed in less than 4 sections, less than 8 sections, less than 20 sections, less than 50 sections, less than 100 sections. In some embodiments, the ion exchange bed is packed in more than 1 section, more than 4 sections, more than 8 sections, more than 20 sections, more than 50 sections, more than 100 sections, In some embodiments, the ion exchange bed is packed from about 1 to about 4 sections, about 4 sections to about 8 sections, from about 8 sections to about 20 sections, from about 20 sections to about 50 sections, from about 50 sections to about 100 sections.

In some embodiments, fluid flows up, down, at an angle, through, or across said fluid diversion device. In some embodiments, said fluid diversion device contains a pipe through which fluid flows. In some embodiments, said fluid diversion device moves along a pipe. In some embodiments, the fluid moves to different positions of a vessel. In some embodiments, the fluid moves to different positions in the vessel in response to fluid flow. In some embodiments, the fluid moves to different positions in the vessel in response to pressure. In some embodiments, the fluid moves to different positions in the vessel in response to the liquid level in the vessel.

In some embodiments, the fluid diversion device blocks sections with lengths less than 1 cm, less than 5 cm, less than 15 cm, less than 50 cm, less than 100 cm, or less than 200 cm. In some embodiments, the fluid diversion device blocks sections with lengths more than 1 cm, more than 5 cm, more than 15 cm, more than 50 cm, more than 100 cm, or more than 200 cm. In some embodiments, the fluid diversion device blocks sections with lengths from 1 cm to 5 cm, from 5 cm to 15 cm, from 15 cm to 50 cm, from 50 cm to 100 cm, from 100 cm to 200 cm.

In some embodiments, the fluid diversion device has a length of less than 1 cm, less than 5 cm, less than 15 cm, less than 50 cm, less than 100 cm, or less than 200 cm. In some embodiments, the fluid diversion has a length of more than 1 cm, more than 5 cm, more than 15 cm, more than 50 cm, more than 100 cm, or more than 200 cm. In some embodiments, the fluid diversion device has a length of from 1 cm to 5 cm, from 5 cm to 15 cm, from 15 cm to 50 cm, from 50 cm to 100 cm, from 100 cm to 200 cm. In some embodiments, the fluid diversion device has a width of less than 1 cm, less than 5 cm, less than 15 cm, less than 50 cm, less than 100 cm, or less than 200 cm. In some embodiments, the fluid diversion has a width of more than 1 cm, more than 5 cm, more than 15 cm, more than 50 cm, more than 100 cm, or more than 200 cm. In some embodiments, the fluid diversion device has a width of from 1 cm to 5 cm, from 5 cm to 15 cm, from 15 cm to 50 cm, from 50 cm to 100 cm, from 100 cm to 200 cm. In some embodiments, the fluid diversion device has a radius of less than 1 cm, less than 5 cm, less than 15 cm, less than 50 cm, less than 100 cm, or less than 200 cm. In some embodiments, the fluid diversion has a radius of more than 1 cm, more than 5 cm, more than 15 cm, more than 50 cm, more than 100 cm, or more than 200 cm. In some embodiments, the fluid diversion device has a radius of from 1 cm to 5 cm, from 5 cm to 15 cm, from 15 cm to 50 cm, from 50 cm to 100 cm, from 100 cm to 200 cm.

In some embodiments, packing is aided by using inert beads to restrict the fluid flow path from certain sections of the vessel. In some embodiments, the inert beads are loaded on a separate compartment from the ion exchange beads; this restricts fluid flow in the compartment that contains said inert beads and directs flow to the compartment containing ion-exchange beads. In some embodiments, the inert beads are loaded on the same compartment with the ion exchange beads; this restricts fluid flow in areas of the compartment that contain said inert beads and directs flow to the ion-exchange beads.

In some embodiments, the inert beads are loaded into the vessel by flowing into the vessel as a slurry, applying vacuum through the vessel and pulling the beads into the vessel, pouring the slurry into the vessel with a slurry transfer device, or a combination thereof. In some embodiments, the inert beads are unloaded into the vessel by flowing into the vessel as a slurry, applying vacuum through the vessel and pulling the beads into the vessel, pouring the slurry into the vessel with a slurry transfer device, or a combination thereof. In some embodiments, the inert beads are loaded as a dry powder. In some embodiments, the inert beads are loaded as a solid. In some embodiments, the inert beads are loaded as a dry powder by pouring them into the ion exchange vessel as a powder. In some embodiments, the inert beads are loaded as a dry powder by pouring them into the ion exchange vessel while tapping them loading container. In some embodiments, the inert beads are loaded as a dry powder by pneumatically conveying them into the ion exchange vessel using a blower, a vacuum, compressed air, a conveyor belt, a fan, or combinations thereof.

In some embodiments, the inert beads consist of a polymer, a ceramic, a metal, a carbide, a nitride, an oxide, a phosphate, a fluoride, a polymer, carbon, a carbonaceous material, or combinations thereof. In some embodiments, the inert beads comprise a chloro-polymer, a fluoro-polymer, a chloro-fluoro-polymer, a hydrophilic polymer, a hydrophobic polymer, co-polymers thereof, mixtures thereof, or combinations thereof. In a further embodiment, a coating is applied to these inert beads. In some embodiments, the coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises low density polyethylene, high density polyethylene, polypropylene, polyester, polytetrafluoroethylene (PTFE), types of polyamide, polyether ether ketone (PEEK), poly sulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, the inert beads are shaped as a sphere, spheroid, ovaloid, cross, tube, torus, ring, saddle ring, tubes, triangles, cylinders, rhombus, square, rectangle, other complex geometric shapes, or a combination thereof.

In some embodiments, the inert beads have an average particle diameter less than about 1 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, inert beads have an average particle diameter more than about 1 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, inert beads have a typical particle size from about 10 μm to about 20 μm, from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm.

In some embodiments, said filler material is inert to acid and brine. In some embodiments, said filler is constructed from a polymer or ceramic. In some embodiments, said filler material has pores containing ion exchange material. In some embodiments, said filler material has pores larger smaller than 10 microns containing ion exchange material. In some embodiments, said material filler has pores larger smaller than 100 microns containing ion exchange material. In some embodiments, said filler material has pores larger smaller than 1 millimeter containing ion exchange material. In some embodiments, said filler material has pores larger smaller than 1 centimeter containing ion exchange material. In some embodiments, said filler material has pores larger than 1 centimeter containing ion exchange material. In some embodiments, said filler material has pores larger than 10 centimeters containing ion exchange material. In some embodiments, said filler material has pores larger than about 10 microns or about 100 microns containing ion exchange material. In some embodiments, said filler material has pores larger than about 1 millimeter, about 1 centimeter, or about 10 centimeters containing ion exchange material. In some embodiments, said filler material has pores larger than about 10 centimeters or about 25 centimeters containing ion exchange material. In some embodiments, said filler material has pores smaller than about 10 microns or about 100 microns containing ion exchange material. In some embodiments, said filler material has pores smaller larger than about 1 millimeter, about 1 centimeter, or about 10 centimeters containing ion exchange material. In some embodiments, said filler material has pores smaller larger than about 10 centimeters or about 25 centimeters containing ion exchange material. In some embodiments, said filler material is a rigid scaffolding.

In some embodiments, a screen, mesh, or other partition is optionally included within the ion exchange vessel, in order to control the location and restrict the movement of ion exchange beads during the contact with fluid. In some embodiments, said partition separates the ion-exchange compartments from the flow-distribution compartments. In some embodiments, said partition separates the flow-distribution compartments from the ion-exchange compartments. In some embodiments, this porous partition optionally provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless-steel mesh, a stainless steel mesh coated in polymer, a stainless steel mesh coated in ceramic, a titanium mesh, or a combination thereof, wherein the mesh is a coarse mesh, a fine mesh, or a combination thereof.

In some embodiments the porous partition is a porous pipe. In some embodiment the porous pipe comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-costyrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In some embodiments the porous pipe comprises sintered metals, stainless steel, titanium, stainless steel coated in ceramic, hastelloy, monel, inconel, or a combination thereof.

In some embodiments the porous pipe consists of openings in that are of a typical characteristic size of less than about 1 µm, less than ab out 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

Other Embodiments of Devices for Extracting Lithium from a Liquid Resource

In one aspect described herein, is a device for lithium extraction from a liquid resource comprising one or more vessels independently configured to simultaneously accommodate ion exchange beads moving in one direction and alternately acid, brine, and optionally other solutions moving in the net opposite direction.

In one aspect described herein, there is a device for lithium extraction from a liquid resource comprising an ion exchange vessel, an ion exchange material, and a pH modulating setup for increasing the pH of the liquid resource in the ion exchange vessel.

In one aspect described herein, is a device for lithium extraction from a liquid resource comprising an ion exchange vessel, an ion exchange material, a pH modulating setup for increasing the pH of the liquid resource in the stirred tank reactor, and a compartment for containing the ion exchange material in the stirred tank reactor while allowing for removal of liquid resource, washing fluid, and acid solutions from the ion exchange vessel.

In one embodiment, at least one of the one or more vessels are fitted with a conveyer system suitably outfitted to move porous ion exchange beads upward and simultaneously allow a net flow of acid, brine, and optionally other solutions, downward. In one embodiment, the conveyor system comprises fins with holes. In one embodiment, wherein the fins slide upward over a sliding surface that is fixed in place. In one embodiment, the fins slide upward over a sliding surface that is fixed in place. In one embodiment, all of the one or more vessels are fitted with a conveyor system suitably outfitted to move porous ion exchange beads upward and simultaneously allow a net flow of acid, brine, and optionally other solutions, downward. In one embodiment, there are an even number of vessels. In one embodiment, there are an odd number of vessels. In one embodiment, the vessels are columns.

In some embodiments, structures with holes are used to move the ion exchange material through one or more vessels. In some embodiments, the holes in the structures may be less than 10 microns, less than 100 microns, less than 1,000 microns, or less than 10,000 microns. In some embodiments, the structures may be attached to a conveyer system. In some embodiments, the structures may comprise a porous compartment, porous partition, or other porous structure. In some embodiments, the structures may contain a bed of fixed or fluidized ion exchange material. In some embodiments, the structures may contain ion exchange material while allowing brine, aqueous solution, or acid solution to pass through the structures.

In one embodiment, porous ion exchange beads comprise ion exchange particles that reversibly exchange lithium and hydrogen and a structural matrix material and having a pore network. In one embodiment, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays, leachate from recycled products, leachate from recycled materials, or combinations thereof.

Lithium-Selective Sorbent

Lithium is extracted from such liquid resources using inorganic lithium-selective sorbents with absorb lithium preferentially over other ions. These lithium-selective sorbents include lithium-selective ion exchange materials. As used herein, a "lithium-selective ion-exchange material" is a "lithium-selective sorbent". For the purposes of this disclosure, the term lithium-selective sorbent includes lithium-selective ion-exchange materials. In some embodiments, the lithium selective sorbent is a lithium-selective ion-exchange material. In some embodiments, the lithium selective sorbent comprises lithium-selective ion-exchange beads. In some embodiments, the lithium selective sorbent comprises ion-exchange beads. In some embodiments, the lithium selective sorbent is an ion-exchange material.

In some embodiments, lithium-selective sorbents include other inorganic material that selectively absorb lithium over other ions. In some embodiments, said lithium selective sorbent is a crystalline lithium salt aluminate, a lithium aluminum intercalate, $LiCl \cdot 2Al(OH)_3$, crystalline aluminum trihydroxide ($Al(OH)_3$), gibbsite, beyerite, nordstrandite, alumina hydrate, bauxite, amorphous aluminum trihydroxide, activated alumina layered lithium-aluminum double hydroxides, $LiAl_2(OH)_6Cl$, combinations thereof, compounds thereof, or solid solutions thereof.

An aspect of the disclosure herein is a device wherein the lithium selective sorbent comprises an ion-exchange material. An aspect of the disclosure herein is a process wherein the lithium selective sorbent comprises an ion-exchange material. An aspect of the disclosure herein is a system wherein the lithium selective sorbent comprises an ion-exchange material. An aspect of the disclosure herein is a lithium selective sorbent which extracts lithium from a liquid resource.

An aspect of the disclosure herein is a device, system, and associated process wherein the lithium selective sorbent comprises a lithium aluminate intercalate. In some embodiments, said lithium aluminate intercalate mixed with a polymer material. In some embodiments, said polymer comprises a chloro-polymer, a fluoro-polymer, a chloro-fluoro-polymer, a hydrophilic polymer, a hydrophobic polymer, co-polymers thereof, mixtures thereof, or combinations thereof. In a further embodiment, a polymer material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further embodiment, a polymer material comprises low density polyethylene, high density polyethylene, polypropylene, polyester, polytetrafluoroethylene (PTFE), types of polyamide, polyether ether ketone (PEEK), poly sulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly (chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium poly acrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further embodiment, a polymer material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further embodiment, said polymer is mixed onto the lithium aluminate intercalate particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further embodiment, said polymer is mixed onto the lithium aluminate intercalate particle using a solvent comprising N-methyl-2-pyrrolidone, dimethyl sulfoxide, tetrahydrofuran, dimethylformamide, dimethylacetamide, methyl ethyl ketone, ethanol, acetone, other solvents, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, or combinations thereof.

In a further aspect described herein, the lithium selective sorbent particles have an average diameter less than about 10 nm, less than about 100 nm, less than about 1,000 nm, less than about 10,000 nm, or less than about 100,000 nm. In a further aspect, the lithium aluminate intercalate particles have an average size less than about 100 nm, less than about 1,000 nm, or less than about 10,000 nm. In a further aspect, the lithium aluminate intercalate particles are optionally secondary particles comprised of smaller primary particles that have an average diameter less than about 10 nm, less than about 100 nm, less than about 1,000 nm, less than about 10,000 nm, or less than about 100,000 nm.

In a further aspect described herein, the lithium aluminate intercalate particles have an average diameter less than about 10 nm, less than about 100 nm, less than about 1,000 nm, less than about 10,000 nm, or less than about 100,000 nm. In a further aspect, the lithium aluminate intercalate particles have an average size less than about 100 nm, less than about 1,000 nm, or less than about 10,000 nm. In a further aspect, the lithium aluminate intercalate particles are optionally secondary particles comprised of smaller primary particles that have an average diameter less than about 10 nm, less than about 100 nm, less than about 1,000 nm, less than about 10,000 nm, or less than about 100,000 nm.

In some embodiments, the lithium-selective sorbent is loaded into a lithium extraction device described herein, wherein the lithium-selective sorbent absorbs lithium from a liquid resource. In some embodiments, said lithium-selective sorbent is an ion-exchange material. In some embodiments, the lithium-selective sorbent is loaded into a lithium extraction device described herein, and a non-sorbent material is co-loaded into said device. In some embodiments, said non-sorbent material is inert to all fluids used in lithium extraction, such that said non-sorbent material has no effect on the chemistry of the lithium extraction process.

In some embodiments, said non-sorbent material is termed a "filler material", "inert material", "packing material", or "packing"; these terms are used interchangeably. In some embodiments, the non-sorbent material is co-loaded into lithium extraction device with a lithium-selective sorbent. In some embodiments, the lithium-selective sorbent is loaded into lithium extraction device first, and the non-sorbent material is subsequently loaded into the lithium extraction device. In some embodiments, the non-sorbent material is loaded into lithium extraction device first, and the lithium-selective sorbent is subsequently loaded into the lithium extraction device. In some embodiments, loading of the lithium extraction device is alternated between non-sorbent material, lithium-selective sorbent, or a mixture thereof, until the device is loaded with solids to the intended loading-level. In some embodiments, the non-sorbent material is removed from the lithium extraction device after said device is loaded with the lithium-selective sorbent.

In some embodiments, the filler material is made from glass, silica, gravel, activated carbon, ceramic, alumina, zeolite, calcite, diatomaceous earth, cellulose, polymers, copolymers, titanium foam, titanium sponge, a mixture thereof or a combination of thereof. In some embodiments, the filler material is a porous material. In one embodiment, the filler material is diatomaceous earth. In one embodiment, the non-sorbent material is diatomaceous earth. For the purposes of this disclosure, the term "diatomaceous earth" also refers to "diatomite" or "kieselgur/kieselguhr", or "celite". In some embodiments, the filler material could be made from polycarbonate, polyvinyl chloride, high density polyethylene, low density polyethylene, polylactic acid, polyimide, poly(methyl methacrylate), polypropylene, polyvinylidene difluoride, polytetrafluoroethylene, polystyrene, Acrylonitrile butadiene styrene, Polyether ether ketone, copolymers thereof, mixture thereof, or combinations. In one embodiment the filler material is placed on top of the vessel, on the bottom of the vessel, or both. In one embodiment the filler material is mixed with the ion-exchange resin. Another aspect described herein is a device for lithium extraction from a liquid resource, comprising a vessel loaded with one or more beds of ion exchange material and a filler material, wherein the filler material is mixed with the one or more beds of ion exchange material, thereby providing support for the one or more beds and/or enabling for better flow distribution for said liquid resource or another fluid entering the vessel. Said better flow distribution ensures that all of the ion exchange material within the ion exchange bed contacts the same amount of liquid across all of the ion exchange bead, and that the hydrostatic pressure required to drive fluid flow across the bed is uniform across the cross section of the ion exchange bed.

In some embodiments, efficient flow distribution within the ion-exchange vessel occurs via one or more shaped objects or particle that are packed within one or more of the compartments that comprise the ion-exchange vessel. In some embodiments, the filler material is shaped as a sphere, spheroid, ovaloid, cross, tube, torus, ring, saddle ring, tubes, triangles, other complex geometric shape, or a combination thereof. In some embodiments, the packing is distributed with a random particle density. In some embodiments, the filler material is distributed with uniform particle density. In some embodiments, the filler material consists of one of more types of filler material, randomly added and distributed within the distribution chamber. In some embodiments, the filler material consists of one of more types of filler material, added and distributed within the fluid distribution chamber within well-defined regions. In some embodiments, parts of the of fluid distribution chamber are empty, and parts of the same chamber contain filler material.

In some embodiments, the non-sorbent material increases the flow uniformity of the liquid resource comprising lithium, when said resource flows across the bed of lithium-selective sorbent mixed with the non-sorbent material, as compared to when said resource flows across a bed of lithium-selective sorbent only. In some embodiments, the fluid pressure required to flow a liquid across a bed of lithium-selective sorbent mixed with the non-sorbent material is lower than when said resource flows across a bed of lithium-selective sorbent with similar length and at a similar flow rate.

In some embodiments, the filler material is shaped as a sphere, spheroid, ovaloid, cross, tube, torus, ring, saddle ring, tubes, triangles, other complex geometric shape, or a combination thereof. In some embodiments, the packing is distributed with a random particle density. In some embodiments, the filler material is distributed with uniform particle density. In some embodiments, the filler material consists of one of more types of filler material, randomly added and distributed within the distribution chamber. In some embodiments, the non-sorbent material consists of one of more types of non-sorbent material, randomly added and distributed within the distribution chamber. In some embodiments, the filler material consists of one of more types of filler material, added and distributed within the fluid distribution chamber within well-defined regions. In some embodiments, parts of the of fluid distribution chamber are empty, and parts of the same chamber contain filler material. In some embodiments, one end of the compartment containing the lithium-selective sorbent comprises a packed bed of non-sorbent material, such that the liquid resource comprising lithium enters said compartment and first contacts the lithium-selective sorbent, followed by the non-sorbent material. In some embodiments, one end of the compartment containing the lithium-selective sorbent comprises a packed bed of non-sorbent material, such that the liquid resource comprising lithium enters said compartment and first contacts the non-sorbent material, followed by the lithium-selective sorbent. In some embodiments, both ends of the compartment containing the lithium-selective sorbent comprise a packed bed of non-sorbent material, such that the liquid resource comprising lithium enters said compartment and first contacts the non-sorbent material, followed by the lithium-selective sorbent, followed by the same or a different non-sorbent material. In some embodiments, one or more sections of the compartment containing the lithium-selective sorbent comprise a packed bed of non-sorbent material, such that the liquid resource comprising lithium enters said compartment and alternates between contacting a non-sorbent material, followed by the lithium-selective sorbent.

In some embodiments, non-sorbent material has an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, non-sorbent material has a average particle diameter of from about 1 µm to about 5 µm, from about 5 µm to about 10 µm, from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600

μm to about 2000 μm, from about 1000 μm to about 2000 μm. In some embodiments, the non-sorbent material has a particle diameter from about 10 μm to about 200 μm.

In some embodiments, non-sorbent material is porous. In some embodiments, the non-sorbent material has an average pore opening size of less than about 0.1 nm, less than about 1 nm, less than about 10 nm, less than about 100 nm, less than about 1 μm, less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 200 μm, less than about 300 μm, less than about 400 μm, less than about 500 μm, less than about 600 μm, less than about 700 μm, less than about 800 μm, less than about 900 μm, less than about 1000 μm, less than about 2000 μm. In some embodiments, the non-sorbent material has an average pore opening size of more than about 0.1 nm, more than about 1 nm, more than about 10 nm, more than about 100 nm, more than about 1 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, non-sorbent material has an average pore opening size of rom about 0.1 nm to about 1 nm, from about 1 nm to about 10 nm, from about 10 nm to about 100 nm, from about 100 nm to about 1 μm, from 1 μm to about 10 μm, from about 1 μm to about 5 μm, from about 5 μm to about 10 μm, from about 10 μm to about 20 μm, from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the non-sorbent material has a particle diameter from about 10 μm to about 200 μm.

In some embodiments, the packed density of the non-sorbent material is of less than about 0.1 g/mL, less than about 0.5 g/mL, less than about 1 g/mL, less than about 3 g/mL nm, less than about 5 g/mL, less than about 10 g/mL. In some embodiments, the packed density of the non-sorbent material is of more than about 0.1 g/mL, more than about 0.5 g/mL, more than about 1 g/mL, more than about 3 g/mL nm, more than about 5 g/mL, more than about 10 g/mL. In some embodiments, the packed density of the non-sorbent material is of from about 0.1 g/mL to about 0.5 g/mL, from about 0.5 g/mL to about 1 g/mL, from about 0.5 g/mL to about 3 g/mL nm, from about 3 g/mL to about 5 g/mL, from about 5 g/mL to about 10 g/mL.

In some embodiments, the lithium-selective sorbent is loaded into the ion-exchange vessel as a slurry or suspension. In some embodiments, the liquid component of such slurry is water, acid, base, or a solvent. In some embodiments, the percentage of liquid in the slurry is less than about 1%, less than about, 2%, less than about 5%, less than about 10%, less than about 20%, less than about 50%, less than about 75%, less than about 90%, more than about 1%, more than about, 2%, more than about 5%, more than about 10%, more than about 20%, more than about 50%, more than about 75%, more than about 90%, between about 0% and 5%, between about 5% and 10%, between about 10% and 20%, between about 20% and 50%, between about 50% and 75%, between about 75% and 90%, between about 90% and 100%. In some embodiments, the percentage of solids in the slurry is less than about 1%, less than about, 2%, less than about 5%, less than about 10%, less than about 20%, less than about 50%, less than about 75%, less than about 90%, more than about 1%, more than about, 2%, more than about 5%, more than about 10%, more than about 20%, more than about 50%, more than about 75%, more than about 90%, between about 0% and 5%, between about 5% and 10%, between about 10% and 20%, between about 20% and 50%, between about 50% and 75%, between about 75% and 90%, between about 90% and 100%. In some embodiments, the ion exchange beads are loaded into the ion-exchange vessel as a dry powder.

In some embodiments, the non-sorbent material is loaded into the ion-exchange vessel as a slurry or suspension. In some embodiments, the liquid component of such slurry is water, acid, base, or a solvent. In some embodiments, the percentage of liquid in the slurry is less than about 1%, less than about, 2%, less than about 5%, less than about 10%, less than about 20%, less than about 50%, less than about 75%, less than about 90%, more than about 1%, more than about, 2%, more than about 5%, more than about 10%, more than about 20%, more than about 50%, more than about 75%, more than about 90%, between about 0% and 5%, between about 5% and 10%, between about 10% and 20%, between about 20% and 50%, between about 50% and 75%, between about 75% and 90%, between about 90% and 100%. In some embodiments, the percentage of solids in the slurry is less than about 1%, less than about, 2%, less than about 5%, less than about 10%, less than about 20%, less than about 50%, less than about 75%, less than about 90%, more than about 1%, more than about, 2%, more than about 5%, more than about 10%, more than about 20%, more than about 50%, more than about 75%, more than about 90%, between about 0% and 5%, between about 5% and 10%, between about 10% and 20%, between about 20% and 50%, between about 50% and 75%, between about 75% and 90%, between about 90% and 100%. In some embodiments, the ion exchange beads are loaded into the ion-exchange vessel as a dry powder.

In some embodiments, the non-sorbent material is mixed with the lithium-selective sorbent in a tank, liquid is added and the contents agitated to make a suspension, and said suspension is loaded into the lithium-extraction device. In some embodiments, the liquid component of such slurry is water, acid, base, or a solvent. In some embodiments, the percentage of liquid in the slurry is less than about 1%, less than about, 2%, less than about 5%, less than about 10%, less than about 20%, less than about 50%, less than about 75%, less than about 90%, more than about 1%, more than about, 2%, more than about 5%, more than about 10%, more than about 20%, more than about 50%, more than about 75%, more than about 90%, between about 0% and 5%, between about 5% and 10%, between about 10% and %, between about 20% and 50%, between about 50% and 75%, between about 75% and %, between about 90% and 100%. In some embodiments, the ion exchange beads are loaded into the ion-exchange vessel as a dry mixture. In some embodiments, the percentage of solids in the slurry is less than about 1%, less than about, 2%, less than about 5%, less than about 10%, less than about 20%, less than about 50%, less than about 75%, less than about 90%, more than about 1%, more than about, 2%, more than about 5%, more than about 10%, more than about 20%, more than about 50%, more than about 75%, more than about 90%, between about 0% and 5%, between about 5% and 10%, between about 10% and 20%, between about 20% and 50%, between about 50% and 75%, between about 75% and 90%, between about 90% and 100%. In some embodiments, the non-sorbent material mixed with the lithium-selective sorbent are loaded into the ion-exchange vessel as a dry mixture.

Ion Exchange Material

An aspect of the disclosure herein is a device for lithium extraction, wherein said device contains a lithium-selective sorbent material, and wherein said sorbent material is an ion-exchange material. An aspect of the disclosure herein is a system for lithium extraction, wherein said system comprises said lithium-extraction device.

An aspect of the disclosure herein is a system wherein the ion exchange material comprises a plurality of ion exchange particles. In an embodiment, the plurality of ion exchange particles in the ion exchange material is selected from uncoated ion exchange particles, coated ion exchange particles and combinations thereof. In an embodiment, the ion exchange material is a porous ion exchange material. In an embodiment, the porous ion exchange material comprises a network of pores that allows liquids to move quickly from the surface of the porous ion exchange material to the plurality of ion exchange particles. In an embodiment, the ion exchange material is in the form of porous ion exchange beads. In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

Ion exchange materials are typically small particles, which together constitute a fine powder. In some embodiments small particle size minimizes the diffusion distance that lithium must travel into the core of the ion exchange particles. In some cases, these particles are optionally coated with protective surface coatings to minimize dissolution of the ion exchange materials while allowing efficient transfer of lithium and hydrogen to and from the particles.

In an embodiment, the coated ion exchange particles are comprised of an ion exchange material and a coating material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof and the coating material comprises $TiO_2$, $ZrO_2$, $MoO_2$, $Li_2TiO_3$, $Li_2ZrO_3$, $LiNbO_3$, $AlF_3$, SiC, $Si_3N_4$, graphitic carbon, amorphous carbon, diamond-like carbon, or combinations thereof. The coated ion exchange particles have an average diameter less than about 100 nm, less than about 1,000 nm, or less than about 10,000 nm, and the coating thickness is less than about 1 nm, less than about 10 nm, or less than about 100 nm. The particles are created by first synthesizing the ion exchange material using a method such as hydrothermal, solid state, or microwave. The coating material is then deposited on the surface of the ion exchange material using a method such as chemical vapor deposition, hydrothermal, solvothermal, sol-gel, precipitation, or microwave. The coated ion exchange particles are treated with an acid solution prepared with hydrochloric acid, sulfuric acid, nitric acid, or combinations thereof wherein the concentration of the acid solution is greater than about 0.1 M, greater than about 1.0M, greater than about 5 M, greater than about 10 M, or combinations thereof. During acid treatment, the particles absorb hydrogen while releasing lithium. The ion exchange material is converted to a hydrated state with a hydrogen-rich composition. The coating material allows diffusion of hydrogen and lithium respectively to and from the ion exchange material while providing a protective barrier that limits dissolution of the ion exchange material. After treatment in acid, the hydrated coated ion exchange particles are treated with a liquid resource wherein the liquid resource is a natural brine, a dissolved salt flat, a concentrated brine, a processed brine, a synthetic brine, liquid from an ion exchange process, liquid from a solvent extraction process, leachate from minerals, leachate from clays, leachate from recycled products, leachate from recycled materials, or combinations thereof. The coated ion exchange particles absorb lithium while releasing hydrogen. The lithium salt solution is then collected. The coated ion exchange particles are capable then perform the ion exchange reaction repeatedly over a number of cycles greater than about 10 cycles, greater than about 30 cycles, greater than about 100 cycles, or greater than about 300 cycles.

One major challenge for lithium extraction using inorganic ion exchange particles is the loading of the particles into an ion exchange column in such a way that brine and acid are optionally pumped efficiently through the column with minimal clogging. The materials are optionally formed into beads, and the beads are optionally loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

In some embodiments, the ion exchange beads are porous ion exchange beads with networks of pores that facilitate the transport into the beads of solutions that are pumped through an ion exchange column. Pore networks are optionally strategically controlled to provide fast and distributed access for the brine and acid solutions to penetrate into the bead and deliver lithium and hydrogen to the ion exchange particles.

In some embodiments, the ion exchange beads are formed by mixing ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method optionally involves multiple ion exchange materials, multiple polymer materials, and multiple filler materials.

Another major challenge for lithium extraction using inorganic ion exchange materials is dissolution and degradation of the materials, especially during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decrease the performance and lifespan of the materials. Therefore, the porous ion exchange beads optionally contain coated ion exchange particle for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle enables the use of concentrated acids in the ion exchange process to yield concentrated lithium solutions.

In this disclosure, the ion exchange material is selected for high lithium absorption capacity, high selectivity for lithium in a liquid resource relative to other ions such as sodium and magnesium, strong lithium uptake in liquid resources including those with low concentrations of lithium, facile elution of lithium with a small excess of acid, and fast ionic diffusion. A coating material is optionally selected to protect the particle from dissolution and chemical degradation during lithium recovery in acid and also during lithium uptake in various liquid resources. A coating material optionally is also selected to facilitate diffusion of lithium and hydrogen between the particles and the liquid resources, to enable adherence of the particles to a structural support, and to suppress structural and mechanical degradation of the particles.

When the porous ion exchange beads are used in an ion exchange column, the liquid resource containing lithium is pumped through the ion exchange column so that the ion exchange particles absorb lithium from the liquid resource while releasing hydrogen. After the beads have absorbed lithium, an acid solution is pumped through the column so that the particles release lithium into the acid solution while absorbing hydrogen. The column is optionally operated in co-flow mode with the liquid resource and acid solution alternately flowing through the column in the same direction, or the column is optionally operated in counter-flow mode with a liquid resource and acid solution alternately flowing through the column in opposite directions. Between flows of the liquid resource and the acid solution, the column is optionally treated or washed with water or other solutions for purposes such as adjusting pH in the column or removing potential contaminants. The beads optionally form a fixed or moving bed, and the moving bed optionally moves in counter-current to the brine and acid flows. The beads are optionally moved between multiple columns with moving beds where different columns are used for brine, acid, water, or other flows. Before or after the liquid resource flows through the column, the pH of the liquid is optionally adjusted with NaOH or other chemicals to facilitate the ion exchange reaction as well as handling or disposal of the spent liquid resource. Before or after the liquid resource flows through the column, the liquid resource is optionally subjected to other processes including other ion exchange processes, solvent extraction, evaporation, chemical treatment, or precipitation to remove lithium, to remove other chemical species, or to otherwise treat the brine.

When the ion exchange particles are treated with acid, a lithium solution is produced. This lithium solution is optionally further processed to produce lithium chemicals. These lithium chemicals are optionally supplied for an industrial application. In some embodiments, an ion exchange material is selected from the following list: an oxide, a phosphate, an oxyfluoride, a fluorophosphate, or combinations thereof. In some embodiments, an ion exchange material is selected from the following list: $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, or combinations thereof. In a further aspect, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In a further aspect described herein, the coating material allows diffusion to and from the ion exchange material. In particular, the coating material facilitates diffusion of lithium and hydrogen between the particles and the liquid resources, enables adherence of the particles to a structural support, and suppresses structural and mechanical degradation of the particles. In a further aspect described herein, the coating material comprises a carbide, a nitride, an oxide, a phosphate, a fluoride, a polymer, carbon, a carbonaceous material, or combinations thereof. In a further aspect, the coating material comprises polyvinylidene difluoride, polyvinyl chloride, a fluoro-polymer, a chloro-polymer, or a fluoro-chloro-polymer. In a further aspect, a coating material comprises $Nb_2O_5$, $Ta_2O_5$, $MoO_2$, $TiO_2$, $ZrO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In a further aspect, a coating material comprises $TiO_2$, $ZrO_2$, $SiO_2$, $Li_2TiO_3$, $Li_2ZrO_3$, $Li_2MnO_3$, $ZrSiO_4$, or $LiNbO_3$. In a further aspect, a coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises low density polyethylene, high density polyethylene, polypropylene, polyester, polytetrafluoroethylene (PTFE), types of polyamide, polyether ether ketone (PEEK), poly sulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinyl fluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further aspect, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, other solvents, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, or combinations thereof.

In a further aspect described herein, the coated ion exchange particles have an average diameter less than about 10 nm, less than about 100 nm, less than about 1,000 nm, less than about 10,000 nm, or less than about 100,000 nm. In a further aspect, the coated ion exchange particles have an average size less than about 100 nm, less than about 1,000 nm, or less than about 10,000 nm. In a further aspect, the coated ion exchange particles are optionally secondary particles comprised of smaller primary particles that have an average diameter less than about 10 nm, less than about 100 nm, less than about 1,000 nm, less than about 10,000 nm, or less than about 100,000 nm. In a further aspect, the coating optionally coats the primary ion exchange particles. In a further aspect, the coating optionally coats the secondary ion exchange particles. In a further aspect, the coating optionally coats the secondary ion exchange particles. In a further aspect, the coating optionally coats both the primary ion exchange particles and the secondary ion exchange particles. In a further aspect, the primary ion exchange particles optionally have a first coating and the secondary ion exchange particles optionally have a second coating that is optionally identical, similar, or different in composition to the first coating.

In some embodiments described herein, the coating material has a thickness less than about 1 nm, less than about 10 nm, less than about 100 nm, less than about 1,000 nm, or less than about 10,000 nm. In further embodiments, the coating material has a thickness less than about 5 nm, less than about 50 nm, or less than about 500 nm. In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm. In certain embodiments, the coating material has a thickness between about 0.5 nm to about 1000 nm. In some embodiments, the coating material has a thickness between about 1 nm to about 100 nm.

In a further aspect described herein, the ion exchange material and the coating material form one or more concentration gradients where the chemical composition of the particle ranges between two or more compositions. In a further aspect, the chemical composition optionally varies between the ion exchange materials and the coating in a manner that is continuous, discontinuous, or continuous and discontinuous in different regions of the particle. In a further aspect, the ion exchange materials and the coating materials form a concentration gradient that extends over a thickness less than about 1 nm, less than about 10 nm, less than about 100 nm, less than about 1,000 nm, less than about 10,000 nm, or less than about 100,000 nm. In a further aspect, the ion exchange materials and the coating materials form a concentration gradient that extends over a thickness of about 1 nm to about 1,000 nm.

In a further aspect described herein, the ion exchange material is synthesized by a method such as hydrothermal, solvothermal, sol-gel, solid state, molten salt flux, ion exchange, microwave, ball milling, chemical precipitation, co-precipitation, vapor deposition, or combinations thereof. In a further aspect, the ion exchange material is synthesized by a method such as chemical precipitation, hydrothermal, solid state, or combinations thereof.

In a further aspect described herein, the coating material is deposited by a method such as chemical vapor deposition, atomic layer deposition, physical vapor deposition, hydrothermal, solvothermal, sol-gel, solid state, molten salt flux, ion exchange, microwave, chemical precipitation, co-precipitation, ball milling, pyrolysis, or combinations thereof. In a further aspect, the coating material is deposited by a method such as sol-gel, chemical precipitation, or combinations thereof. In a further aspect, the coating materials is deposited in a reactor that is optionally a batch tank reactor, a continuous tank reactor, a batch furnace, a continuous furnace, a tube furnace, a rotary tube furnace, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings are optionally deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene fluoride, polyvinyl chloride, polyvinylidene chloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the ion exchange beads are formed by mixing of ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method may involve multiple ion exchange materials, multiple polymer materials, and multiple filler materials.

In some embodiments, the porous bead is formed by mixing the ion exchange particles, the matrix material, and the filler material together at once. In some embodiments, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry is optionally formed using a solvent of n-methyl-2-pyrrolidone, dimethyl sulfoxide, tetrahydrofuran, dimethylformamide, dimethylacetamide, methyl ethyl ketone, or combinations thereof. The different liquid solution is optionally formed using water, ethanol, iso-propyl alcohol, acetone, or combinations thereof.

In some embodiments, the porous ion exchange bead is approximately spherical with an average diameter selected from the following list: less than 10 μm, less than 100 μm, less than 1 mm, less than 1 cm, or less than 10 cm. In some embodiments, the porous ion exchange bead is approximately spherical with an average diameter selected from the following list: less than 200 μm, less than 2 mm, or less than 20 mm. In certain embodiments, the porous ion exchange bead is approximately spherical with an average diameter between 10 μm and 2 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm. In certain embodiments, the porous ion exchange bead is tablet-shaped with a diameter between 500 μm and 10 mm.

In some embodiments, the porous ion exchange bead is embedded in a support structure, which is optionally a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, or organic molecules. In some embodiments, the liquid resource is optionally enter the ion exchange reactor without any pre-treatment following from its source.

In some embodiments, the liquid resource is selected with a lithium concentration selected from the following list: less than 100,000 mg/L, less than 10,000 mg/L, less than 1,000 mg/L, less than 100 mg/L, less than 10 mg/L, or combinations thereof. In some embodiments, a liquid resource is selected with a lithium concentration selected from the following list: less than 5,000 mg/L, less than 500 mg/L, less than 50 mg/L, or combinations thereof.

Process of Extracting Lithium from a Liquid Resource

In one aspect described herein, is a process for lithium extraction from a liquid resource comprising treating ion exchange beads alternately with acid, brine, and optionally other solutions, in a configuration where the beads move in the net opposite direction to the acid, brine, and optionally other solutions, thereby producing a lithium-enriched solution from the liquid resource. In one embodiment, the process comprises: (a) treating the ion exchange beads with acid under conditions suitable to absorb hydrogen to generate hydrogen-enriched beads and release lithium to generate a lithium-enriched solution; (b) optionally, washing the hydrogen-enriched beads with water to generate hydrogen-enriched beads substantially free of residual acid; (c) treating the hydrogen-enriched beads with the liquid resource under conditions suitable to absorb lithium to generate lithium-enriched beads; (d) optionally, washing the lithium-enriched beads with water to generate lithium-enriched beads substantially free of liquid resource; and (e) repeating the cycle to produce a lithium-enriched solution from the liquid resource.

In some embodiments, the process of extracting lithium occurs by contacting solutions described above with ion exchange beads occurs within one or more of the devices for lithium extraction disclosed herein. Examples of lithium extraction with such devices are provided in examples 1 to 11 and associated figures.

In one aspect described herein, is a process for lithium extraction from a liquid resource comprising treating ion exchange material alternately with acid, brine, and optionally other solutions, in a configuration where the ion exchange material moves in the net opposite direction to the acid, brine, and optionally other solutions, thereby producing a lithium-enriched solution from the liquid resource. In one aspect described herein, is a process for lithium extraction from a liquid resource comprising treating ion exchange material alternately with acid, the liquid resource, and optionally other solutions, in a configuration where the ion exchange material moves in the net opposite direction to the acid, liquid resource, and optionally other solutions, thereby producing a lithium-enriched solution from the liquid resource. In one aspect described herein, is a process for lithium extraction from a liquid resource comprising treating ion exchange material alternately with acid, brine, and optionally other solutions, in a configuration where the ion exchange material moves in the net opposite direction to the acid, brine, and optionally other solutions, thereby producing a lithium-enriched solution from the brine. In one embodiment, the process comprises: (a) treating the ion exchange material with acid under conditions suitable to absorb hydrogen to generate hydrogen-enriched material and release lithium to generate a lithium-enriched solution; (b) optionally, washing the hydrogen-enriched material with water to generate hydrogen-enriched material substantially free of residual acid; (c) treating the hydrogen-enriched material with the liquid resource under conditions suitable to absorb lithium to generate lithium-enriched material; (d) optionally, washing the lithium-enriched beads with water to generate lithium-enriched beads substantially free of liquid resource; and (e) repeating the cycle to produce a lithium-enriched solution from the liquid resource.

In one embodiment, the ion exchange beads comprise ion exchange particles that reversibly exchange lithium and hydrogen and a structural matrix material, and having a pore network. In one embodiment, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays leachate from recycled products, leachate from recycled materials, or combinations thereof.

In some embodiments herein, is a process for lithium extraction from a liquid resource comprising treating ion exchange beads alternately with acid, brine, and optionally other solutions, in a configuration where the beads move in the net opposite direction to the acid, brine, and optionally other solutions, thereby producing a lithium-enriched solution from the liquid resource, wherein the process comprises: a) treating the ion exchange beads with acid under conditions suitable to absorb hydrogen to generate hydrogen-enriched beads and release lithium to generate a lithium-enriched solution; b) optionally, washing the hydrogen-enriched beads with water to generate hydrogen-enriched beads substantially free of residual acid; c) treating the hydrogen-enriched beads with the liquid resource under conditions suitable to absorb lithium to generate lithium-enriched beads; d) optionally, washing the lithium-enriched beads with water to generate lithium-enriched beads substantially free of liquid resource; and e) repeating the cycle to produce a lithium-enriched solution from the liquid resource.

In one aspect described herein, is a process for lithium extraction from a liquid resource comprising treating ion exchange particles alternately with the liquid resource, washing fluid, and acid, in a system for the extraction of lithium ions from a liquid resource, comprising: a. an ion exchange material; b. a ion exchange vessel; and c. a pH modulating setup for increasing the pH of the liquid resource in the system.

In one aspect described herein, is a process for lithium extraction from a liquid resource comprising treating ion exchange particles alternately with the liquid resource, a washing fluid, and an acid solution, with a system for the extraction of lithium ions from a liquid resource, comprising a stirred rank reactor, an ion exchange material, a pH modulating setup for increasing the pH of the liquid resource in the ion exchange vessel, and a compartment for containing the ion exchange material in the ion exchange vessel while allowing for removal of liquid resource, washing fluid, and acid solutions from the ion exchange vessel.

Process of Modulating pH for the Extraction of Lithium

An aspect of the disclosure herein is a process for the extraction of lithium ions from a liquid resource, comprising: a) contacting an ion exchange material with the liquid resource; and b) increasing the pH of the liquid resource before contact with the ion exchange material, during contact with the ion exchange material, after contact with the ion exchange material and combinations thereof.

In some embodiment, the process of contacting a liquid resource with an ion exchange material occurs within one or more of the devices for lithium extraction disclosed herein. In some embodiments, several such devices are connected, and the liquid resource undergoes a treatment to increase its pH when flowing from one such vessel to the next. Examples of networks of such devices incorporating a process wherein the pH of the liquid resource is increased are included in examples 9 to 14 and 17, and associated figures.

Another aspect described herein is a process for the extraction of lithium ions from a liquid resource, comprising: a) contacting an ion exchange material with the liquid resource; and b) increasing the pH of the liquid resource before contact with the ion exchange material, during contact with the ion exchange material, after contact with the ion exchange material, or combinations thereof. In some embodiments of the process, increasing the pH of the liquid resource is before contacting the ion exchange material with the liquid resource. In some embodiments of the process, increasing the pH of the liquid resource is during contacting the ion exchange material with the liquid resource. In some embodiments of the process, increasing the pH of the liquid resource is after contacting the ion exchange material with the liquid resource. In some embodiments of the process, increasing the pH of the liquid resource is before and during contacting the ion exchange material with the liquid resource. In some embodiments of the process, increasing the pH of the liquid resource is before and after contacting the ion exchange material with the liquid resource. In some embodiments of the process, increasing the pH of the liquid resource is during and after contacting the ion exchange material with the liquid resource. In some embodiments of the process, increasing the pH of the liquid resource is before, during, and after contacting the ion exchange material with the liquid resource.

An aspect of the disclosure herein is a process, wherein the ion exchange material is loaded into a column. In an embodiment, the process further comprises: a) loading a liquid resource into one or more liquid resource tanks; b) connecting the column to the one or more liquid resource tanks; and c) passing the liquid resource from the one or more liquid resource tanks through the column, wherein the passing of the liquid resource occurs at least once. In an embodiment, the process further comprises increasing the pH of the liquid resource in one or more pH increasing tanks. In an embodiment, the process further comprises settling precipitates in one or more settling tanks. In an embodiment, the process further comprises storing the liquid resource in one or more storing tanks prior to or after circulating the liquid resource through the column.

An aspect of the disclosure herein is a process, wherein the process further comprises: a) loading the liquid resource into one or more liquid resource tanks; b) connecting the column to the one or more liquid resource tanks; c) passing the liquid resource from the one or more liquid resource tanks through the column, wherein the passing of the liquid resource occurs at least once; d) increasing the pH of the liquid resulting from c. in one or more pH increasing tanks; e) settling precipitates of the liquid resulting from d. in one or more settling tanks; and f) storing the liquid resulting from e. in one or more storing tanks.

An aspect of the disclosure herein is a process, wherein the ion exchange material is loaded in a plurality of columns. In an embodiment, a plurality of tanks is connected to the plurality of columns, wherein each of the plurality of tanks is immediately connected to one of the plurality of columns. In an embodiment, two or more of the plurality of columns forms at least one circuit. In an embodiment, at least one circuit is selected from a liquid resource circuit, a water washing circuit and an acid solution circuit. In an embodiment, the pH of the liquid resource is increased in the plurality of tanks connected to the plurality of columns in the liquid resource circuit. In an embodiment, the liquid resource circuit includes a plurality of columns connected to a plurality of tanks, wherein each of the plurality of tanks is immediately connected to one of the plurality of columns.

An aspect of the disclosure herein is a process, wherein the process further comprises: a) passing the liquid resource through a plurality of columns in the liquid resource circuit; b) passing an acid solution through a plurality of columns in the acid solution circuit one or more times; and c) passing water through a plurality of columns in the water washing circuit. In an embodiment, the process further comprises interchanging a plurality of columns between the liquid resource circuit, the water washing circuit and the acid solution circuit, such that: a) at least one of the plurality of columns in the liquid resource circuit becomes at least one of the plurality of columns in the water washing circuit and/or at least one of the plurality of columns in the acid solution circuit; b) at least one of the plurality of columns in the water washing circuit becomes at least one of the plurality of columns in the acid solution circuit and/or at least one of the plurality of columns in the liquid resource circuit; and/or c) at least one of the plurality of columns in the acid solution circuit becomes at least one of the plurality of columns in the liquid resource circuit and/or at least one of the plurality of columns in the water washing circuit.

An aspect of the disclosure herein is a process, wherein the ion exchange material is loaded into one or more compartments in a tank. In an embodiment, the process further comprises moving the liquid resource through the one or more compartments in the tank. In an embodiment, the tank comprises injection ports. In an embodiment, the process further comprises using the injection ports to increase the pH of the liquid resource before contact with the ion exchange material, during contact with the ion exchange material, after contact with the ion exchange material and combinations thereof.

In some embodiments, the process further comprises using the injection ports to increase the pH of the liquid resource before contact with the ion exchange material, during contact with the ion exchange material, after contact with the ion exchange material, or combinations thereof.

An aspect of the disclosure herein is a process, wherein the column further comprises a plurality of injection ports. In an embodiment, the process further comprises using the plurality of injection ports to increase the pH of the liquid resource before contact with the ion exchange material, during contact with the ion exchange material, after contact with the ion exchange material and combinations thereof.

In some embodiments, the process further comprises using the plurality of injection ports to increase the pH of the liquid resource before contact with the ion exchange material, during contact with the ion exchange material, after contact with the ion exchange material, or combinations thereof.

In an embodiment, the ion exchange material comprises a plurality of ion exchange particles. In an embodiment, the plurality of ion exchange particles in the ion exchange material is selected from uncoated ion exchange particles, coated ion exchange particles and combinations thereof. In an embodiment, the ion exchange material is an ion exchange material. In an embodiment, the ion exchange material comprises a network of pores that allows liquids to move quickly from the surface of the ion exchange material to the plurality of ion exchange particles. In an embodiment, the ion exchange material is in the form of ion exchange beads.

In an embodiment, the ion exchange material extracts lithium ions from a liquid resource. During the extraction of lithium ions from a liquid resource by the ion exchange material, the pH of the liquid resource optionally decreases. Increasing the pH of the liquid resource in the system maintains the pH in a range that is suitable for lithium ion uptake by the ion exchange material. In an embodiment, increasing the pH comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, increasing the pH comprises measuring the pH of the system and wherein the pH of the system is less than 6, less than 4, or less than 2, the pH of the system is adjusted to a pH of 2 to 9, a pH of 4 to 9, or a pH of 6 to 9.

Continuous Process for Lithium Extraction

Lithium is an essential element for batteries and other technologies. Lithium is found in a variety of liquid resources, including natural and synthetic brines and leachate solutions from minerals, clays, and recycled products. Lithium can be extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process can be repeated to extract lithium from a liquid resource and yield a concentrated lithium solution. The concentrated lithium solution can be further processed into chemicals for the battery industry or other industries.

Ion exchange materials are typically small particles, which together constitute a fine powder. Small particle size is required to minimize the diffusion distance that lithium must travel into the core of the ion exchange particles. In some cases, these particles may be coated with protective surface coatings to minimize dissolution of the ion exchange materials while allowing efficient transfer of lithium and hydrogen to and from the particles, as disclosed in U.S. provisional application 62/421,934, filed on Nov. 14, 2016, entitled "Lithium Extraction with Coated Ion Exchange Particles," and incorporated in its entirety by reference.

One major challenge for lithium extraction using inorganic ion exchange particles is the loading of the particles into an ion exchange column in such a way that brine and acid are pumped efficiently through the column with minimal clogging. The materials is formed into beads, and the beads are loaded into the column. This bead loading creates void spaces between the beads, and these void spaces facilitate pumping through the column. The beads hold the ion exchange particles in place and prevent free movement of the p articles throughout the column. When the materials are formed into beads, the penetration of brine and acid solutions into the beads may become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

In some embodiments, the ion exchange beads are ion exchange beads with networks of pores that facilitate the transport into the beads of solutions that are pumped through an ion exchange column. Pore networks are strategically controlled to provide fast and distributed access for the brine and acid solutions to penetrate into the bead and deliver lithium and hydrogen to the ion exchange particles.

In some embodiments, the ion exchange beads are formed by mixing of ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method may involve multiple ion exchange materials, multiple polymer materials, and multiple filler materials.

Another major challenge for lithium extraction using inorganic ion exchange materials is dissolution and degradation of the materials, especially during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decreases the performance and lifespan of the materials. Therefore, the ion exchange beads may contain coated ion exchange particle for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle enables the use of concentrated acids in the ion exchange process to yield concentrated lithium solutions.

In one aspect described herein, the ion exchange material is selected for high lithium absorption capacity, high selectivity for lithium in a liquid resource relative to other ions such as sodium and magnesium, strong lithium uptake in liquid resources including those with low concentrations of lithium, facile elution of lithium with a small excess of acid, and fast ionic diffusion. In one aspect described herein, a coating material is selected to protect the particle from dissolution and chemical degradation during lithium recovery in acid and also during lithium uptake in various liquid resources. In some embodiments, the coating material may also be selected to facilitate one or more of the following objectives: diffusion of lithium and hydrogen between the particles and the liquid resources, enabling adherence of the particles to a structural support, and suppressing structural and mechanical degradation of the particles.

When the ion exchange beads are used in an ion exchange column, the liquid resource containing lithium is pumped through the ion exchange column so that the ion exchange particles absorb lithium from the liquid resource while releasing hydrogen. After the beads have absorbed lithium, an acid solution is pumped through the column so that the particles release lithium into the acid solution while absorbing hydrogen. The column may be operated in co-flow mode with the liquid resource and acid solution alternately flowing through the column in the same direction, or the column may be operated in counter-flow mode with a liquid resource and acid solution alternately flowing through the column in opposite directions. Between flows of the liquid resource and the acid solution, the column may be treated or washed with water or other solutions for purposes such as adjusting pH in the column or removing potential contaminants. The beads may form a fixed or moving bed, and the moving bed may move in counter-current to the brine and acid flows. The beads may be moved between multiple columns with moving beds where different columns are used for brine, acid, water, or other flows. Before or after the liquid resource flows through the column, the pH of the liquid may be adjusted with NaOH or other chemicals to facilitate the ion exchange reaction as well as handling or disposal of the spent liquid resource. Before or after the liquid resource flows through the column, the liquid resource may be subjected to other processes including other ion exchange processes, solvent extraction, evaporation, chemical treatment, or precipitation to remove lithium, to remove other chemical species, or to otherwise treat the brine.

When the ion exchange particles are treated with acid, a lithium solution is produced. This lithium solution may be further processed to produce lithium chemicals. These lithium chemicals may be supplied for an industrial application.

In some embodiments, an ion exchange material is selected from the following list: an oxide, a phosphate, an oxyfluoride, a fluorophosphate, or combinations thereof. In some embodiments, an ion exchange material is selected from the following list: $Li_4Mn_5O_{12}$, $Li_4Ti_5O_{12}$, $Li_2MO_3$ (M=Ti, Mn, Sn), $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl\cdot xAl(OH)_3\cdot yH_2O$, $SnO_2\cdot xSb_2O_5\cdot yH_2O$, $TiO_2\cdot xSb_2O_5\cdot yH_2O$, solid solutions thereof, or combinations thereof. In some embodiments, an ion exchange material is selected from the following list: $Li_4Mn_5O_{12}$, $Li_4Ti_5O_{12}$, $Li_{1.6}Mn_{1.6}O_4$, $Li_2MO_3$ (M=Ti, Mn, Sn), $LiFePO_4$, solid solutions thereof, or combinations thereof.

In some embodiments, a coating material for protecting the surface of the ion exchange material is selected from the following list: a carbide, a nitride, an oxide, a phosphate, a fluoride, a polymer, carbon, a carbonaceous material, or combinations thereof. In some embodiments, a coating material is selected from the following list: $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, a coating material is selected from the following list: $TiO_2$, $ZrO_2$, $MoO_2$, $SiO_2$, $Li_2TiO_3$, $Li_2ZrO_3$, $Li_2SiO_3$, Li$_2$MnO$_3$, LiNbO$_3$, AlF$_3$, SiC, Si$_3$N$_4$, graphitic carbon, amorphous carbon, diamond-like carbon, or combinations thereof.

In some embodiments, the ion exchange particles may have an average diameter that is selected from the following list: less than 10 nm, less than 100 nm, less than 1,000 nm, less than nm, or less than 100,000 nm. In some embodiments, the ion exchange particles may have an average size that is selected from the following list: less than 200 nm, less than 2,000 nm, or less than 20,000 nm.

In some embodiments, the ion exchange particles may be secondary particles comprised of smaller primary particles that may have an average diameter selected from the following list: less than 10 nm, less than 100 nm, less than 1,000 nm, or less than 10,000 nm.

In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm.

In some embodiments, the ion exchange material and a coating material may form one or more concentration gradients where the chemical composition of the particle ranges between two or more compositions. In some embodiments, the ion exchange materials and the coating materials may form a concentration gradient that extends over a thickness selected from the following list: less than 1 nm, less than 10 nm, less than 100 nm, less than 1,000 nm, less than nm, or less than 100,000 nm.

In some embodiments, the ion exchange material is synthesized by a method selected from the following list: hydrothermal, solvothermal, sol-gel, solid state, molten salt flux, ion exchange, microwave, ball milling, precipitation, or vapor deposition. In some embodiments, the ion exchange material is synthesized by a method selected from the following list: hydrothermal, solid state, or microwave.

In some embodiments, a coating material is deposited by a method selected from the following list: chemical vapor deposition, atomic layer deposition, physical vapor deposition, hydrothermal, solvothermal, sol-gel, solid state, molten salt flux, ion exchange, microwave, wet impregnation, precipitation, titration, aging, ball milling, or combinations thereof. In some embodiments, the coating material is deposited by a method selected from the following list: chemical vapor deposition, hydrothermal, titration, solvothermal, wet impregnation, sol-gel, precipitation, microwave, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings may be deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the porous bead is formed by mixing the ion exchange particles, the matrix material, and the filler material together at once. In some embodiments, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry may be formed using a solvent of n-methyl-2-pyrrolidone, dimethyl sulfoxide, tetrahydrofuran, dim ethylformamide, dimethylacetamide, methyl ethyl ketone, or combinations thereof. The different liquid solution may be formed using water, ethanol, iso-propyl alcohol, acetone, or combinations thereof.

In some embodiments, the porous ion exchange bead is approximately spherical with an average diameter selected from the following list: less than 10 µm, less than 100 µm, less than 1 mm, less than 1 cm, or less than 10 cm. In some embodiments, the porous ion exchange bead is approximately spherical with an average diameter selected from the following list: less than 200 μm, less than 2 mm, or less than 20 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm.

In some embodiments, the porous ion exchange bead is embedded in a support structure, which may be a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof.

In some embodiments, the liquid resource is selected with a lithium concentration selected from the following list: less than 100,000 mg/L, less than 10,000 mg/L, less than 1,000 mg/L, less than 100 mg/L, less than 10 mg/L, or combinations thereof. In some embodiments, a liquid resource is selected with a lithium concentration selected from the following list: less than 5,000 mg/L, less than 500 mg/L, less than 50 mg/L, or combinations thereof.

In some embodiments, the acid used for recovering lithium from the porous ion exchange beads is selected from the following list: hydrochloric acid, sulfuric acid, phosphoric acid, hydrobromic acid, chloric acid, perchloric acid, nitric acid, formic acid, acetic acid, or combinations thereof. In some embodiments, the acid used for recovering lithium from the porous ion exchange beads is selected from the following list: hydrochloric acid, sulfuric acid, nitric acid, or combinations thereof.

In some embodiments, the acid used for recovering lithium from the porous ion exchange beads has a concentration selected from the following list: less than 0.1 M, less than 1.0 M, less than 5 M, less than 10 M, or combinations thereof.

In some embodiments, the porous ion exchange beads perform the ion exchange reaction repeatedly over a number of cycles selected from the following list: greater than 10 cycles, greater than 30 cycles, greater than 100 cycles, greater than 300 cycles, or greater than 1,000 cycles. In some embodiments, the porous ion exchange beads perform the ion exchange reaction repeatedly over a number of cycles selected from the following list: greater than 50 cycles, greater than 100 cycles, or greater than 200 cycles.

In some embodiments, the concentrated lithium solution that is yielded from the porous ion exchange beads is further processed into lithium raw materials using methods selected from the following list: solvent extraction, ion exchange, chemical precipitation, electrodialysis, electrowinning, evaporation with direct solar energy, evaporation with concentrated solar energy, evaporation with a heat transfer medium heated by concentrated solar energy, evaporation with heat from a geothermal brine, evaporation with heat from combustion, or combinations thereof.

In some embodiments, the concentrated lithium solution that is yielded from the porous ion exchange beads is further processed into lithium chemicals selected from the following list: lithium chloride, lithium carbonate, lithium hydroxide, lithium metal, lithium metal oxide, lithium metal phosphate, lithium sulfide, or combinations thereof. In some embodiments, the concentrated lithium solution that is yielded from the porous ion exchange beads is further processed into lithium chemicals that are solid, liquid, hydrated, or anhydrous.

In some embodiments, the lithium chemicals produced using the porous ion exchange beads are used in an industrial application selected from the following list: lithium batteries, metal alloys, glass, grease, or combinations thereof. In some embodiments, the lithium chemicals produced using the coated ion exchange particles are used in an application selected from the following list: lithium batteries, lithium-ion batteries, lithium sulfur batteries, lithium solid-state batteries, and combinations thereof.

In some embodiments, the ion exchange materials are synthesized in a lithiated state with a sublattice fully or partly occupied by lithium. In some embodiments, the ion exchange materials are synthesized in a hydrated state with a sublattice fully or partly occupied by hydrogen.

System of Modulating pH for the Extraction of Lithium

The release of hydrogen during lithium uptake will acidify the brine and limit lithium uptake unless the pH of the brine is optionally maintained in a suitable range to facilitate thermodynamically favorable lithium uptake and concomitant hydrogen release. To control the pH of the brine and maintain the pH in a range that is suitable for lithium uptake in an ion exchange column, bases such as NaOH, $Ca(OH)_2$, CaO, KOH, or $NH_3$ are optionally added to the brine as solids, aqueous solutions, or in other forms. For brines that contain divalent ions such as Mg, Ca, Sr, or Ba, addition of base to the brine causes precipitation of solids, such as $Mg(OH)_2$ or $Ca(OH)_2$, which can cause problems for the ion exchange reaction. These precipitates cause problems in at least three ways. First, precipitation removes base from solution, leaving less base available in solution to neutralize protons and maintain pH in a suitable range for lithium uptake in the ion exchange column. Second, precipitates that form due to base addition can clog the ion exchange column, including clogging the surfaces and pores of ion exchange beads and the voids between ion exchange beads. This clogging can prevent lithium from entering the beads and being absorbed by the ion exchange material. The clogging can also cause large pressure heads in the column. Third, precipitates in the column dissolve during acid elution and thereby contaminate the lithium concentrate produced by the ion exchange system. For ion exchange beads to absorb lithium from brine, an ideal pH range for the brine is optionally 6 to 9, a preferred pH range is optionally 4 to 9, and an acceptable pH range is optionally 2 to 9.

An aspect of the disclosure herein is an ion exchange reactor for lithium extraction with a form that allows for pH control during lithium uptake from a brine or other lithium ion-containing liquid resource. This reactor functions to neutralize hydrogen that is released during lithium uptake, while solving the problems associated with precipitation from base addition.

An aspect of the disclosure herein is a system for the extraction of lithium ions from a liquid resource, comprising: a) an ion exchange material; and b) a pH modulating setup for increasing pH of the liquid resource in the system. The ion exchange material extracts lithium ions from a liquid resource. During the extraction of lithium ions from a liquid resource by the ion exchange material, the pH of the liquid resource optionally decreases. Increasing the pH of the liquid resource in the system by using a pH modulating setup maintains the pH in a range that is suitable for lithium ion uptake by the ion exchange material. In an embodiment, the pH modulating setup comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, the pH modulating setup comprises measuring the pH of the system and wherein the pH of the system is less than 6, less than 4, or less than 2, the pH of the system is adjusted to a pH of 2 to 9, a pH of 4 to 9, or a pH of 6 to 9.

Recirculating Batch System

In an embodiment of the system, the ion exchange material is loaded in a column. In an embodiment of the system, the pH modulating setup is connected to the column loaded with the ion exchange material. In an embodiment of the system, the pH modulating setup comprises one or more tanks.

In some embodiments of the systems described herein, the ion exchange material is loaded in a vessel. In some embodiments, the pH modulating setup is in fluid communication with the vessel loaded with the ion exchange material. In some embodiments, the pH modulating setup is in fluid communication with the column loaded with the ion exchange material.

In one embodiment of the system, one or more ion exchange columns are loaded with a fixed or fluidized bed of ion exchange beads. In one embodiment of the system, the ion exchange column is a cylindrical construct with entry and exit ports. In a further embodiment, the ion exchange column is optionally a non-cylindrical construct with entry and exit ports. In a further embodiment, the ion exchange column optionally has entry and exit ports for brine pumping, and additional doors or hatches for loading and unloading ion exchange beads to and from the column. In a further embodiment, the ion exchange column is optionally equipped with one or more security devices to decrease the risk of theft of the ion exchange beads. In one embodiment, these beads contain ion exchange material that can reversibly absorb lithium from brine and release lithium in acid. In one embodiment, the ion exchange material is comprised of particles that are optionally protected with coating material such as $SiO_2$, $ZrO_2$, or $TiO_2$ to limit dissolution or degradation of the ion exchange material. In one embodiment, these beads contain a structural component such as an acid-resistant polymer that binds the ion exchange materials. In one embodiment, the beads contain pores that facilitate penetration of brine, acid, aqueous, and other solutions into the beads to deliver lithium and hydrogen to and from the bead or to wash the bead. In one embodiment, the bead pores are structured to form a connected network of pores with a distribution of pore sizes and are structured by incorporating filler materials during bead formation and later removing that filler material in a liquid or gas.

In one embodiment of the system, the system is a recirculating batch system, which comprises an ion exchange column that is connected to one or more tanks for mixing base into the brine, settling out any precipitates following base addition, and storing the brine prior to reinjection into the ion exchange column or the other tanks. In one embodiment of the recirculating batch system, the brine is loaded into one or more tanks, pumped through the ion exchange column, pumped through a series of tanks, and then returned to the ion exchange column in a loop. In one embodiment, the brine optionally traverses this loop repeatedly. In one embodiment, the brine is recirculated through the ion exchange column to enable optimal lithium uptake by the beads. In one embodiment, base is added to the brine in such a way that pH is maintained at an adequate level for lithium uptake and in such a way that the amount of base-related precipitates in the ion exchange column is minimized.

In one embodiment, as the brine is pumped through the recirculating batch system, the brine pH drops in the ion exchange column due to hydrogen release from the ion exchange beads during lithium uptake, and the brine pH is adjusted upward by the addition of base as a solid, aqueous solution, or other form. In one embodiment, the ion exchange system drives the ion exchange reaction to near completion, and the pH of the brine leaving the ion exchange column approaches the pH of the brine entering the ion exchange column. In one embodiment, the amount of base added is optionally controlled to neutralize the hydrogen released by the ion exchange beads in such a way that no basic precipitates form. In one embodiment, an excess of base or a transient excess of base is optionally added in such a way that basic precipitates form. In one embodiment, the basic precipitates form transiently and then are redissolved partially or fully by the hydrogen that is released from the ion exchange column. In one embodiment of the system, base is optionally added to the brine flow prior to the ion exchange column, after the ion exchange column, prior to one or more tanks, or after one or more tanks.

In one embodiment of the recirculating batch system, the tanks include a mixing tank where the base is mixed with the brine. In one embodiment, the tanks include a settling tank, where precipitates such as $Mg(OH)_2$ optionally settle to the bottom of the settling tank to avoid injection of the precipitates into the ion exchange column. In one embodiment, the tanks include a storage tank where the brine is stored prior to reinjection into the ion exchange column, mixing tank, settling tank, or other tanks. In one embodiment, the tanks include an acid recirculation tank. In one embodiment, some tanks in the recirculating batch reactor optionally serve a combination of purposes including base mixing tank, settling tank, acid recirculation tank, or storage tank. In any embodiment, a tank optionally does not fulfil two functions at the same time. For example, a tank is not a base mixing tank and a settling tank.

In one embodiment of the recirculating batch system, base is added to a mixing tank, which is optionally a continuous stirred tank system, a confluence of acidified brine flow and base flow followed by a static mixer, a confluence of acidified brine flow and base flow followed by a paddle mixer, a confluence of acidified brine flow and base flow followed by a turbine impeller mixer, or a continuous stirred tank system in the shape of a vertical column which is well mixed at the bottom and settled near the top. In one embodiment, the base is optionally added as a solid or as an aqueous solution. In one embodiment, the base is optionally added continuously at a constant or variable rate. In one embodiment, the base is optionally added discretely in constant or variable aliquots or batches. In one embodiment, the base is optionally added according to one or more pH meters, which optionally samples brine downstream of the ion exchange column or elsewhere in the recirculating batch system. In one embodiment, filters are optionally used to prevent precipitates from leaving the mixing tank. In one embodiment, the filters are optionally plastic mesh screens, small packed columns containing granular media such as sand, silica, or alumina, small packed columns containing porous media filter, or a membrane.

In one embodiment of the recirculating batch system, the settling tank is optionally a settling tank with influent at bottom and effluent at top or a settling tank with influent on one end and effluent on another end. In one embodiment, chambered weirs are used to fully settle precipitates before brine is recirculated into reactor. In one embodiment, solid base precipitates are collected at the bottom of the settling tank and recirculated into the mixer. In one embodiment, precipitates such as $Mg(OH)_2$ optionally settle near the bottom of the tank. In one embodiment, brine is removed from the top of the settling tank, where the amount of suspended precipitates is minimal. In one embodiment, the precipitates optionally settle under forces such as gravity, centrifugal action, or other forces. In one embodiment, filters are optionally used to prevent precipitates from leaving the settling tank. In one embodiment, the filters are optionally plastic mesh screens, small packed columns containing granular media such as sand, silica, or alumina, small packed columns containing porous media filter, or a membrane. In one embodiment, baffles are optionally used to ensure settling of the precipitate and to prevent the precipitate from exiting the settling tank and entering the column.

In one embodiment of the recirculating batch system, basic precipitates are optionally collected from the settling tank and reinjected into the brine in a mixing tank or elsewhere to adjust the pH of the brine.

In one embodiment of the recirculating batch system, one or more ion exchange columns are optionally connected to one or more tanks or set of tanks. In one embodiment of the recirculating batch system, there are optionally multiple ion exchange columns recirculating brine through a shared set of mixing, settling, and storage tanks. In one embodiment of the recirculating batch system, there is optionally one ion exchange column recirculating brine through multiple sets of mixing, settling, and storage tanks.

Column Interchange System

An aspect of the disclosure herein is a system wherein the ion exchange material is loaded in a plurality of columns. In an embodiment, the pH modulating setup comprises a plurality of tanks connected to the plurality of columns, wherein each of the plurality of tanks is immediately connected to one of the plurality of columns. In an embodiment, two or more of the plurality of tanks connected to the plurality of columns forms at least one circuit. In an embodiment, three or more of the plurality of tanks connected to the plurality of columns forms at least two circuits. In an embodiment, three or more of the plurality of tanks connected to the plurality of columns forms at least three circuits. In an embodiment, at least one circuit is a liquid resource circuit. In an embodiment, at least one circuit is a water washing circuit. In an embodiment, at least one circuit is an acid solution circuit. In an embodiment, at least two circuits are water washing circuits.

In one embodiment of the ion exchange system, the system is a column interchange system where a series of ion exchange columns are connected to form a brine circuit, an acid circuit, a water washing circuit, and optionally other circuits. In one embodiment of the brine circuit, brine flows through a first column in the brine circuit, then into a next column in the brine circuit, and so on, such that lithium is removed from the brine as the brine flows through one or more columns. In one embodiment of the brine circuit, base is added to the brine before or after each ion exchange column or certain ion exchange columns in the brine circuit to maintain the pH of the brine in a suitable range for lithium uptake by the ion exchange beads. In one embodiment of the acid circuit, acid flows through a first column in the acid circuit, then into the next column in the acid circuit, and so on, such that lithium is eluted from the columns with acid to produce a lithium concentrate. In one embodiment of the acid circuit, acid flows through a first column in the acid circuit, then optionally into a next column in the acid circuit, and so on, such that lithium is eluted from the columns with acid to produce a lithium concentrate. In one embodiment of the water washing circuit, water flows through a first column in the water washing circuit, then optionally into a next column in the water washing circuit, and so on, such that brine in the void space, pore space, or head space of the columns in the water washing circuit is washed out.

In one embodiment of the column interchange system, ion exchange columns are interchanged between the brine circuit, the water washing circuit, and the acid circuit. In one embodiment, the first column in the brine circuit is loaded with lithium and then interchanged into the water washing circuit to remove brine from the void space, pore space, or head space of the column. In one embodiment, the first column in the water washing circuit is washed to remove brine, and then interchanged to the acid circuit, where lithium is eluted with acid to form a lithium concentrate. In one embodiment, the first column in the acid circuit is eluted with acid and then interchanged into the brine circuit to absorb lithium from the brine. In one embodiment of the column interchange system, two water washing circuits are used to wash the columns after both the brine circuit and the acid circuit. In one embodiment of the column interchange system, only one water washing circuit is used to wash the columns after the brine circuit, whereas excess acid is neutralized with base or washed out of the columns in the brine circuit.

In one embodiment of the column interchange system, the first column in the brine circuit is interchanged to become the last column in the water washing circuit. In one embodiment of the column interchange system, the first column in the water washing circuit is interchanged to become the last column in the acid circuit. In one embodiment of the column interchange system, the first column in the acid circuit is interchanged to become the last column in the brine circuit.

In one embodiment of the column interchange system, each column in the brine circuit contains one or more tanks or junctions for mixing base into the brine and optionally settling any basic precipitates that form following base addition. In one embodiment of the column interchange system, each column in the brine circuit has associated one or more tanks or junctions for removing basic precipitates or other particles via settling or filtration. In one embodiment of the column interchange system, each column or various clusters of columns have associated one or more settling tanks or filters that remove particles including particles that detach from ion exchange beads.

In one embodiment of the column interchange system, the number of the columns in the brine circuit is optionally less than about 3, less than about 10, less than about 30, or less than about 100. In one embodiment of the column interchange system, the number of the columns in the acid circuit is optionally less than about 3, less than about 10, less than about 30, or less than about 100. In one embodiment of the column interchange system, the number of the columns in the water washing circuit is optionally less than about 3, less than about 10, less than about 30, or less than about 100. In certain embodiments, the number of columns in the brine circuit is 1 to 10. In some embodiments, the number of columns in the acid circuit is 1 to 10. In some embodiments, the number of columns in washing circuit is 1 to 10.

In one embodiment of the column interchange system, there is optionally one or more brine circuits, one or more acid circuits, and one or more water washing circuits. In one embodiment of the column interchange system, ion exchange columns are optionally supplied with fresh ion exchange beads without interruption to operating columns. In one embodiment of the column interchange system, ion exchange columns with beads that have been depleted in capacity is optionally replaced with ion exchange columns with fresh ion exchange beads without interruption to operating columns.

In one embodiment of the column interchange system, the columns contain fluidized beds of ion exchange material. In one embodiment of the column interchange system, the columns have means of created a fluidized bed of ion exchange material such as overhead stirrers or pumps. In one embodiment of the column interchange system, the columns contain fluidized beds of ion exchange material. In one embodiment of the ion exchange system, the system is an interchange system and the vessels are ion exchange vessels. In one embodiment of the interchange system, base may be added directly to the columns or other tanks containing the ion exchange material. In one embodiment of the interchange system, base may be added to the brine or another solution in a separate mixing tank and then added to the columns or other tanks containing the ion exchange material.

In one embodiment of the ion exchange system, ion exchange beads are loaded into ion exchange columns and following lithium uptake from brine, lithium is eluted from the ion exchange columns using an acid recirculation loop. In one embodiment of the acid recirculation loop, acid is flowed through an ion exchange column, into a tank, and then recirculated through the ion exchange column to optimize lithium elution. In one embodiment of the ion exchange system, ion exchange beads are loaded into ion exchange columns and following lithium uptake from brine, lithium is eluted from each ion exchange column using a once-through flow of acid. In one embodiment of the ion exchange system, ion exchange beads are loaded into an ion exchange column and following lithium uptake from brine, lithium is eluted from the ion exchange column using a column interchange circuit.

In one embodiment of the ion exchange system, ion exchange columns are loaded with lithium by flowing brine through the columns using a recirculating batch system and then lithium is eluted from the columns using a column interchange system. In one embodiment of the ion exchange system, ion exchange columns are loaded with lithium by flowing brine through the columns using a column interchange system and then lithium is eluted from the columns using a recirculating batch system. In one embodiment of the ion exchange system, ion exchange columns are loaded with lithium by flowing brine through the columns using a recirculating batch system and then lithium is eluted from the columns using a recirculating batch system. In one embodiment of the ion exchange system, ion exchange columns are loaded with lithium by flowing brine through the columns using a column interchange system and then lithium is eluted from the columns using a column interchange system.

Stirred Tank System

An aspect of the disclosure herein is a system wherein the pH modulating setup is a tank comprising: a) one or more compartments; and b) a means for moving the liquid resource through the one or more compartments. In an embodiment, the ion exchange material is loaded in at least one compartment. In an embodiment, the means for moving the liquid resource through the one or more compartments is a pipe. In a further embodiment, the means for moving the liquid resource through the one or more compartments is a pipe and suitably a configured pump. In an embodiment, the tank further comprises a means for circulating the liquid resource throughout the tank. In an embodiment, the means for circulating the liquid resource throughout the tank is a mixing device. In an embodiment, the tank further comprises an injection port.

In some embodiments, the tank further comprises one or more injection ports. In some embodiments, the tank further comprises a plurality of injection ports.

An aspect described herein is a system for the extraction of lithium ions from a liquid resource, comprising a tank, wherein the tank further comprises: a) one or more compartments; b) an ion exchange material; c) a mixing device; and d) a pH modulating setup for changing the pH of the system, wherein the ion exchange material is used to extract lithium ions from the liquid resource. In one embodiment, the pH modulating setup changes the pH of the liquid resource in the system.

In some embodiments, the ion exchange material is loaded in at least one of the one or more compartments. In some embodiments, the ion exchange material is fluidized in at least one of the one or more compartments. In some embodiments, the ion exchange material is non-fluidized in at least one of the one or more compartments. In some embodiments, the ion exchange material occupies a fixed position in at least one of the one or more compartments.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the tank further comprises a porous partition. In some embodiments, the porous partition is a porous polymer partition. In some embodiments, the porous partition is a mesh or membrane. In some embodiments, the porous partition is a polymer mesh or polymer membrane. In some embodiments, the porous partition comprises one or more layers of mesh, membrane, or other porous structure. In some embodiments, the porous partition comprises one or more coarse meshes that provide structural support and one or more fine meshes and/or membranes that provide filtration. In some embodiments, the porous partition comprises a polyether ether ketone mesh, a polypropylene mesh, a polyethylene mesh, a polysulfone mesh, a polyester mesh, a poly amide mesh, a polytetrafluoroethylene mesh, an ethylene tetrafluoroethylene polymer mesh, a stainless steel mesh, a stainless steel mesh coated in polymer, a stainless steel mesh coated in ceramic, or a combination thereof, wherein the mesh is a course mesh, a fine mesh, or a combination thereof. In some embodiments, the porous polymer partition comprises a mesh comprising one or more blends of two or more of a polyether ether ketone, a polypropylene, a polyethylene, a polysulfone, a polyester, a polyamide, a polytetrafluoroethylene, or an ethylene tetrafluoroethylene polymer. In some embodiments, the porous partition comprises a polyether ether ketone membrane, a polypropylene membrane, a polyethylene membrane, a polysulfone membrane, a polyester membrane, a polyamide membrane, a polytetrafluoroethylene membrane, an ethylene tetrafluoroethylene polymer membrane, or combinations thereof.

In one embodiment of the ion exchange system, the system is a stirred tank system comprised of a tank of brine containing permeable bead compartments such as permeable pallets, cases, boxes, or other containers that are loaded with ion exchange beads, and the brine is stirred through the tank in a batch process. In one embodiment of the stirred tank system, the base is optionally added directly to the tank gradually or all at once as a solid or in an aqueous solution. In one embodiment of the stirred tank system, after a brine uptake stage is complete, the permeable bead containers are optionally moved to another tank for acid elution. In one embodiment of the stirred tank system, the permeable bead compartments are located at the bottom of the stirred tank during the brine stage and after the brine stage is completed, then brine is removed, and the bottom of the stirred tank is filled with acid to elute lithium in such a way that the permeable bead compartments are covered with an optimal volume of acid.

In one embodiment of the stirred tank system, the ion exchange beads are suspended using plastic structural supports in a tank with an internal mixing device. In one embodiment of the stirred tank system, a stream of brine is removed from the tank and passed through a column where hydrogen ions in the brine produced by ion exchange are neutralized using sacrificial base in solution or added as solid, or by an ion exchange resin. This pH-corrected stream is sent back into the system where the lithium is continued to be removed. In one embodiment of the stirred tank system, brine that has passed through the bead compartment is returned to the opposite end of the tank through a pipe that is optionally internal or external to the tank. In one embodiment of the stirred tank system, base is optionally added to the brine inside the tank or in a base addition tank outside the tank.

In one embodiment of the stirred tank system, fresh brine is fed to the system so as to operate in continuous stirred tank system mode instead of batch mode. In one embodiment of the recirculating batch system, fresh brine is fed to the system so as to operate in continuous stirred tank system mode instead of batch mode.

In one embodiment of the ion exchange system, the ion exchange material is mixed with a liquid resource in a stirred tank reactor. In one embodiment, the ion exchange material may be comprised of coated particles, uncoated particles, porous beads, or combinations thereof.

In one embodiment of the ion exchange system, a stirred tank reactor is used to fluidize the ion exchange material in a liquid resource to enable absorption of lithium from the liquid resource into the ion exchange material. In one embodiment, a stirred tank reactor is used to fluidize the ion exchange material in a washing fluid to remove residual brine, acid, or other contaminants from the ion exchange materials. In one embodiment, a stirred tank reactor is used to fluidize the ion exchange material in an acid solution to elute lithium from the ion exchange material while replacing the lithium in the ion exchange material with protons. In one embodiment, a single stirred tank reactor is used to mix ion exchange material with a liquid resource, washing fluid, and acid solution.

In some embodiments, the system for the extraction of lithium ions from a liquid resource, comprising a tank, wherein the tank further comprises: a) one or more compartments; b) an ion exchange material; c) a mixing device; and d) a pH modulating setup for changing the pH of the liquid resource in the system, wherein the ion exchange material is used to extract lithium ions from the liquid resource, further comprises another tank, wherein the other tank further comprises: a) one or more compartments; b) an ion exchange material; c) a mixing device; and d) a pH modulating setup for changing the pH of the liquid resource in the system. In some embodiments, the tank is in fluid communication with the other tank.

In some embodiments, the system for the extraction of lithium ions from a liquid resource, comprising a tank, wherein the system further comprises another tank, wherein the other tank further comprises: a) one or more compartments; b) an ion exchange material; c) a mixing device; and d) an acid inlet for adding acid to the system. In a further embodiment, the ion exchange material is moved between the tank and the other tank.

In some embodiments, the system for the extraction of lithium ions from a liquid resource, comprising a tank, wherein the tank further comprises: a) one or more compartments; b) an ion exchange material; c) a mixing device; and d) a pH modulating setup for changing the pH of the liquid resource in the system, wherein the ion exchange material is used to extract lithium ions from the liquid resource, further comprises a plurality of tanks, each tank further comprising: a) one or more compartments; b) an ion exchange material; c) a mixing device; and d) a pH modulating setup for changing the pH of the liquid resource in the system. In some embodiments, each tank of the system is in fluid communication with each other tank of the system.

In some embodiments, the system further comprises another plurality of tanks, wherein each tank further comprises: a) one or more compartments; b) an ion exchange material; and c) a mixing device.

In some embodiments, the system is configured to operate in a batch mode. In some embodiments, the system is configured to operate in a continuous mode. In some embodiments, the system is configured to operate in a batch mode and a continuous mode. In some embodiments, one or more tanks in the system are configured to operate in a batch mode and one or more tanks in the system are configured to operate in a continuous mode. In some embodiments, one or more tanks in the system are configured to operate in a batch mode and one or more tanks in the system are configured to operate in a semi-continuous mode. In some embodiments, one or more tanks in the system are configured to operate in a semi-continuous mode and one or more tanks in the system are configured to operate in a continuous mode. In some embodiments, one or more tanks in the system are configured to operate in a batch mode, one or more tanks in the system are configured to operate in a semi-continuous mode, and one or more tanks in the system are configured to operate in a continuous mode. In some embodiments, the system is configured to operate in a semi-continuous mode, a batch mode, a continuous mode, or combinations thereof.

In one embodiment of the ion exchange system, a plurality of stirred tank reactors are used to mix ion exchange material with a liquid resource, washing fluid, and acid solution. In one embodiment, the stirred tank reactors may be different sizes and may contain different volumes of a liquid resource, washing fluid, and acid solution. In one embodiment, the stirred tanks may be cylindrical, conical, rectangular, pyramidal, or a combination thereof. In one embodiment of the ion exchange system, the ion exchange material may move through the plurality of stirred tank reactors in the opposite direction of the liquid resource, the washing fluid, or the acid solution.

In one embodiment of the ion exchange system, a plurality of stirred tank reactors may be used where one or more stirred tank reactors mix the ion exchange material with a liquid resource, one or more stirred tank reactors mix the ion exchange material with a washing fluid, and one or more stirred tank reactors mix the ion exchange material with an acid solution.

In one embodiment of the ion exchange system, stirred tank reactors may be operated in a continuous, semi-continuous, or batch mode where a liquid resource flows continuously, semi-continuously, or batch-wise through the stirred tank reactor. In one embodiment of the ion exchange system, stirred tank reactors may be operated in a continuous, semi-continuous, or batch mode where the ion exchange material flows continuously, semi-continuously, or batch-wise through the stirred tank reactor. In one embodiment of the ion exchange system, stirred tank reactors may be operated in a mode where the ion exchange material remains in the tank while flows of liquid resource, washing fluid, or acid solution are flowed through the tank in continuous, semi-continuous, or batch flows.

In one embodiment, ion exchange material may be loaded into or removed from the stirred tank reactors through the top, the bottom, or the side of the tank.

In one embodiment of the ion exchange system, stirred tank reactors may comprise one or more compartments. In one embodiment, the compartments may contain ion exchange material in a bed that is fluidized, fixed, partially fluidized, partially fixed, alternatively fluidized, alternatively fixed, or combinations thereof. In one embodiment, the compartments may be comprised of a porous support at the bottom of the compartment, the sizes of the compartment, the top of the compartment, or combinations thereof. In one embodiment, the compartments may be conical, cylindrical, rectangular, pyramidal, other shapes, or combinations thereof. In one embodiment, the compartment may be located at the bottom of the tank. In one embodiment, the shape of the compartment may conform to the shape of the stirred tank reactor. In one embodiment, the compartment may be partially or fully comprised of the tank of the stirred tank reactor.

In one embodiment, the compartment may be comprised of a porous structure. In one embodiment, the compartment may be comprised of a polymer, a ceramic, a metal, or combinations thereof. In one embodiment, the compartment may be comprised be comprised partially or fully of a porous material or a mesh. In one embodiment, the compartment may be at the top of the tank. In one embodiment, the compartment may be separated from the rest of the tank with one or more porous materials. In one embodiment, the compartment may be at the top of the tank. In one embodiment, the compartment may be separated from the rest of the tank with a bilayer mesh comprising one layer of coarse mesh for strength and one layer of fine mesh to contain smaller particles in the compartment. In one embodiment, the compartment may allow liquid to flow freely through the stirred tank reactor and through the compartment. In one embodiment, the compartment may be open on the top. In one embodiment, the compartment may contain the ion exchange material in the tank but allow the ion exchange material to move throughout the tank. In one embodiment, the compartment may comprise a majority or minority of the tank volume. In one embodiment, the compartment may represent a fraction of the volume of the tank that is greater than 1 percent, greater than 10 percent, greater than 50 percent, greater than 90 percent, greater than 99 percent, or greater than 99.9 percent. In one embodiment, one or more devices for stirring, mixing, or pumping may be used to move fluid through the compartment, the stirred tank reactor, or combinations thereof.

In one embodiment of the ion exchange system, stirred tank reactors may be arranged into a network where flows of brine, washing fluid, and acid solutions are directly through different columns. In one embodiment, a network of stirred tank reactors may involve physical movement of the ion exchange material through the various stirred tank reactors. In one embodiment, a network of stirred tank reactors may involve no physical movement of the ion exchange material through the various stirred tank reactors. In one embodiment, a network of stirred tank reactors may involve switching of flows of brine, washing fluid, and acid solutions through the various stirred tank reactors. In one embodiment, brine may into stirred tank reactors in continuous or batch mode. In one embodiment, brine may be mixed with ion exchange material in one or more reactors before exiting the system. In one embodiment, a network of stirred tank reactors may involve a brine circuit with counter-current exposure of ion exchange material to flows of brine. In one embodiment, a network of stirred tank reactors may involve a washing circuit with counter-current exposure of ion exchange material to flows of washing fluid. In one embodiment, a network of stirred tank reactors may involve an acid circuit with counter-current exposure of ion exchange material to flows of acid solution. In one embodiment, the washing fluid may be water, an aqueous solution, or a solution containing an anti-scalant.

In one embodiment of the stirred tank reactor, acid is added at the beginning of elution. In one embodiment of the stirred tank reactor, acid is added at the beginning of elution and again during elution. In one embodiment of the stirred tank reactor, an acid of lower concentration is added at the start of elution and additional acid of high concentration is added to continue elution.

An aspect described herein is a system for the extraction of lithium ions from a liquid resource, comprising: a) an ion exchange material; b) a tank comprising one or more compartments; and c) a mixing device, wherein the ion exchange material is used to extract lithium ions from the liquid resource.

In some embodiments, the ion exchange material is loaded in at least one of the one or more compartments. In some embodiments, the ion exchange material is fluidized or partially fluidized in at least one of the one or more compartments. In some embodiments, the ion exchange material occupies a fixed position in at least one of the one or more compartments. In some embodiments, the ion exchange material is mounted in at least one of the one or more compartments.

An aspect described herein is a system for the extraction of lithium ions from a liquid resource, comprising: a) a column comprising an ion exchange material; and b) a pH modulating setup for changing the pH of the liquid resource in the system, wherein the pH modulating setup is in fluid communication with the column, wherein the ion exchange material is used to extract lithium ions from the liquid resource.

Other Types of Systems

An aspect described herein is a system for the extraction of lithium ions from a liquid resource, comprising: a) a plurality of columns, wherein each of the plurality of columns comprises an ion exchange material; and b) a pH modulating setup for changing the pH of the liquid resource in the system, wherein the pH modulating setup is in fluid communication with each of the plurality of columns, wherein the ion exchange material is used to extract lithium ions from the liquid resource.

In some embodiments, the pH modulating setup comprises a plurality of tanks, wherein each of the plurality of tanks is immediately connected to one of the plurality of columns. In one embodiment, the pH modulating setup comprises a plurality of tanks, wherein each of the plurality of tanks is in immediate liquid communication with one of the plurality of columns. In some embodiments, two or more of the plurality of tanks connected to two or more of the plurality of columns forms at least one circuit. In some embodiments, two or more of the plurality of tanks connected to two or more of the plurality of columns forms at least two circuits. In some embodiments, three or more of the plurality of tanks connected to three or more of the plurality of columns forms at least two circuits. In some embodiments, three or more of the plurality of tanks connected to three or more of the plurality of columns forms at least three circuits.

In some embodiments, the pH modulating setup comprises a plurality of tanks, wherein each of the plurality of tanks is connected to the of the plurality of columns through a filtration system. In some embodiments, two or more of the plurality of tanks are connected to two or more of the plurality of columns through a filter system to form at least one circuit. In some embodiments, two or more of the plurality of tanks are connected to two or more of the plurality of columns through a filter system to form at least two circuits. In some embodiments, three or more of the plurality of tanks are connected to two or more of the plurality of columns through a filter system to form at least two circuits. In some embodiments, three or more of the plurality of tanks are connected to two or more of the plurality of columns through a filter system to form at least three circuits.

In some embodiments, the filtration system comprises a bag filter, a candle filter, a cartridge filter, a media filter, a depth filter, a sand filter, a membrane filter, an ultrafiltration system, a microfiltration filter, a nanofiltration filter, a cross-flow filter, a dead-end filter, a drum filter, a filter press, or a combination thereof. In some embodiments, the openings in this filter are of less than about 0.02 µm, less than about 0.1 µm, less than about 0.2 µm, less than about 1 µm, less than about 2 µm, less than about 5 µm, less than about 10 µm, less than about 25 µm, less than about 100 µm, less than about 1000 µm. In some embodiments, the perforated openings in outer-perforated walls are of dimension of more than about 0.02 µm, more than about 0.1 µm, more than about 0.2 µm, more than about 1 µm, more than about 2 µm, more than about 5 µm, more than about 10 µm, more than ab out 25 µm, more than about 100 µm. In some embodiments, the perforated openings in outer-perforated walls are of dimension of about 0.02 µm to about 0.1 µm, from about 0.1 µm to about 0.2 µm, from about 0.2 µm to about 0.5 µm, from about 0.5 µm to about 1 µm, from about 1 µm to about 5 µm, from about 5 µm to about 10 µm, from about 10 µm to about 25 µm, from about 25 µm to about 100 µm. In some embodiments, the filter martial comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly (ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In some embodiments, the filter martial comprises iron, stainless steel, nickel, carbon steel, titanium, Hastelloy, Inconel, zirconium, tantalum, alloys thereof, mixtures thereof, or combinations thereof.

In some embodiments, at least one circuit is a liquid resource circuit. In some embodiments, at least one circuit is a water washing circuit. In some embodiments, at least two circuits are water washing circuits. In some embodiments, at least one circuit is an acid solution circuit.

An aspect described herein is a system for the extraction of lithium ions from a liquid resource comprising an ion exchange material and a plurality of vessels, wherein each of the plurality of vessels is configured to transport the ion exchange material along the length of the vessel and the ion exchange material is used to extract lithium ions from the liquid resource. In some embodiments, at least one of the plurality of vessels comprises an acidic solution. In some embodiments, at least one of the plurality of vessels comprises the liquid resource. In some embodiments, each of the plurality of vessels is configured to transport the ion exchange material by a pipe system or an internal conveyer system.

An aspect described herein is a system for the extraction of lithium ions from a liquid resource comprising an ion exchange material and a plurality of columns, wherein each of the plurality of columns is configured to transport the ion exchange material along the length of the column and the ion exchange material is used to extract lithium ions from the liquid resource.

In some embodiments, at least one of the plurality of columns comprises an acidic solution. In some embodiments, at least one of the plurality of columns comprises the liquid resource. In some embodiments, each of the plurality of columns is configured to transport the ion exchange material by a pipe system or an internal conveyer system.

In some embodiments, the ion exchange material comprises ion exchange particles. In some embodiments, at least a portion of the ion exchange material is in the form of ion exchange particles. In some embodiments, the ion exchange particles are selected from uncoated ion exchange particles, coated ion exchange particles, and combinations thereof. In some embodiments, the ion exchange particles comprise uncoated ion exchange particles. In some embodiments, the ion exchange particles comprise coated ion exchange particles. In some embodiments, the ion exchange particles comprise a mixture of uncoated and coated ion exchange particles.

In some embodiments, the coated ion exchange particles comprise an ion exchange material and a coating material.

In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, $SiC$, $TiC$, $ZrC$, $Si_3N_4$, $ZrN$, $BN$, carbon, graphitic carbon, amorphous carbon, hard carbon, diamond-like carbon, solid solutions thereof, and combinations thereof.

In some embodiments, the ion exchange material of the coated ion exchange particles comprises an oxide, a phosphate, an oxyfluoride, a fluorophosphate, or combinations thereof. In some embodiments, the ion exchange material of the coated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, and combinations thereof; wherein x is from 0.1-10; and y is from 0.1-10.

In some embodiments, the uncoated ion exchange particles comprise an ion exchange material. In some embodiments, the ion exchange material of the uncoated ion exchange particles comprises an oxide, a phosphate, an oxyfluoride, a fluorophosphate, or combinations thereof. In some embodiments, the ion exchange material of the uncoated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, and combinations thereof; wherein x is from 0.1-10; and y is from 0.1-10.

In some embodiments, the ion exchange material is porous. In some embodiments, the porous ion exchange material comprises a network of pores that allows liquids to move quickly from the surface of the porous ion exchange material to a plurality of ion exchange particles. In some embodiments, the porous ion exchange material comprises a network of pores that allows a liquid to move from the surface of the porous ion exchange material to a plurality of ion exchange particles. In some embodiments, the porous ion exchange material comprises a network of pores that allows a liquid to move quickly from the surface of the porous ion exchange material to a plurality of ion exchange particles. In some embodiments, the porous ion exchange material is porous ion exchange beads. In some embodiments, the porous ion exchange material is comprised of porous ion exchange beads.

In some embodiments of the systems described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments of the systems described herein, the liquid resource is a brine. In some embodiments of the systems described herein, the liquid resource comprises a natural brine, a synthetic brine, or a mixture of a natural and a synthetic brine. In some embodiments of the systems described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, or combinations thereof.

An aspect of the disclosure herein is a system, wherein the column further comprises a plurality of injection ports, wherein the plurality of injection ports are used to increase the pH of the liquid resource in the system In one embodiment of the ion exchange system, the system is a mixed base system comprising an ion exchange column and a mixing chamber where base is mixed into the brine immediately prior to injection of the brine into the column.

In one embodiment of the ion exchange system, the system is a ported ion exchange column system with multiple ports for injection of aqueous base spaced at intervals along the direction of brine flow through the column. As brine flows through the column, there is a region of the column where the beads experience the greatest rate of lithium absorption, and this region moves through the column in the direction of brine flow. In the ported ion exchange column system, base is injected near that region to neutralize protons released by the ion exchange reaction. In regions of the columns where the beads have been saturated with lithium and the rate of release of protons has slowed, base injected is decreased or terminated to avoid formation of basic precipitates.

In one embodiment of the ion exchange system, the system has a moving bed of beads that moves in a direction opposite to the flow of brine and base is injected at one or more fixed points in the column in a region near where the ion exchange reaction occurs at a maximum rate in the column to neutralize the protons released from the ion exchange reaction. In one embodiment of the ion exchange system, the base added to the brine is optionally NaOH, KOH, $Mg(OH)_2$, $Ca(OH)_2$, CaO, $NH_3$, $Na_2SO_4$, $K_2SO_4$, $NaHSO_4$, $KHSO_4$, NaOCl, KOCl, $NaClO_4$, $KClO_4$, $NaH_2BO_4$, $Na_2HBO_4$, $Na_3BO_4$, $KH_2BO_4$, $K_2HBO_4$, $K_3BO_4$, $MgHBO_4$, $CaHBO_4$, $NaHCO_3$, $KHCO_3$, $NaCO_3$, $KCO_3$, $MgCO_3$, $CaCO_3$, $Na_2O$, $K_2O$, $Na_2CO_3$, $K_2CO_3$, $Na_3PO_4$, $Na_2HPO_4$, $NaH_2PO_4$, $K_3PO_4$, $K_2HPO_4$, $KH_2PO_4$, $CaHPO_4$, $MgHPO_4$, sodium acetate, potassium acetate, magnesium acetate, poly(vinylpyridine), poly(vinylamine), polyacrylonitrile, other bases, or combinations thereof. In one embodiment, the base is optionally added to the brine in its pure form or as an aqueous solution. In one embodiment, the base is optionally added in a gaseous state such as gaseous $NH_3$. In one embodiment, the base is optionally added to the brine in a steady stream, a variable stream, in steady aliquots, or in variable aliquots. In one embodiment, the base is optionally created in the brine by using an electrochemical cell to remove $H_2$ and $Cl_2$ gas, which is optionally combined in a separate system to create HCl acid to be used for eluting lithium from the system or for other purposes.

In some embodiments, a solid base is mixed with a liquid resource to create a basic solution. In some embodiments, a solid base is mixed with a liquid resource to create a basic solution, and the resulting basic solution is added to a second volume of a liquid resource to increase the pH of the second volume of the liquid resource. In some embodiments, solid base is mixed with a liquid resource to create a basic solution, wherein the resulting basic solution is used to adjust or control the pH of a second solution. In some embodiments, a solid base is mixed with a liquid resource to create a basic slurry. In some embodiments, a solid base is mixed with a liquid resource to create a basic slurry, and the resulting basic slurry is added to a second volume of a liquid resource to increase the pH of the second volume of the liquid resource. In some embodiments, solid base is mixed with a liquid resource to create a basic slurry, wherein the resulting basic slurry is used to adjust or control the pH of a second solution. In some embodiments, base may be added to a liquid resource as a mixture or slurry of base and liquid resource.

In one embodiment of the ion exchange system, the brine flows through a pH control column containing solid sacrificial base particles such as NaOH, CaO, or $Ca(OH)_2$, which dissolve into the brine and raise the pH of the brine. In one embodiment of the ion exchange system, the brine flows through a pH control column containing immobilized regeneratable OH-containing ion exchange resins which react with hydrogen ions, or regeneratable base species such as immobilized polypyridine, which conjugate HCl, thereby neutralizing the acidified brine. When the ion exchange resin has been depleted of its OH groups or is saturated with HCl, it is optionally regenerated with a base such as NaOH.

In one embodiment of the ion exchange system, pH meters are optionally installed in tanks, pipes, column, and other components of the system to monitor pH and control the rates and amounts of base addition at various locations throughout the system.

In one embodiment of the ion exchange system, the columns, tanks, pipes, and other components of the system are optionally constructed using plastic, metal with a plastic lining, or other materials that are resistant to corrosion by brine or acid.

In one embodiment of the ion exchange system, the ion exchange columns are optionally washed with water that is mildly acidic, optionally including a buffer, to remove any basic precipitates from the column prior to acid elution.

After the ion exchange column is saturated or nearly saturated with lithium, the lithium is flushed out of the ion exchange column using acid. The acid is optionally flowed through the column one or more times to elute the lithium. In one embodiment, the acid is optionally flowed through the ion exchange column using a recirculating batch system comprised of the ion exchange column connected to a tank. In one embodiment, the tank used for acid flows is optionally the same tank used for the brine flows. In a further embodiment, the tank used for acid flows is optionally a different tank than the one used for brine flows. In a further embodiment, the acid is distributed at the top of the ion exchange column and allowed to percolate through and immediately recirculated into the column with no extra tank. In an embodiment, acid addition optionally occurs without a tank used for acid flows.

In one embodiment of the ion exchange system, the column is optionally washed with water after the brine and/or acid steps, and the effluent water from washing is optionally treated using pH neutralization and reverse osmosis to yield process water.

In one embodiment of the ion exchange system, the ion exchange column is optionally shaped like a cylinder, a rectangle, or another shape. In one embodiment, the ion exchange column optionally has a cylinder shape with a height that is greater or less than its diameter. In one embodiment, the ion exchange column optionally has a cylinder shape with a height that is less than 10 cm, less than 1 meter, or less than 10 meters. In one embodiment, the ion exchange column optionally has a cylinder shape with a diameter that is less than 10 cm, less than 1 meter, or less than 10 meters.

In one embodiment of the ion exchange system, the system is optionally resupplied with fresh ion exchange beads by swapping out an ion exchange column with a new column loaded with fresh ion exchange beads. In one embodiment of the ion exchange system, the system is optionally resupplied with fresh ion exchange beads by removing the beads from the column and loading new beads into the column. In one embodiment of the ion exchange system, new beads are optionally supplied to all columns in the system simultaneously. In one embodiment of the ion exchange system, new beads are optionally supplied to one or more columns at a time. In one embodiment of the ion exchange system, new beads are optionally supplied to one or more columns without interruption to other columns that optionally continue operating.

In one embodiment of the ion exchange system, brine pumping optionally continues until the ion exchange beads approach a point of lithium saturation over a period of time that is optionally less than about 1 hours, less than about 2 hours, less than about 4 hours, less than about 8 hours, less than about 24 hours, less than about 48 hours, or less than about one week. In one embodiment of the ion exchange system, brine pumping optionally continues until the ion exchange beads approach a point of lithium saturation over a period of time that is optionally greater than about one week. In certain embodiments of the ion exchange system, brine pumping optionally continues until the ion exchange beads approach a point of lithium saturation over a period of time that is optionally between 30 minutes and 24 hours. In one embodiment of the ion exchange system, acid pumping optionally continues until the ion exchange beads approach a point of hydrogen saturation over a period of time that is optionally less than about 1 hours, less than about 2 hours, less than about 4 hours, less than about 8 hours, less than about 24 hours, or less than about 48 hours. In one embodiment of the ion exchange system, brine pumping optionally continues until the ion exchange beads approach a point of hydrogen saturation over a period of time that is optionally greater than about one 48 hours. In certain embodiments of the ion exchange system, brine pumping optionally continues until the ion exchange beads approach a point of hydrogen saturation over a period of time that is optionally between 30 minutes and 24 hours.

Figures 2A, 2B, 2C:
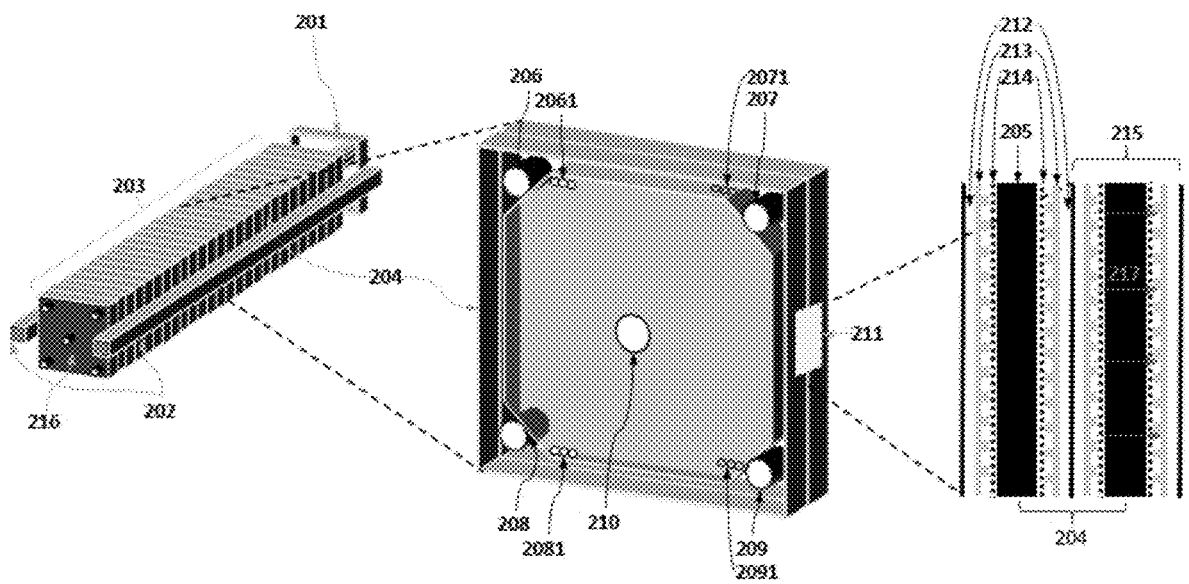
FIG. 2A-2C illustrates a lithium extraction device comprising a filter press loaded with ion exchange beads, wherein said filter press is equipped with membrane-squeeze plates.

Embodiments Comprising Devices Comprising One or More Filter Banks Containing a Lithium-Selective Sorbent An aspect of the disclosure herein is a device for lithium extraction from a liquid resource. Examples of such lithium extraction devices are included in examples 1 to 10, and accompanying FIGS. 1 to 10. In some embodiments, said device comprises one or more filter banks containing a lithium-selective sorbent. An example of a filter bank is shown in FIG. 2, while the multiple filter banks within an lithium extraction device are shown in FIG. 2C. In some embodiments, said sorbent is an ion-exchange material. In some embodiments, each filter bank comprises a compartment containing a lithium-selective sorbent, wherein said compartment is contained within porous partitions. In some embodiments, said compartment contains a bed or cake of said sorbent. In some embodiments, said filter bank contains pipes, shapes, and flow paths that connect said sorbent-containing compartment to a fluid distribution manifold that the delivers flow to and form said sorbent. In some embodiments, two porous partitions are located at opposing ends of the compartment containing a lithium-selective sorbent, such that fluid can flow from one partition, through the sorbent, and out of the second partition. In some embodiments, more than two such partitions are located within a filter bank. In some embodiments, said porous partition is a mesh, cloth, other woven material, a screen, or a combination thereof. In some embodiments, said porous partition is attached a mechanical device, plate, flow distributor, or scaffolding.

In some embodiments, the porous partition is adjacent to a flow distribution compartment or surface, which distributes flow from inlet orifices to the entire surface of said porous partition. As used herein, the term "flow distribution surface" and "flow distribution compartment" refer to components of lithium extraction devices that ensure well-distributed and uniform flow to and from components in said device. In some embodiments, said flow distribution surface ensures that fluid entering the filter bank through said orifices is distributed to the entire flow distribution surface, such that it can travel through said porous partition and evenly flow into and across the sorbent. In some embodiments, the flow distribution surface comprises surface textured features, such that a void is created between a non-porous surface and the porous partition. An example of such a void is shown in FIG. 2 and insert FIG. 2C, where the surface is denoted 213 and the porous partition 214. In some embodiments, this void creates a resistance-free space for fluid to flow from the orifices that deliver flow to the filter bank to the porous partition.

In some embodiments, these surface features are shaped as circles, pips, ovals, hexagons, squares, rectangles, rectangular ovals, spheres, grooves, flat surfaces, uneven surfaces, stars, dimples, other geometric shapes, mixtures thereof, or combinations thereof. In some embodiments, said features have a protrusion from the surface of less than about 1 mm, less than about 2 mm, less than about 5 mm, less than about 10 mm, less than about 20 mm, less than about 30 mm, less than about 40 mm, less than about 50 mm, less than about 60 mm, less than about 70 mm, less than about 80 mm, less than about 90 mm, less than about 100 mm. In some embodiments, said features have a protrusion from the surface of more than about 1 mm, more than about 2 mm, more than about 5 mm, more than about 10 mm, more than about 20 mm, more than about 30 mm, more than about 40 mm, more than about 50 mm, more than about 60 mm, more than about 70 mm, more than about 80 mm, more than about 90 mm, more than about 100 mm. In some embodiments, said features have a protrusion from the surface of about 1 mm to about 2 mm, from about 2 mm to about 4 mm, from about 4 mm to about 10 mm, from about 10 mm to about 20 mm. In some embodiments, said features have a length of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm, less than about 200 cm, less than about 500 cm, less than about 10 m. In some embodiments, said features have a length of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, more than about 80 cm, more than about 90 cm, more than about 100 cm, more than about 200 cm, more than about 500 cm, more than about 10 m. In some embodiments, said features have a length of about 1 cm to about 2 cm, from about 2 cm to about 4 cm, from about 4 cm to about 10 cm, from about 10 cm to about 20 cm, from about 20 cm to about 50 cm, from about 50 cm to about 100 cm, from about 100 cm to about 200 cm, from about 200 cm to about 10 m.

In some embodiments, the shape of said flow distribution surface conforms to the shape of the filter bank. In some embodiments, the shape of said flow distribution surface conforms to the shape of the porous partition. In some embodiments, the shape of said flow distribution surface conforms to the shape of the sorbent cake or bed.

In some embodiments, the compartment containing the lithium selective sorbent or ion-exchange beads is treated with a fluid. In some embodiments, the compartment containing the lithium selective sorbent or ion-exchange beads is treated with water or other solutions for the purposes of adjusting the concentration, composition, pH, or contaminant level of the fluid flowing through the vessel. In some embodiments, the compartment containing the lithium selective sorbent or ion-exchange beads is treated with a lithium-containing liquid resource to absorb lithium. In some embodiments, the compartment containing the lithium selective sorbent or ion-exchange beads is treated with an acidic solution to release absorbed lithium. In some embodiments, the compartment containing the lithium selective sorbent or ion-exchange beads is treated with multiple fluids. In some embodiments, in order to contact the lithium-selective sorbent with said fluid, fluid is directed from the inlet of the lithium extraction device to the one or more filter banks in said device. In some embodiments, said direction of flow is achieved by means of optional inlet- and outlet-flows to and from said compartment within a filter bank. In some embodiments, such inlet- and outlet flows are located at the top, bottom, center, off-center, or side of said compartments. In some embodiments, such inlet- and outlet flows are located at the top, bottom, center, off-center, or side of said filter bank. In some embodiments, the inlet- and outlet flows to and from said compartment are injected and removed from the internal space of said compartments by means of piping, tubing, orifices, or other internal components that protrude into said compartment.

In some embodiments, one or more pipes are in fluid contact with each filter bank, with each of said pipes delivering or removing fluid flows to and from said filter bank. In some embodiments, one such pipe is present in the filter bank. In some embodiments, two such pipes are present in the filter bank. In some embodiments, three such pipes are present in the filter bank. In some embodiments, four such pipes are present in the filter bank. In some embodiments, five such pipes are present in the filter bank. In a preferred embodiment, four such fluid deliver pipes are located at the four corners of a filter bank. In some embodiments, more than five such pipes are present in the filter bank.

In some embodiments, said pipes have a diameter of less than about 1 mm, less than about 2 mm, less than about 5 mm, less than about 10 mm, less than about 20 mm, less than about 30 mm, less than about 40 mm, less than about 50 mm, less than about 60 mm, less than about 70 mm, less than about 80 mm, less than about 90 mm, less than about 100 mm, less than about 200 mm, less than about 500 mm, less than about 1000 mm, less than about 1500 mm, less than about 2000 mm. In some embodiments, said pipes or have a diameter of more than about 1 mm, more than about 2 mm, more than about 5 mm, more than about 10 mm, more than about 20 mm, more than about 30 mm, more than about 40 mm, more than about 50 mm, more than about 60 mm, more than about 70 mm, more than about 80 mm, more than about 90 mm, more than about 100 mm, more than about 200 mm, more than about 500 mm, more than about 1000 mm, more than about 1500 mm, more than about 2000 mm.

In some embodiments, said pipes have a diameter of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm. In some embodiments, said pipes have a diameter of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, more than about 80 cm, more than about 90 cm, more than about 100 cm. In some embodiments, said pipes have a diameter of about 1 cm to about 2 cm, from about 2 cm to about 4 cm, from about 4 cm to about 10 cm, from about 10 cm to about 20 cm, from about 20 cm to about 50 cm, from about 50 cm to about 100 cm.

In some embodiments, said pipes have a length of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm, less than about 200 cm, less than about 500 cm, less than about 10 m. In some embodiments, said pipes have a length of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, more than about 80 cm, more than about 90 cm, more than about 100 cm, more than about 200 cm, more than about 500 cm, more than about 10 m. In some embodiments, said pipes have a length of about 1 cm to about 2 cm, from about 2 cm to about 4 cm, from about 4 cm to about 10 cm, from about 10 cm to about 20 cm, from about 20 cm to about 50 cm, from about 50 cm to about 100 cm, from about 100 cm to about 200 cm, from about 200 cm to about 10 m.

In some embodiments, one or more of said pipes are connected to the flow distribution surface by additional pipes, conduits, or fluid paths. In some embodiments, said pipes have a diameter of less than about 1 mm, less than about 2 mm, less than about 5 mm, less than about 10 mm, less than about 20 mm, less than about 30 mm, less than about 40 mm, less than about 50 mm, less than about 60 mm, less than about 70 mm, less than about 80 mm, less than about 90 mm, less than about 100 mm. In some embodiments, said pipes have a diameter of more than about 1 mm, more than about 2 mm, more than about 5 mm, more than about 10 mm, more than about 20 mm, more than about 30 mm, more than about 40 mm, more than about 50 mm, more than about 60 mm, more than about 70 mm, more than about 80 mm, more than about 90 mm, more than about 100 mm. In some embodiments, said pipes have a diameter of about 1 mm to about 2 mm, from about 2 mm to about 4 mm, from about 4 mm to about 10 mm, from about 10 mm to about 20 mm. In some embodiments, said pipes have a length of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm, less than about 200 cm, less than about 500 cm, less than about 10 m. In some embodiments, said pipes have a length of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, more than about 80 cm, more than about 90 cm, more than about 100 cm, more than about 200 cm, more than about 500 cm, more than about 10 m. In some embodiments, said pipes have a length of about 1 cm to about 2 cm, from about 2 cm to about 4 cm, from about 4 cm to about 10 cm, from about 10 cm to about 20 cm, from about 20 cm to about 50 cm, from about 50 cm to about 100 cm, from about 100 cm to about 200 cm, from about 200 cm to about 10 m.

In some embodiments, the ratio of the diameter of said pipe to the dimension of the filter bank is less than about 0.01, less than about 0.1, less than about 1, less than about 10, less than about 100. In some embodiments, the ratio of the diameter of said pipe to the dimension of the filter bank is more than about 0.01, more than about 0.1, more than about 1, more than about 10, more than about 100. In some embodiments, the ratio of the diameter of said pipe to the dimension of the filter bank is from about 0.01 to about 0.1, from about 0.1 to about 1, from about 1 to about 10, from about 10 to about 100. In some embodiments, one or more pipes of equivalent or different dimensions are found within a filter bank. In some embodiments, one or more of these pipes are connected. In some embodiments, one or more of said pipes are oriented with respect to each other in parallel, perpendicular, at an angle, in varying geometries, or in a combination thereof. In some embodiments, the ratio of the diameters of pipes within the same filter bank is less than about 0.01, less than about 0.1, less than about 1, less than about 10, less than about 100. In some embodiments, the ratio of the diameters of pipes within the same filter bank is more than about 0.01, more than about 0.1, more than about 1, more than about 10, more than about 100. In some embodiments, the ratio of the diameters of pipes within the same filter bank is from about 0.01 to about 0.1, from about 0.1 to about 1, from about 1 to about 10, from about 10 to about 100.

In some embodiments, said additional pipes are connected to one or more orifices which deliver fluid to and from the flow distribution surface. In some embodiments, orifices provide a fluid connection from the piping that delivers flow to the filter bank to the flow distribution surfaces. In some embodiments, one such orifice delivers flow. In some embodiments, more than one orifice delivers flow. In some embodiments, 2, 3, 4, 5, 6, 7, 8, 9, 10, 11, 12, 13, 14, 15, 16, 17, 18, 19, 20 orifices deliver flow. In some embodiments, more than 20 orifices deliver flow. In some embodiments, said orifices have a diameter of less than about 1 mm, less than about 2 mm, less than about 5 mm, less than about 10 mm, less than about 20 mm, less than about 30 mm, less than about 40 mm, less than about 50 mm, less than about 60 mm, less than about 70 mm, less than about 80 mm, less than about 90 mm, less than about 100 mm. In some embodiments, said orifices have a diameter of more than about 1 mm, more than about 2 mm, more than about 5 mm, more than about 10 mm, more than about 20 mm, more than about 30 mm, more than about 40 mm, more than about 50 mm, more than about 60 mm, more than about 70 mm, more than about 80 mm, more than about 90 mm, more than about 100 mm. In some embodiments, said pipes have a diameter of about 1 mm to about 2 mm, from about 2 mm to about 4 mm, from about 4 mm to about 10 mm, from about 10 mm to about 20 mm. In some embodiments, said orifices have a length of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm, less than about 200 cm, less than about 500 cm, less than about 10 m. In some embodiments, said orifices have a length of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, more than about 80 cm, more than about 90 cm, more than about 100 cm, more than about 200 cm, more than about 500 cm, more than about 10 m. In some embodiments, said orifices have a length of about 1 cm to about 2 cm, from about 2 cm to about 4 cm, from about 4 cm to about 10 cm, from about 10 cm to about 20 cm, from about 20 cm to about 50 cm, from about 50 cm to about 100 cm, from about 100 cm to about 200 cm, from about 200 cm to about 10 m.

In some embodiments, pipes, orifices, and flow distribution surfaces are configured to direct a flow of a liquid resource through the one or more filter banks and out of said one or more filter banks, wherein the sorbent material contained in said filter bank selectively absorbs lithium. In some embodiments, pipes, orifices, and flow distribution surfaces are configured to uniformly distribute the flow of liquid through the sorbent material contained in the filter bank. In some embodiments, said flow uniformity implies that each volume of sorbent material within the filter bank is contacted with the same volume of liquid resource within a given time period. In some embodiments, uniform distribution of flow through the sorbent material results in a higher lithium absorption capacity of the sorbent, a higher selectivity for lithium absorption by the sorbent over other ions present in the liquid resource, a minimized distance required to flow the liquid through the one or more filter banks, a reduced change in pressure when flowing liquid across the one or more filter banks, a longer life time of the sorbent, a longer life time of the ion-exchange material, or a combination thereof.

In some embodiments, the devices, vessels, system, and methods described herein utilize a flow distribution compartment to optimize the flow of various solutions or gases through the devices, vessels, pipes, filter banks, and lithium-selective sorbents materials. In some embodiments, the inlet- and outlet flows to and from the flow distribution compartments are injected and remove from the internal space of said compartments by means of piping, tubing, or other internal components that protrude into said compartment. In some embodiments, the inlet- and outlet flows to and from the flow distribution compartments are injected and remove from the internal space of said compartments by means of piping, tubing, or other internal components that protrude into said compartment In some embodiments, the flow distribution compartment are optionally treated with a lithium containing resource, hydrogen ion-containing acid, water, or other solutions for the purposes of adjusting the concentration, composition, pH, or contaminant level of the fluid flowing through the vessel. This is achieved by means of an optional inlet- and outlet-flows to and from the flow distribution compartment.

In some embodiments, there is a partition between the flow distribution surface and the compartment containing the lithium sorbent. In some embodiments, said partition comprises a filter, a solid-liquid separation device, or other solid-retaining material. In some embodiments, a partition is in contact with the lithium selective sorbent. In some embodiments, said partition is a permeable partition. In some embodiments, said permeable partition is a porous partition. In some embodiments, said permeable partition is a slitted partition that provides support for the ion-exchange bead bed, chemical protection, aids filtration, or a combination thereof. In some embodiments, said permeable partition is a porous partition that provides structural support for the bed of lithium-selective sorbent, chemical protection, aids filtration, or a combination thereof. In some embodiments, the partition between the flow distribution compartment and the compartment containing the ion-exchange beads consists of a porous partition that provides structural support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a v-wire screen, a sintered metal screen, a sintered polymer screen, a flat screen, a cylindrical screen, a screen comprised of wire with cylindrical cross section, a screen comprised of wire with square cross section, a screen comprised of wire with rectangular cross section, a screen comprised of wire with rhomboidal cross section, a screen comprised of wire with triangular cross section, a screen comprised of wire with irregular cross section, a slotted wire screen, a mesh, or a combination thereof, wherein said porous partition is coarse, fine, or a combination thereof. In some embodiments, the porous partition comprises polyether ether ketone, polypropylene, polyethylene, poly sulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof. In some embodiments, the porous partition comprises ion exchange particles. In some embodiments, the porous partition comprises porous ion exchange particles. In some embodiments, the porous partition comprises a mixture of ion exchange particles with other polymers described above. In some embodiments, the porous partition comprises multiple layers.

In some embodiments, the porous partition is a single layer filtration fabric. In some embodiments, the porous partition is a double layer filtration fabric. In some embodiments, the porous partition is a multi-layer filtration fabric. In some embodiments, the porous partition is a spun fabric. In some embodiments, the porous partition is a is a mixture of fabrics. In some embodiments, the porous partition is a woven fabric. In some embodiments, said fabric is manufactured with one or more weave patterns, including but not limited to a plain, twill, satin, oxford, leno or basket-weave.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 μm, more than about 2 μm, more than about 5 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 200 μm, more than about 300 μm, more than about 400 μm, more than about 500 μm, more than about 600 μm, more than about 700 μm, more than about 800 μm, more than about 900 μm, more than about 1000 μm, more than about 2000 μm. In some embodiments, the porous partition consists of openings in that are of a typical characteristic size from about 20 μm to about 40 μm, from about 40 μm to about 80 μm, from about 80 μm to about 200 μm, from about 100 μm to about 400 μm, from about 200 μm to about 800 μm, from about 400 μm to about 1000 μm, from about 600 μm to about 2000 μm, from about 1000 μm to about 2000 μm. In some embodiments, the porous partition consists of openings in that are of a typical characteristic size of from about 1 μm to about 2 μm, from about 2 μm to about 4 μm, from about 4 μm to about 10 μm, from about 10 μm to about 20 μm, from about 20 μm to about 40 μm, from about 40 μm to about 100 μm, from about 100 μm to about 200 μm, from about 200 μm to about 400 μm, from about 400 μm to about 1000 μm, from about 1000 μm to about 2000 μm. In some embodiments, the porous partition consists of openings in that are of a typical characteristic size of from about 1 μm to about 10 μm, from about 10 μm to about 100 μm, from about 100 μm to about 1000 μm, from about 1000 μm to about 10000 μm.

In some embodiments, the air permeability of said permeable partition, measured at 200 Pa, in units of liters per meter square per second, is less than about 1, less than about 5, less than about 10, less than about 50, less than about 100, less than about 500, less than about 1000, less than about 5000, less than about 10,000. In some embodiments, the air permeability of said permeable partition, measured at 200 Pa, in units of liters per meter square per second, is more than about 1, more than about 5, more than about 10, more than about 50, more than about 100, more than about 500, more than about 1000, more than ab out 5000, more than about 10,000. In some embodiments, the air permeability of said permeable partition, measured at 200 Pa, in units of liters per meter square per second, is from about 0.1 to about 1, from about 1 to about 5, from about 5 to about 10, from about 10 to about 50, from about 50 to about 100, from about 100 to about 500, from about 500 to about 1000, from about 1000 to about 5000, from about about 10,000.

In some embodiments, said porous partition described herein comprises a lithium selective sorbent. In some embodiments, the lithium selective sorbent is embedded in the components of the porous partition. In some embodiments, the lithium selective sorbent is embedded in the porous partition during the manufacture of said partition. In some embodiments, the lithium selective sorbent is embedded in the porous partition after the manufacture of said partition. In some embodiments, said lithium selective sorbent comprises an ion exchange material. In some embodiments, said porous partition comprises an ion exchange material and one or more of: a filter, a solid-liquid separation device, or other solid-retaining material. In some embodiments, a partition is in contact with lithium selective sorbent in the filter bank. In some embodiments, said partition is a permeable partition. In some embodiments, said permeable partition is a porous partition.

In some embodiments, the porous partition comprises an ion exchange material and a porous polymer. In some embodiments, the porous partition comprises an ion exchange material and a porous fiber. In some embodiments, the porous partition comprises an ion exchange material and cellulose. In some embodiments, the porous partition comprises an ion exchange material and a mesh or polymer membrane. In some embodiments, said partition comprises one or more meshes of similar or different composition, of similar or different aperture sizes, of similar or different percent open area. In some embodiments, side porous partition comprises one or more meshes to provide structural support and/or filtration capabilities. In some embodiments, side porous partition comprises one or partitions, one or more of which comprise an ion exchange material. In some embodiments, the porous partition comprises a v-wire screen, a sintered metal screen, a sintered polymer screen, a flat screen, a cylindrical screen, a screen comprised of wire with cylindrical cross section, a screen comprised of wire with square cross section, a screen comprised of wire with rectangular cross section, a screen comprised of wire with rhomboidal cross section, a screen comprised of wire with triangular cross section, a screen comprised of wire with irregular cross section, a slotted wire screen, a mesh, or a combination thereof, wherein said porous partition is coarse, fine, or a combination thereof. In some embodiments, said porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof. In some embodiments, the porous partition comprises ion exchange particles. In some embodiments, the porous partition comprises porous ion exchange particles. In some embodiments, the porous partition comprises a mixture of ion exchange particles with other polymers described above. In some embodiments, the porous partition comprises multiple layers. In some embodiments, the porous partition comprising an ion exchange material extracts lithium in the lithium extraction device. In some embodiments, the porous partition comprising an ion exchange material is the only component that extracts lithium in the lithium extraction device. In some embodiments, the porous partition comprises an ion exchange material, while the filter bank is filled with a packed bed of the same ion exchange material. In some embodiments, the porous partition comprises an ion exchange material, while the filter bank is filled with a packed bed a different ion exchange material. In some embodiments, the porous partition comprises an ion exchange material, while the filter bank is filled with a packed bed a different lithium selective sorbent.

In some embodiments, said porous partition optionally contains structures to enable said partition to be incorporated into the assembly of the filter bank. In some embodiments, these structures comprise, but are not limited to, holes, slits, cutouts, perforations, protrusions, gaskets, or rings. In some embodiments, said structures comprise a flexible cylinder that forms an octagonal shape spanning the entire porous partition, providing a structural reinforcement. In some embodiments, the porous surface is contained within said octagon. In some embodiments, said reinforcement is surrounded by the material that the porous partition is made of. In some embodiments, said structural reinforcement is caulked into an octagonally-shaped groove on the filter bank using a mallet, resulting in the porous partition being immobilized directly onto the filter bank.

In some embodiments, said porous partitions comprises a moveable filter cloth or filter belt. In some embodiments, said filter bed is movable. In some embodiments, said filter belt forms a continuous cloth spanning multiple filter banks.

In some embodiments, the porous partition, fluid conduits, fluid orifices, and flow distribution surfaces, are assembled to form a filter bank. An example of such a filter bank is shown in FIG. 2. In some embodiments, said filter banks comprise a one or more filter plates. In some embodiments, said filer banks are assembled from two opposing filter plates. As an exemplary embodiment of such an assembly, FIG. 2C shows how two filter plates 204 come together to form a filter bank 215, said filter bank containing a lithium selective sorbent within compartment 205 in said filter bank.

In some embodiments, said filter banks contain structural supports that allow said banks to be mounted within a larger lithium extraction device. In some embodiments, solid filter banks comprise a compartment containing a lithium-selective sorbent or ion-exchange material. In some embodiments, multiple filter banks are found within a single lithium extraction device, such that they form a stack of filter banks. In some embodiments, said stack is oriented vertically, horizontally, or slanted with respect to the ground.

In some embodiments, the bed of ion exchange material is contained within said filter bank. In some embodiments, the bed of lithium selective sorbent is contained within said filter bank. In some embodiments, said bed of ion exchange material has a characteristic "thickness", wherein "thickness" is defined as the average dimension of the said solid mass, measured in a direction that is parallel to the direction of fluid flow through the filter bank.

In some embodiments, the typical thickness of the bed of lithium selective sorbent is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the bed of lithium selective sorbent is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the bed of lithium selective sorbent is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m. In a preferred embodiment, the typical thickness of the bed of lithium selective sorbent is selected from 18 mm, 25 mm, 32 mm, 40 mm, 50 mm, or 60 mm.

In some embodiments, the bed of ion exchange material is contained within said filter bank. In some embodiments, the bed of lithium selective sorbent is contained within said filter bank. In some embodiments, said bed of ion exchange material has a characteristic "cross sectional length" of said bed, defined as the average dimension of the said solid mass, measured in a direction that is perpendicular to the direction of fluid flow through the filter bank. In some embodiments, the cross-sectional length of said bed is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the cross-sectional length of said bed is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the cross-sectional length of said bed is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m. In a preferred embodiment, the cross-sectional length is selected from: about 250 mm, 320 mm, 470 mm, 630 mm, 800 mm, 1000 mm, 1200 mm, 1500 mm, 2000 mm, 4000 mm. In some embodiments, the bed of sorbent material is not square, and comprises a cross-sectional length that is selected from two of the following dimensions: about 250 mm, 320 mm, 470 mm, 630 mm, 800 mm, 1000 mm, 1200 mm, 1500 mm, 2000 mm, 4000 mm. In a preferred embodiment, the cross-sectional length of the bed of lithium-selective sorbent is 2000 mm×4000 mm, 1500 mm×2000 mm, 2500 mm by 5000 mm, or a combination thereof.

In some embodiments, the device containing ion-exchange beads is comprised of multiple and separate ion-exchange compartments arranged within a single vessel. In some embodiments, the lithium extraction devices comprises multiple individual filter banks—each containing an individual lithium-selective sorbent compartment—where lithium is absorbed by said lithium selective sorbent. In some embodiments, said compartments comprise individual filter banks. An exemplary embodiment of such a device is shown in FIG. 2. In one embodiment, there is only one ion-exchange compartment in the lithium extraction device. In some embodiments, there is more than one ion-exchange compartments lithium extraction device. In some embodiments, there are less than about two, less than about three, less than about five, less than about ten, less than about twenty, less than about thirty, less than about fifty, less than about one-hundred, less than about two-hundred individual compartments within a single lithium extraction device. In some embodiments, there are more than about two, more than about three, more than about five, more than about ten, more than about twenty, more than about thirty, more than about fifty, more than about one-hundred, more than about two-hundred individual compartments within a single lithium extraction device. In some embodiments, a single lithium extraction device comprises about two, about three, about five, about ten, about twenty, about thirty, about fifty, about one-hundred, about one hundred and fifty, or about two-hundred individual lithium extraction compartments.

In some embodiments, the multiple filter banks are held together by a device that applies a mechanical force that presses the individual filter banks together. In some embodiments, said device comprises a hydraulic system, comprising one more pistons and one or more devices to apply a hydraulic force on said piston. In some embodiments, the mechanical force is applied to one structurally reinforced component that is in contact with the first plate in the stack of filter banks, and the compressive force is distributed across all filter plates in the device. In some embodiments, said force is applied by means of a pressurized hydraulic fluid system, pressurized air system, mechanical tensions system, or combinations thereof. In some embodiments, the pressure applied to compress all filter bank together is less than 50 psi, less than 150 psi, less than 500 psi, less than 1000 psi, less than 2500 psi, or less than 5000 psi. In some embodiments the pressure applied is more than 50 psi, more than 150 psi, more than 500 psi, more than 1000 psi, more than 2500 psi, or more than 5000 psi. In some embodiments, the pressure applied is from 50 psi to 150 psi, from 150 psi to 500 psi, from 500 psi to 1000 psi, from 1000 psi to 2500 psi, from 2500 psi to 5000 psi.

In devices comprising multiple beds of lithium-selective sorbent, all beds are connected to a shared flow distribution manifold, such that flow of liquid to and from said beds of lithium-selective sorbent occur in parallel. In some embodiments, a multitude of ion-exchange beds share the same inlet and outlet flows in parallel, wherein a different multitude of ion-exchange beds share a different set of inlet and outlet flows.

In some embodiments, the filter banks are constructed such that one or more components of said filter bank can be deformed or expanded after said filter bank is filled with the lithium selective sorbent, in a manner that applies a compressive or "squeezing" force on said sorbent. Said deformable components are optionally referred to as a "membrane". In some embodiments, said compression results in additional compaction of the bed of lithium-selective sorbent. In some embodiments, said compression increases the uniformity of the bed of lithium-selective sorbent. In some embodiments, said compression results in improved uniformity of flow when contacting said lithium-selective sorbent with a liquid stream. In some embodiments, said compression is applied continually during operation of the lithium-extraction device. In some embodiments, said compression is applied intermittently during operation of the lithium-extraction device.

In some embodiments, the expandable component that applies mechanical compression or "squeezing" on the sorbent comprises the flow distribution compartment or surface. An example of such a compartment is shown in FIG. 2C. A flow distribution compartment exists between the structure surface 213 and the porous partition 214. Surface 213 is flexible, such that hydraulic fluid or air can be injected into chamber 212 by means of a hydraulic fluid or air distribution system, thereby "inflating" 213 towards sorbent 205. In the field of the art, such an operating may be denoted as a membrane squeeze. In some embodiments, the flexible surface that deforms to apply pressure on the lithium selective sorbent comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly (ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In some embodiments, a filter cake of lithium selective sorbent is held within said filter bank, wherein said cake is formed by flowing a suspension of said sorbent through said filter bank.

In some embodiments, the pressure applied to deform the "membrane" component of the filter bank is less than 5 psi, less than 25 psi, less than 50 psi, less than 100 psi, less than 150 psi, less than 250 psi, or less than 500 psi. In some embodiments, the pressure applied to deform the "membrane" component of the filter bank is more than 5 psi, more than 25 psi, more than 50 psi, more than 100 psi, more than 150 psi, more than 250 psi, or more than 500 psi. In some embodiments, the pressure applied to deform the "membrane" component of the filter bank is from about 1 psi to about 5 psi, from about 5 psi to about 25 psi, from about 25 psi to about 50 psi, from about 50 psi to about 100 psi, from about 100 psi to about 150 psi, from about 150 psi to about 250 psi, from about 250 psi to about 500 psi. In some embodiments, the pressure applied to deform the "membrane" component of the filter bank remains constant during operation of the lithium extraction device. In some embodiments, the pressure applied to deform the "membrane" component of the filter bank is varied during operation of the lithium extraction device. In some embodiments, the pressure applied to deform the "membrane" component of the filter bank is applied after said filter bank is loaded with said sorbent, and then released. In some embodiments, the pressure applied to deform the "membrane" component of the filter bank is applied after said filterbank is loaded with said sorbent, and then maintained during all subsequent operations. In some embodiments, the pressure applied to deform the "membrane" component of the filter bank is applied when the lithium-selective sorbent is contacted with a liquid resource comprising lithium. In some embodiments, the pressure applied to deform the "membrane" component of the filter bank is applied when the lithium-selective sorbent is contacted with an acidic eluent that releases lithium form said sorbent. In some embodiments, the pressure applied to deform the "membrane" component of the filterbank is applied during washing of the lithium-selective sorbent with a washing solution. In some embodiments, the pressure applied to deform the "membrane" component of the filter bank is applied without a liquid stream being in contact with the lithium selective sorbent.

In some embodiments, said deformable components or membrane are welded to the rest of the filter bank. In some embodiments, said components are replaceable. In some embodiments, said components are manufactured of the same material as the rest of the filter bank. In some embodiments, said components are manufactured of a different material from the rest of the filter bank.

In some embodiments, the deformable component applies pressure on the bed of lithium-selective sorbent from one side of said bed. In some embodiments, the deformable component applies pressure on the bed of lithium-selective sorbent from both sides of said bed. In some embodiments, the deformable component applies pressure on the bed of lithium-selective sorbent from multiple directions. In some embodiments, the direct from which pressure is applied varies with time. In some embodiments, the direct from which pressure is applied depends on the fluid which is being contacted with the lithium-selective sorbent. In some embodiments, the deformable component is a membrane.

In some embodiments, the lithium selective sorbent is loaded into the lithium extraction device. In some embodiments, said lithium-selective sorbent is an ion exchange material. In some embodiments, the lithium selective sorbent is loaded into the lithium extraction device, and pressure is applied on the loaded sorbent using the deformable component in the filter bank. In some embodiments, the lithium selective sorbent is loaded into the lithium extraction device, and the loaded sorbent is squeezed using a membrane in said filter bank. In some embodiments, said pressure is applied on the loaded sorbent after initial loading of said sorbent, and then released. In some embodiments, said pressure is applied on the loaded sorbent during the entire operation of said device for lithium extraction, during certain periods of said operation. In some embodiments, said pressure is applied on the loaded sorbent when said sorbent absorbs lithium from a liquid resource. In some embodiments, said pressure is applied on the loaded sorbent when said sorbent releases the absorbed lithium to produce an acidic eluent solution. In some embodiments, said pressure is applied on the loaded sorbent when said sorbent is being washed with a wash solution. In some embodiments, said pressure is applied on the loaded sorbent when said sorbent is contacted with water. In some embodiments, said pressure is applied on the loaded sorbent when said sorbent is contacted with a gas.

In some embodiments, the lithium selective sorbent is loaded into the lithium extraction device. In some embodiments, in order to load said sorbent into the device, the lithium selective sorbent is suspended in a fluid within a vessel. For the purposes of this disclosure, suspension of a solid in a liquid is also termed "fluidization", or fluidization of said solids. In some embodiments, said fluid is water, a liquid resource containing lithium, a brine, an acidic eluent solution, an acidic solution, or a mixture thereof. In some embodiments, said fluid is a gas flown in a manner that fluidizes the sorbent. In some embodiments, the sorbent is suspended in a liquid by agitating sorbent in said liquid, such that the solids are distributed uniformly or non-uniformly throughout the fluid. In some embodiments, the distribution of solids in said fluid allows for the solids to be conveyed out of the vessel where it is contained. In some embodiments, suspension of said solids occurs by agitation of solid solids and said fluid, wherein agitation occurs with a mechanical agitator, an eductor, fluid recirculation, baffles, shaking, tapping or a combination thereof. In some embodiments, the fluidization of said ion exchange material occurs by means of contact with one or more gases phases. In some embodiments, the fluidization of said ion exchange material occurs by means of contact with a liquid resource, a wash solution, an acidic solution, one or more alternate phases or combinations thereof. In some embodiments, said ion exchange material is fluidized during contact with said liquid resource. In some embodiments, said ion exchange material is fluidized during contact with said acidic solution. In some embodiments, said ion exchange material is fluidized during contact with said alternate phase. In some embodiments, said ion exchange material is fluidized during contact with said wash solution.

In some embodiments, initial fluidization of the solids is aided by contacting a pressurized gas with said solid sorbent and said fluid. In some embodiments, said aiding occurs by the additional turbulence and break up of the consolidated solids at the bottom of the vessel where said solids are stored. In some embodiments, said gas is air, nitrogen, argon, oxygen, chlorine, a different gas, or a combination thereof. In some embodiments, injection of said gas for contact with the solid and fluid occurs through one or more of a pipe, tubing, channels, slits, beams, baffles, baskets, scallops, nozzles, or a mesh. In some embodiments, the components that direct flow within the vessel are perforated. In some embodiments, the openings or perforations in the components that distribute flow are shaped as circles, ovals, vertical or horizontal slits, squares, crosses, rectangles, triangles, irregular shapes, or a combination thereof.

In some embodiments, flow of the gas occurs from the top to the bottom of the vessel. In some embodiments, flow of the gas occurs from the bottom to the top of the vessel. In some embodiments, flow of the gas occurs from the inside to the outside of the vessel. In some embodiments, flow of the gas occurs from the outside to the inside of the vessel.

In one embodiment, the vessel has an internal nozzle designed to distribute flow of the gas evenly. In one embodiment, the vessel has nozzles placed equidistant with each other on a support plate. In one embodiment the nozzles are spaced out so that each nozzle covers the same area. In one embodiment the nozzles have slits or holes of width of less than 0.1 µm, less than 1 µm, less than 10 µm, less than 100 µm, or less than 1 mm. In one embodiment, the vessel has mesh with holes less than 0.1 µm, less than 1 µm, less than 10 µm, less than 100 µm, or less than 1000 µm. In some embodiments, the openings or perforation in one or more for the flow distribution components, such as pipes, tubing, channels, slits, beams, baffles, baskets, scallops, nozzles, or a mesh, have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings or perforation in one or more for the flow distribution components have a dimension of less than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings or perforation in one or more for the flow distribution components have a dimension of less than about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, an gas is contacted with the ion exchange beads for more than about 10 milliseconds, more than about 100 milliseconds, more than about 1 second, more than about 10 seconds, more than about 100 seconds, more than about 1 minute, more than about 10 minutes, more than about 100 minutes, more than about 1 hour, more than about 10 hours, more than about 100 hours. In some embodiments, an gas is contacted with the ion exchange beads for less than about 10 milliseconds, less than about 100 milliseconds, less than about 1 second, less than about 10 seconds, less than about 100 seconds, less than about 1 minute, less than about 10 minutes, less than about 100 minutes, less than about 1 hour, less than about 10 hours, less than about 100 hours. In some embodiments, an gas is contacted with the ion exchange beads from about 10 milliseconds to about 100 milliseconds, from about 100 milliseconds to about 1 second, from about 1 second to about 10 seconds, from about 10 seconds to about 100 seconds, from about 100 seconds to about 1 minute, from about 1 minute to about 10 minutes, from about 10 minutes to about 100 minutes, from about 1 hour to about 10 hours, from about 10 hours to about 100 hours.

In some embodiments, a gas is injected to contact the ion exchange beads at a pressure of more than about 0.1 psi, more than about 1 psi, more than about 5 psi, more than about 10 psi, more than about 50 psi, more than about 100 psi, more than about 500 psi, more than about 1000 psi, more than about 500 psi, more than about 1000 psi. In some embodiments, an gas is injected to contact the ion exchange beads at a pressure of less than about 0.1 psi, less than about 1 psi, less than about 5 psi, less than about 10 psi, less than about 50 psi, less than about 100 psi, less than about 500 psi, less than about 1000 psi, less than about 500 psi, less than about 1000 psi. In some embodiments, an gas is injected to contact the ion exchange beads at a pressure from about 0.1 psi to about 5 psi, from about 5 psi to about 10 psi, from about 10 psi to about 50 psi, from about 50 psi to about 100 psi, from about 100 psi to about 500 psi, from about 500 psi to about 1000 psi, from about 1000 psi to about 5000 psi, from about 5000 psi to about 10,000 psi. In some embodiments, the suspended lithium selective sorbent is loaded into the lithium extraction device.

In some embodiments, the suspended sorbent is conveyed from the vessel described above and into an ion exchange device comprising multiple filter banks. In some embodiments, conveyance of said suspension occurs by use of a mechanical device. In some embodiments, said mechanical device comprises a double-diaphragm pump, and air operated double-diaphragm pump, a diaphragm pump, a positive displacement pump, a centrifugal pump, a vortex pump, a slurry pump, or combinations thereof. In some embodiments, said suspension is conveyed from said vessel and into said ion exchange device by pressurizing the top of said vessel, such that the liquid suspension is forced by pressure-driven flow to exist said vessel through a pipe. In some embodiments, said suspension is conveyed from said vessel and into said ion exchange device by suction applied at the outlet of said lithium extraction device.

In some embodiments, the suspension of sorbent that is loaded into the ion exchange device has a solids content of less than about 0.001% v/v (solids volume per total solution volume), of less than about 0.01% v/v, of less than about 0.1% v/v, of less than about 1% v/v, of less than about 10% v/v, of less than about 50% v/v, of less than about 75% v/v, of less than about 100% v/v. In some embodiments, the suspension of sorbent that is loaded into the ion exchange device has a solids content of more than about 0.001% v/v (solids volume per total solution volume), of more than about 0.01% v/v, of more than about 0.1% v/v, of more than about 1% v/v, of more than about 10% v/v, of more than about 50% v/v, of more than about 75% v/v. In some embodiments, the suspension of sorbent that is loaded into the ion exchange device has a solids content of from about 0.001% v/v (solids volume per total solution volume) to about 0.01% v/v, from about 0.01% v/v to about 0.1% v/v, of from about 0.1% v/v to about 1% v/v, of from about 1% v/v to about 10% v/v, of from about 10% v/v to about 50% v/v, of from about 50% v/v to about 75% v/v, of from 75% v/v to about 100% v/v. In some embodiments, the suspension of sorbent is a thick suspension. In some embodiments, said suspension of sorbents is a slurry.

In some embodiments, the said suspension of sorbent is conveyed into the lithium extraction device via a pipe. In some embodiments, said suspension of sorbent is conveyed into said lithium extraction device through one inlet port. In some embodiments, said suspension of sorbent is conveyed into said lithium extraction device through one or more inlet ports. In some embodiments, said suspension of sorbent is conveyed into said lithium extraction device through two inlet ports. In some embodiments, said suspension of sorbent is conveyed into said lithium extraction device through two inlet ports that are connected to opposite ends of the lithium extraction device. In some embodiments, one or more of said inlet ports connect to a common piping system that is in fluid contact with all filter banks within said lithium extraction device.

In some embodiments, one or more of said inlet ports connect to a common piping system that is in fluid contact with all filter banks within said lithium extraction device. In some embodiments, one or more of said inlet ports connect to a common conduit or piping system that is in fluid contact with all filter banks within said lithium extraction device. An example of a fluid conduit is shown in FIG. 2: Conduit 210 spans the entire stack of filter banks at their center, and is connected to a fluid inlet port at the end of the device (216). In some embodiments, the location of the fluid conduit for said suspension is the same in all filter banks across the entire device. In some embodiments, the location of the fluid conduit for said suspension is the different in different filter banks that comprise said device. In some embodiments, the location of the fluid conduit for the sorbent is above the filter bank, below the filter bank, or off to one of the sides of the filter bank.

In some embodiments, the outlet of the conduit for conveyance of sorbent into individual filter bank is located within the bed of sorbent within said filter bank. For the purposes of this description, the center of the filter bank is the center of symmetry of said filter bank when observed in the direction of normal fluid flow through said bed. In some embodiments, said conduit is located at the center of the sorbent bed. In some embodiments, said conduit is located off-center from the center of the sorbent bed, wherein off-center implies a location in any of the radial directions from said center. In some embodiments, the ratio (distance from the center of said bed to the conduit for conveyance of sorbent into individual filter bank) to (distance from the center of said bed to the outer edge of said bed) is less than about 0.1, less than about 0.25, less than about 0.4, less than about 0.5, less than about 0.75, less than about 0.9. In some embodiments, the ratio (distance from the center of said bed to the conduit for conveyance of sorbent into individual filter bank) to (distance from the center of said bed to the outer edge of said bed) is more than about 0.1, more than about 0.25, more than about 0.4, more than about 0.5, more than about 0.75, more than about 0.9. In some embodiments, the ratio (distance from the center of said bed to the conduit for conveyance of sorbent into individual filter bank) to (distance from the center of said bed to the outer edge of said bed) is from about 0.01 to about 0.1, from about 0.1 to about 0.25, from about 0.25 to about 0.4, from about 0.4 to about 0.5, from about 0.5 to about 0.75, from about 0.75 about 0.9. In some embodiments, the outlet of the conduit for conveyance of sorbent into individual filter bank is located within said filter bank towards the top, bottom, side, or corner of said filter bed. In some embodiments, the outlet of the conduit for conveyance of sorbent into individual filter bank is outside said filter bank. In some embodiments, the outlet of the conduit for conveyance of sorbent into individual filter bank is located outside the bed of sorbent, at the top, bottom, side, or corner of the lithium extraction device but outside of the bed of sorbent, wherein bed of sorbent is defined as the sorbent that absorbs lithium during operation of the device.

In some embodiments, as the suspension of sorbent is conveyed into the device and into the filter banks, the suspension flows into the compartment within the filter bank, and the solids are retained within said compartment by the porous partition; the fluid flows across said partition, into the flow distribution chamber, and out of the filter bank through orifices and pipes. As described herein, each filter bank comprises one or more porous partitions. In some embodiments, fluid flows out of said filter bank through one of said porous partitions. In some embodiments, fluid flows out of said filter bank through two of said porous partitions. In some embodiments, fluid flows out of said filter bank through one or more of said porous partitions, and out of one of the pipes that connect said filter bank to the rest of the lithium extraction device. In some embodiments, fluid flows out of said filter bank through one or more of said porous partitions, and out of two of the pipes that connect said filter bank to the rest of the lithium extraction device. In some embodiments, fluid flows out of said filter bank through one or more of said porous partitions, and out of three of the pipes that connect said filter bank to the rest of the lithium extraction device. In some embodiments, fluid flows out of said filter bank through one or more of said porous partitions, and out of four of the pipes that connect said filter bank to the rest of the lithium extraction device. In some embodiments, fluid flows out of said filter bank through one or more of said porous partitions, and out of more than of one of the pipes that connect said filter bank to the rest of the lithium extraction device.

In some embodiments, the bed of sorbent within said filter bank is filled with sorbent until the physical volume available in said filter bank is fully occupied by said sorbent. In some embodiments, the maximum fill level is determined based on the pressure required to pump the suspension of sorbent in fluid into said filter bank; when a certain pressure and pumping rate is reached, the filter banks are considered completely filled. In some embodiments, the filter banks are filled with sorbent until the pressure required to pump said suspended sorbent into said device is more than about 0.1 psi, more than about 1 psi, more than about 5 psi, more than about 10 psi, more than about 20 psi, more than about 50 psi, more than about 75 psi, more than about 100 psi, more than about 200 psi, more than about 500 psi. In some embodiments, the filter banks are filled with sorbent until the pressure required to pump said suspended sorbent into said device is less than about 0.1 psi, less than about 1 psi, less than about 5 psi, less than about 10 psi, less than about 20 psi, less than about 50 psi, less than about 75 psi, less than about 100 psi, less than about 200 psi, less than about 500 psi. In some embodiments, the filter banks are filled with sorbent until the pressure required to pump said suspended sorbent into said device is from about 0.1 psi to about 5 psi, from about 5 psi to about 10 psi, from about 10 psi to about 20 psi, from about 20 psi to about 50 psi, from about 50 psi to about 100 psi, from about 100 psi to about 250 psi, from about 250 psi to about 500 psi, from about 500 psi to about 1000 psi.

In some embodiments, the filter banks are filled with sorbent until the rate at which the suspended sorbent is pumped into said device is less than about 0.1%, less than about 1%, less than about 10%, less than about 50%, or less than about 75% of the initial rate at which the suspended sorbent is pumped into said device (when said device is empty). In some embodiments, the filter banks are filled with sorbent until the rate at which the suspended sorbent is pumped into said device is more than about 0.1%, more than about 1%, more than about 10%, more than about 50%, or more than about 75% of the initial rate at which the suspended sorbent is pumped into said device (when said device is empty). In some embodiments, the filter banks are filled with sorbent until the rate at which the suspended sorbent is pumped into said device is from about 0.01% to about 0.1%, from about 0.1% to about 1%, from about 1% to about 10%, from about 10% to about 50%, from about 50% to about 75% of the initial rate at which the suspended sorbent is pumped into said device (when said device is empty).

In some embodiments, said lithium-selective sorbent is incorporated into the filter bank during the manufacturing process, such that each filter bank comprises a lithium-selective sorbent. In some embodiments, the filter plates that comprise the filter banks comprise a lithium-selective sorbent. In some embodiments, said lithium selective sorbent is an ion exchange material. In some embodiments, said lithium selective sorbent is a porous ion exchange material. In some embodiments, said ion-exchange material is bonded to the filter bank.

In some embodiments, such a device is constructed by using a series of filter banks wherein the filters contain ion exchange beads, as exemplified in examples 1 and 9, and associated figures. In some embodiments, such a device is constructed where multiple ion-exchange compartments are arranged vertically or horizontally. In some embodiments, such filter banks are separated to load and unloaded the ion exchange beads. In some embodiments, the ion exchange beads are conveyed into the filter banks as a slurry to load the ion exchange beads into the ion exchange vessel. In some embodiments, loading of the ion exchange beads occurs in the same direction, opposite direction, orthogonal direction, or other direction relative the normal direction of flow during the ion exchange process. In some embodiments, the tension holding the filter bank together is increased, decreased, or maintained during the ion exchange process.

In some embodiments, ion-exchange compartments are added or removed from the vessel by mechanical means, such that the number of ion-exchange compartments are adjusted. In some embodiments, ion-exchange compartments and their components are mechanically separated to clean out, replace, and fill in compartments and partitions between compartments.

In one embodiment, the ion exchange compartment within each ion-exchange compartment is partially filled with ion exchange beads, such that ion exchange beads freely move within their containing compartment during contacting with fluid. In some embodiments, the ion exchange compartment is filled to its capacity with ion exchange beads, such that ion exchange beads are fixed in place and cannot freely move within the containing compartment during contacting with fluid. In one embodiment, the ion exchange compartment is partially filled, and becomes completely filled by the change in volume of ion exchange beads that occurs when contacting said beads with certain fluids. In some embodiments, the ion exchange compartment is configured such that ion exchange beads may enter and leave the ion-exchange compartment conveyed by the fluid which they are contacting, in the top-down or down-top direction. In one embodiment, the ion exchange beads may be loaded into and unloaded from said compartments through the top or bottom of the compartments, through the sides, or by mechanically separating and opening the ion-exchange compartment to expose the compartment and subsequently filling said compartment with ion-exchange beads.

In some embodiments, the typical length of the vessel containing the ion-exchange compartments is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the said vessel is more than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of said vessel is from about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the devices, vessels, system, and methods described herein utilize a flow distribution compartment to optimize the flow of various solutions or gases through the devices, vessels, ad systems. In some embodiments, the flow distribution compartment is an inner flow distribution compartment and/or outer flow distribution compartment.

In one embodiment, the flow distribution compartment and/or ion-exchange bead compartment is empty, partially filled, or fully filled with fluid, or a combination thereof. In some embodiments, the flow distribution compartment and/or ion-exchange bead compartment are cylindrical, rectangular, irregular, or a combination thereof. In some embodiments, the flow distribution compartment has a constant cross-sectional area or a varying cross-sectional area.

In one embodiment, the flow distribution compartment and/or ion-exchange bead compartment contains internal beams to provide structural support for the vessel. In some embodiments, internal beams are positioned to optimize flow distribution. In one embodiment, the flow distribution compartment and/or ion-exchange bead compartment contain pipes and tubes that direct flow into individual perforations in the inner- and outer-perforated walls. In one embodiment the flow distribution compartment and/or ion-exchange bead compartment contain trays that direct flow.

In some embodiments, the flow distribution compartment and/or ion-exchange bead compartment contain filler material to provide structural support for the vessel, while also providing more optimal flow distribution. In some embodiments, the filler material is comprised of a polymer, ceramic, metal, ion-exchange beads, or a combination thereof. In some embodiments, the filler material contained within the outer-flow distribution and/or the inner-flow distribution compartments have an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm; from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

Embodiments Comprising a Filter Press

An aspect of the disclosure herein is a device for lithium extraction from a liquid resource, wherein said device comprises one or more filter banks containing a lithium-selective sorbent. In some embodiments, said lithium extraction comprises a filter press. A filter press is a filtration device known in the field of filtration and solids-liquid separation. An aspect of the disclosure herein is the use of a filter press to extract lithium, wherein said filter press is filled with a lithium-selective sorbent, and said sorbent is contacted with a liquid resource comprising lithium in said filter press. In some embodiments, said sorbent is an ion-exchange material.

In some embodiments, a filter press comprises multiple filter plates, wherein said filter two filter plates come together to form a filter chamber or filter bank. In some embodiments, each filter bank comprises a compartment containing a lithium-selective sorbent, wherein said compartment is contained within porous partitions. In some embodiments, said compartment contains a bed or cake of said sorbent. In some embodiments, said filter bank contains pipes, shapes, and flow paths that connect said sorbent-containing compartment to a fluid distribution manifold that the delivers flow to and form said sorbent. In some embodiments, two porous partitions are located at opposing ends of the compartment containing a lithium-selective sorbent, such that fluid can flow from one partition, through the sorbent, and out of the second partition. In some embodiments, more than two such partitions are located within a filter bank. In some embodiments, said porous partition is a mesh, cloth, other woven material, a screen, or a combination thereof. In some embodiments, said porous partition is attached a mechanical device, plate, flow distributor, or scaffolding.

In some embodiments, the porous partition is a filter cloth. In some embodiments, said partition comprises a filter, a solid-liquid separation device, or other solid-retaining material. In some embodiments, a partition is in contact with the lithium selective sorbent. In some embodiments, said partition is a permeable partition. In some embodiments, said permeable partition is a porous partition. In some embodiments, said permeable partition is a slitted partition that provides support for the ion-exchange bead bed, chemical protection, aids filtration, or a combination thereof. In some embodiments, said permeable partition is a porous partition that provides structural support for the bed of lithium-selective sorbent, chemical protection, aids filtration, or a combination thereof. In some embodiments, the partition between the flow distribution compartment and the compartment containing the ion-exchange beads consists of a porous partition that provides structural support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a v-wire screen, a sintered metal screen, a sintered polymer screen, a flat screen, a cylindrical screen, a screen comprised of wire with cylindrical cross section, a screen comprised of wire with square cross section, a screen comprised of wire with rectangular cross section, a screen comprised of wire with rhomboidal cross section, a screen comprised of wire with triangular cross section, a screen comprised of wire with irregular cross section, a slotted wire screen, a mesh, or a combination thereof, wherein said porous partition is coarse, fine, or a combination thereof. In some embodiments, the porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof. In some embodiments, the porous partition comprises ion exchange particles. In some embodiments, the porous partition comprises porous ion exchange particles. In some embodiments, the porous partition comprises a mixture of ion exchange particles with other polymers described above. In some embodiments, the porous partition comprises multiple layers.

In some embodiments, the porous partition is a single layer filtration fabric. In some embodiments, the porous partition is a double layer filtration fabric. In some embodiments, the porous partition is a multi-layer filtration fabric. In some embodiments, the porous partition is a spun fabric. In some embodiments, the porous partition is a is a mixture of fabrics. In some embodiments, the porous partition is a woven fabric. In some embodiments, said fabric is manufactured with one or more weave patterns, including but not limited to a plain, twill, satin, oxford, leno or basket-weave.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, the air permeability of said permeable partition, measured at 200 Pa, in units of liters per meter square per second, is less than about 1, less than about 5, less than about 10, less than about 50, less than about 100, less than about 500, less than about 1000, less than about 5000, less than about 10,000. In some embodiments, the air permeability of said permeable partition, measured at 200 Pa, in units of liters per meter square per second, is more than about 1, more than about 5, more than about 10, more than about 50, more than about 100, more than about 500, more than about 1000, more than about 5000, more than about 10,000. In some embodiments, the air permeability of said permeable partition, measured at 200 Pa, in units of liters per meter square per second, is from about 0.1 to about 1, from about 1 to about 5, from about 5 to about 10, from about 10 to about 50, from about 50 to about 100, from about 100 to about 500, from about 500 to about 1000, from about 1000 to about 5000, from about about 10,000.

In some embodiments, the porous partition comprises an ion exchange material and a porous polymer. In some embodiments, the porous partition comprises an ion exchange material and a porous fiber. In some embodiments, the porous partition comprises an ion exchange material and cellulose. In some embodiments, the porous partition comprises an ion exchange material and a mesh or polymer membrane. In some embodiments, said partition comprises one or more meshes of similar or different composition, of similar or different aperture sizes, of similar or different percent open area. In some embodiments, side porous partition comprises one or more meshes to provide structural support and/or filtration capabilities. In some embodiments, side porous partition comprises one or partitions, one or more of which comprise an ion exchange material. In some embodiments, the porous partition comprises a v-wire screen, a sintered metal screen, a sintered polymer screen, a flat screen, a cylindrical screen, a screen comprised of wire with cylindrical cross section, a screen comprised of wire with square cross section, a screen comprised of wire with rectangular cross section, a screen comprised of wire with rhomboidal cross section, a screen comprised of wire with triangular cross section, a screen comprised of wire with irregular cross section, a slotted wire screen, a mesh, or a combination thereof, wherein said porous partition is coarse, fine, or a combination thereof. In some embodiments, said porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof. In some embodiments, the porous partition comprises ion exchange particles. In some embodiments, the porous partition comprises porous ion exchange particles. In some embodiments, the porous partition comprises a mixture of ion exchange particles with other polymers described above. In some embodiments, the porous partition comprises multiple layers. In some embodiments, the porous partition comprising an ion exchange material extracts lithium in the lithium extraction device. In some embodiments, the porous partition comprising an ion exchange material is the only component that extracts lithium in the lithium extraction device. In some embodiments, the porous partition comprises an ion exchange material, while the filter bank is filled with a packed bed of the same ion exchange material. In some embodiments, the porous partition comprises an ion exchange material, while the filter bank is filled with a packed bed a different ion exchange material. In some embodiments, the porous partition comprises an ion exchange material, while the filter bank is filled with a packed bed a different lithium selective sorbent.

In some embodiments, said porous partition optionally contains structures to enable said partition to be incorporated into the assembly of the filter bank. In some embodiments, these structures comprise, but are not limited to, holes, slits, cutouts, perforations, protrusions, gaskets, or rings. In some embodiments, said structures comprise a flexible cylinder that forms an octagonal shape spanning the entire porous partition, providing a structural reinforcement. In some embodiments, the porous surface is contained within said octagon. In some embodiments, said reinforcement is surrounded by the material that the porous partition is made of. In some embodiments, said structural reinforcement is caulked into an octagonally-shaped groove on the filter bank using a mallet, resulting in the porous partition being immobilized directly onto the filter bank.

In some embodiments, the filter cloths are gasketed. In some embodiments, the filter cloths are non-gasketed. In some embodiments, the filter cloths span more than one filter bank.

In some embodiments, the compartment containing the lithium selective sorbent or ion-exchange beads is treated with a fluid. In some embodiments, the compartment containing the lithium selective sorbent or ion-exchange beads is treated with water or other solutions for the purposes of adjusting the concentration, composition, pH, or contaminant level of the fluid flowing through the vessel. In some embodiments, the compartment containing the lithium selective sorbent or ion-exchange beads is treated with a lithium-containing liquid resource to absorb lithium. In some embodiments, the compartment containing the lithium selective sorbent or ion-exchange beads is treated with an acidic solution to release absorbed lithium. In some embodiments, the compartment containing the lithium selective sorbent or ion-exchange beads is treated with multiple fluids. In some embodiments, in order to contact the lithium-selective sorbent with said fluid, fluid is directed from the inlet of the lithium extraction device to the one or more filter plates in said device. In some embodiments, said direction of flow is achieved by means of optional inlet- and outlet-flows to and from said compartment within a filter plate. In some embodiments, such inlet- and outlet flows are located at the top, bottom, center, off-center, or side of said compartments. In some embodiments, such inlet- and outlet flows are located at the top, bottom, center, off-center, or side of said filter plate. In some embodiments, the inlet- and outlet flows to and from said compartment are injected and removed from the internal space of said compartments by means of piping, tubing, orifices, or other internal components that protrude into said compartment.

In some embodiments, one or more pipes are in fluid contact with each filter plate, with each of said pipes delivering or removing fluid flows to and from said filter plate. In some embodiments, one such pipe is present in the filter plate. In some embodiments, two such pipes are present in the filter plate. In some embodiments, three such pipes are present in the filter plate. In some embodiments, four such pipes are present in the filter plate. In some embodiments, five such pipes are present in the filter plate. In a preferred embodiment, four such fluid deliver pipes are located at the four corners of a filter plate. In some embodiments, more than five such pipes are present in the filter plate.

In some embodiments, said pipes have a diameter of less than about 1 mm, less than about 2 mm, less than about 5 mm, less than about 10 mm, less than about 20 mm, less than about 30 mm, less than about 40 mm, less than about 50 mm, less than about 60 mm, less than about 70 mm, less than about 80 mm, less than about 90 mm, less than about 100 mm, less than about 200 mm, less than about 500 mm, less than about 1000 mm, less than about 1500 mm, less than about 2000 mm. In some embodiments, said pipes or have a diameter of more than about 1 mm, more than about 2 mm, more than about 5 mm, more than about 10 mm, more than about 20 mm, more than about 30 mm, more than about 40 mm, more than about 50 mm, more than about 60 mm, more than about 70 mm, more than about 80 mm, more than about 90 mm, more than about 100 mm, more than about 200 mm, more than about 500 mm, more than about 1000 mm, more than about 1500 mm, more than about 2000 mm. In some embodiments said pipes or have a diameter of about 1 mm to about 2 mm, from about 2 mm to about 4 mm, from about 4 mm to about 10 mm, from about 10 mm to about 20 mm from about 20 mm to about 40 mm, from about 40 mm to about 100 mm, from about 100 mm to about 500 mm, from about 500 mm to about 1500 mm, from about 1500 mm to about 2000 mm. In some embodiments, said pipes or have a length of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm, less than about 200 cm, less than about 500 cm, less than about 10 m. In some embodiments, said pipes or have a length of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, more than about 80 cm, more than about 90 cm, more than about 100 cm, more than about 200 cm, more than about 500 cm, more than about 10 m. In some embodiments, said or pipes have a length of about 1 cm to about 2 cm, from about 2 cm to about 4 cm, from about 4 cm to about 10 cm, from about 10 cm to about 20 cm, from about 20 cm to about 50 cm, from about 50 cm to about 100 cm, from about 100 cm to about 200 cm, from about 200 cm to about 10 m.

In some embodiments, said pipes have a diameter of less than about 1 mm, less than about 2 mm, less than about 5 mm, less than about 10 mm, less than about 20 mm, less than about 30 mm, less than about 40 mm, less than about 50 mm, less than about 60 mm, less than about 70 mm, less than about 80 mm, less than about 90 mm, less than about 100 mm, less than about 200 mm, less than about 500 mm, less than about 1000 mm, less than about 1500 mm, less than about 2000 mm. In some embodiments, said pipes or have a diameter of more than about 1 mm, more than about 2 mm, more than about 5 mm, more than about 10 mm, more than about 20 mm, more than about 30 mm, more than about 40 mm, more than about 50 mm, more than about 60 mm, more than about 70 mm, more than about 80 mm, more than about 90 mm, more than about 100 mm, more than about 200 mm, more than about 500 mm, more than about 1000 mm, more than about 1500 mm, more than about 2000 mm. In some embodiments said pipes or have a diameter of about 1 mm to about 2 mm, from about 2 mm to about 4 mm, from about 4 mm to about 10 mm, from about 10 mm to about 20 mm from about 20 mm to about 40 mm, from about 40 mm to about 100 mm, from about 100 mm to about 500 mm, from about 500 mm to about 1500 mm, from about 1500 mm to about 2000 mm. In some embodiments, said pipes or have a length of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm, less than about 200 cm, less than about 500 cm, less than about 10 m. In some embodiments, said pipes or have a length of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, more than about 80 cm, more than about 90 cm, more than about 100 cm, more than about 200 cm, more than about 500 cm, more than about 10 m. In some embodiments, said or pipes have a length of about 1 cm to about 2 cm, from about 2 cm to about 4 cm, from about 4 cm to about 10 cm, from about 10 cm to about 20 cm, from about 20 cm to about 50 cm, from about 50 cm to about 100 cm, from about 100 cm to about 200 cm, from about 200 cm to about 10 m.

In some embodiments, the ratio of the diameter of said pipe to the dimension of the filter plate is less than about 0.01, less than about 0.1, less than about 1, less than about 10, less than about 100. In some embodiments, the ratio of the diameter of said pipe to the dimension of the filter plate is more than about 0.01, more than about 0.1, more than about 1, more than about 10, more than about 100. In some embodiments, the ratio of the diameter of said pipe to the dimension of the filter plate is from about 0.01 to about 0.1, from about 0.1 to about 1, from about 1 to about 10, from about 10 to about 100. In some embodiments, one or more pipes of equivalent or different dimensions are found within a filter plate. In some embodiments, one or more of these pipes are connected. In some embodiments, one or more of said pipes are oriented with respect to each other in parallel, perpendicular, at an angle, in varying geometries, or in a combination thereof. In some embodiments, the ratio of the diameters of pipes within the same filter plate is less than about 0.01, less than about 0.1, less than about 1, less than about 10, less than about 100. In some embodiments, the ratio of the diameters of pipes within the same filter plate is more than about 0.01, more than about 0.1, more than about 1, more than about 10, more than about 100. In some embodiments, the ratio of the diameters of pipes within the same filter plate is from about 0.01 to about 0.1, from about 0.1 to about 1, from about 1 to about 10, from about 10 to about 100.

In some embodiments, said additional pipes are connected to one or more orifices which deliver fluid to and from the flow distribution surface. In some embodiments, orifices provide a fluid connection from the piping that delivers flow to the filter plate to the flow distribution surfaces. In some embodiments, one such orifice delivers flow. In some embodiments, more than one orifice delivers flow. In some embodiments, 2, 3, 4, 5, 6, 7, 8, 9, 10, 11, 12, 13, 14, 15, 16, 17, 18, 19, 20 orifices deliver flow. In some embodiments, more than 20 orifices deliver flow. In some embodiments, said orifices have a diameter of less than about 1 mm, less than about 2 mm, less than about 5 mm, less than about 10 mm, less than about 20 mm, less than about 30 mm, less than about 40 mm, less than about 50 mm, less than about 60 mm, less than about 70 mm, less than about 80 mm, less than about 90 mm, less than about 100 mm. In some embodiments, said orifices have a diameter of more than about 1 mm, more than about 2 mm, more than about 5 mm, more than about 10 mm, more than about 20 mm, more than about 30 mm, more than about 40 mm, more than about 50 mm, more than about 60 mm, more than about 70 mm, more than about 80 mm, more than about 90 mm, more than about 100 mm. In some embodiments, said pipes have a diameter of about 1 mm to about 2 mm, from about 2 mm to about 4 mm, from about 4 mm to about 10 mm, from about 10 mm to about 20 mm. In some embodiments, said orifices have a length of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm, less than about 200 cm, less than about 500 cm, less than about 10 m. In some embodiments, said orifices have a length of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, more than about 80 cm, more than about 90 cm, more than about 100 cm, more than about 200 cm, more than about 500 cm, more than about 10 m. In some embodiments, said orifices have a length of about 1 cm to about 2 cm, from about 2 cm to about 4 cm, from about 4 cm to about 10 cm, from about 10 cm to about 20 cm, from about 20 cm to about 50 cm, from about 50 cm to about 100 cm, from about 100 cm to about 200 cm, from about 200 cm to about 10 m.

In some embodiments, pipes, orifices, and flow distribution surfaces are configured to direct a flow of a liquid resource through the one or more filter plates and out of said one or more filter plates, wherein the sorbent material contained in said filter plate selectively absorbs lithium. In some embodiments, pipes, orifices, and flow distribution surfaces are configured to uniformly distribute the flow of liquid through the sorbent material contained in the filter plate. In some embodiments, said flow uniformity implies that each volume of sorbent material within the filter plate is contacted with the same volume of liquid resource within a given time period. In some embodiments, uniform distribution of flow through the sorbent material results in a higher lithium absorption capacity of the sorbent, a higher selectivity for lithium absorption by the sorbent over other ions present in the liquid resource, a minimized distance required to flow the liquid through the one or more filter plates, a reduced change in pressure when flowing liquid across the one or more filter plates, a longer life time of the sorbent, a longer life time of the ion-exchange material, or a combination thereof.

In some embodiments, the devices, vessels, system, and methods described herein utilize a flow distribution compartment to optimize the flow of various solutions or gases through the devices, vessels, pipes, filter plates, and lithium-selective sorbents materials. In some embodiments, the inlet- and outlet flows to and from the flow distribution compartments are injected and remove from the internal space of said compartments by means of piping, tubing, or other internal components that protrude into said compartment. In some embodiments, the inlet- and outlet flows to and from the flow distribution compartments are injected and remove from the internal space of said compartments by means of piping, tubing, or other internal components that protrude into said compartment In some embodiments, the flow distribution compartment are optionally treated with a lithium containing resource, hydrogen ion-containing acid, water, or other solutions for the purposes of adjusting the concentration, composition, pH, or contaminant level of the fluid flowing through the vessel. This is achieved by means of an optional inlet- and outlet-flows to and from the flow distribution compartment.

In some embodiments, the porous partition, fluid conduits, fluid orifices, and flow distribution surfaces, are assembled to form a filter plate. An example of such a filter plates is shown in FIG. 2B.

In some embodiments, said filter plates contain structural supports that allow said plates to be mounted within a larger lithium extraction device. In some embodiments, solid filter plates comprise a compartment containing a lithium-selective sorbent or ion-exchange material. In some embodiments, multiple filter plates are found within a single lithium extraction device, such that they form a stack of filter plates. In some embodiments said stack of filter plates is formed into a filter press In some embodiments, said filter press is oriented vertically, horizontally, or slanted with respect to the ground.

In some embodiments, the bed of ion exchange material is contained within said filter bank. In some embodiments, the bed of lithium selective sorbent is contained within said filter bank. In some embodiments, said bed of ion exchange material has a characteristic "thickness", wherein "thickness" is defined as the average dimension of the said solid mass, measured in a direction that is parallel to the direction of fluid flow through the filter bank.

In some embodiments, the typical thickness of the chamber containing solids between filter plates is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the chamber containing solids between filter plates is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the chamber containing solids between filter plates is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m. In a preferred embodiment, the typical thickness of the chamber containing solids between filter plates is selected from 18 mm, 25 mm, 32 mm, 40 mm, 50 mm, or 60 mm.

In some embodiments, the chamber holds a maximum volume of solids, this is the maximum volume of lithium selective sorbent that can be contained within each filter bank. In some embodiments, said volume is less than about 1 mL, less than about 10 mL, less than about 100 mL, less than about 1 L, less than about 10 L, less than about 100 L, less than about 1 cubic meter, less than about 10 cubic meters. In some embodiments, said volume is more than about 1 mL, more than about 10 mL, more than about 100 mL, more than about 1 L, more than about 10 L, more than about 100 L, more than about 1 cubic meter, more than about 10 cubic meters. In some embodiments, said volume is from about 0.1 mL to about 1 mL, from about 1 mL to about 10 mL, from about 10 mL to about 100 mL, from about 100 mL to about 1 L, from about 1 L to about 10 L, from about 10 L to about 100 L, from about 100 L to about 1 cubic meter, from about 1 cubic meter to about 10 cubic meters, from about 10 cubic meters.

In some embodiments, the porous partition in the chamber comprises a fixed surface area per chamber. In some embodiments, said area is less than about 1 $cm^2$, less than about 10 $cm^2$, less than about 100 $cm^2$, less than about 1,000 $cm^2$, less than about 1 $m^2$, less than about 10 $m^2$, less than about 100 $m^2$, less than about 1000 $m^2$. In some embodiments, said volume is more than about 1 $cm^2$, more than about 10 $cm^2$, more than about 100 $cm^2$, more than about 1,000 $cm^2$, more than about 1 $m^2$, more than about 10 $m^2$, more than about 100 $m^2$, more than about 1000 $m^2$. In some embodiments, said volume is from about 0.1 $cm^2$ to about 1 $cm^2$, from about 1 $cm^2$ to about 10 $cm^2$, from about 10 $cm^2$ to about 100 $cm^2$, from about 100 $cm^2$ to about 1,000 $cm^2$, from about 1,000 $cm^2$ to about 1 $m^2$, from about 1 $m^2$ to about 10 $m^2$, from about 10 $m^2$ to about 100 $m^2$, from about 100 $m^2$ cubic meter to about 1,000 $m^2$.

In some embodiments, the bed of ion exchange material is contained between two filter plates. In some embodiments, said bed of ion exchange material has a characteristic "cross sectional length" of said bed, defined as the average dimension of the said solid mass, measured in a direction that is perpendicular to the direction of fluid flow through the filter bank. In some embodiments, the cross-sectional length of said bed is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the cross-sectional length of said bed is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the cross-sectional length of said bed is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m. In a preferred embodiment, the cross-sectional length is selected from: about 250 mm, 320 mm, 470 mm, 630 mm, 800 mm, 1000 mm, 1200 mm, 1500 mm, 2000 mm, 4000 mm. In some embodiments, the bed of sorbent material is not square, and comprises a cross-sectional length that is selected from two of the following dimensions: about 250 mm, 320 mm, 470 mm, 630 mm, 800 mm, 1000 mm, 1200 mm, 1500 mm, 2000 mm, 4000 mm. In a preferred embodiment, the cross-sectional length of the bed of lithium-selective sorbent is 2000 mm×4000 mm, 1500 mm×2000 mm, 2500 mm by 5000 mm, or a combination thereof.

In some embodiments, the device containing ion-exchange beads is comprised of multiple and separate ion-exchange compartments arranged within a single vessel. In some embodiments, the lithium extraction device comprises multiple and separate lithium extraction compartments arranged within a single vessel. In some embodiments, the lithium extraction devices comprises multiple individual filter banks—each containing an individual lithium-selective sorbent compartment—where lithium is absorbed by said lithium selective sorbent. In some embodiments, said compartments comprise individual filter banks. In some embodiments, said multiple compartments comprise the filter chambers contained between filter plates in a filter press. In some embodiments, there is more than one lithium extraction compartments lithium extraction device. In some embodiments, there are less than about two, less than about three, less than about five, less than about ten, less than about twenty, less than about thirty, less than about fifty, less than about one-hundred, less than about two-hundred individual compartments within a single lithium extraction device. In some embodiments, there are more than about two, more than about three, more than about five, more than about ten, more than about twenty, more than about thirty, more than about fifty, more than about one-hundred, more than about two-hundred individual compartments within a single lithium extraction device. In some embodiments, a single lithium extraction device comprises about two, about three, about five, about ten, about twenty, about thirty, about fifty, about one-hundred, about one hundred and fifty, or about two-hundred individual lithium extraction compartments.

In some embodiments, the multiple filter banks are held together by a device that applies a mechanical force that presses the individual filter banks together. In some embodiments, said device comprises a hydraulic system, comprising one more pistons and one or more devices to apply a hydraulic force on said piston. In some embodiments, the mechanical force is applied to one structurally reinforced component that is in contact with the first plate in the stack of filter banks, and the compressive force is distributed across all filter plates in the device. In some embodiments, said force is applied by means of a pressurized hydraulic fluid system, pressurized air system, mechanical tensions system, or combinations thereof. In some embodiments, the pressure applied to compress all filter bank together is less than 50 psi, less than 150 psi, less than 500 psi, less than 1000 psi, less than 2500 psi, or less than 5000 psi. In some embodiments the pressure applied is more than 50 psi, more than 150 psi, more than 500 psi, more than 1000 psi, more than 2500 psi, or more than 5000 psi. In some embodiments, the pressure applied is from 50 psi to 150 psi, from 150 psi to 500 psi, from 500 psi to 1000 psi, from 1000 psi to 2500 psi, from 2500 psi to 5000 psi.

In devices comprising multiple beds of lithium-selective sorbent, all beds are connected to a shared flow distribution manifold, such that flow of liquid to and from said beds of lithium-selective sorbent occur in parallel. In some embodiments, a multitude of ion-exchange beds share the same inlet and outlet flows in parallel, wherein a different multitude of ion-exchange beds share a different set of inlet and outlet flows.

In some embodiments, the filter press comprises filter plates. In some embodiments, filter plates comprise structures, flow distributors, orifices, fluid conduits, fluid conducts, membranes, structural supports, and any other component that is required for the assembly of a filter bank. In some embodiments, two filter plates are assembled together to form a filter bank between them, wherein said filter bank contains a space or chamber that can be loaded with a lithium-selective sorbent. An example of such an assembly is shown in FIG. 2; two opposing filter plates 204 come together to form a single filter bank comprising a bed of lithium-selective sorbent 215. In some embodiments, said filter plates are chamber filter plates. In some embodiments, said filter plates are recessed chamber filter plates. In some embodiments, said filter plates are diaphragm squeeze filter plates. In some embodiments said filter plates are chosen from, but not limited to, one or more of the following types of filter plates commonly known in the field of the art: recessed, chamber recessed chamber, plate-and-frame, membrane squeeze, diaphragm squeeze, flush plate and frame, mineral plates, gasketed, non-gasketed, mixtures thereof or combinations thereof. In some embodiments, said filter plates are constructed out of a metal, stainless steel, carbon steel, titanium, Hastelloy, nickel, Inconel, Monel, tantalum, alloys thereof, or mixtures thereof. In some embodiments, said filter plates are constructed out of polymer, a fluoropolymer, polyether ether ketone (PEEK), acrylonitrile butadiene styrene (ABS), nylon, polycarbonate, polyurethane, polyethylene terephthalate, polybutylene terephthalate, polyethylene, polypropylene, high-density polyethylene, polyphenylene sulfide, tetrapolyethylene, PVDF, EPDM, Viton, rubber, Bunna-N, natural rubber, mixtures thereof, or combinations thereof. In some embodiments, multiple plates described above are stacked in such a manner so as to form a multitude of parallel filter banks, shown in FIG. 2A. In some embodiments, the assembled filter banks constitute a filter press, and said filter press is used to contain a lithium-selective sorbent and used to extract lithium. In some embodiments, there is more than one filter plate in said filter press. In some embodiments, there are less than about two, less than about three, less than about five, less than about ten, less than about twenty, less than about thirty, less than about fifty, less than about one-hundred, less than about two-hundred individual filter plates in said filter press. In some embodiments, there are more than about two, more than about three, more than about five, more than about ten, more than about twenty, more than about thirty, more than about fifty, more than about one-hundred, more than about two-hundred filter plates in said filter press. In some embodiments, a single lithium extraction device comprises about two, about three, about five, about ten, about twenty, about thirty, about fifty, about one-hundred, about one hundred and fifty, or about two-hundred filter plates in said filter press.

In some embodiments, the filter press comprises filter plates equipped with a membrane squeeze feature. In some embodiments, the filter press comprises membrane filter plates. In some embodiments, said membrane filter plates comprise one or more components that are deformed or expanded after the filter bank is filled with the lithium selective sorbent, in a manner that applies a compressive or "squeezing" force on said sorbent. Said deformable components are optionally referred to as a "membrane". In some embodiments, said compression results in additional compaction of the bed of lithium-selective sorbent. In some embodiments, said compression increases the uniformity of the bed of lithium-selective sorbent. In some embodiments, said compression results in improved uniformity of flow when contacting said lithium-selective sorbent with a liquid stream. In some embodiments, said compression is applied continually during operation of the lithium-extraction device. In some embodiments, said compression is applied intermittently during operation of the lithium-extraction device.

In some embodiments, the expandable membrane component that applies mechanical compression or "squeezing" on the sorbent comprises the flow distribution compartment or surface. An example of such a compartment is shown in FIG. 2C. A flow distribution compartment exists between the structure surface 213 and the porous partition 214. Surface 13 is flexible, such that hydraulic fluid or air can be injected into chamber 212 by means of a hydraulic fluid or air distribution system, thereby "inflating" 213 towards sorbent 205. In the field of the art, such an operating may be denoted as a membrane squeeze. In some embodiments, the membrane comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium poly acrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In some embodiments, a filter cake of lithium selective sorbent is held within said filter bank, wherein said cake is formed by flowing a suspension of said sorbent through said filter bank.

In some embodiments, the pressure applied to deform the membrane is less than 5 psi, less than 25 psi, less than 50 psi, less than 100 psi, less than 150 psi, less than 250 psi, or less than 500 psi. In some embodiments, the pressure applied to deform the membrane component of the filter bank is more than 5 psi, more than 25 psi, more than 50 psi, more than 100 psi, more than 150 psi, more than 250 psi, or more than 500 psi. In some embodiments, the pressure applied to deform the membrane component of the filter bank is from about 1 psi to about 5 psi, from about 5 psi to about 25 psi, from about 25 psi to about 50 psi, from about 50 psi to about 100 psi, from about 100 psi to about 150 psi, from about 150 psi to about 250 psi, from about 250 psi to about 500 psi. In some embodiments, the pressure applied to deform the membrane component of the filter bank remains constant during operation of the lithium extraction device. In some embodiments, the pressure applied to deform the membrane component of the filter bank is varied during operation of the lithium extraction device. In some embodiments, the pressure applied to deform the membrane component of the filter bank is applied after said filter bank is loaded with said sorbent, and then released. In some embodiments, the pressure applied to deform the membrane component of the filter bank is applied after said filter bank is loaded with said sorbent, and then maintained during all subsequent operations. In some embodiments, the pressure applied to deform the membrane component of the filter bank is applied when the lithium-selective sorbent is contacted with a liquid resource comprising lithium. In some embodiments, the pressure applied to deform the membrane component of the filter bank is applied when the lithium-selective sorbent is contacted with an acidic eluent that releases lithium form said sorbent. In some embodiments, the pressure applied to deform the membrane component of the filter bank is applied during washing of the lithium-selective sorbent with a washing solution. In some embodiments, the pressure applied to deform the membrane component of the filter bank is applied without a liquid stream being in contact with the lithium selective sorbent.

In some embodiment, the pressure on the deformable flow distribution surface is applied by means of compressed air or a compressed liquid. In some embodiment, the pressure on the deformable flow distribution surface is applied by a hydraulic system. In some embodiment, the pressure on the deformable flow distribution surface is applied by a mechanical device, such as a piston.

In some embodiments, the pressure thus applied on the bed of lithium selective sorbent decreases the volume of said bed. In some embodiments, the pressure thus applied on the bed of lithium selective sorbent decreases the volume of said bed by about 0.01%, by about 0.1%, by about 1%, by about 5%, by about 10%, by about 25%, by about 50%, by about 75%, or by about 100%. In some embodiments, the pressure thus applied on the bed of lithium selective sorbent decreases the volume of said bed by more than about 0.01%, by more than about 0.1%, by more than about 1%, by more than about 5%, by more than about 10%, by more than about 25%, by more than about 50%, by more than about 75%, or by more than about 100%. In some embodiments, the pressure thus applied on the bed of lithium selective sorbent decrease s the volume of said bed by less than about 0.01%, by less than about 0.1%, by less than about 1%, by less than about 5%, by less than about 10%, by less than about 25%, by less than about 50%, by less than about 75%, or by less than about 100%. In some embodiments, the pressure thus applied on the bed of lithium selective sorbent decreases the volume of said bed from about 0.01% to about 0.1%, from about 0.1% to about 1%, from about 1% to about 5%, from about 5% to about 10%, from about 10% to about 25%, from about 25% to about 50%, from about 50% to about 75%, from about 75% to about 100%.

In some embodiments, said deformable components or membrane are welded to the rest of the filter bank. In some embodiments, said components are replaceable. In some embodiments, said components are manufactured of the same material as the rest of the filter bank. In some embodiments, said components are manufactured of a different material from the rest of the filter bank.

In some embodiments, the deformable component applies pressure on the bed of lithium-selective sorbent from one side of said bed. In some embodiments, the deformable component applies pressure on the bed of lithium-selective sorbent from both sides of said bed. In some embodiments, the deformable component applies pressure on the bed of lithium-selective sorbent from multiple directions. In some embodiments, the direct from which pressure is applied varies with time. In some embodiments, the direct from which pressure is applied depends on the fluid which is being contacted with the lithium-selective sorbent. In some embodiments, the deformable component is a membrane.

In some embodiments, the lithium selective sorbent is loaded into the lithium extraction device. In some embodiments, said lithium-selective sorbent is an ion exchange material. In some embodiments, the lithium selective sorbent is loaded into the lithium extraction device, and pressure is applied on the loaded sorbent using the deformable component in the filter bank. In some embodiments, the lithium selective sorbent is loaded into the lithium extraction device, and the loaded sorbent is squeezed using a membrane in said filter bank. In some embodiments, said pressure is applied on the loaded sorbent after initial loading of said sorbent, and then released. In some embodiments, said pressure is applied on the loaded sorbent during the entire operation of said device for lithium extraction, during certain periods of said operation. In some embodiments, said pressure is applied on the loaded sorbent when said sorbent absorbs lithium from a liquid resource. In some embodiments, said pressure is applied on the loaded sorbent when said sorbent releases the absorbed lithium to produce an acidic eluent solution. In some embodiments, said pressure is applied on the loaded sorbent when said sorbent is being washed with a wash solution. In some embodiments, said pressure is applied on the loaded sorbent when said sorbent is contacted with water. In some embodiments, said pressure is applied on the loaded sorbent when said sorbent is contacted with a gas.

In some embodiments, the lithium selective sorbent is loaded into the lithium extraction device. In some embodiments, in order to load said sorbent into the device, the lithium selective sorbent is suspended in a fluid within a vessel. For the purposes of this disclosure, suspension of a solid in a liquid is also termed "fluidization", or fluidization of said solids. In some embodiments, said fluid is water, a liquid resource containing lithium, a brine, an acidic eluent solution, an acidic solution, or a mixture thereof. In some embodiments, said fluid is a gas flown in a manner that fluidizes the sorbent. In some embodiments, the sorbent is suspended in a liquid by agitating sorbent in said liquid, such that the solids are distributed uniformly or non-uniformly throughout the fluid. In some embodiments, the distribution of solids in said fluid allows for the solids to be conveyed out of the vessel where it is contained. In some embodiments, suspension of said solids occurs by agitation of solid solids and said fluid, wherein agitation occurs with a mechanical agitator, an eductor, fluid recirculation, baffles, shaking, tapping or a combination thereof. In some embodiments, the fluidization of said ion exchange material occurs by means of contact with one or more gases phases. In some embodiments, the fluidization of said ion exchange material occurs by means of contact with a liquid resource, a wash solution, an acidic solution, one or more alternate phases or combinations thereof. In some embodiments, said ion exchange material is fluidized during contact with said liquid resource. In some embodiments, said ion exchange material is fluidized during contact with said acidic solution. In some embodiments, said ion exchange material is fluidized during contact with said alternate phase. In some embodiments, said ion exchange material is fluidized during contact with said wash solution.

In some embodiments, initial fluidization of the solids is aided by contacting a pressurized gas with said solid sorbent and said fluid. In some embodiments, said aiding occurs by the additional turbulence and break up of the consolidated solids at the bottom of the vessel where said solids are stored. In some embodiments, said gas is air, nitrogen, argon, oxygen, chlorine, a different gas, or a combination thereof. In some embodiments, injection of said gas for contact with the solid and fluid occurs through one or more of a pipe, tubing, channels, slits, beams, baffles, baskets, scallops, nozzles, or a mesh. In some embodiments, the components that direct flow within the vessel are perforated. In some embodiments, the openings or perforations in the components that distribute flow are shaped as circles, ovals, vertical or horizontal slits, squares, crosses, rectangles, triangles, irregular shapes, or a combination thereof.

In some embodiments, flow of the gas occurs from the top to the bottom of the vessel. In some embodiments, flow of the gas occurs from the bottom to the top of the vessel. In some embodiments, flow of the gas occurs from the inside to the outside of the vessel. In some embodiments, flow of the gas occurs from the outside to the inside of the vessel.

In one embodiment, the vessel has an internal nozzle designed to distribute flow of the gas evenly. In one embodiment, the vessel has nozzles placed equidistant with each other on a support plate. In one embodiment the nozzles are spaced out so that each nozzle covers the same area. In one embodiment the nozzles have slits or holes of width of less than 0.1 µm, less than 1 µm, less than 10 µm, less than 100 µm, or less than 1 mm. In one embodiment, the vessel has mesh with holes less than 0.1 µm, less than 1 µm, less than 10 µm, less than 100 µm, or less than 1000 µm. In some embodiments, the openings or perforation in one or more for the flow distribution components, such as pipes, tubing, channels, slits, beams, baffles, baskets, scallops, nozzles, or a mesh, have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings or perforation in one or more for the flow distribution components have a dimension of less than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings or perforation in one or more for the flow distribution components have a dimension of less than about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, a gas is contacted with the lithium selective sorbent for more than about 10 milliseconds, more than about 100 milliseconds, more than about 1 second, more than about 10 seconds, more than about 100 seconds, more than about 1 minute, more than about 10 minutes, more than about 100 minutes, more than about 1 hour, more than about 10 hours, more than about 100 hours. In some embodiments, an gas is contacted with the ion exchange beads for less than about 10 milliseconds, less than about 100 milliseconds, less than about 1 second, less than about 10 seconds, less than about 100 seconds, less than about 1 minute, less than about 10 minutes, less than about 100 minutes, less than about 1 hour, less than about 10 hours, less than about 100 hours. In some embodiments, an gas is contacted with the ion exchange beads from about 10 milliseconds to about 100 milliseconds, from about 100 milliseconds to about 1 second, from about 1 second to about 10 seconds, from about 10 seconds to about 100 seconds, from about 100 seconds to about 1 minute, from about 1 minute to about 10 minutes, from about 10 minutes to about 100 minutes, from about 1 hour to about 10 hours, from about 10 hours to about 100 hours.

In some embodiments, a gas is injected to contact lithium selective sorbent at a pressure of more than about 0.1 psi, more than about 1 psi, more than about 5 psi, more than about 10 psi, more than about 50 psi, more than about 100 psi, more than about 500 psi, more than about 1000 psi, more than about 500 psi, more than about 1000 psi. In some embodiments, an gas is injected to contact the ion exchange beads at a pressure of less than about 0.1 psi, less than about 1 psi, less than about 5 psi, less than about 10 psi, less than about 50 psi, less than about 100 psi, less than about 500 psi, less than about 1000 psi, less than about 500 psi, less than about 1000 psi. In some embodiments, an gas is injected to contact the ion exchange beads at a pressure from about 0.1 psi to about 5 psi, from about 5 psi to about 10 psi, from about 10 psi to about 50 psi, from about 50 psi to about 100 psi, from about 100 psi to about 500 psi, from about 500 psi to about 1000 psi, from about 1000 psi to about 5000 psi, from about 5000 psi to about 10,000 psi. In some embodiments, the suspended lithium selective sorbent is loaded into the lithium extraction device.

In some embodiments, the suspended sorbent is conveyed from the vessel described above and into a filer press. In some embodiments, conveyance of said suspension occurs by use of a mechanical device. In some embodiments, said mechanical device comprises a double-diaphragm pump, and air operated double-diaphragm pump, a diaphragm pump, a positive displacement pump, a centrifugal pump, a vortex pump, a slurry pump, or combinations thereof. In some embodiments, said suspension is conveyed from said vessel and into said ion exchange device by pressurizing the top of said vessel, such that the liquid suspension is forced by pressure-driven flow to exist said vessel through a pipe. In some embodiments, said suspension is conveyed from said vessel and into said ion exchange device by suction applied at the outlet of said lithium extraction device.

In some embodiments, the suspension of sorbent that is loaded into the ion exchange device has a solids content of less than about 0.001% v/v (solids volume per total solution volume), of less than about 0.01% v/v, of less than about 0.1% v/v, of less than about 1% v/v, of less than about 10% v/v, of less than about 50% v/v, of less than about 75% v/v, of less than about 100% v/v. In some embodiments, the suspension of sorbent that is loaded into the ion exchange device has a solids content of more than about 0.001% v/v (solids volume per total solution volume), of more than about 0.01% v/v, of more than about 0.1% v/v, of more than about 1% v/v, of more than about 10% v/v, of more than about 50% v/v, of more than about 75% v/v. In some embodiments, the suspension of sorbent that is loaded into the ion exchange device has a solids content of from about 0.001% v/v (solids volume per total solution volume) to about 0.01% v/v, from about 0.01% v/v to about 0.1% v/v, of from about 0.1% v/v to about 1% v/v, of from about 1% v/v to about 10% v/v, of from about 10% v/v to about 50% v/v, of from about 50% v/v to about 75% v/v, of from 75% v/v to about 100% v/v. In some embodiments, the suspension of sorbent is a thick suspension. In some embodiments, said suspension of sorbents is a slurry.

In some embodiments, the said suspension of sorbent is conveyed into the filter press via a pipe. In some embodiments, said suspension of sorbent is conveyed into filter press through one inlet port. In some embodiments, said suspension of sorbent is conveyed into said lithium extraction device through one or more inlet ports. In some embodiments, said suspension of sorbent is conveyed into said lithium extraction device through two inlet ports. In some embodiments, said suspension of sorbent is conveyed into said lithium extraction device through two inlet ports that are connected to opposite ends of the lithium extraction device. In some embodiments, one or more of said inlet ports connect to a common piping system that is in fluid contact with all filter banks within said lithium extraction device.

In some embodiments, one or more of said inlet ports connect to a common piping system that is in fluid contact with all filter banks within said lithium extraction device. In some embodiments, one or more of said inlet ports connect to a common conduit or piping system that is in fluid contact with all filter banks within said lithium extraction device. An example of a fluid conduit is shown in FIG. 2: Conduit 210 spans the entire stack of filter banks at their center, and is connected to a fluid inlet port at the end of the device (216). In some embodiments, the location of the fluid conduit for said suspension is the same in all filter banks across the entire device. In some embodiments, the location of the fluid conduit for said suspension is the different in different filter banks that comprise said device. In some embodiments, the location of the fluid conduit for the sorbent is above the filter bank, below the filter bank, or off to one of the sides of the filter bank.

In some embodiments, the outlet of the conduit for conveyance of sorbent into individual filter bank is dictated by the location of the slurry inlet port in a filter plate. For the purposes of this description, the center of the filter bank is the center of symmetry of said filter bank when observed in the direction of normal fluid flow through said bed. In some embodiments, said conduit is located at the center of the filter plate. In some embodiments, said conduit is located off-center from the center of the filter plate, wherein off-center implies a location in any of the radial directions from said center. In some embodiments, the ratio (distance from the center of said filter plate to the slurry inlet) to (distance from the center of plate to the edge of said plate) is less than about 0.1, less than about 0.25, less than about 0.4, less than about 0.5, less than about 0.75, less than about 0.9. In some embodiments, the ratio In some embodiments, the ratio (distance from the center of said filter plate to the slurry inlet) to (distance from the center of plate to the edge of said plate) is more than about 0.1, more than about 0.25, more than about 0.4, more than about 0.5, more than about 0.75, more than about 0.9. In some embodiments, the ratio (distance from the center of said filter plate to the slurry inlet) to (distance from the center of plate to the edge of said plate)

is from about 0.01 to about 0.1, from about 0.1 to about 0.25, from about 0.25 to about 0.4, from about 0.4 to about 0.5, from about 0.5 to about 0.75, from about 0.75 about 0.9. In some embodiments, the outlet of the conduit for conveyance of sorbent into individual filter bank is located within said filter plate towards the top, bottom, side, or corner of said filter bed. In some embodiments, the outlet of the conduit for conveyance of sorbent into individual filter bank is outside said filter bank. In some embodiments, the outlet of the conduit for conveyance of sorbent into individual filter bank is located outside the bed of sorbent, at the top, bottom, side, or corner of the lithium extraction device but outside of the bed of sorbent, wherein bed of sorbent is defined as the sorbent that absorbs lithium during operation of the device.

In some embodiments, as the suspension of sorbent is conveyed into the device and into the filter banks, the suspension flows into the compartment within the filter bank, and the solids are retained within said compartment by the filter cloth or porous partition; the fluid flows across said partition, into the flow distribution chamber, and out of the filter bank through orifices and pipes. As described herein, each filter bank comprises one or more porous partitions. In some embodiments, fluid flows out of said filter bank through one of said porous partitions. In some embodiments, fluid flows out of said filter bank through two of said porous partitions. In some embodiments, fluid flows out of said filter bank through one or more of said porous partitions, and out of one of the pipes that connect said filter bank to the rest of the lithium extraction device. In some embodiments, fluid flows out of said filter bank through one or more of said porous partitions, and out of two of the pipes that connect said filter bank to the rest of the lithium extraction device. In some embodiments, fluid flows out of said filter bank through one or more of said porous partitions, and out of three of the pipes that connect said filter bank to the rest of the lithium extraction device. In some embodiments, fluid flows out of said filter bank through one or more of said porous partitions, and out of four of the pipes that connect said filter bank to the rest of the lithium extraction device. In some embodiments, fluid flows out of said filter bank through one or more of said porous partitions, and out of more than of one of the pipes that connect said filter bank to the rest of the lithium extraction device.

In some embodiments the lithium extraction device comprising a filter press has a single inlet for conveyance of the suspension of sorbent into said filter press; such a configuration of a filter press is called a "single end feed" filter press. In some embodiments the lithium extraction device comprising a filter press has two inlets for conveyance of the suspension of sorbent into said filter press, located at opposite ends of the device; such a configuration of a filter press is called a "double-end feed" filter press.

In some embodiments, the bed of sorbent within said filter bank is filled with sorbent until the physical volume available in said filter bank is fully occupied by said sorbent. In some embodiments, the maximum fill level is determined based on the pressure required to pump the suspension of sorbent in fluid into said filter bank; when a certain pressure and pumping rate is reached, the filter banks are considered completely filled. In some embodiments, the filter banks are filled with sorbent until the pressure required to pump said suspended sorbent into said device is more than about 0.1 psi, more than about 1 psi, more than about 5 psi, more than about 10 psi, more than about 20 psi, more than about 50 psi, more than about 75 psi, more than about 100 psi, more than about 200 psi, more than about 500 psi. In some embodiments, the filter banks are filled with sorbent until the pressure required to pump said suspended sorbent into said device is less than about 0.1 psi, less than about 1 psi, less than about 5 psi, less than about 10 psi, less than about 20 psi, less than about 50 psi, less than about 75 psi, less than about 100 psi, less than about 200 psi, less than about 500 psi. In some embodiments, the filter banks are filled with sorbent until the pressure required to pump said suspended sorbent into said device is from about 0.1 psi to about 5 psi, from about 5 psi to about 10 psi, from about 10 psi to about 20 psi, from about 20 psi to about 50 psi, from about 50 psi to about 100 psi, from about 100 psi to about 250 psi, from about 250 psi to about 500 psi, from about 500 psi to about 1000 psi.

In some embodiments, the filter banks are filled with sorbent until the rate at which the suspended sorbent is pumped into said device is less than about 0.1%, less than about 1%, less than about 10%, less than about 50%, or less than about 75% of the initial rate at which the suspended sorbent is pumped into said device (when said device is empty). In some embodiments, the filter banks are filled with sorbent until the rate at which the suspended sorbent is pumped into said device is more than about 0.1%, more than about 1%, more than about 10%, more than about 50%, or more than about 75% of the initial rate at which the suspended sorbent is pumped into said device (when said device is empty). In some embodiments, the filter banks are filled with sorbent until the rate at which the suspended sorbent is pumped into said device is from about 0.01% to about 0.1%, from about 0.1% to about 1%, from about 1% to about 10%, from about 10% to about 50%, from about 50% to about 75% of the initial rate at which the suspended sorbent is pumped into said device (when said device is empty).

In some embodiments, such a device is constructed by using a series of filter banks wherein the filters contain ion exchange beads, as exemplified in examples 1 and 9, and associated figures. In some embodiments, such a device is constructed where multiple ion-exchange compartments are arranged vertically or horizontally. In some embodiments, such filter banks are separated to load and unloaded the ion exchange beads. In some embodiments, the ion exchange beads are conveyed into the filter banks as a slurry to load the ion exchange beads into the ion exchange vessel. In some embodiments, loading of the ion exchange beads occurs in the same direction, opposite direction, orthogonal direction, or other direction relative the normal direction of flow during the ion exchange process. In some embodiments, the tension holding the filter bank together is increased, decreased, or maintained during the ion exchange process.

In some embodiments, ion-exchange compartments are added or removed from the vessel by mechanical means, such that the number of ion-exchange compartments are adjusted. In some embodiments, ion-exchange compartments and their components are mechanically separated to clean out, replace, and fill in compartments and partitions between compartments.

In one embodiment, the ion exchange compartment within each ion-exchange compartment is partially filled with ion exchange beads, such that ion exchange beads freely move within their containing compartment during contacting with fluid. In some embodiments, the ion exchange compartment is filled to its capacity with ion exchange beads, such that ion exchange beads are fixed in place and cannot freely move within the containing compartment during contacting with fluid. In one embodiment, the ion exchange compartment is partially filled, and becomes completely filled by the change in volume of ion exchange beads that occurs when contacting said beads with certain fluids. In some embodiments, the ion exchange compartment is configured such that ion exchange beads may enter and leave the ion-exchange compartment conveyed by the fluid which they are contacting, in the top-down or down-top direction. In one embodiment, the ion exchange beads may be loaded into and unloaded from said compartments through the top or bottom of the compartments, through the sides, or by mechanically separating and opening the ion-exchange compartment to expose the compartment and subsequently filling said compartment with ion-exchange beads.

In some embodiments, the typical length of the vessel containing the ion-exchange compartments is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the said vessel is more than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of said vessel is from about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the devices, vessels, system, and methods described herein utilize a flow distribution compartment to optimize the flow of various liquids, solutions or gases through the devices, vessels, and systems. In some embodiments, the flow distribution compartment is an inner flow distribution compartment and/or outer flow distribution compartment. In one embodiment, the flow distribution compartment and/or ion-exchange bead compartment is empty, partially filled, or fully filled with fluid, or a combination thereof. In some embodiments, the flow distribution compartment and/or ion-exchange bead compartment are cylindrical, rectangular, irregular, or a combination thereof. In some embodiments, the flow distribution compartment has a constant cross-sectional area or a varying cross-sectional area.

In some embodiments, the filter banks comprise one or more flow distribution compartments. In some embodiments, the filter bank comprise two flow distribution compartments. In some embodiments, said flow distribution compartments comprise a flow distribution surface. In some embodiments, said flow distribution compartment comprises inlet orifices, a void, and a permeable partition. In some embodiments, said void is formed between the porous partition and the flow distribution surface. In some embodiments, said flow distribution surface comprises a textured surface. Examples of flow distribution compartments within filter banks are shown in FIGS. 2, 3, 4, 5, and 6. FIG. 2 Shows a textured surface 213, which is immediately adjacent to porous partition 214, such that said porous partition can be in physical contact with flow distribution surface 213, yet a void between these two persists because of the protruding textural features. In this embodiment, the void between surface 213 and porous partition 214 is the flow distribution compartment. In this embodiment, when fluid enters the filter bank 2081, the void in this flow distribution compartment enables the fluid to flood the entire surface of the bed of sorbent material 205, and subsequently flow across said bed as shown by arrows 217. The side of the bed of sorbent material that receives this flow of fluid comprises a similarly constructed flow distribution chamber, wherein said void space enables the fluid to exit unobstructed form the bed of sorbent, and out of the filter bank through orifices 2071. The presence of this flow distribution surface thus enables uniform flow across the bed of lithium-selective sorbent, thereby resulting in its optimal performance for ion exchange.

In some embodiments, the uniformity of flow across the lithium selective sorbent can be further enhanced by mechanically compressing the sorbent-bed by a deformable flow distribution surface. In some embodiments, this deformable surface optionally comprises a membrane, as described herein. In some embodiments, pressure is applied in a chamber behind the flow distribution surface. In one embodiment shown in FIG. 2, said chamber is denoted 212. The pressure applied in 212, and therefore is translated as a mechanical compression onto the bed of sorbent 205. In a preferred embodiment, said pressure is from about 10 psi to about 225 psi. In one embodiment, compression removes inhomogeneities in bed 205 by forcing all solids to compress against each other. In this embodiment, the presence of the textured surface features on flow distribution surface 213 results in a void remaining between the porous partition 214 and flow distribution surface 213, such that fluid can be uniformly distributed to the entire surface of the bed of lithium-selective sorbent 205. In a preferred embodiment, the combination of such mechanical compression with a membrane and the construction of the flow distribution surface enables for most optimal flow distribution across the bed of lithium-selective sorbent, thereby resulting in its optimal performance for ion exchange.

In some embodiment, said mechanical compression is applied during fluid flow. In some embodiments, said mechanical compression is applied during loading of the sorbent into the filter bank, and is not applied during operation of the device as a lithium extraction device. In some embodiments, said compression is applied during contact with a liquid resource. In some embodiments, said compression is applied during contact with a wash solution. In some embodiments, said compression is applied during contact with an acidic eluent. In some embodiments, said compression is applied at different times, wherein the time between cycles of compression and release is constant, increases with time, decreases with time, varies sinusoidally, is non-uniform, or a combination thereof.

In some embodiments, the surfaces of filter plates contain surface features to allow for an even distribution of flow of fluid across the filter cloth and into out of the filter bank. One embodiment of said flow distribution surfaces was described above, as shown in FIG. 2 by flow distribution surface 213. In some embodiments, these surface features are shaped as circles, pips, ovals, hexagons, squares, rectangles, rectangular ovals, spheres, grooves, flat surfaces, uneven surfaces, stars, dimples, other geometric shapes, mixtures thereof, or combinations thereof. In some embodiments, said features have a protrusion from the surface of less than about 1 mm, less than about 2 mm, less than about 5 mm, less than about 10 mm, less than about 20 mm, less than about 30 mm, less than about 40 mm, less than about 50 mm, less than about 60 mm, less than about 70 mm, less than about 80 mm, less than about 90 mm, less than about 100 mm. In some embodiments, said features have a protrusion from the surface of more than about 1 mm, more than about 2 mm, more than about 5 mm, more than about 10 mm, more than about 20 mm, more than about 30 mm, more than about 40 mm, more than about 50 mm, more than about 60 mm, more than about 70 mm, more than about 80 mm, more than about 90 mm, more than about 100 mm. In some embodiments, said features have a protrusion from the surface of about 1 mm to about 2 mm, from about 2 mm to about 4 mm, from about 4 mm to about 10 mm, from about 10 mm to about 20 mm. In some embodiments, said features have a length of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm, less than about 200 cm, less than about 500 cm, less than about 10 m. In some embodiments, said features have a length of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, m ore than about 80 cm, more than about 90 cm, more than about 100 cm, more than about 200 cm, more than about 500 cm, more than about 10 m. In some embodiments, said features have a length of about 1 cm to about 2 cm, from about 2 cm to about 4 cm, from about 4 cm to about 10 cm, from about 10 cm to about 20 cm, from about 20 cm to about 50 cm, from about 50 cm to about 100 cm, from about 100 cm to about 200 cm, from about 200 cm to about 10 m.

In some embodiments, the shape of said flow distribution surface conforms to the shape of the filter bank. In some embodiments, the shape of said flow distribution surface conforms to the shape of the porous partition. In some embodiments, the shape of said flow distribution surface conforms to the shape of the sorbent cake or bed.

In some embodiments, the filter plates comprise structural supports, fasteners, beams, adhesives, compression fittings, gaskets or other structural components for fastening of all components of the filter bank. In some embodiments, the filter plates comprise pipes, tubes, conduits, conducts, and orifices that direct flow into individual filter banks.

In some embodiments, the filter press is constructed to facilitate the flow of a liquid through the filter bank. In some embodiments, such a liquid flow is enabled by the construction of the filter bank. In some embodiments, the filter plates are constructed to facilitate their manufacturing, while enabling facile assembly into a filter press comprising multiple filter banks. One embodiment of manufacturing of such a plate is shown in FIG. 2: two filter plates (204) come together to form a filter bank (215) which comprises a bed of lithium-selective sorbent (205). One other embodiment of such a plate is shown in FIG. 4: two types of filter plates, 404A and 404B are alternated to result in a filter bank (415) where the flow distribution surface is deformable from one side. Other such embodiments are described in Examples 1-6.

In some embodiments, the fluid conduits that deliver and remove fluid flow to and from the flow distribution compartments, chambers, and surfaces described above, are configured to uniformly distribute flow across the bed of lithium selective sorbent. In some embodiments, said fluid conduits comprise orifices.

One embodiments of such fluid conduits and their optimal flow distribution is described in FIG. 5 and Example 5. In this embodiment, orifices 5061, 5071, 5081, and 5091 connect to pipes that deliver process flows to and from the filter bank. In one embodiment, fluid flow into the filter bank through 5081, in distributed across the entire surface of the lithium selective sorbent bed by the flow distribution surface, and flows across the lithium selective sorbent as shown by arrows 517. In this embodiment, the device is operated such that flow out of the filter bank occurs through 5071. This corner to corner choice of inlets and outlets results in favorable hydrodynamics for fluid flowing cross the bed of lithium-selective sorbent. In less preferred embodiments, if the device were to be operated such that outlet flowed out of 5091, fluid would preferentially flow through the bottom portion of the bed, resulting in less uniform contact of the lithium selective sorbent with the liquid resource. In a preferred embodiment, inlet and outlet fluid flow ports in the filter bank are chosen such that inlet and outlet flows occur at opposite locations on the filter bank. In one embodiment, fluid flows are chosen such that inlet and outlet flow occur on the same side of the filter bank. In one embodiment, fluid flows are chosen such that inlet and outlet flow occur at the bottom of the filter bank. In one embodiment, fluid flows are chosen such that fluid flows to the bottom of the filter bank and out from the top of the filter bank. In one embodiment, fluid flows are chosen such that fluid flows to the top of the filter bank and out from the bottom of the filter bank. In one embodiment, fluid flows are chosen such that fluid flows to the left of the filter bank and out from the right of the filter bank. In one embodiment, fluid flows are chosen such that fluid flows to the right of the filter bank and out from the left of the filter bank. In one embodiment, fluid flows are chosen such that fluid flows to one corner of the filter bank and out from the opposing corner of the filter bank. In some embodiments, the configuration of flow is chosen to change with the type of process fluid being flown through the filter bank. In some embodiments, the configuration of flow varies with time.

In some embodiments, said fluid conduits connect to a pipe that delivers flow to and from each of the filter banks and filter plates in the filter press. In one embodiment, shown in example 2, orifices 2081 connect to pipe 208, orifices 2061 connect to pipe 206, orifices 2071 connect to pipe 207, orifices 2091 connect to pipe 209. In some embodiments, said pipe are connected to the rest of the lithium-extraction system through one process connection. In one embodiment, shown in example 2, said connection occurs on one end of the device (216). In some embodiments, such connection occurs on two ends of the device. In one embodiment, a pipe that distributes flow, such as pipe 207 shown in example 2, has process connections on opposite end of the device. In some embodiments, said pipe has process connections on both ends of the device, opposite to each other. In some preferred embodiments, this allows for said pipe to be used for both inlet and outlet flows to and from each of the filter banks. In some embodiments, when said pipe is an inlet, flow occurs from one end of the device; when said pipe is an outlet, flow is removed from the opposite end of the device.

In some embodiments, one such pipe in the device serves as an inlet, and a different pipe serves as an outlet. In some embodiments, the pipe that serves as an inlet is connected to one end of the device, while the pipe that serves as an outlet is connected to the opposite end of the device. Such an arrangement allows for uniform distribution of flow to each filter bank in the device, as pressure drops in inlet and outlet pipes are symmetrically compensated. With reference to FIG. 2, the device in said example can be modified to accommodate such flow configuration. In this embodiment, flow of a fluid occurs into a filter bank through pipe 208 and orifices 2081, pipe 208 is connected to one end of the device; this end is the end facing the viewer in FIG. 2. In this embodiment, flow of fluid out of a filter bank occurs through orifice 2071 and pipe 207; pipe 207 is connected to the opposite end of the device as pipe 208, this end being the end that is distal to the viewer in FIG. 2.

In some embodiments, the fluid flown in this manner is a liquid resource comprising lithium, such that the lithium-selective sorbent absorbs lithium from said liquid resource. In some embodiments, the fluid flown in this manner is a wash solution comprising water, such that entrained fluids are removed from the bed of lithium-selective sorbent. In some embodiments, the lithium selective sorbent is an ion exchange material and the fluid flown in this manner is an acidic eluent solution comprising protons, such that the lithium selective sorbent releases lithium while absorbing protons. In some embodiments, the fluid flown in this manner is water, such that the lithium selective sorbent releases lithium. In some embodiments, the flows described herein are alternated through the same ion exchange material that is held within the filter bank.

In some embodiments, the fluid flown is a liquid. In some embodiments, the flow rate of fluid through the bed of lithium selective sorbent in one filter bank is less than about 1 mL/min, less than about 10 mL/min, less than about 100 mL/min, less than about 1 L/min, less than about 10 L/min, less than about 100 L/min, less than about 1,000 L/min, less than about 10,000 L/min. In some embodiments, the flow rate of fluid through the bed of lithium selective sorbent in one filter bank is more than about 1 mL/min, more than about 10 mL/min, more than about 100 mL/min, more than about 1 L/min, more than about 10 L/min, more than about 100 L/min, more than about 1,000 L/min, more than about 10,000 L/min. In some embodiments, the flow rate of fluid through the bed of lithium selective sorbent in one filter bank is from about 1 mL/min to about 10 mL/min, from about 10 mL/min to about 100 mL/min, from about 100 mL/min to about 1 L/min, from about 1 L/min to about 10 L/min, from about 10 L/min to about 100 L/min, from about 100 L/min to about 1,000 L/min, from about 1,000 L/min to about 10,000 L/min.

In some embodiments, the fluid flown is a liquid. In some embodiments, the ratio of volume of lithium-selective sorbent to flow rate of fluid through the bed of lithium selective sorbent, which has units of time, indicates the characteristic contact time of fluid with the bed of lithium selective sorbent. In some embodiments, said characteristic contact time is less than about 1 second, less than about 10 seconds, less than about 1 minute, less than about 5 minutes, less than about 10 minutes, less than about 1 hours, less than about 10 hours, less than about 1 day. In some embodiments, said characteristic contact time is more than about 1 second, more than about 10 seconds, more than about 1 minute, more than about 5 minutes, more than about 10 minutes, more than about 1 hours, more than about 10 hours, more than about 1 day. In some embodiments, said characteristic contact time is from about 0.1 second to about 1 second, from about 1 second to about 10 seconds, from about 10 seconds to about 1 minute, from about 1 minute to about 5 minutes, from about 5 minutes to about 10 minutes, from about 10 minutes to about 1 hours, from about 1 hours to about 10 hours, from about 1 hours to about 1 day.

In some embodiments, the fluid flown is a liquid. In some embodiments, the ratio of volume of flow rate of fluid through the bed to the surface area of the bed, which has units of length per time, indicates the characteristic flux of fluid through the bed of lithium selective sorbent. In some embodiments, said characteristic flux is less than about 1 mm/min, less than 1 cm/min, less than about 10 cm/min, less than about 1 m/min, less than about 10 m/min, less than about 100 m/min. In some embodiments, the flow rate of fluid through the bed of lithium selective sorbent in one filter bank is more than about 1 mm/min, more than 1 cm/min, more than about 10 cm/min, more than about 1 m/min, more than about 10 m/min, more than about 100 m/min. In some embodiments, the flow rate of fluid through the bed of lithium selective sorbent in one filter bank is from about 0.1 mm/min to about 1 mm/min, from about 1 mm/min to about 1 cm/min, from about 1 cm/min to about 10 cm/min, from about 10 cm/min to about 1 m/min, from about 1 m/min to about 10 m/min, from about 10 m/min to about 100 m/min.

In some embodiments, the fluid flown is a gas. In some embodiments, said gas is air, nitrogen, argon, or a different gas. In some embodiments, the flow rate of fluid through the bed of lithium selective sorbent in one filter bank is less than about 1 mL/min, less than about 10 mL/min, less than about 100 mL/min, less than about 1 L/min, less than about 10 L/min, less than about 100 L/min, less than about 1,000 L/min, less than about 10,000 L/min. In some embodiments, the flow rate of fluid through the bed of lithium selective sorbent in one filter bank is more than about 1 mL/min, more than about 10 mL/min, more than about 100 mL/min, more than about 1 L/min, more than about 10 L/min, more than about 100 L/min, more than about 1,000 L/min, more than about 10,000 L/min. In some embodiments, the flow rate of fluid through the bed of lithium selective sorbent in one filter bank is from about 1 mL/min to about 10 mL/min, from about 10 mL/min to about 100 mL/min, from about 100 mL/min to about 1 L/min, from about 1 L/min to about 10 L/min, from about 10 L/min to about 100 L/min, from about 100 L/min to about 1,000 L/min, from about 1,000 L/min to about 10,000 L/min.

In some embodiments, the fluid flown is a gas. In some embodiments, said gas is air, nitrogen, argon, or a different gas. In some embodiments, the ratio of volume of lithium-selective sorbent to flow rate of fluid through the bed of lithium selective sorbent, which has units of time, indicates the characteristic contact time of fluid with the bed of lithium selective sorbent. In some embodiments, said characteristic contact time is less than about 1 second, less than about 10 seconds, less than about 1 minute, less than about 5 minutes, less than about 10 minutes, less than about 1 hours, less than about 10 hours, less than about 1 day. In some embodiments, said characteristic contact time is more than about 1 second, more than about 10 seconds, more than about 1 minute, more than about 5 minutes, more than about 10 minutes, more than about 1 hours, more than about 10 hours, more than about 1 day. In some embodiments, said characteristic contact time is from about 0.1 second to about 1 second, from about 1 second to about 10 seconds, from about 10 seconds to about 1 minute, from about 1 minute to about 5 minutes, from about 5 minutes to about 10 minutes, from about 10 minutes to about 1 hours, from about 1 hours to about 10 hours, from about 1 hours to about 1 day.

In some embodiments, the fluid flown is a gas. In some embodiments, said gas is air, nitrogen, argon, or a different gas. In some embodiments, the ratio of volume of flow rate of fluid through the bed to the surface area of the bed, which has units of length per time, indicates the characteristic flux of fluid through the bed of lithium selective sorbent. In some embodiments, said characteristic flux is less than about 1 mm/min, less than 1 cm/min, less than about 10 cm/min, less than about 1 m/min, less than about 10 m/min, less than about 100 m/min. In some embodiments, the flow rate of fluid through the bed of lithium selective sorbent in one filter bank is more than about 1 mm/min, more than 1 cm/min, more than about 10 cm/min, more than about 1 m/min, more than about 10 m/min, more than about 100 m/min. In some embodiments, the flow rate of fluid through the bed of lithium selective sorbent in one filter bank is from about 0.1 mm/min to about 1 mm/min, from about 1 mm/min to about 1 cm/min, from about 1 cm/min to about 10 cm/min, from about 10 cm/min to about 1 m/min, from about 1 m/min to about 10 m/min, from about 10 m/min to about 100 m/min.

In some embodiments, the pressure applied to flow said fluid across the ion-exchange bed is less than 5 psi, less than 25 psi, less than 50 psi, less than 100 psi, less than 150 psi, less than 250 psi, or less than 500 psi. In some embodiments, the pressure applied to flow said fluid across the ion-exchange bed is more than 5 psi, more than 25 psi, more than 50 psi, more than 100 psi, more than 150 psi, more than 250 psi, or more than 500 psi. In some embodiments, the pressure applied to flow said fluid across the ion-exchange bed is from about 1 psi to about 5 psi, from about 5 psi to about 25 psi, from about 25 psi to about 50 psi, from about 50 psi to about 100 psi, from about 100 psi to about 150 psi, from about 150 psi to about 250 psi, from about 250 psi to about 500 psi.

In some embodiments, the filter press comprises multiple filter banks. In some embodiments, when operation of the device is complete, filter plates are separated such that an individual filter bank is exposed, thereby allowing the sorbent contained in said filter bank to fall of said filter bank by gravity. One embodiment is shown in FIG. 2: two filter plates (204) come together to form a filter bank (215) which comprises a bed of lithium-selective sorbent (205). In this embodiment, when operation of the filter bank ceases, the bed of lithium-selective sorbent (205) can be discharged form the device by separating the two filter plates (204), thereby exposing two halves of a filter bank to the outside; i.e. 215 is split in half. In some embodiments, this discharges the lithium-selective sorbents contained in said device. In some embodiments, such a separation requires for the pressure holding the stack of filter plates together to be released. In some embodiments, once this pressure is released, an operator physically separates each plate from the next. In some embodiments, once this pressure is released, an automated system physically separates all plates simultaneously. In some embodiments, once this pressure is released, an operator positions an automated system that separates one plate at a time.

In some embodiments, a solid receiving device is position below the lithium-extraction device, such that said device contains the discharged material, and such that said discharged material can be subsequently conveyed away. In some embodiments, said solids receiving device is a tray, a hopper, a fork liftable hopper. In some embodiments, said discharged material are received by a drip tray, which is fitted with a motor to open downwards, thereby allowing said solids to be discharged to a second system. In some embodiments, a conveyor belt is positioned below the filter press, such that the solids can be automatically removed and conveyed away after discharge. In some embodiments, the filter press is positioned above a tank, such that the solids can fall directly into said tank after discharge. In some embodiments, the filter press is positioned above an agitated tank. In some embodiments, the filter press is positioned above a tank containing a liquid resource comprising lithium, such that the discharged lithium-selective sorbent absorbs lithium when discharged from the device into the tank. In some embodiments, the filter press is positioned above a tank containing an acidic eluent, such that the discharged lithium-selective sorbent releases lithium when discharged from the device into the tank. In some embodiments, the filter press is positioned above a tank containing a wash solution, such that the discharged lithium-selective sorbent is washed when discharged from the device.

In some embodiments, the solid sorbent is discharged from the device about once per year, about once per month, about once per week, about once per day, about twice per day, about three times per day, about one time per hour, about twice per hour, or about five times per hour. In some embodiments, the lithium-selective sorbent is discharged in coordination with the lithium extraction process. In some embodiments, the lithium-selective sorbent is discharged after it has contacted a liquid resource containing lithium. In some embodiments, the lithium-selective sorbent is discharged after it is saturated with lithium, having contacted a liquid resource containing lithium. In some embodiments, the lithium-selective sorbent is discharged after a certain amount of contact time with a lithium containing liquid resource. In some embodiments, the lithium-selective sorbent is discharged after it has contacted a wash solution. In some embodiments, the lithium-selective sorbent is discharged after it has contacted an aqueous solution. In some embodiments, said aqueous solution releases the lithium contained in said lithium selective sorbent. In some embodiments, the lithium-selective sorbent is discharged after it has contacted an acidic eluent solution, such that lithium from said sorbent has been released.

In some embodiments, a lithium-selective sorbent is loaded into the lithium extraction device. In some embodiments, loading occurs through only one end of the device. In one embodiment shown in example 2, the process connection for loading of the solid sorbent (210) is found on only one end of the device (216). In some embodiment, said process connection is found on both ends of the device, directly opposite to each other, such that flow from each inlet occurs in opposing directions, 180 degrees offset from each other. In some embodiment, said process connection is found on both ends of the device, directly opposite to each other, such that flow from each inlet occurs in opposing directions, 180 degrees offset from each other. One embodiment of said connection, on both sides of the device, is shown in FIG. 3. In some embodiment, said process connection is found in more than two locations in said device. In some embodiments, the device is a single end feed filter press. In some embodiments, the device is a double end feed filter press.

Figures 3A, 3B, 3C:
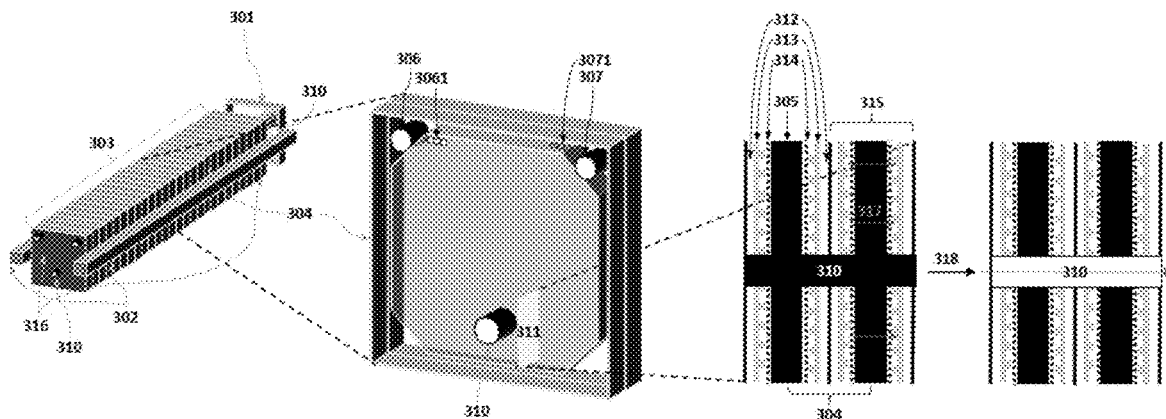
FIG. 3A-3C illustrates a lithium extraction device comprising a filter press loaded with ion exchange beads, wherein said filter press is equipped with membrane-squeeze plates.

In some embodiments, when the device is loaded with lithium-selective sorbent, the solids are removed from the fluid conduit through with the solid sorbent was loaded. In one embodiment shown in FIG. 3, this entails removing any remaining solid sorbent from pipe 310 after the device is loaded. In some embodiments, this requires that the process connection for loading of the solid sorbent be found in at least two different locations in the device. In a preferred embodiment, this requires that the process connection for loading of the solid sorbent be found in at least two opposing locations in the device. In some embodiments, removal of solids from this pipe is done by injecting fluid from one end of the pipe, such that said fluid conveys solids found in said pipe, and such that said fluid with entrained solids is removed from the opposing end of the pipe. In one embodiment of such a method using said device is shown in FIG. 3C, and descried in example 3. In some embodiments, said fluid is a liquid or a gas. In some embodiments, said fluid is an aqueous solution. In some embodiments, said fluid is compressed air, air, nitrogen, another gas, or a mixture thereof. In some embodiments, said fluid is injected at less than 5 psi, less than 25 psi, less than 50 psi, less than 100 psi, less than 150 psi, less than 250 psi, or less than 500 psi. In some embodiments, said fluid is injected at more than 5 psi, more than 25 psi, more than 50 psi, more than 100 psi, more than 150 psi, more than 250 psi, or more than 500 psi. In some embodiments, said fluid is injected at from about 1 psi to about 5 psi, from about 5 psi to about 25 psi, from about 25 psi to about 50 psi, from about 50 psi to about 100 psi, from about 100 psi to about 150 psi, from about 150 psi to about 250 psi, from about 250 psi to about 500 psi.

In some embodiments, the filter press is filled with a lithium selective sorbent. In some embodiments, the volume of sorbent that is contained within said device is less than about 1 mL, less than about 10 mL, less than about 100 mL, less than about 1 L, less than about 10 L, less than about 100 L, less than about 1 cubic meter, less than about 10 cubic meters, less than about 100 cubic meters, less than about 1,000 cubic meters, or less than about 10,000 cubic meters. In some embodiments, the volume of sorbent that is contained within said device is more than about 1 mL, more than about 10 mL, more than about 100 mL, more than about 1 L, more than about 10 L, more than about 100 L, more than about 1 cubic meter, more than about 10 cubic meters, more than about 100 cubic meters, more than about 1,000 cubic meters, or more than about 10,000 cubic meters. In some embodiments, the volume of sorbent that is contained within said device is from about 0.1 mL to about 1 mL, from about 1 mL to about 10 mL, from about 10 mL to about 100 mL, from about 100 mL to about 1 L, from about 1 L to about 10 L, from about 10 L to about 100 L, from about 100 L to about 1 cubic meter, from about 1 cubic meter to about 10 cubic meters, from about 10 cubic meters to about 100 cubic meters, from about 100 cubic meters to about 1,000 cubic meters, or from about 1,000 cubic meters to about 10,000 cubic meters.

In some embodiments, the amount of lithium-selective sorbent that can be contained said device can be adjusted by positioning a "backup plate" device. In some embodiments, said "back up plate" device comprises a plate that is connected to the rest of the piping in the lithium extraction device on only one side, and is not connected to the pipe that conveys the lithium selective sorbent into the device. In some embodiments, the effect of this "back up plate" is to not allow any solids of fluid flow to filters located beyond the back up late. In some embodiments, this splits the filter press into two sections, one with fluid connection, and another without, such that only a section of the filter press is being used. In some embodiments, this constitutes a method to adjust the total volume of solids that are contained within the filter press, while using the same device.

In some embodiments, said backup plate splits the filter press into two sections. In some embodiments, when said filter press has process connections from both sides, a backup plate can be positions such that two sides of the same press can be used for independent fluid flows. In some embodiments, this allows two sections of the filter press to be configured to be in different stages of the ion-exchange process simultaneously. In some embodiments, this allows for lower down-time and higher lithium productivity of the ion exchange device. In some embodiments, one or more dividing plates are positioned within the device, wherein said dividing plate is constructed such that fluid that exits from one section of the filter press is sent to the inlet of a subsequent section of the filter press. In some embodiments, one such plate is present in the filter press. In some embodiments, two or more such plates are present in the filter press.

Embodiments Comprising a Vertical Pressure Filter

An aspect of the disclosure herein is a device for lithium extraction from a liquid resource, wherein said device comprises one or more filter banks containing a lithium-selective sorbent. In some embodiments, said lithium extraction comprises a vertical pressure filter. In some embodiments, said vertical pressure filter comprises multiple filter banks, or filter plates, which are mechanically held together to form a vertical stack. A vertical pressure filter is a filtration device known in the field of filtration and solids-liquid separation. An aspect of the disclosure herein is the use of a vertical pressure filter to extract lithium, wherein said vertical pressure filter is filled with a lithium-selective sorbent, and said sorbent is contacted with a liquid resource comprising lithium in said filter press. In some embodiments, said sorbent is an ion-exchange material.

In some embodiments, a vertical pressure filter comprises multiple filter plates or filter trays, wherein each filter plate or filter trays comprises a filter bank. As used herein, in the context of a vertical pressure filter, the term "filter bank", "filter plate", and "filter tray" are used interchangeably. An example of such a device is shown in FIG. 7. In some embodiments, each filter bank comprises a compartment containing a lithium-selective sorbent, wherein said compartment is contained within porous partitions. In some embodiments, said compartment contains a bed or cake of said sorbent. In some embodiments, said filter bank contains pipes, shapes, tubes, hoses and flow paths that connect said sorbent-containing compartment to a fluid distribution manifold that the delivers flow to and form said sorbent. In some embodiments, a porous partitions are located at the bottom of the filter bank. In some embodiments, more than two such partitions are located within a filter bank. In some embodiments, said porous partition is a mesh, cloth, other woven material, a screen, or a combination thereof. In some embodiments, said porous partition is attached a mechanical device, plate, flow distributor, or scaffolding.

In some embodiments, the porous partition is a filter cloth. In some embodiments, said partition comprises a filter, a solid-liquid separation device, or other solid-retaining material. In some embodiments, a partition is in contact with the lithium selective sorbent. In some embodiments, said partition is a permeable partition. In some embodiments, said permeable partition is a porous partition. In some embodiments, said permeable partition is a slitted partition that provides support for the ion-exchange bead bed, chemical protection, aids filtration, or a combination thereof. In some embodiments, said permeable partition is a porous partition that provides structural support for the bed of lithium-selective sorbent, chemical protection, aids filtration, or a combination thereof. In some embodiments, the partition between the flow distribution compartment and the compartment containing the ion-exchange beads consists of a porous partition that provides structural support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a v-wire screen, a sintered metal screen, a sintered polymer screen, a flat screen, a cylindrical screen, a screen comprised of wire with cylindrical cross section, a screen comprised of wire with square cross section, a screen comprised of wire with rectangular cross section, a screen comprised of wire with rhomboidal cross section, a screen comprised of wire with triangular cross section, a screen comprised of wire with irregular cross section, a slotted wire screen, a mesh, or a combination thereof, wherein said porous partition is coarse, fine, or a combination thereof. In some embodiments, the porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof. In some embodiments, the porous partition comprises ion exchange particles. In some embodiments, the porous partition comprises porous ion exchange particles. In some embodiments, the porous partition comprises a mixture of ion exchange particles with other polymers described above. In some embodiments, the porous partition comprises multiple layers.

In some embodiments, the porous partition is a single layer filtration fabric. In some embodiments, the porous partition is a double layer filtration fabric. In some embodiments, the porous partition is a multi-layer filtration fabric. In some embodiments, the porous partition is a spun fabric. In some embodiments, the porous partition is a is a mixture of fabrics. In some embodiments, the porous partition is a woven fabric. In some embodiments, said fabric is manufactured with one or more weave patterns, including but not limited to a plain, twill, satin, oxford, leno or basket-weave.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In some embodiments, the air permeability of said permeable partition, measured at 200 Pa, in units of liters per meter square per second, is less than about 1, less than about 5, less than about 10, less than about 50, less than about 100, less than about 500, less than about 1000, less than about 5000, less than about 10,000. In some embodiments, the air permeability of said permeable partition, measured at 200 Pa, in units of liters per meter square per second, is more than about 1, more than about 5, more than about 10, more than about 50, more than about 100, more than about 500, more than about 1000, more than about 5000, more than about 10,000. In some embodiments, the air permeability of said permeable partition, measured at 200 Pa, in units of liters per meter square per second, is from about 0.1 to about 1, from about 1 to about 5, from about 5 to about 10, from about 10 to about 50, from about 50 to about 100, from about 100 to about 500, from about 500 to about 1000, from about 1000 to about 5000, from about 10,000.

In some embodiments, the porous partition comprises an ion exchange material and a porous polymer. In some embodiments, the porous partition comprises an ion exchange material and a porous fiber. In some embodiments, the porous partition comprises an ion exchange material and cellulose. In some embodiments, the porous partition comprises an ion exchange material and a mesh or polymer membrane. In some embodiments, said partition comprises one or more meshes of similar or different composition, of similar or different aperture sizes, of similar or different percent open area. In some embodiments, side porous partition comprises one or more meshes to provide structural support and/or filtration capabilities. In some embodiments, side porous partition comprises one or partitions, one or more of which comprise an ion exchange material. In some embodiments, the porous partition comprises a v-wire screen, a sintered metal screen, a sintered polymer screen, a flat screen, a cylindrical screen, a screen comprised of wire with cylindrical cross section, a screen comprised of wire with square cross section, a screen comprised of wire with rectangular cross section, a screen comprised of wire with rhomboidal cross section, a screen comprised of wire with triangular cross section, a screen comprised of wire with irregular cross section, a slotted wire screen, a mesh, or a combination thereof, wherein said porous partition is coarse, fine, or a combination thereof. In some embodiments, said porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof. In some embodiments, the porous partition comprises ion exchange particles. In some embodiments, the porous partition comprises porous ion exchange particles. In some embodiments, the porous partition comprises a mixture of ion exchange particles with other polymers described above. In some embodiments, the porous partition comprises multiple layers. In some embodiments, the porous partition comprising an ion exchange material extracts lithium in the lithium extraction device. In some embodiments, the porous partition comprising an ion exchange material is the only component that extracts lithium in the lithium extraction device. In some embodiments, the porous partition comprises an ion exchange material, while the filter bank is filled with a packed bed of the same ion exchange material. In some embodiments, the porous partition comprises an ion exchange material, while the filter bank is filled with a packed bed a different ion exchange material. In some embodiments, the porous partition comprises an ion exchange material, while the filter bank is filled with a packed bed a different lithium selective sorbent.

In some embodiments, said porous partition optionally contains structures to enable said partition to be incorporated into the assembly of the filter bank. In some embodiments, these structures comprise, but are not limited to, holes, slits, cutouts, perforations, protrusions, gaskets, or rings. In some embodiments, said structures comprise a flexible cylinder that forms an octagonal shape spanning the entire porous partition, providing a structural reinforcement.

In some embodiments, the filter cloths are gasketed. In some embodiments, the filter cloths are non-gasketed. In some embodiments, the filter cloths span more than one filter bank.

In some embodiments, the compartment containing the lithium selective sorbent or ion-exchange beads is treated with a fluid. In some embodiments, the compartment containing the lithium selective sorbent or ion-exchange beads is treated with water or other solutions for the purposes of adjusting the concentration, composition, pH, or contaminant level of the fluid flowing through the vessel. In some embodiments, the compartment containing the lithium selective sorbent or ion-exchange beads is treated with a lithium-containing liquid resource to absorb lithium. In some embodiments, the compartment containing the lithium selective sorbent or ion-exchange beads is treated with an acidic solution to release absorbed lithium. In some embodiments, the compartment containing the lithium selective sorbent or ion-exchange beads is treated with multiple fluids. In some embodiments, in order to contact the lithium-selective sorbent with said fluid, fluid is directed from the inlet of the lithium extraction device to the one or more filter plates in said device. In some embodiments, said direction of flow is achieved by means of optional inlet- and outlet-flows to and from said compartment within a filter plate. In some embodiments, such inlet- and outlet flows are located at the top, bottom, center, off-center, or side of said compartments. In some embodiments, such inlet- and outlet flows are located at the top, bottom, center, off-center, or side of said filter plate. In some embodiments, the inlet- and outlet flows to and from said compartment are injected and removed from the internal space of said compartments by means of piping, tubing, orifices, or other internal components that protrude into said compartment.

In some embodiments, one or more pipes are in fluid contact with each filter plate, with each of said pipes delivering or removing fluid flows to and from said filter plate. In some embodiments, one such pipe is present in the filter plate. In some embodiments, two such pipes are present in the filter plate. In some embodiments, three such pipes are present in the filter plate. In some embodiments, four such pipes are present in the filter plate. In some embodiments, five such pipes are present in the filter plate. In a preferred embodiment, four such fluid deliver pipes are located at the four corners of a filter plate. In some embodiments, more than five such pipes are present in the filter plate. In some embodiments, said hoses are connected to each filter tray instead of pipes.

In some embodiments, said pipes or hoses have a diameter of less than about 1 mm, less than about 2 mm, less than about 5 mm, less than about 10 mm, less than about 20 mm, less than about 30 mm, less than about 40 mm, less than about 50 mm, less than about 60 mm, less than about 70 mm, less than about 80 mm, less than about 90 mm, less than about 100 mm, less than about 200 mm, less than about 500 mm, less than about 1000 mm, less than about 1500 mm, less than about 2000 mm. In some embodiments, said pipes or hoses have a diameter of more than about 1 mm, more than about 2 mm, more than about 5 mm, more than about 10 mm, more than about 20 mm, more than about 30 mm, more than about 40 mm, more than about 50 mm, more than about 60 mm, more than about 70 mm, more than about 80 mm, more than about 90 mm, more than about 100 mm, more than about 200 mm, more than about 500 mm, more than about 1000 mm, more than about 1500 mm, more than about 2000 mm. In some embodiments said pipes or hoses have a diameter of about 1 mm to about 2 mm, from about 2 mm to about 4 mm, from about 4 mm to about 10 mm, from about 10 mm to about 20 mm from about 20 mm to about 40 mm, from about 40 mm to about 100 mm, from about 100 mm to about 500 mm, from about 500 mm to about 1500 mm, from about 1500 mm to about 2000 mm. In some embodiments, said pipes or hoses have a length of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm, less than about 200 cm, less than about 500 cm, less than about 10 m. In some embodiments, said pipes or hoses have a length of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, more than about 80 cm, more than about 90 cm, more than about 100 cm, more than about 200 cm, more than about 500 cm, more than about 10 m. In some embodiments, said or hoses pipes have a length of about 1 cm to about 2 cm, from about 2 cm to about 4 cm, from about 4 cm to about 10 cm, from about 10 cm to about 20 cm, from about 20 cm to about 50 cm, from about 50 cm to about 100 cm, from about 100 cm to about 200 cm, from about 200 cm to about 10 m.

In some embodiments, one or more of said pipes or hoses are connected to the flow distribution surface by additional pipes, conduits, or fluid paths. In some embodiments, said pipes have a diameter of less than about 1 mm, less than about 2 mm, less than about 5 mm, less than about 10 mm, less than about 20 mm, less than about 30 mm, less than about 40 mm, less than about 50 mm, less than about 60 mm, less than about 70 mm, less than about 80 mm, less than about 90 mm, less than about 100 mm, less than about 200 mm, less than about 500 mm, less than about 1000 mm, less than about 1500 mm, less than about 2000 mm. In some embodiments, said pipes or have a diameter of more than about 1 mm, more than about 2 mm, more than about 5 mm, more than about 10 mm, more than about 20 mm, more than about 30 mm, more than about 40 mm, more than about 50 mm, more than about 60 mm, more than about 70 mm, more than about 80 mm, more than about 90 mm, more than about 100 mm, more than about 200 mm, more than about 500 mm, more than about 1000 mm, more than about 1500 mm, more than about 2000 mm. In some embodiments said pipes or have a diameter of about 1 mm to about 2 mm, from about 2 mm to about 4 mm, from about 4 mm to about 10 mm, from about 10 mm to about 20 mm from about 20 mm to about 40 mm, from about 40 mm to about 100 mm, from about 100 mm to about 500 mm, from about 500 mm to about 1500 mm, from about 1500 mm to about 2000 mm. In some embodiments, said pipes or have a length of less than about 1 cm, less than about 2 cm, less than about 5 cm, less than about 10 cm, less than about 20 cm, less than about 30 cm, less than about 40 cm, less than about 50 cm, less than about 60 cm, less than about 70 cm, less than about 80 cm, less than about 90 cm, less than about 100 cm, less than about 200 cm, less than about 500 cm, less than about 10 m. In some embodiments, said pipes or have a length of more than about 1 cm, more than about 2 cm, more than about 5 cm, more than about 10 cm, more than about 20 cm, more than about 30 cm, more than about 40 cm, more than about 50 cm, more than about 60 cm, more than about 70 cm, more than about 80 cm, more than about 90 cm, more than about 100 cm, more than about 200 cm, more than about 500 cm, more than about 10 m. In some embodiments, said or pipes have a length of about 1 cm to about 2 cm, from about 2 cm to about 4 cm, from about 4 cm to about 10 cm, from about 10 cm to about 20 cm, from about 20 cm to about 50 cm, from about 50 cm to about 100 cm, from about 100 cm to about 200 cm, from about 200 cm to about 10 m.

In some embodiments, the ratio of the diameter of said pipe to the dimension of the filter plate is less than about 0.01, less than about 0.1, less than about 1, less than about 10, less than about 100. In some embodiments, the ratio of the diameter of said pipe to the dimension of the filter plate is more than about 0.01, more than about 0.1, more than about 1, more than about 10, more than about 100. In some embodiments, the ratio of the diameter of said pipe to the dimension of the filter plate is from about 0.01 to about 0.1, from about 0.1 to about 1, from about 1 to about 10, from about 10 to about 100. In some embodiments, one or more pipes of equivalent or different dimensions are found within a filter plate. In some embodiments, one or more of these pipes are connected. In some embodiments, one or more of said pipes are oriented with respect to each other in parallel, perpendicular, at an angle, in varying geometries, or in a combination thereof. In some embodiments, the ratio of the diameters of pipes within the same filter plate is less than about 0.01, less than about 0.1, less than about 1, less than about 10, less than about 100. In some embodiments, the ratio of the diameters of pipes within the same filter plate is more than about 0.01, more than about 0.1, more than about 1, more than about 10, more than about 100. In some embodiments, the ratio of the diameters of pipes within the same filter plate is from about 0.01 to about 0.1, from about 0.1 to about 1, from about 1 to about 10, from about 10 to about 100.

In some embodiments, pipes, orifices, and flow distribution surfaces are configured to direct a flow of a liquid resource through the one or more filter plates and out of said one or more filter plates, wherein the sorbent material contained in said filter plate selectively absorbs lithium. In some embodiments, pipes, orifices, and flow distribution surfaces are configured to uniformly distribute the flow of liquid through the sorbent material contained in the filter plate. In some embodiments, said flow uniformity implies that each volume of sorbent material within the filter plate is contacted with the same volume of liquid resource within a given time period. In some embodiments, uniform distribution of flow through the sorbent material results in a higher lithium absorption capacity of the sorbent, a higher selectivity for lithium absorption by the sorbent over other ions present in the liquid resource, a minimized distance required to flow the liquid through the one or more filter plates, a reduced change in pressure when flowing liquid across the one or more filter plates, a longer life time of the sorbent, a longer life time of the ion-exchange material, or a combination thereof.

In some embodiments, the devices, vessels, system, and methods described herein utilize a flow distribution compartment to optimize the flow of various solutions or gases through the devices, vessels, pipes, filter plates, and lithium-selective sorbents materials. In some embodiments, the inlet- and outlet flows to and from the flow distribution compartments are injected and remove from the internal space of said compartments by means of piping, tubing, or other internal components that protrude into said compartment. In some embodiments, the inlet- and outlet flows to and from the flow distribution compartments are injected and remove from the internal space of said compartments by means of piping, tubing, or other internal components that protrude into said compartment In some embodiments, the flow distribution compartment are optionally treated with a lithium containing resource, hydrogen ion-containing acid, water, or other solutions for the purposes of adjusting the concentration, composition, pH, or contaminant level of the fluid flowing through the vessel. This is achieved by means of an optional inlet- and outlet-flows to and from the flow distribution compartment.

In some embodiments, the porous partition, fluid conduits, fluid orifices, and flow distribution surfaces, are assembled to form a filter plate. In some embodiments, said filter plates contain structural supports that allow said plates to be mounted within a larger lithium extraction device. In some embodiments, solid filter plates comprise a compartment containing a lithium-selective sorbent or ion-exchange material. In some embodiments, multiple filter plates are found within a single lithium extraction device, such that they form a stack of filter plates. In some embodiments said stack of filter plates is formed into a vertical pressure filter. In some embodiments, said vertical pressure filter is oriented vertically, horizontally, or slanted with respect to the ground.

In some embodiments, the bed of ion exchange material is contained within said filter bank. In some embodiments, the bed of lithium selective sorbent is contained within said filter bank. In some embodiments, said bed of ion exchange material has a characteristic "thickness", wherein "thickness" is defined as the average dimension of the said solid mass, measured in a direction that is parallel to the direction of fluid flow through the filter bank.

In some embodiments, the typical thickness of the chamber containing the sorbent material is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the chamber containing solids between filter plates is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the chamber containing solids between filter plates is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m. In a preferred embodiment, the typical thickness of the chamber containing solids between filter plates is selected from 18 mm, 25 mm, 32 mm, 40 mm, 50 mm, or 60 mm.

In some embodiments, the chamber holds a maximum volume of solids, this is the maximum volume of lithium selective sorbent that can be contained within each filter bank. In some embodiments, said volume is less than about 1 mL, less than about 10 mL, less than about 100 mL, less than about 1 L, less than about 10 L, less than about 100 L, less than about 1 cubic meter, less than about 10 cubic meters. In some embodiments, said volume is more than about 1 mL, more than about 10 mL, more than about 100 mL, more than about 1 L, more than about 10 L, more than about 100 L, more than about 1 cubic meter, more than about 10 cubic meters. In some embodiments, said volume is from about 0.1 mL to about 1 mL, from about 1 mL to about 10 mL, from about 10 mL to about 100 mL, from about 100 mL to about 1 L, from about 1 L to about 10 L, from about 10 L to about 100 L, from about 100 L to about 1 cubic meter, from about 1 cubic meter to about 10 cubic meters, from about 10 cubic meters.

In some embodiments, the porous partition in the filter bank comprises a fixed surface area per chamber. In some embodiments, said area is less than about 1 $cm^2$, less than about 10 $cm^2$, less than about 100 $cm^2$, less than about 1,000 $cm^2$, less than about 1 $m^2$, less than about 10 $m^2$, less than about 100 $m^2$, less than about 1000 $m^2$. In some embodiments, said volume is more than about 1 $cm^2$, more than about 10 $cm^2$, more than about 100 $cm^2$, more than about 1,000 $cm^2$, more than about 1 $m^2$, more than about 10 $m^2$, more than about 100 $m^2$, more than about 1000 $m^2$. In some embodiments, said volume is from about 0.1 $cm^2$ to about 1 $cm^2$, from about 1 $cm^2$ to about 10 $cm^2$, from about 10 $cm^2$ to about 100 $cm^2$, from about 100 $cm^2$ to about 1,000 $cm^2$, from about 1,000 $cm^2$ to about 1 $m^2$, from about 1 $m^2$ to about 10 $m^2$, from about 10 $m^2$ to about 100 $m^2$, from about 100 $m^2$ cubic meter to about 1,000 $m^2$.

In some embodiments, the bed of ion exchange material is contained in a filter plate. In some embodiments, said bed of ion exchange material has a characteristic "cross sectional length" of said bed, defined as the average dimension of the said solid mass, measured in a direction that is perpendicular to the direction of fluid flow through the filter bank. In some embodiments, the cross-sectional length of said bed is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the cross-sectional length of said bed is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the cross-sectional length of said bed is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m. In a preferred embodiment, the cross-sectional length is selected from: about 250 mm, 320 mm, 470 mm, 630 mm, 800 mm, 1000 mm, 1200 mm, 1500 mm, 2000 mm, 4000 mm. In some embodiments, the bed of sorbent material is not square, and comprises a cross-sectional length that is selected from two of the following dimensions: about 250 mm, 320 mm, 470 mm, 630 mm, 800 mm, 1000 mm, 1200 mm, 1500 mm, 2000 mm, 4000 mm. In a preferred embodiment, the cross-sectional length of the bed of lithium-selective sorbent is 2000 mm×4000 mm, 1500 mm×2000 mm, 2500 mm by 5000 mm, or a combination thereof.

In some embodiments, the device containing ion-exchange beads is comprised of multiple and separate ion-exchange compartments arranged within a single vessel. In some embodiments, the lithium extraction device comprises multiple and separate lithium extraction compartments arranged within a single device. In some embodiments, the lithium extraction devices comprises multiple individual filter banks—each containing an individual lithium-selective sorbent compartment—where lithium is absorbed by said lithium selective sorbent. In some embodiments, said compartments comprise individual filter banks. In some embodiments, said multiple compartments comprise the filter chambers. In some embodiments, there is more than one lithium extraction compartments lithium extraction device. In some embodiments, there are less than about two, less than about three, less than about five, less than about ten, less than about twenty, less than about thirty, less than about fifty, less than about one-hundred, less than about two-hundred individual compartments within a single lithium extraction device. In some embodiments, there are more than about two, more than about three, more than about five, more than about ten, more than about twenty, more than about thirty, more than about fifty, more than about one-hundred, more than about two-hundred individual compartments within a single lithium extraction device. In some embodiments, a single lithium extraction device comprises about two, about three, about five, about ten, about twenty, about thirty, about fifty, about one-hundred, about one hundred and fifty, or about two-hundred individual lithium extraction compartments.

In some embodiments, the multiple filter banks are held together by a device that applies a mechanical force that presses the individual filter banks together. In some embodiments, said device comprises a hydraulic system, comprising one more pistons and one or more devices to apply a hydraulic force on said piston. In some embodiments, the mechanical force is applied to one structurally reinforced component that is in contact with the first plate in the stack of filter banks, and the compressive force is distributed across all filter plates in the device. In some embodiments, said force is applied by means of a pressurized hydraulic fluid system, pressurized air system, mechanical tensions system, or combinations thereof. In some embodiments, the pressure applied to compress all filter bank together is less than 50 psi, less than 150 psi, less than 500 psi, less than 1000 psi, less than 2500 psi, or less than 5000 psi. In some embodiments the pressure applied is more than 50 psi, more than 150 psi, more than 500 psi, more than 1000 psi, more than 2500 psi, or more than 5000 psi. In some embodiments, the pressure applied is from 50 psi to 150 psi, from 150 psi to 500 psi, from 500 psi to 1000 psi, from 1000 psi to 2500 psi, from 2500 psi to 5000 psi.

In devices comprising multiple beds of lithium-selective sorbent, all beds are connected to a shared flow distribution system, such that flow of liquid to and from said beds of lithium-selective sorbent occur in parallel. In some embodiments, a multitude of ion-exchange beds share the same inlet and outlet flows in parallel, wherein a different multitude of ion-exchange beds share a different set of inlet and outlet flows.

In some embodiments, the vertical pressure filter comprises filter plates. In some embodiments, filter plates comprise structures, flow distributors, orifices, fluid conduits, fluid conducts, membranes, structural supports, and any other component that is required for the assembly of a filter bank. In some embodiments, said filter plates are recessed chamber filter plates. In some embodiments, said filter plates are diaphragm squeeze filter plates. In some embodiments said filter plates are chosen from, but not limited to, one or more of the following types of filter plates commonly known in the field of the art: recessed, chamber recessed chamber, plate-and-frame, membrane squeeze, diaphragm squeeze, flush plate and frame, mineral plates, gasketed, non-gasketed, mixtures thereof or combinations thereof. In some embodiments, said filter plates are constructed out of a metal, stainless steel, carbon steel, titanium, Hastelloy, nickel, Inconel, Monel, tantalum, alloys thereof, or mixtures thereof. In some embodiments, said filter plates are constructed out of polymer, a fluoropolymer, polyether ether ketone (PEEK), acrylonitrile butadiene styrene (ABS), nylon, poly carbonate, polyurethane, polyethylene terephthalate, polybutylene terephthalate, polyethylene, polypropylene, high-density polyethylene, polyphenylene sulfide, tetrapolyethylene, PVDF, EPDM, Viton, rubber, Bunna-N, natural rubber, mixtures thereof, or combinations thereof. In some embodiments, multiple plates described above are stacked in such a manner so as to form a multitude of parallel filter banks, shown in FIG. 7. In some embodiments, the assembled filter banks constitute a vertical pressure filter, and said vertical pressure filter is used to contain a lithium-selective sorbent and used to extract lithium. In some embodiments, there is more than one filter plate in said vertical pressure filter. In some embodiments, there are less than about two, less than about three, less than about five, less than about ten, less than about twenty, less than about thirty, less than about fifty, less than about one-hundred, less than about two-hundred individual filter plates in said vertical pressure filter. In some embodiments, there are more than about two, more than about three, more than about five, more than about ten, more than about twenty, more than about thirty, more than about fifty, more than about one-hundred, more than about two-hundred filter plates in said vertical pressure filter. In some embodiments, a single lithium extraction device comprises about two, about three, about five, about ten, about twenty, about thirty, about fifty, about one-hundred, about one hundred and fifty, or about two-hundred filter plates in said vertical pressure filter.

In some embodiments, the vertical pressure filter comprises filter plates equipped with a membrane squeeze feature. This membrane squeeze feature is described in detail in Example 7. In some embodiments, the vertical pressure filter comprises membrane filter plates. In some embodiments, said membrane filter plates comprise one or more components that are deformed or expanded after the filter bank is filled with the lithium selective sorbent, in a manner that applies a compressive or "squeezing" force on said sorbent. Said deformable components are optionally referred to as a "membrane". In some embodiments, said compression results in additional compaction of the bed of lithium-selective sorbent. In some embodiments, said compression increases the uniformity of the bed of lithium-selective sorbent. In some embodiments, said compression results in improved uniformity of flow when contacting said lithium-selective sorbent with a liquid stream. In some embodiments, said compression is applied continually during operation of the lithium-extraction device. In some embodiments, said compression is applied intermittently during operation of the lithium-extraction device.

In some embodiments, the expandable membrane component that applies mechanical compression or "squeezing" on the sorbent comprises the flow distribution compartment or surface. An example of such a compartment is shown in FIG. 7. Each bank comprises a support structure (707), upon which a porous filter belt is positioned (708). The chamber that is loaded with lithium-selective sorbent (709) is positioned immediately above this porous filer belt. The filter belt continuously connects between all trays, as shown in insert 7B as a connection from the one to the subsequent tray, connected through roller 711. Each filter tray contains a diaphragm (710) that can be mechanically actuated to apply compressive pressure on the chamber containing the lithium-selective sorbent immediately below it (709). Membrane 710 is mechanically compressed against the bed of ion-exchange material directly below it (709), and the compressive pressure applied. This results in consolidation of the bed of lithium-selective sorbent, which improves flow through said sorbent. This treatment is continued for 5 minutes, and the pressure is released.

In the field of the art, such an operating may be denoted as a membrane squeeze. In some embodiments, the membrane comprises low density polyethylene, high density polyethylene, polypropylene, polyester, polytetrafluoroethylene (PTFE), types of polyamide, polyether ether ketone (PEEK), poly sulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinyfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In some embodiments, a filter cake of lithium selective sorbent is held within said filter bank, wherein said cake is formed by flowing a suspension of said sorbent through said filter bank.

In some embodiments, the pressure applied to deform the membrane is less than 5 psi, less than 25 psi, less than 50 psi, less than 100 psi, less than 150 psi, less than 250 psi, or less than 500 psi. In some embodiments, the pressure applied to deform the membrane component of the filter bank is more than 5 psi, more than 25 psi, more than 50 psi, more than 100 psi, more than 150 psi, more than 250 psi, or more than 500 psi. In some embodiments, the pressure applied to deform the membrane component of the filter bank is from about 1 psi to about 5 psi, from about 5 psi to about 25 psi, from about 25 psi to about 50 psi, from about 50 psi to about 100 psi, from about 100 psi to about 150 psi, from about 150 psi to about 250 psi, from about 250 psi to about 500 psi. In some embodiments, the pressure applied to deform the membrane component of the filter bank remains constant during operation of the lithium extraction device. In some embodiments, the pressure applied to deform the membrane component of the filter bank is varied during operation of the lithium extraction device. In some embodiments, the pressure applied to deform the membrane component of the filter bank is applied after said filter bank is loaded with said sorbent, and then released. In some embodiments, the pressure applied to deform the membrane component of the filter bank is applied after said filter bank is loaded with said sorbent, and then maintained during all subsequent operations. In some embodiments, the pressure applied to deform the membrane component of the filter bank is applied when the lithium-selective sorbent is contacted with a liquid resource comprising lithium. In some embodiments, the pressure applied to deform the membrane component of the filter bank is applied when the lithium-selective sorbent is contacted with an acidic eluent that releases lithium form said sorbent. In some embodiments, the pressure applied to deform the membrane component of the filter bank is applied during washing of the lithium-selective sorbent with a washing solution. In some embodiments, the pressure applied to deform the membrane component of the filter bank is applied without a liquid stream being in contact with the lithium selective sorbent.

In some embodiments, the pressure on the membrane e is applied by means of compressed air or a compressed liquid. In some embodiment, the pressure on the deformable flow distribution surface is applied by a hydraulic system. In some embodiment, the pressure on the deformable flow distribution surface is applied by a mechanical device, such as a piston.

In some embodiments, the pressure thus applied on the bed of lithium selective sorbent decreases the volume of said bed. In some embodiments, the pressure thus applied on the bed of lithium selective sorbent decreases the volume of said bed by about 0.01%, by about 0.1%, by about 1%, by about 5%, by about 10%, by about 25%, by about 50%, by about 75%, or by about 100%. In some embodiments, the pressure thus applied on the bed of lithium selective sorbent decreases the volume of said bed by more than about 0.01%, by more than about 0.1%, by more than about 1%, by more than about 5%, by more than about 10%, by more than about 25%, by more than about 50%, by more than about 75%, or by more than about 100%. In some embodiments, the pressure thus applied on the bed of lithium selective sorbent decreases the volume of said bed by less than about 0.01%, by less than about 0.1%, by less than about 1%, by less than about 5%, by less than about 10%, by less than about 25%, by less than about 50%, by less than about 75%, or by less than about 100%. In some embodiments, the pressure thus applied on the bed of lithium selective sorbent decreases the volume of said bed from about 0.01% to about 0.1%, from about 0.1% to about 1%, from about 1% to about 5%, from about 5% to about 10%, from about 10% to about 25%, from about 25% to about 50%, from about 50% to about 75%, from about 75% to about 100%.

In some embodiments, said deformable components or membrane are welded to the rest of the filter bank. In some embodiments, said components are replaceable. In some embodiments, said components are manufactured of the same material as the rest of the filter bank. In some embodiments, said components are manufactured of a different material from the rest of the filter bank.

In some embodiments, the deformable component applies pressure on the bed of lithium-selective sorbent from one side of said bed. In some embodiments, the deformable component applies pressure on the bed of lithium-selective sorbent from both sides of said bed. In some embodiments, the deformable component applies pressure on the bed of lithium-selective sorbent from multiple directions. In some embodiments, the direct from which pressure is applied varies with time. In some embodiments, the direct from which pressure is applied depends on the fluid which is being contacted with the lithium-selective sorbent. In some embodiments, the deformable component is a membrane.

In some embodiments, the lithium selective sorbent is loaded into the lithium extraction device. In some embodiments, said lithium-selective sorbent is an ion exchange material. In some embodiments, the lithium selective sorbent is loaded into the lithium extraction device, and pressure is applied on the loaded sorbent using the deformable component in the filter bank. In some embodiments, the lithium selective sorbent is loaded into the lithium extraction device, and the loaded sorbent is squeezed using a membrane in said filter bank. In some embodiments, said pressure is applied on the loaded sorbent after initial loading of said sorbent, and then released. In some embodiments, said pressure is applied on the loaded sorbent during the entire operation of said device for lithium extraction, during certain periods of said operation. In some embodiments, said pressure is applied on the loaded sorbent when said sorbent absorbs lithium from a liquid resource. In some embodiments, said pressure is applied on the loaded sorbent when said sorbent releases the absorbed lithium to produce an acidic eluent solution. In some embodiments, said pressure is applied on the loaded sorbent when said sorbent is being washed with a wash solution. In some embodiments, said pressure is applied on the loaded sorbent when said sorbent is contacted with water. In some embodiments, said pressure is applied on the loaded sorbent when said sorbent is contacted with a gas.

In some embodiments, a suspended sorbent is conveyed from the vessel described above and into a vertical pressure filter. In some embodiments, conveyance of said suspension occurs by use of a mechanical device. In some embodiments, said mechanical device comprises a double-diaphragm pump, and air operated double-diaphragm pump, a diaphragm pump, a positive displacement pump, a centrifugal pump, a vortex pump, a slurry pump, or combinations thereof. In some embodiments, said suspension is conveyed from said vessel and into said ion exchange device by pressurizing the top of said vessel, such that the liquid suspension is forced by pressure-driven flow to exist said vessel through a pipe. In some embodiments, said suspension is conveyed from said vessel and into said ion exchange device by suction applied at the outlet of said lithium extraction device.

In some embodiments, the said suspension of sorbent is conveyed into the vertical pressure filter via a pipe. In some embodiments, said suspension of sorbent is conveyed into vertical pressure filter through one inlet port. In some embodiments, said suspension of sorbent is conveyed into said lithium extraction device through one or more inlet ports. In some embodiments, said suspension of sorbent is conveyed into said lithium extraction device through two inlet ports. In some embodiments, said suspension of sorbent is conveyed into said lithium extraction device through two inlet ports that are connected to opposite ends of the lithium extraction device. In some embodiments, one or more of said inlet ports connect to a common piping system that is in fluid contact with all filter banks within said lithium extraction device.

In some embodiments, one or more of said inlet ports connect to a common piping system that is in fluid contact with all filter banks within said lithium extraction device. In some embodiments, one or more of said inlet ports connect to a common conduit or piping system that is in fluid contact with all filter banks within said lithium extraction device. In some embodiments, the orientation of the fluid conveying the solids into the filter tray is horizontal, whereby the solids are delivered from the side of the filter tray, and then fill up the entire chamber within said filter tray.

In some embodiments, the outlet of the conduit for conveyance of sorbent into individual filter bank is dictated by the location of the slurry inlet port in a filter plate. For the purposes of this description, the center of the filter bank is the center of symmetry of said filter bank when observed in the direction of normal fluid flow through said bed. In some embodiments, said conduit is located at the center of the filter plate. In some embodiments, said conduit is located off-center from the center of the filter plate, wherein off-center implies a location in any of the radial directions from said center. In some embodiments, the ratio (distance from the center of said filter plate to the slurry inlet) to (distance from the center of plate to the edge of said plate) is less than about 0.1, less than about 0.25, less than about 0.4, less than about 0.5, less than about 0.75, less than about 0.9. In some embodiments, the ratio In some embodiments, the ratio (distance from the center of said filter plate to the slurry inlet) to (distance from the center of plate to the edge of said plate) is more than about 0.1, more than about 0.25, more than about 0.4, more than about 0.5, more than about 0.75, more than about 0.9. In some embodiments, the ratio (distance from the center of said filter plate to the slurry inlet) to (distance from the center of plate to the edge of said plate) is from about 0.01 to about 0.1, from about 0.1 to about 0.25, from about 0.25 to about 0.4, from about 0.4 to about 0.5, from about 0.5 to about 0.75, from about 0.75 about 0.9. In some embodiments, the outlet of the conduit for conveyance of sorbent into individual filter bank is located within said filter plate towards the top, bottom, side, or corner of said filter bed. In some embodiments, the outlet of the conduit for conveyance of sorbent into individual filter bank is outside said filter bank. In some embodiments, the outlet of the conduit for conveyance of sorbent into individual filter bank is located outside the bed of sorbent, at the top, bottom, side, or corner of the lithium extraction device but outside of the bed of sorbent, wherein bed of sorbent is defined as the sorbent that absorbs lithium during operation of the device.

In some embodiments, as the suspension of sorbent is conveyed into the device and into the filter banks, the suspension flows into the compartment within the filter bank, and the solids are retained within said compartment by the filter cloth or porous partition; the fluid flows across said partition, into the flow distribution chamber, and out of the filter bank through orifices and pipes. As described herein, each filter bank comprises one or more porous partitions. In some embodiments, fluid flows out of said filter bank through one of said porous partitions. In some embodiments, fluid flows out of said filter bank through two of said porous partitions. In some embodiments, fluid flows out of said filter bank through one or more of said porous partitions, and out of one of the pipes that connect said filter bank to the rest of the lithium extraction device. In some embodiments, fluid flows out of said filter bank through one or more of said porous partitions, and out of two of the pipes that connect said filter bank to the rest of the lithium extraction device. In some embodiments, fluid flows out of said filter bank through one or more of said porous partitions, and out of three of the pipes that connect said filter bank to the rest of the lithium extraction device. In some embodiments, fluid flows out of said filter bank through one or more of said porous partitions, and out of four of the pipes that connect said filter bank to the rest of the lithium extraction device. In some embodiments, fluid flows out of said filter bank through one or more of said porous partitions, and out of more than of one of the pipes that connect said filter bank to the rest of the lithium extraction device.

In some embodiments the lithium extraction device comprising a vertical pressure filter has a single inlet for conveyance of the suspension of sorbent into a filter tray in said vertical pressure filter. In some embodiments the lithium extraction device comprising a vertical pressure filter has two ore more inlets for conveyance of the suspension of sorbent into a filter tray in said vertical pressure filter.

In some embodiments, the bed of sorbent within said filter bank is filled with sorbent until the physical volume available in said filter bank is fully occupied by said sorbent. In some embodiments, the maximum fill level is determined based on the pressure required to pump the suspension of sorbent in fluid into said filter bank; when a certain pressure and pumping rate is reached, the filter banks are considered completely filled. In some embodiments, the filter banks are filled with sorbent until the pressure required to pump said suspended sorbent into said device is more than about 0.1 psi, more than about 1 psi, more than about 5 psi, more than about 10 psi, more than about 20 psi, more than about 50 psi, more than about 75 psi, more than about 100 psi, more than about 200 psi, more than about 500 psi. In some embodiments, the filter banks are filled with sorbent until the pressure required to pump said suspended sorbent into said device is less than about 0.1 psi, less than about 1 psi, less than about 5 psi, less than about 10 psi, less than about 20 psi, less than about 50 psi, less than about 75 psi, less than about 100 psi, less than about 200 psi, less than about 500 psi. In some embodiments, the filter banks are filled with sorbent until the pressure required to pump said suspended sorbent into said device is from about 0.1 psi to about 5 psi, from about 5 psi to about 10 psi, from about 10 psi to about 20 psi, from about 20 psi to about 50 psi, from about 50 psi to about 100 psi, from about 100 psi to about 250 psi, from about 250 psi to about 500 psi, from about 500 psi to about 1000 psi.

In some embodiments, the filter banks are filled with sorbent until the rate at which the suspended sorbent is pumped into said device is less than about 0.1%, less than about 1%, less than about 10%, less than about 50%, or less than about 75% of the initial rate at which the suspended sorbent is pumped into said device (when said device is empty). In some embodiments, the filter banks are filled with sorbent until the rate at which the suspended sorbent is pumped into said device is more than about 0.1%, more than about 1%, more than about 10%, more than about 50%, or more than about 75% of the initial rate at which the suspended sorbent is pumped into said device (when said device is empty). In some embodiments, the filter banks are filled with sorbent until the rate at which the suspended sorbent is pumped into said device is from about 0.01% to about 0.1%, from about 0.1% to about 1%, from about 1% to about 10%, from about 10% to about 50%, from about 50% to about 75% of the initial rate at which the suspended sorbent is pumped into said device (when said device is empty).

In some embodiments, such a device is constructed by using a series of filter banks wherein the filters contain ion exchange beads, as exemplified in examples 7, and associated figures. In some embodiments, such a device is constructed where multiple ion-exchange compartments are arranged vertically. In some embodiments, such filter banks are separated to load and unloaded the ion exchange beads. In some embodiments, the ion exchange beads are conveyed into the filter banks as a slurry to load the ion exchange beads into the ion exchange vessel. In some embodiments, loading of the ion exchange beads occurs in the same direction, opposite direction, orthogonal direction, or other direction relative the normal direction of flow during the ion exchange process. In some embodiments, the tension holding the filter bank together is increased, decreased, or maintained during the ion exchange process.

In some embodiments, ion-exchange compartments are added or removed from the vessel by mechanical means, such that the number of ion-exchange compartments are adjusted. In some embodiments, ion-exchange compartments and their components are mechanically separated to clean out, replace, and fill in compartments and partitions between compartments.

In one embodiment, the ion exchange compartment within each ion-exchange compartment is partially filled with ion exchange beads, such that ion exchange beads freely move within their containing compartment during contacting with fluid. In some embodiments, the ion exchange compartment is filled to its capacity with ion exchange beads, such that ion exchange beads are fixed in place and cannot freely move within the containing compartment during contacting with fluid. In one embodiment, the ion exchange compartment is partially filled, and becomes completely filled by the change in volume of ion exchange beads that occurs when contacting said beads with certain fluids. In some embodiments, the ion exchange compartment is configured such that ion exchange beads may enter and leave the ion-exchange compartment conveyed by the fluid which they are contacting, in the top-down or down-top direction. In one embodiment, the ion exchange beads may be loaded into and unloaded from said compartments through the top or bottom of the compartments, through the sides, or by mechanically separating and opening the ion-exchange compartment to expose the compartment and subsequently filling said compartment with ion-exchange beads.

In some embodiments, the typical length of the vessel containing the ion-exchange compartments is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the said vessel is more than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of said vessel is from about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the devices, vessels, system, and methods described herein utilize a flow distribution compartment to optimize the flow of various liquids, solutions or gases through the devices, vessels, and systems. In some embodiments, the flow distribution compartment is an inner flow distribution compartment and/or outer flow distribution compartment. In one embodiment, the flow distribution compartment and/or ion-exchange bead compartment is empty, partially filled, or fully filled with fluid, or a combination thereof. In some embodiments, the flow distribution compartment and/or ion-exchange bead compartment are cylindrical, rectangular, irregular, or a combination thereof. In some embodiments, the flow distribution compartment has a constant cross-sectional area or a varying cross-sectional area.

In some embodiments, the filter banks comprise one or more flow distribution compartments. In some embodiments, the filter bank comprises two flow distribution compartments. In some embodiments, said flow distribution compartments comprise a flow distribution surface. In some embodiments, said flow distribution compartment comprises inlet orifices, a void, and a permeable partition. In some embodiments, said void is formed between the porous partition and the flow distribution surface. In some embodiments, said flow distribution surface comprises a textured surface. Examples of flow distribution compartments within filter banks are shown in FIG. 7. FIG. 7 shows screen 707, which is immediately adjacent to porous partition 708, such that said porous partition can be in physical contact with flow distribution screen 707, yet a void persists underneath said screen.

In some embodiments, the uniformity of flow across the lithium selective sorbent can be further enhanced by mechanically compressing the sorbent-bed by a deformable flow distribution surface. In some embodiments, this deformable surface optionally comprises a membrane, as described herein. In one embodiment shown in FIG. 7, said membrane is denoted 710. In some embodiments, said membrane applies mechanical compression on the bed of lithium-selective sorbent. In some embodiments, said mechanical compression is applied during loading of the sorbent into the filter bank, and is not applied during operation of the device as a lithium extraction device. In some embodiments, said compression is applied during contact with a liquid resource. In some embodiments, said compression is applied during contact with a wash solution. In some embodiments, said compression is applied during contact with an acidic eluent. In some embodiments, said compression is applied at different times, wherein the time between cycles of compression and release is constant, increases with time, decreases with time, varies sinusoidally, is non-uniform, or a combination thereof.

In some embodiments, the shape of said flow distribution surface conforms to the shape of the filter bank. In some embodiments, the shape of said flow distribution surface conforms to the shape of the porous partition. In some embodiments, the shape of said flow distribution surface conforms to the shape of the sorbent cake or bed.

In some embodiments, the filter plates comprise structural supports, fasteners, beams, adhesives, compression fittings, gaskets or other structural components for fastening of all components of the filter bank. In some embodiments, the filter plates comprise pipes, tubes, conduits, conducts, and orifices that direct flow into individual filter banks. In some embodiments, the fluid conduits that deliver and remove fluid flow to and from the flow distribution compartments, chambers, and surfaces described above, are configured to uniformly distribute flow across the bed of lithium selective sorbent. In some embodiments, said fluid conduits comprise orifices.

In some embodiments, the fluid flown in this manner is a liquid resource comprising lithium, such that the lithium-selective sorbent absorbs lithium from said liquid resource. In some embodiments, the fluid flown in this manner is a wash solution comprising water, such that entrained fluids are removed from the bed of lithium-selective sorbent. In some embodiments, the lithium selective sorbent is an ion exchange material and the fluid flown in this manner is an acidic eluent solution comprising protons, such that the lithium selective sorbent releases lithium while absorbing protons. In some embodiments, the fluid flown in this manner is water, such that the lithium selective sorbent releases lithium. In some embodiments, the flows described herein are alternated through the same ion exchange material that is held within the filter bank.

In some embodiments, the fluid flown is a liquid. In some embodiments, the flow rate of fluid through the bed of lithium selective sorbent in one filter bank is less than about 1 mL/min, less than about 10 mL/min, less than about 100 mL/min, less than about 1 L/min, less than about 10 L/min, less than about 100 L/min, less than about 1,000 L/min, less than about 10,000 L/min. In some embodiments, the flow rate of fluid through the bed of lithium selective sorbent in one filterbank is more than about 1 mL/min, more than about 10 mL/min, more than about 100 mL/min, more than about 1 L/min, more than about 10 L/min, more than about 100 L/min, more than about 1,000 L/min, more than about 10,000 L/min. In some embodiments, the flow rate of fluid through the bed of lithium selective sorbent in one filter bank is from about 1 mL/min to about 10 mL/min, from about 10 mL/min to about 100 mL/min, from about 100 mL/min to about 1 L/min, from about 1 L/min to about 10 L/min, from about 10 L/min to about 100 L/min, from about 100 L/min to about 1,000 L/min, from about 1,000 L/min to about 10,000 L/min.

In some embodiments, the fluid flown is a liquid. In some embodiments, the ratio of volume of lithium-selective sorbent to flow rate of fluid through the bed of lithium selective sorbent, which has units of time, indicates the characteristic contact time of fluid with the bed of lithium selective sorbent. In some embodiments, said characteristic contact time is less than about 1 second, less than about 10 seconds, less than about 1 minute, less than about 5 minutes, less than about 10 minutes, less than about 1 hours, less than about 10 hours, less than about 1 day. In some embodiments, said characteristic contact time is more than about 1 second, more than about 10 seconds, more than about 1 minute, more than about 5 minutes, more than about 10 minutes, more than about 1 hours, more than about 10 hours, more than about 1 day. In some embodiments, said characteristic contact time is from about 0.1 second to about 1 second, from about 1 second to about 10 seconds, from about 10 seconds to about 1 minute, from about 1 minute to about 5 minutes, from about 5 minutes to about 10 minutes, from about 10 minutes to about 1 hours, from about 1 hours to about 10 hours, from about 1 hours to about 1 day.

In some embodiments, the fluid flown is a liquid. In some embodiments, the ratio of volume of flow rate of fluid through the bed to the surface area of the bed, which has units of length per time, indicates the characteristic flux of fluid through the bed of lithium selective sorbent. In some embodiments, said characteristic flux is less than about 1 mm/min, less than 1 cm/min, less than about 10 cm/min, less than about 1 m/min, less than about 10 m/min, less than about 100 m/min. In some embodiments, the flow rate of fluid through the bed of lithium selective sorbent in one filter bank is more than about 1 mm/min, more than 1 cm/min, more than about 10 cm/min, more than about 1 m/min, more than about 10 m/min, more than about 100 m/min. In some embodiments, the flow rate of fluid through the bed of lithium selective sorbent in one filterbank is from about 0.1 mm/min to about 1 mm/min, from about 1 mm/min to about 1 cm/min, from about 1 cm/min to about 10 cm/min, from about 10 cm/min to about 1 m/min, from about 1 m/min to about 10 m/min, from about 10 m/min to about 100 m/min.

In some embodiments, the fluid flown is a gas. In some embodiments, said gas is air, nitrogen, argon, or a different gas. In some embodiments, the flow rate of fluid through the bed of lithium selective sorbent in one filter bank is less than about 1 mL/min, less than about 10 mL/min, less than about 100 mL/min, less than about 1 L/min, less than about 10 L/min, less than about 100 L/min, less than about 1,000 L/min, less than about 10,000 L/min. In some embodiments, the flow rate of fluid through the bed of lithium selective sorbent in one filter bank is more than about 1 mL/min, more than about 10 mL/min, more than about 100 mL/min, more than about 1 L/min, more than about 10 L/min, more than about 100 L/min, more than about 1,000 L/min, more than about 10,000 L/min. In some embodiments, the flow rate of fluid through the bed of lithium selective sorbent in one filter bank is from about 1 mL/min to about 10 mL/min, from about 10 mL/min to about 100 mL/min, from about 100 mL/min to about 1 L/min, from about 1 L/min to about 10 L/min, from about 10 L/min to about 100 L/min, from about 100 L/min to about 1,000 L/min, from about 1,000 L/min to about 10,000 L/min.

In some embodiments, the fluid flown is a gas. In some embodiments, said gas is air, nitrogen, argon, or a different gas. In some embodiments, the ratio of volume of lithium-selective sorbent to flow rate of fluid through the bed of lithium selective sorbent, which has units of time, indicates the characteristic contact time of fluid with the bed of lithium selective sorbent. In some embodiments, said characteristic contact time is less than about 1 second, less than about 10 seconds, less than about 1 minute, less than about 5 minutes, less than about 10 minutes, less than about 1 hours, less than about 10 hours, less than about 1 day. In some embodiments, said characteristic contact time is more than about 1 second, more than about 10 seconds, more than about 1 minute, more than about 5 minutes, more than about 10 minutes, more than about 1 hours, more than about 10 hours, more than about 1 day. In some embodiments, said characteristic contact time is from about 0.1 second to about 1 second, from about 1 second to about 10 seconds, from about 10 seconds to about 1 minute, from about 1 minute to about 5 minutes, from about 5 minutes to about 10 minutes, from about 10 minutes to about 1 hours, from about 1 hours to about 10 hours, from about 1 hours to about 1 day.

In some embodiments, the fluid flown is a gas. In some embodiments, said gas is air, nitrogen, argon, or a different gas. In some embodiments, the ratio of volume of flow rate of fluid through the bed to the surface area of the bed, which has units of length per time, indicates the characteristic flux of fluid through the bed of lithium selective sorbent. In some embodiments, said characteristic flux is less than about 1 mm/min, less than 1 cm/min, less than about 10 cm/min, less than about 1 m/min, less than about 10 m/min, less than about 100 m/min. In some embodiments, the flow rate of fluid through the bed of lithium selective sorbent in one filter bank is more than about 1 mm/min, more than 1 cm/min, more than about 10 cm/min, more than about 1 m/min, more than about 10 m/min, more than about 100 m/min. In some embodiments, the flow rate of fluid through the bed of lithium selective sorbent in one filter bank is from about 0.1 mm/min to about 1 mm/min, from about 1 mm/min to about 1 cm/min, from about 1 cm/min to about 10 cm/min, from about 10 cm/min to about 1 m/min, from about 1 m/min to about 10 m/min, from about 10 m/min to about 100 m/min.

In some embodiments, the pressure applied to flow said fluid across the ion-exchange bed is less than 5 psi, less than 25 psi, less than 50 psi, less than 100 psi, less than 150 psi, less than 250 psi, or less than 500 psi. In some embodiments, the pressure applied to flow said fluid across the ion-exchange bed is more than 5 psi, more than 25 psi, more than 50 psi, more than 100 psi, more than 150 psi, more than 250 psi, or more than 500 psi. In some embodiments, the pressure applied to flow said fluid across the ion-exchange bed is from about 1 psi to about 5 psi, from about 5 psi to about 25 psi, from about 25 psi to about 50 psi, from about 50 psi to about 100 psi, from about 100 psi to about 150 psi, from about 150 psi to about 250 psi, from about 250 psi to about 500 psi.

In some embodiments, the vertical pressure filter comprises multiple filter banks. In some embodiments, when operation of the device is complete, filter plates are separated such that an individual filter bank is exposed. In one embodiment shown in FIG. 7, each filter bank comprises a support structure (707), upon which a porous filter belt is positioned (708). The chamber that is loaded with lithium-selective sorbent (709) is positioned immediately above this porous filer belt. The filter belt continuously connects between all trays, as shown in insert FIG. 7B as a connection from the one to the subsequent tray, connected through roller 711. In one embodiment, when the lithium selective sorbent is to be removed from the deice, the filter banks are separated by releasing the pressure from hydraulic system 705 and separating the plates using structural support 706. The filter belt (708) rolls using rollers 711, resulting in the bed of ion-exchange material falling off the side of the device. The ion-exchange device is thus empty and ready to be re-loaded with ion-exchange beads for further lithium extraction. The used ion-exchange beads are taken to a different location in the lithium plant for their recycle.

In some embodiments, said filter process of rolling a filter belt is used to automatically discharge the filter bed. In some embodiment, a spatula is used to discharge the contents of the device manually.

In some embodiments, a solid receiving device is position below or near the lithium-extraction device, such that said device contains the discharged material, and such that said discharged material can be subsequently conveyed away. In some embodiments, said solids receiving device is a tray, a hopper, a fork liftable hopper. In some embodiments, said discharged material are received by a drip tray, which is fitted with a motor to open downwards, thereby allowing said solids to be discharged to a second system. In some embodiments, a conveyor belt is positioned below the vertical pressure filter, such that the solids can be automatically removed and conveyed away after discharge. In some embodiments, the vertical pressure filter is positioned above a tank, such that the solids can fall directly into said tank after discharge. In some embodiments, the vertical pressure filter is positioned above an agitated tank. In some embodiments, the vertical pressure filter is positioned above a tank containing a liquid resource comprising lithium, such that the discharged lithium-selective sorbent absorbs lithium when discharged from the device into the tank. In some embodiments, the vertical pressure filter is positioned above a tank containing an acidic eluent, such that the discharged lithium-selective sorbent releases lithium when discharged from the device into the tank. In some embodiments, the vertical pressure filter is positioned above a tank containing a wash solution, such that the discharged lithium-selective sorbent is washed when discharged from the device.

In some embodiments, the solid sorbent is discharged from the device about once per year, about once per month, about once per week, about once per day, about twice per day, about three times per day, about one time per hour, about twice per hour, or about five times per hour. In some embodiments, the lithium-selective sorbent is discharged in coordination with the lithium extraction process. In some embodiments, the lithium-selective sorbent is discharged after it has contacted a liquid resource containing lithium. In some embodiments, the lithium-selective sorbent is discharged after it is saturated with lithium, having contacted a liquid resource containing lithium. In some embodiments, the lithium-selective sorbent is discharged after a certain amount of contact time with a lithium containing liquid resource. In some embodiments, the lithium-selective sorbent is discharged after it has contacted a wash solution. In some embodiments, the lithium-selective sorbent is discharged after it has contacted an aqueous solution. In some embodiments, said aqueous solution releases the lithium contained in said lithium selective sorbent. In some embodiments, the lithium-selective sorbent is discharged after it has contacted an acidic eluent solution, such that lithium from said sorbent has been released.

In some embodiments, the vertical pressure filter is filled with a lithium selective sorbent. In some embodiments, the volume of sorbent that is contained within said device is less than about 1 mL, less than about 10 mL, less than about 100 mL, less than about 1 L, less than about 10 L, less than about 100 L, less than about 1 cubic meter, less than about 10 cubic meters, less than about 100 cubic meters, less than about 1,000 cubic meters, or less than about 10,000 cubic meters. In some embodiments, the volume of sorbent that is contained within said device is more than about 1 mL, more than about 10 mL, more than about 100 mL, more than about 1 L, more than about 10 L, more than about 100 L, more than about 1 cubic meter, more than about 10 cubic meters, more than about 100 cubic meters, more than about 1,000 cubic meters, or more than about 10,000 cubic meters. In some embodiments, the volume of sorbent that is contained within said device is from about 0.1 mL to about 1 mL, from about 1 mL to about 10 mL, from about 10 mL to about 100 mL, from about 100 mL to about 1 L, from about 1 L to about 10 L, from about 10 L to about 100 L, from about 100 L to about 1 cubic meter, from about 1 cubic meter to about 10 cubic meters, from about 10 cubic meters to about 100 cubic meters, from about 100 cubic meters to about 1,000 cubic meters, or from about 1,000 cubic meters to about 10,000 cubic meters.

In some embodiments, the amount of lithium-selective sorbent that can be contained said device can be adjusted by directing the flow of a suspension comprising the lithium-selective sorbent to only a portion of the filter trays.

Methods for Loading a Lithium Extraction Device with a Lithium-Selective Sorbent An aspect of the disclosure herein is a method for loading a lithium-selective sorbent into a lithium extraction device, wherein said device comprises one or more filter banks. In some embodiments, said filter banks are filled with lithium-selective sorbent.

In some embodiments, the lithium selective sorbent is loaded into the lithium extraction device. An example of a method for loading lithium-selective sorbent into a lithium extraction device is shown in Example 3. The device comprises a filter press (FIG. 3).

In this device (FIG. 3A), multiple filter plates (304) are maintained in a vertical position by structural supports (302) comprising coated carbon-steel beams. The plates are pressed together to form a "horizontal stack" of approximately 130 plates (303). The plates contain non-gasketed filter cloths that provide a total filtration area of approximately 900 square meters, and are manufactured out of polypropylene. The filter cloths are constructed of woven polypropylene. The plates can hold a total of approximately 14,000 L of ion exchange beads. The structural frame of the filter press comprises a hydraulic system at one end of the device (201), which applies 750 kN of force on the last plate in the stack, therefore squeezing the filter stack together and maintaining the stack closed.

Fluid process connections are located at both ends of the device (316), both at the opposite end from said hydraulic piston, and at the end with the hydraulic piston. This is considered a "double-end feed" and "double-end wash" configuration. These connect to three distinct fluid conduits that direct fluid flow to and from all filter banks. These fluid conduits comprise a sorbent slurry inlet that is approximately 15 cm in diameter (310), which is used to load the device with the lithium-selective sorbent, and two fluid flow conduits of approximately 12 cm in diameter (306, 307). These latter conduits carry liquid or gaseous flow streams including water, the liquid resource, an acidic eluent solution, or air, to each of the filter banks simultaneously.

FIG. 3B shows the detail of a filter bank. The filter bank comprises a cake of sorbent material (305) contained between filter cloths (314) supported on two opposing filter plates (304). The thickness of the sorbent cake contained within this filter bank is approximately 32 mm; the filter cake is approximately a square with a length of about 1900 mm, and its four corners are cut off diagonally to form an octagon. The filter plates are square, and their dimension is about 2000 mm by 2000 mm. The lithium extraction device is first loaded with a lithium-selective sorbent material. The sorbent material comprises ion-exchange beads. \

To load the lithium extraction device with ion-exchange beads, said beads are loaded into an agitated vessel, and suspended in water to form a 1% v/v suspension. Said vessel is fitted with an air-delivery manifold at the bottom, and air is injected when agitation is begun. When air is co-injecting in conjunction with agitation, the suspension is fluidized in less than 30 seconds; otherwise, full agitation of the solids occurs only after 5 minutes. Agitation is achieved by means of a propeller stirrer.

To load the device with ion-exchange beads, beads are pumped from said vessel into the lithium-extraction device. Beads are pumped into inlets 310 on both ends of the device using an air-operated double-diaphragm pump. Inlet 310 is located towards the bottom of the filter banks. Because 310 is in fluid communication with all filter banks, the ion-exchange material flows into all filter banks simultaneously, is retained in said filter banks by filter cloths (314), flows into the space created by the textured flow distribution surface (313), and flows out of the top of the filter plates through orifices 3061 and 3071, through pipes 306 and 307, and out of the ion exchange device. This loading continues until all filter banks are filled. Pumping of the slurry is continued until the pressure necessary to pump the slurry increases beyond 100 psi. After this point is reached, the loading of the lithium sorbent is considered complete.

In some embodiments, in order to load said sorbent into the device, the lithium selective sorbent is suspended in a fluid within a vessel. For the purposes of this disclosure, suspension of a solid in a liquid is also termed "fluidization", or fluidization of said solids. In some embodiments, said fluid is water, a liquid resource containing lithium, a brine, an acidic eluent solution, an acidic solution, or a mixture thereof. In some embodiments, said fluid is a gas flown in a manner that fluidizes the sorbent. In some embodiments, the sorbent is suspended in a liquid by agitating sorbent in said liquid, such that the solids are distributed uniformly or non-uniformly throughout the fluid. In some embodiments, the distribution of solids in said fluid allows for the solids to be conveyed out of the vessel where it is contained. In some embodiments, suspension of said solids occurs by agitation of solid solids and said fluid, wherein agitation occurs with a mechanical agitator, an eductor, fluid recirculation, baffles, shaking, tapping or a combination thereof. In some embodiments, the fluidization of said ion exchange material occurs by means of contact with one or more gases phases. In some embodiments, the fluidization of said ion exchange material occurs by means of contact with a liquid resource, a wash solution, an acidic solution, one or more alternate phases or combinations thereof. In some embodiments, said ion exchange material is fluidized during contact with said liquid resource. In some embodiments, said ion exchange material is fluidized during contact with said acidic solution. In some embodiments, said ion exchange material is fluidized during contact with said alternate phase. In some embodiments, said ion exchange material is fluidized during contact with said wash solution.

In some embodiments, initial fluidization of the solids is aided by contacting a pressurized gas with said solid sorbent and said fluid. In some embodiments, said aiding occurs by the additional turbulence and break up of the consolidated solids at the bottom of the vessel where said solids are stored. In some embodiments, said gas is air, nitrogen, argon, oxygen, chlorine, a different gas, or a combination thereof. In some embodiments, injection of said gas for contact with the solid and fluid occurs through one or more of a pipe, tubing, channels, slits, beams, baffles, baskets, scallops, nozzles, or a mesh. In some embodiments, the components that direct flow within the vessel are perforated. In some embodiments, the openings or perforations in the components that distribute flow are shaped as circles, ovals, vertical or horizontal slits, squares, crosses, rectangles, triangles, irregular shapes, or a combination thereof.

In some embodiments, flow of the gas occurs from the top to the bottom of the vessel. In some embodiments, flow of the gas occurs from the bottom to the top of the vessel. In some embodiments, flow of the gas occurs from the inside to the outside of the vessel. In some embodiments, flow of the gas occurs from the outside to the inside of the vessel.

In one embodiment, the vessel has an internal nozzle designed to distribute flow of the gas evenly. In one embodiment, the vessel has nozzles placed equidistant with each other on a support plate. In one embodiment the nozzles are spaced out so that each nozzle covers the same area. In one embodiment the nozzles have slits or holes of width of less than 0.1 µm, less than 1 µm, less than 10 µm, less than 100 µm, or less than 1 mm. In one embodiment, the vessel has mesh with holes less than 0.1 µm, less than 1 µm, less than 10 µm, less than 100 µm, or less than 1000 µm. In some embodiments, the openings or perforation in one or more for the flow distribution components, such as pipes, tubing, channels, slits, beams, baffles, baskets, scallops, nozzles, or a mesh, have a dimension of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm, less than about 4000 µm, less than about 8000 µm, or less than about 10000 µm. In some embodiments, the openings or perforation in one or more for the flow distribution components have a dimension of less than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm, more than about 4000 µm, more than about 8000 µm, or more than about 10000 µm. In some embodiments, the openings or perforation in one or more for the flow distribution components have a dimension of less than about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm, from about 2000 µm to about 4000 µm, from about 4000 µm to about 8000 µm, from about 6000 µm to about 10000 µm.

In some embodiments, a gas is contacted with the lithium selective sorbent for more than about 10 milliseconds, more than about 100 milliseconds, more than about 1 second, more than about 10 seconds, more than about 100 seconds, more than about 1 minute, more than about 10 minutes, more than about 100 minutes, more than about 1 hour, more than about 10 hours, more than about 100 hours. In some embodiments, an gas is contacted with the ion exchange beads for less than about 10 milliseconds, less than about 100 milliseconds, less than about 1 second, less than about 10 seconds, less than about 100 seconds, less than about 1 minute, less than about 10 minutes, less than about 100 minutes, less than about 1 hour, less than about 10 hours, less than about 100 hours. In some embodiments, an gas is contacted with the ion exchange beads from about 10 milliseconds to about 100 milliseconds, from about 100 milliseconds to about 1 second, from about 1 second to about 10 seconds, from about 10 seconds to about 100 seconds, from about 100 seconds to about 1 minute, from about 1 minute to about 10 minutes, from about 10 minutes to about 100 minutes, from about 1 hour to about 10 hours, from about 10 hours to about 100 hours.

In some embodiments, a gas is injected to contact lithium selective sorbent at a pressure of more than about 0.1 psi, more than about 1 psi, more than about 5 psi, more than about 10 psi, more than about 50 psi, more than about 100 psi, more than about 500 psi, more than about 1000 psi, more than about 500 psi, more than about 1000 psi. In some embodiments, an gas is injected to contact the ion exchange beads at a pressure of less than about 0.1 psi, less than about 1 psi, less than about 5 psi, less than about 10 psi, less than about 50 psi, less than about 100 psi, less than about 500 psi, less than about 1000 psi, less than about 500 psi, less than about 1000 psi. In some embodiments, an gas is injected to contact the ion exchange beads at a pressure from about 0.1 psi to about 5 psi, from about 5 psi to ab out 10 psi, from about 10 psi to about 50 psi, from about 50 psi to about 100 psi, from about 100 psi to about 500 psi, from about 500 psi to about 1000 psi, from about 1000 psi to about 5000 psi, from about 5000 psi to about 10,000 psi. In some embodiments, the suspended lithium selective sorbent is loaded into the lithium extraction device.

In some embodiments, the suspended sorbent is conveyed from the vessel described above and into an ion exchange device comprising multiple filter banks. In some embodiments, conveyance of said suspension occurs by use of a mechanical device. In some embodiments, said mechanical device comprises a double-diaphragm pump, and air operated double-diaphragm pump, a diaphragm pump, a positive displacement pump, a centrifugal pump, a vortex pump, a slurry pump, or combinations thereof. In some embodiments, said suspension is conveyed from said vessel and into said ion exchange device by pressurizing the top of said vessel, such that the liquid suspension is forced by pressure-driven flow to exist said vessel through a pipe. In some embodiments, said suspension is conveyed from said vessel and into said ion exchange device by suction applied at the outlet of said lithium extraction device.

In some embodiments, the suspension of sorbent that is loaded into the ion exchange device has a solids content of less than about 0.001% v/v (solids volume per total solution volume), of less than about 0.01% v/v, of less than about 0.1% v/v, of less than about 1% v/v, of less than about 10% v/v, of less than about 50% v/v, of less than about 75% v/v, of less than about 100% v/v. In some embodiments, the suspension of sorbent that is loaded into the ion exchange device has a solids content of more than about 0.001% v/v (solids volume per total solution volume), of more than about 0.01% v/v, of more than about 0.1% v/v, of more than about 1% v/v, of more than about 10% v/v, of more than about 50% v/v, of more than about 75% v/v. In some embodiments, the suspension of sorbent that is loaded into the ion exchange device has a solids content of from about 0.001% v/v (solids volume per total solution volume) to about 0.01% v/v, from about 0.01% v/v to about 0.1% v/v, of from about 0.1% v/v to about 1% v/v, of from about 1% v/v to about 10% v/v, of from about 10% v/v to about 50% v/v, of from about 50% v/v to about 75% v/v, of from 75% v/v to about 100% v/v. In some embodiments, the suspension of sorbent is a thick suspension. In some embodiments, said suspension of sorbents is a slurry.

In some embodiments, the said suspension of sorbent is conveyed into the lithium extraction device via a pipe. In some embodiments, said suspension of sorbent is conveyed into said lithium extraction device through one inlet port. In some embodiments, said suspension of sorbent is conveyed into said lithium extraction device through one or more inlet ports. In some embodiments, said suspension of sorbent is conveyed into said lithium extraction device through two inlet ports. In some embodiments, said suspension of sorbent is conveyed into said lithium extraction device through two inlet ports that are connected to opposite ends of the lithium extraction device. In some embodiments, one or more of said inlet ports connect to a common piping system that is in fluid contact with all filter banks within said lithium extraction device.

In some embodiments, one or more of said inlet ports connect to a common piping system that is in fluid contact with all filter banks within said lithium extraction device. In some embodiments, one or more of said inlet ports connect to a common conduit or piping system that is in fluid contact with all filter banks within said lithium extraction device.

Embodiments for Methods of Extraction of Lithium from Lithium Extraction Devices An aspect of the disclosure herein is a device for lithium extraction from a liquid resource, wherein said device comprises one or more filter banks containing a lithium-selective sorbent. In some embodiments, said lithium extraction comprises a filter press. In some embodiments, said lithium extraction device comprises a vertical pressure filer. An aspect of the disclosure herein is the use of a filter press to extract lithium, wherein said filter press is filled with a lithium-selective sorbent, and said sorbent is contacted with a liquid resource comprising lithium in said filter press. An aspect of the disclosure herein is the use of a vertical pressure filter to extract lithium, wherein said vertical pressure filter is filled with a lithium-selective sorbent, and said sorbent is contacted with a liquid resource comprising lithium in said filter press.

In one aspect described herein, is a process for lithium extraction from a liquid resource comprising treating ion exchange beads within said device, by treating ion ion exchange beads alternately with acid, brine, and optionally other solutions, in a configuration where the beads move in the net opposite direction to the acid, brine, and optionally other solutions, thereby producing a lithium-enriched solution from the liquid resource. In one embodiment, the process comprises: (a) treating the ion exchange beads with acid under conditions suitable to absorb hydrogen to generate hydrogen-enriched beads and release lithium to generate a lithium-enriched solution; (b) optionally, washing the hydrogen-enriched beads with water to generate hydrogen-enriched beads substantially free of residual acid; (c) treating the hydrogen-enriched beads with the liquid resource under conditions suitable to absorb lithium to generate lithium-enriched beads; (d) optionally, washing the lithium-enriched beads with water to generate lithium-enriched beads substantially free of liquid resource; and (e) repeating the cycle to produce a lithium-enriched solution from the liquid resource.

In some embodiments, the process of extracting lithium occurs by contacting solutions described above with ion exchange beads occurs within one or more of the devices for lithium extraction disclosed herein. Examples of lithium extraction with such devices are provided in examples 1, 2, 4, 5, 6, 7, 8, 9, 10, and associated figures.

In one aspect described herein, is a process for lithium extraction from a liquid resource comprising treating ion exchange material alternately with acid, brine, and optionally other solutions, in a configuration where the ion exchange material moves in the net opposite direction to the acid, brine, and optionally other solutions, thereby producing a lithium-enriched solution from the liquid resource. In one aspect described herein, is a process for lithium extraction from a liquid resource comprising treating ion exchange material alternately with acid, the liquid resource, and optionally other solutions, in a configuration where the ion exchange material moves in the net opposite direction to the acid, liquid resource, and optionally other solutions, thereby producing a lithium-enriched solution from the liquid resource. In one aspect described herein, is a process for lithium extraction from a liquid resource comprising treating ion exchange material alternately with acid, brine, and optionally other solutions, in a configuration where the ion exchange material moves in the net opposite direction to the acid, brine, and optionally other solutions, thereby producing a lithium-enriched solution from the brine. In one embodiment, the process comprises: (a) treating the ion exchange material with acid under conditions suitable to absorb hydrogen to generate hydrogen-enriched material and release lithium to generate a lithium-enriched solution; (b) optionally, washing the hydrogen-enriched material with water to generate hydrogen-enriched material substantially free of residual acid; (c) treating the hydrogen-enriched material with the liquid resource under conditions suitable to absorb lithium to generate lithium-enriched material; (d) optionally, washing the lithium-enriched beads with water to generate lithium-enriched beads substantially free of liquid resource; and (e) repeating the cycle to produce a lithium-enriched solution from the liquid resource.

In one embodiment, the ion exchange beads comprise ion exchange particles that reversibly exchange lithium and hydrogen and a structural matrix material, and having a pore network. In one embodiment, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays leachate from recycled products, leachate from recycled materials, or combinations thereof.

In some embodiments herein, is a process for lithium extraction from a liquid resource comprising treating ion exchange beads alternately with acid, brine, and optionally other solutions, in a configuration where the beads move in the net opposite direction to the acid, brine, and optionally other solutions, thereby producing a lithium-enriched solution from the liquid resource, wherein the process comprises: a) treating the ion exchange beads with acid under conditions suitable to absorb hydrogen to generate hydrogen-enriched beads and release lithium to generate a lithium-enriched solution; b) optionally, washing the hydrogen-enriched beads with water to generate hydrogen-enriched beads substantially free of residual acid; c) treating the hydrogen-enriched beads with the liquid resource under conditions suitable to absorb lithium to generate lithium-enriched beads; d) optionally, washing the lithium-enriched beads with water to generate lithium-enriched beads substantially free of liquid resource; and e) repeating the cycle to produce a lithium-enriched solution from the liquid resource.

In one aspect described herein, is a process for lithium extraction from a liquid resource comprising treating ion exchange particles alternately with the liquid resource, washing fluid, and acid, in a system for the extraction of lithium ions from a liquid resource, comprising: a. an ion exchange material; b. a ion exchange vessel; and c. a pH modulating setup for increasing the pH of the liquid resource in the system.

In one aspect described herein, is a process for lithium extraction from a liquid resource comprising treating ion exchange particles alternately with the liquid resource, a washing fluid, and an acid solution, with a system for the extraction of lithium ions from a liquid resource, comprising a stirred rank reactor, an ion exchange material, a pH modulating setup for increasing the pH of the liquid resource in the ion exchange vessel, and a compartment for containing the ion exchange material in the ion exchange vessel while allowing for removal of liquid resource, washing fluid, and acid solutions from the ion exchange vessel.

In some embodiments, a liquid resource flows into one side of each filter bank containing ion exchange beads, and exits on the other side said filter bank, having undergone an ion-exchange process. In some embodiments, a flow distribution network delivers the liquid resource to each one of these filter banks independently. In some embodiments, the device is constructed such that a flow distribution network recovers the liquid resource that underwent lithium extraction from each one of these ion-filter banks independently. In some embodiments, this allows for multiple simultaneous and concurrent lithium extraction processes to occur within the same device. In some embodiments, the separation of lithium-selective sorbent into several filter banks results in minimal flow distance through ion exchange beads.

In some embodiments, the lithium extraction device is position next to a tank, such that the solids from the lithium extraction device can be sent to a tank directly after discharge from said lithium extraction device. In some embodiments, the lithium extraction device is positioned directly above an agitated tank. In some embodiments, the solids discharged from the lithium extraction device are sent to a tank containing a liquid resource comprising lithium, such that the discharged lithium-selective sorbent absorbs lithium when discharged from the device into the tank. In some embodiments, the solids discharged from the lithium extraction device are sent to a tank containing an acidic eluent solution, such that the discharged lithium-selective sorbent releases lithium when discharged from the device into the tank. In some embodiments, the solids discharged from the lithium extraction device are sent to a tank containing a wash solution, such that the discharged lithium-selective sorbent is washed when discharged from the device. In some embodiments, the lithium selective sorbent in said agitated tank is fed as a suspension into a lithium extraction device comprising multiple filter banks, so as to separate the solids from the liquid resource, wash solution, or eluent solutions. In some embodiments, said process is performed during every ion exchange cycle. In some embodiments, said process is performed every certain number of ion exchange cycles. In some embodiments, said process is performed about every two, five, ten, twenty, fifty, one hundred, five hundred, one thousand, five thousand, or ten thousand ion exchange cycles.

In some embodiments, the lithium selective sorbent is discharged from the ion exchange device when the performance of said lithium selective sorbent decreases below a particular level. In some embodiments, this performance is based on lithium absorption capacity, lithium eluate purity, lithium uptake speed, flow uniformity, fluid pressure drop, other performance metrics, or combinations thereof. In some embodiments, said discharged lithium selective sorbent undergoes a classification process to separate sorbent particles with lower performance, from sorbent particles with satisfactory performance. In some embodiments, solid particles with satisfactory performance are re-used by loading them into the same or a different lithium extraction device. In some embodiments, a portion of the discharged lithium extraction sorbent particles are mixed with new lithium selective sorbent particles, and loaded into a lithium extraction device. These and related embodiments allow for the efficient reutilization of the lithium selective sorbent.

Definitions

The terms "lithium", "lithium ion", "Li" and "$Li^+$" describe a cationic lithium atom species without reference to any particular counterion and are used interchangeably in the present specification. These terms are synonymous unless specifically noted to the contrary.

The term "lithium salt" is used to denote a chemical entity including at least one lithium cation and at least one anion.

The terms "hydrogen", "hydrogen ion", "proton", and "$H^+$" describe a cationic hydrogen atom and are used interchangeably in the present specification and these terms are synonymous unless specifically noted to the contrary.

As used herein, the words "column" and "vessel" are used interchangeably. In some embodiments described herein referring to a "vessel", the vessel is a column. In some embodiments described herein referring to a "column", the column is a vessel.

As used herein, the word "sorbent", "sorbent material" are used interchangeably. In some embodiments, the "sorbent" is a lithium-selective sorbent, wherein said sorbent selectively absorbs lithium from a liquid resource containing lithium. In some embodiments, said lithium-selective sorbent is an ion-exchange material, wherein said ion-exchange material absorbs lithium from a liquid resource containing lithium, while releasing protons, and absorbs protons from an acidic eluent solution, while releasing lithium. In some embodiments, ion-exchange beads comprise an ion-exchange material.

The term pH refers to the concentration of hydrogen ions of a liquid, and its numerical value is defined as the negative of the base ten logarithm of the activity of hydrogen ions in solution. When the term "the pH of the system" or "the pH of" a component of a system is used, pH refers to the pH of the liquid medium contained or present in the system, or contained or present in one or more components of said system. In some embodiments, one more fluids are present in one or more components of the system. In some embodiments, the liquid medium contained in the system, or one or more components thereof, is a liquid resource. In some embodiments, the liquid medium contained in the system, or one or more components thereof, is a brine. In some embodiments, the liquid medium contained in the system, or one or more components thereof, is an acid solution, an aqueous solution, a wash solution, a salt solution, a salt solution comprising lithium ions, or a lithium-enriched solution.

As used herein, the term "bed" of ion exchange material refers to a compartment within a vessel filled with ion exchange material, wherein fluid can flow into and out of said compartment. In some embodiments, such a "bed" is a "packed bed", or "fixed bed", wherein the ion exchange material is immobile as a process fluid is flowed across the compartment containing the ion exchange material. In some embodiments, such a "bed" is a "fluidized bed", wherein the ion exchange material is agitated and is suspended in the process fluid present in the compartment containing the ion exchange material.

As used herein, the term "filter plate" refers to an container in which sorbent can be loaded and housed. A filter plate comprises holes in which fluids or slurries can enter and exit the filter plate. In some embodiments, a filter plate comprises a filter, particle trap, or partition that allows fluid to move through the filter plate while inhibiting the movement of the solid. In some embodiments, a filter plate comprises a flow distributor or flow distribution surface, such that space is present to allow for the uniform movement of fluid.

As used herein, the term "filter press" or "stack" refers to a collection of two or more filter plates held together with structural supports.

As used herein, the term "filter bank" refers to an assembly of components, constructed in a manner such that a solid is retained within said filter bank, when a fluid containing solids flows through it. In some embodiments, said fluid is a liquid that flows through said filter bank while solids are retained. In some embodiments, only a portion of the solids are retained. In some embodiments, said fluid is a gas that conveys solids along with it. In some embodiments, retained solids form a cohesive porous solid mass, said mass is defined as a "filter cake", "cake", "bed", or "packed bed", with said terms used interchangeably.

As used herein, the "thickness" of said cake is defined as the average dimension of the said solid mass, measured in a direction that is parallel to the direction of fluid flow through the filter bank.

As used herein, the "cross sectional length" of said "filter cake", "cake", "bed", or "packed bed" is defined as the average dimension of the said solid mass, measured in a direction that is perpendicular to the direction of fluid flow through the solids.

As used herein, the term "cross-sectional area" or "cross sectional area" of said cake, a fluid compartment, a pipe, a tube or any other component through which a fluid is conveyed, is defined as the are orthogonal to the direction of fluid flow during normal operation of the device wherein said component is located.

A "bed" of lithium selective sorbent, such as an ion exchange material, can be contained within a "filter bank"; said "bed" can constitute the "cake" in said filter banks, and both terms are used interchangeably. In some embodiments, a "filter bank" is a filter.

As used herein, the term "fluid communication" refers to the ability of fluid to freely flow from one section of a vessel to a different section of said vessel, driven by hydrostatic pressure. In some embodiments, fluid communication implies that a fluid path exists between two parts of a vessel; such a path may include compartment, porous partitions, pipes, flow distributors, and other flow components.

As used herein, the term "fluid conduit", "fluid conduct" and "fluid path" are used interchangeably, and refer to an enclosed space within a device through which fluid can flow; such a fluid conduit may include voids, pipes, orifices, perforations, tubes, manifolds, holds, mixtures thereof, or combinations thereof.

As used herein, the term "permeable" refers to a component of a vessel or device that enables fluid communication across said component.

As used herein, the term "permeable partition" is a partition within the vessel or device wherein fluid can freely flow from one side of said partition to another when pressure is applied. Examples of permeable partitions include porous partitions and partitions with slits or regularly geometric shaped orifices.

As used herein, the term "flow distributor" refers to a component that delivers flow from one or more locations to a different set of one or more locations through a fluid path. In some embodiments, flow distributors are pipes that deliver fluid from the inlet of a vessel to one or more ion exchange beds. In some embodiments, flow distributors are pipes that deliver fluid from one or more ion exchange beds to the outlet of the vessel. In some embodiments, flow distributors comprise pipes, screens, meshes, fluid splitters, fluid concentrators, and other components that serve to direct flow. In some embodiments, a flow distributor optimizes the flow of a liquid through the vessels, systems, and devices described herein. In some embodiments, a flow distributor improves the uniformity of flow liquid through a bed of sorbent material, or a subsequent flow compartment. In some embodiments, a flow distributor allows for a reduction of liquid pressure required for the vessels, systems, and devices described herein to operate. In some embodiments, a flow distributer increases the efficiency of the vessels, systems, and devices described herein by reducing the hydrostatic pressure required to pump a liquid across vessels, systems, and devices described herein. A reduction in hydrostatic pressure leads to a reduction in the power requirements and decreases the cost of components. In some embodiments, a flow distributer increases the efficiency of the vessels, systems, and devices described herein by increasing the amount of lithium extracted from the liquid resource. In some embodiments, a flow distributer increases the efficiency of the vessels, systems, and devices described herein by increasing the amount of lithium extracted from the liquid resource as compared to a vessels, systems, and devices without flow distributers and using the same pressure.

As used herein, the hydrostatic pressure required to pump a liquid across an ion exchange vessel refers to the difference in hydrostatic pressure between the inlet and the outlet of said vessel, as measured by a pressure measuring device. In some embodiments, such pressure measuring devices include pressure gauges, pressure indicators, pressure transmitters, manometers, barometers, aneroids, pressure sensors, piezoresistive pressure sensor, other pressure measurement devices, or combinations thereof.

Additional Embodiments

EXAMPLES

Example 1: Lithium Extraction Device Using a Device Comprising Filter Banks Loaded with Ion Exchange Beads Lithium is extracted from a brine using a vessel comprising filter banks filled with ion exchange beads arranged along the length of the vessel, with parallel flow to and from each filter bank. (FIG. 1). Each filter bank is filled with a lithium-selective sorbent comprising an ion-exchange material; therefore, each compartment acts as an individual ion-exchange device.

The internal characteristics of the device are shown in FIG. 1. The vessel is rectangular and arranged horizontally, is approximately 75 cm long, and has a width and height of approximately 15 cm. It is constructed of polymer-coated carbon steel with plastic internal divisions. The vessel consists of 3 filter banks that act as ion-exchange compartments (103) and empty pipes that distribute the flow to each of the three filter banks and collect the outlet flow from each of the three filter banks. The liquid delivery and collection distributors connect to each other only through the ion-exchange compartments, thereby forcing all fluids flowing into the device to contact the ion-exchange material. The pipes that distribute flow are circular with an internal diameter of 2.4 cm.

The ion-exchange compartments (103) are 11 cm wide and 11 cm tall, with a length of 5 cm. The inlet and outlet of the ion-exchange bead compartment comprises a porous partition (104), comprising a polyethylene terephthalate cloth with 25 micron characteristic opening, to prevent escape of beads. In each ion exchange compartment, fluid is transported by pressure-driven flow through the ion exchange bed, through the polymer mesh, and into the fluid collection system. Uniform flow to each ion-exchange compartment is ensured because the pressure-drop across the ion-exchange bead is 100 times larger than pressure drop due to frictional losses in the inlet and outlet flow distribution systems.

The ion-exchange beads are loaded into each of the ion-exchange compartments by mechanically separating each flow ion exchange compartment, and loading the ion exchange beads in the interstitial space. The porous ion exchange beads are comprised of ion exchange particles and a polymer matrix. The ion exchange particles are coated ion exchange particles comprised of a $Li_2TiO_3$ core with a $SiO_2$ coating. The particles are approximately spherical with a mean diameter of 5.0 microns to 30.0 microns, and the coating thickness is approximately 10.0 nm. The polymer matrix is comprised of polyvinylidene difluoride. The porous beads contain porous networks with a controlled distribution of pore sizes providing diffusion channels from the bead surface into the bead interior and to the ion exchange particles. The beads have a 400 micron average diameter.

The liquid resource flows into the vessel from a side flange (101), where it flows into the flow distribution pipes which delivers them to each one of the ion-exchange chambers. The liquid flows through the above-mentioned mesh, through the bed of ion-exchange beads (103), out of the above-mentioned mesh, and into the outlet flow distribution pipes. The collected effluent then exits through a flange (102) on the other side of the ion-exchange vessel.

The brine from which lithium is extracted consists of a natural aqueous chloride solution containing approximately 150 mg/L Li, 60,000 mg/L Na, 10,000 mg/L Ca, and 30,000 mg/L Mg, and other chemical species including K and chloride. When this liquid resource enters the vessel, the pressure needed to flow said resource at a rate of 10 L/min is 10 psi. Flow through this ion exchange material results in an outlet flow that contains approximately 10 mg/L Li, 60,000 mg/L Na, 10,000 mg/L Ca, and 30,000 mg/L Mg, and other chemical species including K and chloride.

Example 2: Lithium Extraction Device Comprising a Filter Press Loaded with Ion Exchange Beads, with Mechanical Compression Applied to Said Beads Lithium is extracted from a liquid resource using a device comprising filter banks containing ion exchange beads. The banks are contained between filter plates that are arranged as a "horizontal stack" that share a common flow distribution manifold.

The device is a membrane-squeeze filter press (FIG. 2). In this device (FIG. 2A), multiple filter plates (204) are maintained in a vertical position by structural supports (202) comprising coated carbon-steel beams. The plates are pressed together to form a "horizontal stack" of approximately 30 plates (203). The plates contain gasketed filter cloths (214) that provide a total filtration area of approximately 30 square meters, and are manufactured out of polypropylene. The filter cloths are constructed of woven polypropylene. The plates can hold a total of approximately 400 L of ion exchange beads. The structural frame of the filter press comprises a hydraulic piston at one end of the device (201), which applies 500 kN of force on the last plate in the stack, therefore squeezing the filter stack together and maintaining the stack closed. Fluid process connections are located at the opposite end of the device (216) from said hydraulic piston; these connect to five distinct fluid conduits that direct fluid flow to and from all filter plates. These fluid conduits comprise a sorbent slurry inlet that is approximately 50 mm in diameter (210), and four fluid flow conduits of approximately 40 mm in diameter (206, 207, 208, 209). These conduits carry liquid or gaseous flow streams including water, the liquid resource, an acidic eluent solution, or air, to each of the filter banks simultaneously.

FIG. 2B shows the detail of a filter bank. A filter bank is formed by two opposing filter plates pressed together. When the two opposing filter plates (204) are pressed together, a voided compartment is formed (205). A permeable partition, such as a filter cloth or mech screen (214), lines the voided compartment. The filter bank comprises a cake of sorbent material (205) contained between filter cloths (214) in the compartment supported by the two opposing filter plates (204). The thickness of the sorbent cake contained within this filter bank is approximately 32 mm; the filter cake is approximately a square with a length of about 750 mm, and its four corners are cut off diagonally to form an octagon. The filter plates are square, and their dimension is about 800 mm by 800 mm.

Each of the square's corners contains a circular flow conduit. When all plates in the stack of filter plates are mechanically pressed together, the fluid conduits from all plates align to form four independent pipes that span the length of the entire filter plate stack. These pipes distribute flow to and from all filter plates in parallel, thereby constituting a flow distribution manifold to and from each filter bank. Within each plate, the four fluid conduits connect to the filter bank through orifices/opening that provide fluid communication to a corner of the sorbent cake, as shown in FIG. 2B. For example, fluid conduit 206 connects through a conduit that is 5 mm in diameter to five orifices 5 mm in diameter 2061. The configuration and diameter of pipes and orifices 207 to 2071, 208 to 2081, and 209 to 2091 are identical to 206 and 2061. The sorbent slurry inlet 210 is present along the entirety of the device, such that port 210 from one filter bank connects to 210 of the following filter bank, and such that all filter banks are in fluid communication to the 210 process connection on the end plate (216) of the device.

FIG. 2C shows the detail of a cross section (211) of a filter bank containing the sorbent material (205). When the two opposing filter plates (204) are pressed together, a voided compartment is formed (215). The sorbent material is contained between two filter cloths (214), which conform to the shape of the filter plates (204) and flow distribution surface (213). The cloths lie flat on a flow distribution surface (213). The flow distribution surface, or flow distributor, is joined or manufactured into the filter plate and contains textured shapes consisting of pips that protrude (213), such that an open space is created between the surface of the filter cloth (212) and the surface of the filter plate. The open space can be aligned to form a fluid conduit for the flow of liquids through the device. The pips are 8 mm in thickness. The flow distribution surface is semi-rigid (213). The flow distribution surface can be expanded in the direction of the sorbent material by applying hydraulic pressure into a chamber (212) behind said surface, applying mechanical compression on said sorbent material.

Each filter bank contains two opposing sides of two filter plates (204), and the two opposing plates come together to form a filter bank (sorbent cake (205), filter cloth (214), flow distributor (213), fluid conduit (212) and filter plates (204)), shown together as 215.

The lithium extraction device is first loaded with a lithium-selective sorbent material. The sorbent material comprises ion-exchange beads. The porous ion exchange beads are comprised of ion exchange particles and a polymer matrix. The ion exchange particles are coated ion exchange particles comprised of a $Li_2TiO_3$ core with a $SiO_2$ coating. The particles are approximately spherical with a mean diameter of 5.0 microns to 30.0 microns, and the coating thickness is approximately 5.0 nm in thickness. The polymer matrix is comprised of polyvinylidene difluoride. The beads have an average diameter of 150 microns.

To load the lithium extraction device with ion-exchange beads, said beads are loaded into an agitated vessel, and suspended in water to form a 5% v/v slurry. The ion-exchange beads are pumped into inlet 210 using an air-operated double-diaphragm pump. Because 210 is in fluid communication with all filter banks, the ion-exchange material flows into all filter banks simultaneously, and is retained in said filter banks by filter cloths (214). The remaining fluid flows into the space created by the textured flow distribution surface (213), and flows out of the top of the filter plates through orifices 2061 and 2071, through pipes 206 and 207, and out of the ion exchange device. This loading continues until all filter banks are filled. When the pressure required to pump the slurry increases to 50 psi, valves are opened such that fluid can flow out of all orifices in each filter bank (2061, 2071, 2081, 291). Pumping of the slurry is continued until the pressure necessary to pump the slurry increases beyond 100 psi. After this point is reached, the loading of the lithium sorbent is considered complete.

Following this loading step, water is flowed through the sorbent cake in the filter bank by flowing the water into 208. Water is distributed through the pipe manifold 208 and through orifices 2081, flowing into all filter banks simultaneously, across the filter cake from one flow distribution surface to another. Arrow 217 demonstrate the direction of this flow. Flow is collected simultaneously from all filter banks from orifices 2091 and pipe manifold 209. Flow of water is continued in this manner, at a rate that results in a pressure drop of 25 psi across the sorbent cake.

After five minutes of flow, hydraulic pressure is applied to the membrane plates in chamber 212 at a pressure of 50 psi. This results in mechanical squeezing/compression of the sorbent cake from both opposing sides.

To extract lithium, water flow is stopped, and the liquid resource is flown into the filter bank in the same configuration and flow path; specifically, flow enters the device and filter banks through 208, enters the cake through 2081, leaves the cake through 2071, and exits the filter bank and device through 207. The liquid resource consists of a natural aqueous chloride brine containing approximately 150 mg/L Li, 90,000 mg/L Na, 1,000 mg/L Ca, and 10,000 mg/L Mg, and other chemical species including K and chloride. The pressure needed to flow said resource across all filter banks, in parallel, is 35 psi. Flow through this ion exchange material results in an outlet flow that contains approximately 50 mg/L Li, 90,000 mg/L Na, 1,000 mg/L Ca, and 10,000 mg/L Mg, and other chemical species including K and chloride. Contacting said liquid resource with said ion exchange material results in lithium being extracted, and protons are released into solution.

After said brine is contacted with the ion exchange material for one hour, the flow of the liquid resource is ceased. Air is injected through the pipe manifold 206 and collected through outlet pipe 209, such that air blown through all filter banks and entrained brine is removed. Following this step, and acidic eluent solution comprising sulfuric acid is flown through pipe manifold 208 and collected thorough outlet pipe manifold 207, such that an acidic eluent solution flows through the lithium sorbent in all filter banks. Thus, the lithiated ion exchange beads absorb protons while releasing lithium, yielding a lithium sulfate solution comprising the extracted lithium.

The cycle of lithium loading with the liquid resource and lithium release with acid is repeated to produce a lithium sulfate solution. The process of applying a mechanical squeezing pressure onto the ion exchange material during lithium extraction results in more uniform flow of the liquid resource and eluent through the ion exchange material, ensuring uniform lithium loading and stripping of said material. The net effect is an increase in the uptake capacity of said material for lithium, thus improving the amount of lithium that the ion exchange device can produce.

Example 3: Method of Loading a Filter Press with Ion-Exchange Beads, Wherein the Loading Port is Vacated Prior to Operation as a Lithium-Extraction Device Lithium is extracted from a liquid resource using a device comprising filter banks containing ion exchange beads. The banks are contained between filter plates that are arranged as a "horizontal stack" that share a common flow distribution manifold. The device comprises a filter press (FIG. 3).

In this device (FIG. 3A), multiple filter plates (304) are maintained in a vertical position by structural supports (302) comprising coated carbon-steel beams. The plates are pressed together to form a "horizontal stack" of approximately 130 plates (303). The plates contain non-gasketed filter cloths (314) that provide a total filtration area of approximately 900 square meters, and are manufactured out of polypropylene. The filter cloths are constructed of woven polypropylene. The plates can hold a total of approximately 14,000 L of ion exchange beads. The structural frame of the filter press comprises a hydraulic system at one end of the device (201), which applies 750 kN of force on the last plate in the stack, therefore squeezing the filter stack together and maintaining the stack closed.

Fluid process connections are located at both ends of the device (316), both at the opposite end from said hydraulic piston, and at the end with the hydraulic piston. This is considered a "double-end feed" and "double-end wash" configuration. These connect to three distinct fluid conduits that direct fluid flow to and from all filter plates. These fluid conduits comprise a sorbent slurry inlet that is approximately 15 cm in diameter (310), which is used to load the device with the lithium-selective sorbent, and two fluid flow conduits of approximately 12 cm in diameter (306, 307). These latter conduits carry liquid or gaseous flow streams including water, the liquid resource, an acidic eluent solution, or air, to each of the filter banks simultaneously.

FIG. 3B shows the detail of a filter bank. When the two opposing filter plates (304) are pressed together, a voided compartment is formed (305). A permeable partition, such as a filter cloth or mech screen (314), lines the voided compartment. The filter bank comprises a cake of sorbent material (305) contained between filter cloths (314) supported on two opposing filter plates (304). The thickness of the sorbent cake contained within this filter bank is approximately 32 mm; the filter cake is approximately a square with a length of about 1900 mm, and its four corners are cut off diagonally to form an octagon. The filter plates are square, and their dimension is about 2000 mm by 2000 mm.

The top two of the plate's corners contains a circular flow conduit. When all plates in the stack of filter plates are mechanically pressed together, the fluid conduits from all plates align to form four independent pipes that span the length of the entire filter plate stack. These pipes distribute flow to and from all filter plates in parallel, thereby constituting a flow distribution manifold to and from each filter bank. Within each plate, the two fluid conduits connect to the filter bank through orifices/opening that provide fluid communication to a corner of the sorbent cake, as shown in FIG. 3B. For example, fluid conduit 306 connects through a conduit that is 10 cm in diameter to fifteen orifices 7.5 mm in diameter 3061. The configuration and diameter of pipes and orifices 307 to 3071 are identical to 306 and 3061. The sorbent slurry inlet 310 is present along the entirety of the device, towards the bottom of the filter plate. Thus, port 310 from one filter bank connects to 310 of the following filter bank, and such that all filter banks are in fluid communication to the 310 process connection on both of the end plates (316) of the device.

FIG. 3C shows the detail of a cross section (311) of a filter bank containing the sorbent material (305).

The sorbent material is contained between two filter cloths (314), which conform to the shape of the filter plates (304) and flow distribution surface (313). The cloths lie flat on a flow distribution surface (313). The flow distribution surface, or flow distributor, is joined or manufactured into the filter plate and contains textured shapes consisting of pips that protrude (313), such that an open space is created between the surface of the filter cloth (312) and the surface of the filter plate. The open space can be aligned to form a fluid conduit for the flow of liquids through the device. These pips are 8 mm in thickness. The flow distribution surface is semi-rigid (313); as such, this flow distribution surface can be expanded in the direction of the sorbent cake by applying hydraulic pressure into a chamber (312) behind said surface, applying mechanical compression on said cake.

Each filter bank contains two opposing sides of two filter plates (304), and two opposing plates come together to form a filter bank (sorbent cake (305), filter cloth (314), flow distributor (313), fluid conduit (312) and filter plates (304)), shown together as 315.

The lithium extraction device is first loaded with a lithium-selective sorbent material. The sorbent material comprises ion-exchange beads. The porous ion exchange beads are comprised of ion exchange particles and a polymer matrix. The ion exchange particles are coated ion exchange particles comprised of a $Li_2MnO_3$. The particles are approximately spherical with a mean diameter of 5.0 microns to 50.0 microns.

To load the lithium extraction device with ion-exchange beads, said beads are loaded into an agitated vessel, and suspended in water to form a 1% v/v suspension. Said vessel is fitted with an air-delivery manifold at the bottom, and air is injected when agitation is begun. When air is co-injecting in conjunction with agitation, the suspension is fluidized in less than 30 seconds; otherwise, full agitation of the solids occurs only after 5 minutes. Agitation is achieved by means of a propeller stirrer.

To load the vessel with -ion-exchange beads, beads are pumped from said vessel into the lithium-extraction device. Beads are pumped into inlets 310 on both ends of the device using an air-operated double-diaphragm pump. Inlet 310 is located towards the bottom of the filter banks. Because 310 is in fluid communication with all filter banks, the ion-exchange material flows into all filter banks simultaneously, and is retained in said filter banks by filter cloths (314). The remaining fluid flows into the space created by the textured flow distribution surface (313), and flows out of the top of the filter plates through orifices 3061 and 3071, through pipes 306 and 307, and out of the ion exchange device. This loading continues until all filter banks are filled. Pumping of the slurry is continued until the pressure necessary to pump the slurry increases beyond 100 psi. After this point is reached, the loading of the lithium sorbent is considered complete.

Following this loading step, water is flowed through the sorbent cake in the filter bank by flowing water into 306. Water is distributed through the pipe manifold 306 and through orifices 3061, flowing into all filter banks simultaneously, across the filter cake from one flow distribution surface to another. Arrow 317 demonstrate the direction of this flow. Flow is collected simultaneously from all filter banks from orifices 3071 and pipe manifold 307. Flow of water is continued in this manner, at a rate that results in a pressure drop of 50 psi across the sorbent cake.

After five minutes of flow, hydraulic pressure is applied to the membrane plates in chamber 212 at a pressure of 50 psi. This results in mechanical squeezing/compression of the sorbent cake from both opposing sides, and discharge of additional water Following this loading step, solids are lodged inside of the conduit for loading the vessel with fluid, 310. FIG. 3C shows the detail of said conduit. As shown in this figure, fluid flow across the ion exchange beads (317) would bypass this conduit (310), leading to poor fluid contact of the ion-exchange material with fluid. Therefore, a "core blow" is performed. Air is injected through one end of inlet 310, at a pressure of 100 psi, and solid are collected on the other end of the device through 310. Thus, air displaces solids lodged in this section of pipe. This section of pipe is now empty and is filled with fluid, and fluid can be remove for this section of pipe by performing a "core blow" whenever the fluid needs to be removed. This effect is shown by transition 318, showing the direction of fluid flow that displaces the contents lodged in 310.

To extract lithium, the liquid resource is flown into the filter bank through inlet 310. Because 310 is in fluid communication with all filter banks, the liquid resource flows into all filter banks simultaneously, across the filter cloths (314), flows into the space created by the textured flow distribution surface (313), and flows out of the top of the filter plates through orifices 3061 and 3071, through pipes 306 and 307, and out of the ion exchange device. The liquid resource consists of a natural aqueous chloride brine containing approximately 2,000 mg/L Li, 90,000 mg/L Na, 500 mg/L Ca, and 10,000 mg/L Mg, and other chemical species including K and chloride. The pressure needed to flow said resource across all filter banks, in parallel, is 50 psi. Flow through this ion exchange material results in an outlet flow that contains approximately 100 mg/L Li, 90,000 mg/L Na, 500 mg/L Ca, and 10,000 mg/L Mg, and other chemical species including K and chloride. Contacting said liquid resource with said ion exchange material results in lithium being extracted, and protons are released into solution.

After said brine is contacted with the ion exchange material for one hour, flow of the liquid resource is ceased. A "core blow" is performed by injecting air through one end of 310 and collecting the liquid from the opposite 310 connection on the opposite end of the device.

Following this step, and acidic eluent solution comprising hydrochloric acid is flown into each filter bank through inlet 310. Because 310 is in fluid communication with all filter banks, the eluent solution flows into all filter banks simultaneously, across the filter cloths (314), flows into the space created by the textured flow distribution surface (313), and flows out of the top of the filter plates through orifices 3061 and 3071, through pipes 306 and 307, and out of the ion exchange device. Thus, the lithiated ion exchange beads absorb protons while releasing lithium, yielding a lithium chloride solution comprising the extracted lithium.

The cycle of lithium loading with the liquid resource and lithium release with acid is repeated to produce a lithium chloride solution.

Example 4: Lithium Extraction Device Comprising a Filter Press Loaded with Ion Exchange Beads, with Mechanical Compression Applied to Said Beads Lithium is extracted from a liquid resource using a device comprising filter banks containing ion exchange beads. The banks are contained between filter plates that are arranged as a "horizontal stack" that share a common flow distribution manifold.

The device is a membrane-squeeze filter press (FIG. 4), wherein membrane squeeze is applied from one side of the filter bank. In this device (FIG. 4A), multiple filter plates (404) are maintained in a vertical position by structural supports (402) comprising coated carbon-steel beams. The plates are pressed together to form a "horizontal stack" of approximately 30 plates (403). The plates contain gasketed filter cloths that provide a total filtration area of approximately 15 square meters, and are manufactured out of polypropylene. The filter cloths are constructed of double-weave polyester. The plates can hold a total of approximately 800 L of ion exchange beads. The structural frame of the filter press comprises a hydraulic piston at one end of the device (401), which applies 500 kN of force on the last plate in the stack, therefore squeezing the filter stack together and maintaining the stack closed. Fluid process connections are located at the opposite end of the device (416) from said hydraulic piston; these connect to five distinct fluid conduits that direct fluid flow to and from all filter plates. These fluid conduits comprise a sorbent slurry inlet that is approximately 100 mm in diameter (410), and four fluid flow conduits of approximately 100 mm in diameter (406, 407, 408, 409). These conduits carry liquid streams including water, the liquid resource, an acidic eluent solution, or air, to each of the filter banks simultaneously.

Figures 4A, 4B, 4C:
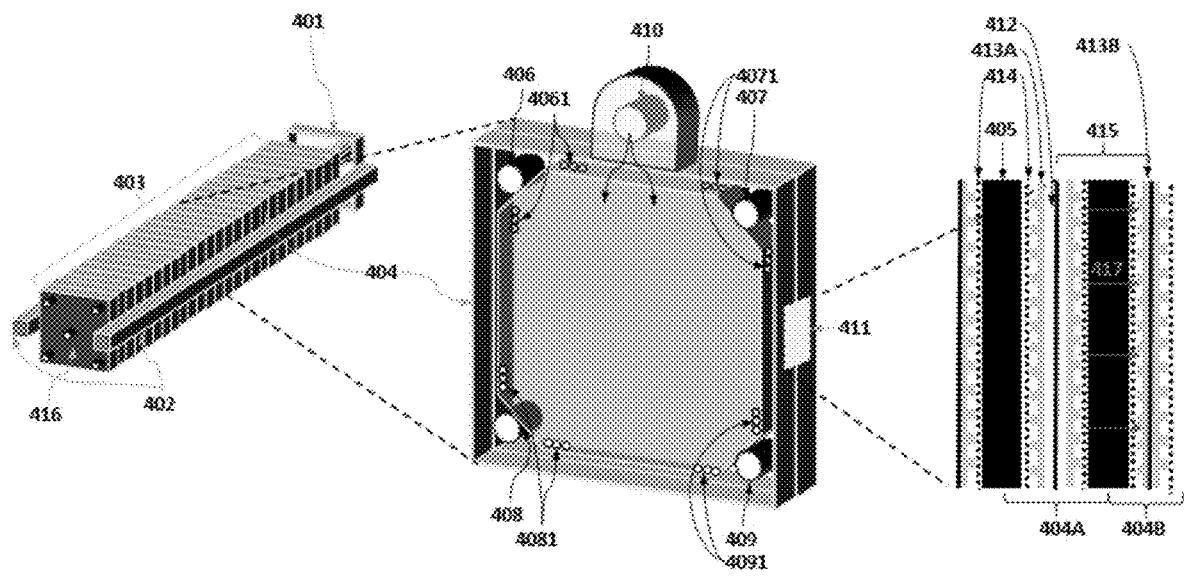
FIG. 4A-4C illustrates a lithium extraction device comprising a filter press loaded with ion exchange beads, wherein said filter press is equipped with membrane-squeeze plates.

FIG. 4B shows the detail of a filter bank. A filter bank is formed by two adjacent filter plates pressed together. When the two opposing filter plates (404) are pressed together, a voided compartment is formed (405). A permeable partition, such as a filter cloth or mech screen (414), lines the voided compartment. The filter bank comprises a cake of sorbent material (405) contained between filter cloths (414) supported on two opposing filter plates (404). The thickness of the sorbent cake contained within this filter bank is approximately 25 mm; the filter cake is approximately a square with a length of about 1400 mm, and its four corners are cut off diagonally to form an octagon. The filter plates are square, and their dimension is about 1500 mm by 1500 mm.

Each of the square's corners contains a circular flow conduit. When all plates in the stack of filter plates are mechanically pressed together, the fluid conduits from all plates align to form four independent pipes that span the length of the entire filter plate stack. These pipes distribute flow to and from all filter plates in parallel, thereby constituting a flow distribution manifold to and from each filter bank. Within each plate, the four fluid conduits connect to the filter bank through orifices/opening that provide fluid communication to a corner of the sorbent cake, as shown in FIG. 4B. For example, fluid conduit 406 connects through a conduit that is 10 mm in diameter to five orifices 7.5 mm in diameter 4061. The configuration and diameter of pipes and orifices 407 to 4071, 408 to 4081, and 409 to 4091 are identical to 406 and 4061. The sorbent slurry inlet 410 is present along the entirety of the device, such that port 410 from one filter bank connects to 410 of the following filter bank, and such that all filter banks are in fluid communication to the 410 process connection on the end plate (416) of the device. The sorbent inlet 410 is located 10 cm above the chamber that is filled with the lithium-selective sorbent (405), such that solids flow down into the space 405 when the device is loaded.

FIG. 4C shows the detail of a cross section (411) of a filter bank containing the sorbent material (405). When the two opposing filter plates (404) are pressed together, a voided compartment is formed (415).

The sorbent material is contained between two filter cloths (414), which conform to the shape of the filter plates (404) and flow distribution surface (413). The cloths lie flat on a flow distribution surface (413). The flow distribution surface, or flow distributor, is joined or manufactured into the filter plate and contains textured shapes consisting of grooves that protrude (413), such that an open space is created between the surface of the filter cloth (412) and the surface of the filter plate. The open space can be aligned to form a fluid conduit for the flow of liquids through the device. These grooves are 6 mm deep.

Filter plates alternate in construction. On one side of the filter bank there is filer plate of type 404A, with a flow distribution surface that is semi-rigid (413A); as such, this flow distribution surface can be expanded in the direction of the sorbent cake by applying hydraulic pressure into a chamber (412) behind said surface, applying mechanical compression on said cake. On the other side of the filter bank, there is filter plate 404B, where said flow distribution surface (413B) is welded to the plate and cannot be expanded. As such, mechanical compression on the filter cake is applied from one side.

The lithium extraction device is first loaded with a lithium-selective sorbent material. The sorbent material comprises ion-exchange beads. The porous ion exchange beads are comprised of ion exchange particles and a polymer matrix. The ion exchange particles are coated ion exchange particles comprised of a $Li_4Mn_5O_{12}$ core with a $TiO_2$ coating. The particles are approximately spherical with a mean diameter of 5 microns, the coating is approximately 2 nm thick. The porous beads contain porous networks with a controlled distribution of pore sizes providing diffusion channels from the bead surface into the bead interior and to the ion exchange particles. The polymer matrix is comprised of polyvinyl chloride. The beads have a 90 micron average diameter.

To load the lithium extraction device with ion-exchange beads, said beads are loaded into an agitated vessel, and suspended in water to form a 2.5% v/v slurry. The ion-exchange beads are pumped into inlet 410 using an air-operated double-diaphragm pump.

Because 410 is in fluid communication with all filter banks, the ion-exchange material flows into all filter banks simultaneously, is retained in said filter banks by filter cloths (414), flows into the space created by the textured flow distribution surface (413), and flows out of the top of the filter plates through orifices 4061 and 4071, through pipes 406 and 407, and out of the ion exchange device. This loading continues until all filter banks are filled. When the pressure required to pump the slurry increases to 75 psi, valves are opened such that fluid can flow out of all orifices in each filter bank (4061, 4071, 4081, 491). Pumping of the slurry is continued until the pressure necessary to pump the slurry increases beyond 110 psi. After this point is reached, the loading of the lithium sorbent is considered complete.

Following this loading step, water is flowed through the sorbent cake in the filter bank by flowing water into 408.

Water is distributed through the pipe manifold 408 and through orifices 4081, flowing into all filter banks simultaneously, across the filter cake from one flow distribution surface to another. Arrow 417 demonstrate the direction of this flow. Flow is collected simultaneously from all filter banks from orifices 4091 and pipe manifold 409. Flow of water is continued in this manner, at a rate that results in a pressure drop of 30 psi across the sorbent cake. The location of the solids inlet 410 above the bed of lithium-selective sorbent ensures that the cake is uniformly washed with water.

After five minutes of flow, hydraulic pressure is applied to the membrane plates in chamber 412 at a pressure of 100 psi. This results in mechanical squeezing/compression of the sorbent cake from one side of the filter bank. The hydraulic pressure results in consolidation of the bed of lithium-selective sorbent. Following this, the pressure is released for the rest of the device's operation.

To extract lithium, water flow is stopped, and the liquid resource is flown into the filter bank; specifically, flow enters the device and filter banks through 409 and 408, enters the cake through 4091 and 4081, leaves the cake through 4061 and 4071, and exits the filter bank and device through 406 and 407.

The liquid resource consists of a natural aqueous chloride brine containing approximately 2500 ppm Li, 60,000 mg/L Na, 1,000 mg/L K, 250 mg/L Ca, and 1,000 mg/L Mg, and other chemical species including sulphates. Flow through this ion exchange material results in an outlet flow that contains approximately 200 ppm Li, 60,000 mg/L Na, 1,000 mg/L K, 250 mg/L Ca, and 1,000 mg/L Mg, and other chemical species including sulphates. Contacting said liquid resource with said ion exchange material results in lithium being extracted, and protons are released into solution.

After said brine is contacted with the ion exchange material for two hours, flow of brine is ceased. Water is injected through the pipe manifold 406 and collected through outlet pipe 409, such that entrained brine is removed from the ion-exchange device. Following this step, and acidic eluent solution comprising hydrochloric acid is flown through pipe manifold 408 and collected thorough outlet pipe manifold 407, such that an acidic eluent solution flows through the lithium sorbent in all filter banks. Thus, the lithiated ion exchange beads absorb protons while releasing lithium, yielding a lithium chloride solution comprising the extracted lithium.

The cycle of lithium loading with the liquid resource and lithium release with acid is repeated to produce a lithium chloride solution. The process of applying a mechanical squeezing pressure onto the ion exchange material during initial loading of the device results in consolidation of the ion-exchange bed. This results in more uniform flow of the liquid resource, water, and eluent through the ion exchange material, ensuring uniform lithium loading, washing and stripping of said material. The net effect is a decrease in the amount of water needed to remove entrained brine from the lithium-selective sorbent before the eluent solution is flown through said sorbent. This reduces the overall water consumption for extraction of lithium with said device by 25% as compared to systems that are not mechanically squeezed during the initial loading process.

Example 5: Lithium Extraction Device Comprising a Filter Press Loaded with Ion Exchange Beads, Wherein Said Ion-Exchange Material is Recycled Lithium is extracted from a liquid resource using a device comprising filter banks containing ion exchange beads. The filter banks are contained between filter plates that are arranged as a "horizontal stack" that share a common flow distribution manifold.

The device is constructed from a filter press (FIG. 5). In this device (FIG. 5A), multiple filter plates (504) are maintained in a vertical position by structural supports (502) comprising coated carbon-steel beams. The plates are pressed together to form a "horizontal stack" of approximately 10 plates (503). The plates contain gasketed filter cloths that provide a total filtration area of approximately 3.5 square meters, and are manufactured out of PTFE. The filter cloths are constructed of double-weave polyester. The plates can hold a total of approximately 45 L of ion exchange beads. The structural frame of the filter press comprises a hydraulic piston at one end of the device (501), which applies 400 kN of force on the last plate in the stack, therefore squeezing the filter stack together and maintaining the stack closed. Fluid process connections are located at the opposite end of the device (516) from said hydraulic piston; these connect to five distinct fluid conduits that direct fluid flow to and from all filter banks. These fluid conduits comprise a sorbent slurry inlet that is approximately 40 mm in diameter (510), and four fluid flow conduits of approximately 25 mm in diameter (506, 507, 508, 509). These conduits carry liquid streams including water, the liquid resource, an acidic eluent solution, or air, to each of the filter banks simultaneously.

FIG. 5B shows the detail of a filter bank. The filter bank comprises a cake of sorbent material (505) contained between filter cloths (514) supported on two opposing filter plates (504). The thickness of the sorbent cake contained within this filter bank is approximately 40 mm; the filter cake is approximately a square with a length of about 450 mm, and its four corners are cut off diagonally to form an octagon. The filter plates are square, and their dimension is about 470 mm by 470 mm.

Each of the square's corners contains a circular flow conduit. When all plates in the stack of filter plates are mechanically pressed together, the fluid conduits from all plates align to form four independent pipes that span the length of the entire filter plate stack. These pipes distribute flow to and from all filter plates in parallel, thereby constituting a flow distribution manifold to and from each filter bank. Within each plate, the four fluid conduits connect to the filter bank through orifices/opening that provide fluid communication to a corner of the sorbent cake, as shown in FIG. 5B. For example, fluid conduit 506 connects through a conduit that is 5 mm in diameter to five orifices 10 mm in diameter 5061. The configuration and diameter of pipes and orifices 507 to 5071, 508 to 5081, and 509 to 5091 are identical to 506 and 5061. The sorbent slurry inlet 510 is present along the entirety of the device, such that port 510 from one filter bank connects to 510 of the following filter bank, and such that all filter banks are in fluid communication to the 510 process connection on the end plate (516) of the device. The sorbent inlet 510 is located 10 cm above the chamber that is filled with the lithium-selective sorbent (505), such that solids flow down into the space 505 when the device is loaded.

FIG. 5C shows the detail of a cross section (511) of a filter bank containing the sorbent material (505). Each filter bank contains two opposing sides of two filter plates (504), and the two opposing plates come together to form a filter bank (sorbent cake (505), filter cloth (514), flow distributor (513A), fluid conduit (512) and filter plates (504)), shown together as 515.

The ion-exchange material (505) is contained between two filter cloths (514). The cloths lie flat on a flow distribution surface (513A). This surface contains textured shapes consisting of grooves that protrude from said surface (513A), such that an open space is created between the surface of the filter cloth (512) and the surface of the flow distribution surface (513). These grooves are 6 mm deep.

The lithium extraction device is first loaded with a lithium-selective sorbent material. The sorbent material comprises ion-exchange beads. The porous ion exchange beads are comprised of ion exchange particles and a polymer matrix. The ion exchange particles are coated ion exchange particles comprised of a $Li_4Mn_5O_{12}$ core with a $TiO_2$ coating. The particles are approximately spherical with a mean diameter of 5 microns, the coating is approximately 5 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a 150 micron average diameter.

To load the lithium extraction device with ion-exchange beads, said beads are loaded into an agitated vessel, and suspended in water to form a 10% v/v slurry. The ion-exchange beads are pumped into inlet 510 using an air-operated double-diaphragm pump.

Because 510 is in fluid communication with all filter banks, the ion-exchange material flows into all filter banks simultaneously, is retained in said filter banks by filter cloths (514), flows into the space created by the textured flow distribution surface (513A), and flows out of the top of the filter plates through orifices 5061 and 5071, through pipes 506 and 507, and out of the ion exchange device. This loading continues until all filter banks are filled. When the pressure required to pump the slurry increases to 25 psi, valves are opened such that fluid can flow out of all orifices in each filter bank (5061, 5071, 5081, 5091). Pumping of the slurry is continued until the pressure necessary to pump the slurry increases beyond 100 psi. After this point is reached, the loading of the lithium sorbent is considered complete.

Following this loading step, water is flowed through the sorbent cake in the filter bank by flowing water into 508.

Water is distributed through the pipe manifold 508 and through orifices 5081, flowing into all filter banks simultaneously, across the filter cake from one flow distribution surface to another. Arrow 517 demonstrate the direction of this flow. Flow is collected simultaneously from all filter banks from orifices 5091 and pipe manifold 509. Flow of water is continued in this manner, at a rate that results in a pressure drop of 30 psi across the sorbent cake. The location of the solids inlet 510 above the bed of lithium-selective sorbent ensures that the cake is uniformly washed with water.

To extract lithium, water flow is stopped, and the liquid resource is flown into the filter bank; specifically, flow enters the device and filter banks through 509, enters the cake through 5091, leaves the cake through 5061, and exits the filter bank and device through 506. The liquid resource consists of a natural aqueous chloride brine containing approximately 850 ppm Li, 20,000 mg/L Na, 20,000 mg/L Ca, and 20,000 mg/L Mg, and other chemical species including K and sulphates. When this liquid resource enters the vessel, the pressure is 150 psi. Flow through this ion exchange material results in an outlet flow that contains approximately 85 ppm Li, 20,000 mg/L Na, 20,000 mg/L Ca, and 20,000 mg/L Mg, and other chemical species including K and sulphates. Contacting said liquid resource with said ion exchange material results in lithium being extracted, and protons are released into solution.

After said brine is contacted with the ion exchange material for two hours, flow of brine is ceased. Water is injected through the pipe manifold 506 and collected through outlet pipe 509, such that entrained brine is removed from the ion-exchange device. Following this step, and acidic eluent solution comprising hydrochloric acid is flown through pipe manifold 508 and collected thorough outlet pipe manifold 507, such that an acidic eluent solution flows through the lithium sorbent in all filter banks. Thus, the lithiated ion exchange beads absorb protons while releasing lithium, yielding a lithium chloride solution comprising the extracted lithium. The cycle of lithium loading with the liquid resource and lithium release with acid is repeated to produce a lithium chloride solution.

When the end of the useful life of the ion-exchange beads is reached, the pressure on the hydraulic piston at one end of the device (501), is released. An automatic plate shifting device, which is mounted on structural supports 502, is positioned next to each filter bank. This device separates the plates to open up each individual filter bank, and provides a mechanical force to force the bed of ion-exchange material (505) to be released by gravity. This cake falls into the bottom of the ion-exchange device, and is conveyed away. This process is repeated for all filter banks. The ion-exchange device is thus empty and ready to be re-loaded with ion-exchange beads for further lithium extraction. The used ion-exchange beads are taken to a different location in the lithium plant for their recycle.

Example 6: Lithium Extraction Device Comprising a Filter Press Loaded with a Lithium Aluminum Intercalate, with Mechanical Compression Applied to Said Intercalate Lithium is extracted from a liquid resource using a device comprising filter banks containing a lithium aluminum intercalate. This lithium aluminum intercalate absorbs lithium from liquid resources containing lithium, and releases said lithium when contacted with water. The filter banks are contained between filter plates that are arranged as a "horizontal stack" that share a common flow distribution manifold.

The device is constructed from a membrane-squeeze filter press (FIG. 6). In this device (FIG. 6A), multiple filter plates (604) are maintained in a vertical position by structural supports (602) comprising coated carbon-steel beams. The plates are pressed together to form a "horizontal stack" of approximately 30 plates (603). The plates contain non-gasketed filter cloths that provide a total filtration area of approximately 30 square meters, and are manufactured out of polypropylene. The filter cloths are constructed of woven polypropylene. The plates can hold a total of approximately 400 L of lithium aluminum intercalate. The structural frame of the filter press comprises a hydraulic piston at one end of the device (601), which applies 500 kN of force on the last plate in the stack, therefore squeezing the filter stack together and maintaining the stack closed. Fluid process connections are located at the opposite end of the device (616) from said hydraulic piston; these connect to five distinct fluid conduits that direct fluid flow to and from all filter banks. These fluid conduits comprise a sorbent slurry inlet that is approximately 50 mm in diameter (610), and four fluid flow conduits of approximately 40 mm in diameter (606, 607, 608, 609). These conduits carry liquid or gaseous flow streams including water, the liquid resource, an acidic eluent solution, or air, to each of the filter banks simultaneously.

FIG. 6B shows the detail of a filter bank. The filter bank comprises a cake of sorbent material (605) contained between filter cloths (614) supported on two opposing filter plates (604). The thickness of the sorbent cake contained within this filter bank is approximately 18 mm; the filter cake is approximately a square with a length of about 750 mm, and its four corners are cut off diagonally to form an octagon. The filter plates are square, and their dimension is about 800 mm by 800 mm.

Each of the square's corners contains a circular flow conduit. When all plates in the stack of filter plates are mechanically pressed together, the fluid conduits from all plates align to form four independent pipes that span the length of the entire filter plate stack. These pipes distribute flow to and from all filter plates in parallel, thereby constituting a flow distribution manifold to and from each filter bank. Within each plate, the four fluid conduits connect to the filter bank through orifices/opening that provide fluid communication to a corner of the sorbent cake, as shown in FIG. 6B. For example, fluid conduit 606 connects through a conduit that is 5 mm in diameter to five orifices 5 mm in diameter 6061. The configuration and diameter of pipes and orifices 607 to 6071, 608 to 6081, and 609 to 6091 are identical to 606 and 6061. The sorbent slurry inlet 610 is present along the entirety of the device, such that port 610 from one filter bank connects to 610 of the following filter bank, and such that all filter banks are in fluid communication to the 610 process connection on the end plate (616) of the device.

FIG. 6C shows the detail of a cross section (611) of a filter bank containing the sorbent material (605). Each filter bank is contained between two filter cloths (614), which conform to the shape of the filter bank (605) and the filter plate (604). The cloths lie flat on a flow distribution surface (613). This surface contains textured shapes consisting of pips that protrude from said surface (613), such that an open space is created between the surface of the filter cloth (612) and the surface of the flow distribution surface (613). These pips are 8 mm in thickness. This flow distribution surface is semi-rigid (613); as such, this flow distribution surface can be expanded in the direction of the sorbent cake by applying hydraulic pressure into a chamber (612) behind said surface, applying mechanical compression on said cake.

Each plate (604) contains two opposing sides of a filter bank, and two opposing plates come together to form a filter bank (sorbent cake, filter cloth, membranes, and membrane hydraulic chamber), shown together as 615.

The lithium extraction device is first loaded with a lithium-selective sorbent material. The sorbent material comprises lithium aluminum intercalate. The intercalate is bound by a polymer matrix. The polymer matrix is comprised of polyvinyl chloride. The intercalate particles have an average diameter of 150 microns.

To load the lithium extraction device with lithium-selective sorbent, said sorbent particles are loaded into an agitated vessel, and suspended in water to form a 5% v/v slurry. The suspended particles are pumped into inlet 610 using an air-operated double-diaphragm pump. Because 610 is in fluid communication with all filter banks, the particles flow into all filter banks simultaneously, is retained in said filter banks by filter cloths (614), flows into the space created by the textured flow distribution surface (613), and flows out of the top of the filter plates through orifices 6061 and 6071, through pipes 606 and 607, and out of the device. This loading continues until all filter banks are filled. When the pressure required to pump the slurry increases to 50 psi, valves are opened such that fluid can flow out of all orifices in each filter bank (6061, 6071, 6081, 691). Pumping of the slurry is continued until the pressure necessary to pump the slurry increases beyond 100 psi. After this point is reached, the loading of the lithium sorbent is considered complete.

Following this loading step, water is flowed through the sorbent cake in the filter bank by flowing water into 608. Water is distributed through the pipe manifold 608 and through orifices 6081, flowing into all filter banks simultaneously, across the filter cake from one flow distribution surface to another. Arrow 617 demonstrate the direction of this flow. Flow is collected simultaneously from all filter banks from orifices 6091 and pipe manifold 609. Flow of water is continued in this manner, at a rate that results in a pressure drop of 25 psi across the sorbent cake.

After five minutes of flow, hydraulic pressure is applied to the membrane plates in chamber 612 at a pressure of 50 psi. This results in mechanical squeezing/compression of the sorbent cake from both opposing sides.

To extract lithium, water flow is stopped, and the liquid resource is flown into the filter bank in the same configuration and flow path; specifically, flow enters the device and filter banks through 608, enters the cake through 6081, leaves the cake through 6071, and exits the filter bank and device through 607. The liquid resource consists of a natural aqueous chloride brine containing approximately 500 mg/L Li, 90,000 mg/L Na, 1,000 mg/L Ca, and 10,000 mg/L Mg, and other chemical species including K and chloride. The pressure needed to flow said resource across all filter banks, in parallel, is 35 psi. Flow through this lithium aluminum intercalate results in an outlet flow that contains approximately 200 mg/L Li, 90,000 mg/L Na, 1,000 mg/L Ca, and 10,000 mg/L Mg, and other chemical species including K and chloride. Contacting said liquid resource with said ion lithium aluminum intercalate results in lithium being extracted, and protons are released into solution.

After said brine is contacted with the lithium aluminum intercalate for one hour, flow of brine is ceased. Following this step, and water solution comprising lithium chloride is flown through pipe manifold 608 and collected thorough outlet pipe manifold 607, such that lithium is released from said lithium aluminum intercalate. Thus, the lithiated lithium aluminum intercalate release lithium, yielding a lithium solution comprising the extracted lithium.

The cycle of lithium loading with the liquid resource and lithium release with water is repeated to produce a lithium solution. The process of applying a mechanical squeezing pressure onto the lithium-selective sorbent during lithium extraction results in more uniform flow of the liquid resource and eluent through the sorbent, ensuring uniform lithium loading and stripping of said material. The net effect is an increase in the uptake capacity of said material for lithium, thus improving the amount of lithium produced.

Example 7: Lithium Extraction Device Comprising Vertical Stack of Filter Banks, Loaded with Ion Exchange Beads, with Mechanical Compression Applied to Said Beads Lithium is extracted from a liquid resource using a device comprising filter banks containing ion exchange beads (FIG. 7) The filter banks comprise horizontally oriented recessed-chamber filter plates (703) fitted with a diaphragm. Said filter plates are optionally referred to as filter trays. The horizontally oriented filter plates are arranged as a vertical stack (704). Such a stack is optionally referred to as a vertical pressure filter or vertical filter press.

Figures 7A, 7B:
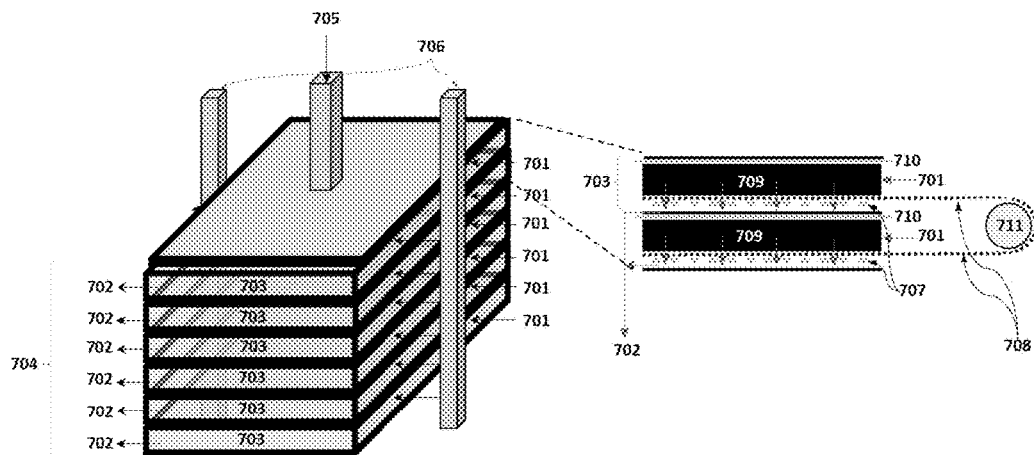
FIG. 7A-7B illustrates a lithium extraction device comprising a vertical pressure loaded with ion exchange beads, wherein said lithium extraction device is equipped with membrane-squeeze plates.

The device is constructed from a vertical pressure filter (FIG. 7). In this device (FIG. 7A), multiple horizontally oriented filter trays (703) are stacked vertical, held in place by structural supports (706) comprising coated carbon-steel beams. The trays are pressed together with a hydraulic compression system (705), wherein said system exerts hydraulic pressure on the top plate in said device. 500 kN of force are apply during normal operation of the device. This pressure holds all filter trays (703) together, such that each plate is hydraulically sealed to prevent fluids from escaping during operation. The device is approximately 3 m wide, 3 m tall, and 4 m in length.

Each filter plate comprises a filter bank, which is shown from its side in FIG. 7B. Each bank comprises a support structure (707), upon which a porous filter belt is positioned (708). The chamber that is loaded with lithium-selective sorbent (709) is positioned immediately above this porous filer belt. The filter belt continuously connects between all trays, as shown in insert 7B as a connection from the one to the subsequent tray, connected through roller 711. Each filter tray contains a diaphragm (710) that can be mechanically actuated to apply compressive pressure on the chamber containing the lithium-selective sorbent immediately below it (709).

Hoses deliver flow into (701) and from (702) each tray, wherein all hoses are connected to a common fluid delivery system and such that fluid flow to and from each filter bank occurs in parallel. During operation of said device, fluid is fed through inlet hoses 701 to each filter plate and fluid fills the filter bank. Any solids are retained by the filter cloth (708) and accumulate in the filter chamber to form a filter cake or bed (709), while liquids are force by pressure driven flow through said filter belt (708) and the structural supports that hold said filter belt in place (707). Said structural supports (707) have space below that connects to an outlet hose (702) such that liquids can exit the device.

The device comprises a vertical stack of filter banks comprising 10 trays (704). The filter belt provides a total filtration area of approximately 14 square meters. The trays are manufactured out of Hastelloy C276. The filter cloths are constructed of woven polypropylene. The trays have a solids-chamber thickness of approximately 40 mm. The plates can hold a total of approximately 500 L of ion exchange beads.

The lithium extraction device is first loaded with a lithium-selective sorbent material. The sorbent material comprises ion-exchange beads. The porous ion exchange beads are comprised of ion exchange particles and a polymer matrix. The ion exchange particles are coated ion exchange particles comprised of a $Li_2TiO_3$ core with a $TiO_2$ coating. The particles are approximately spherical with a mean diameter of 2.5 microns to 50.0 microns, and the coating thickness is approximately 5.0 nm in thickness. The polymer matrix is comprised of polyvinyl chloride. The beads have an average diameter of 100 microns.

To load the lithium extraction device with ion-exchange beads, said beads are loaded into an agitated vessel, and suspended in water to form a 10% v/v slurry. The ion-exchange beads are pumped into inlet hose 701 using an air-operated double-diaphragm pump. Because all hoses are connected to the same pump, the ion-exchange material flows into all filter banks simultaneously, and is retained in said filter banks by filter belt (710). The retained sorbent solids fill each of the filter banks completely until the physical space in this device is fully occupied, forming a bed of ion exchange material 709. Pumping of the sorbent is continued until the pressure necessary to pump the slurry increases beyond 100 psi. After this point is reached, the loading of the sorbent is considered complete. The thickness of the bed of lithium-selective sorbent is 40 mm.

Subsequently, membrane 710 is mechanically compressed against the bed of ion-exchange material directly below it (709), and the compressive pressure applied is 50 psi. This results in consolidation of the bed of lithium-selective sorbent, which improves flow through said sorbent. This treatment is continued for 5 minutes, and the pressure is released.

To extract lithium, the liquid resource is flown into the filter bank through inlet hoses 701, wherein it flows into each filter bank. Pressure of said liquid resource is maintained at 35 psi, which forces the liquid resource through the bed of lithium-selective sorbent (709), through the filter belt (708), support structure (707), and into the outlet manifold of the filter bank and device (702). The ion-exchange material absorb lithium while releasing protons, thereby loading the ion-exchange beads with lithium.

The liquid resource consists of a natural aqueous chloride brine containing approximately 500 mg/L Li, 100,000 mg/L Na, 100 mg/L Ca, and 500 mg/L Mg, and other chemical species including K and chloride. Flow through this ion exchange material results in an outlet flow that contains approximately 50 mg/L Li, 100,000 mg/L Na, 000 mg/L Ca, and 500 mg/L Mg, and other chemical species including K and chloride. Contacting said liquid resource with said ion exchange material results in lithium being extracted, and protons are released into solution.

After said brine is contacted with the ion exchange material for two hours, flow of brine is ceased. Water is injected through 701 and collected through outlet hoses 702, such that entrained brine is removed from the ion-exchange device by water. Following this step, and acidic eluent solution comprising hydrochloric acid is flown hoses 701 and collected thorough outlet hoses 702, such that an acidic eluent solution contacts the lithium sorbent in all filter banks. Thus, the lithiated ion exchange beads absorb protons while releasing lithium, yielding a lithium chloride solution comprising the extracted lithium. The cycle of lithium loading with the liquid resource and lithium release with acid is repeated to produce a lithium chloride solution.

If the bed of ion exchange material were not mechanically compressed prior to lithium extraction in order to consolidate the ion-exchange bed and increase flow uniformity, the amount of water needed to removed entrained brine after lithium uptake and before elution increases by 100%, increasing said water consumption from 1000 L of water to 2000 L per lithium extraction cycle. In addition, the useful lifetime to the ion-exchange material decreases from 6 months to 4 months. Thus, mechanical compression aid in increasing the performance of the lithium extraction device.

When the end of the useful life of the ion-exchange beads is reached, the filter banks are separated by releasing the pressure from hydraulic system 705 and separating the plates using structural support 706. The filter belt (708) rolls using rollers 711, resulting in the bed of ion-exchange material falling off the side of the device. The ion-exchange device is thus empty and ready to be re-loaded with ion-exchange beads for further lithium extraction. The used ion-exchange beads are taken to a different location in the lithium plant for their recycle.

Example 8: Lithium Extraction Device Using a Network of Devices Comprising Filter Presses Lithium is extracted from a liquid resource using a network of devices containing a lithium-selective sorbent, wherein said sorbent comprises ion-exchange beads. The lithium extraction devices comprise filter presses (801). Each filter press comprises filter banks filled with ion exchange beads arranged along the length of the vessel, with parallel flow to and from each filter bank. Each filter bank acts as an individual ion-exchange compartment. The internal construction and operation of the lithium extraction device is described in Example 2 (FIG. 2).

The device is ion-exchange beads are loaded into each of the ion-exchange compartments as described in Example 2. The porous ion exchange beads are comprised of ion exchange particles and a polymer matrix. The ion exchange particles are coated ion exchange particles comprised of a $Li_2Mn_2O_5$ core with a $TiO_2$ coating. The particles are approximately spherical with a mean diameter of 15 microns, and the coating thickness is approximately 5 nm. The polymer matrix is comprised of polyvinyl chloride. The porous beads contain porous networks with a controlled distribution of pore sizes providing diffusion channels from the bead surface into the bead interior and to the ion exchange particles. The beads have a 200 microns average diameter.

The liquid resource flows into each device, where in contacts the ion-exchange beads and lithium is absorbed, and exits said device. The brine from which lithium is extracted consists of a natural aqueous chloride solution containing approximately 1,000 mg/L Li, 60,000 mg/L Na, 10,000 mg/L Ca, and 30,000 mg/L Mg, and other chemical species including K and chloride.

Figure 8:
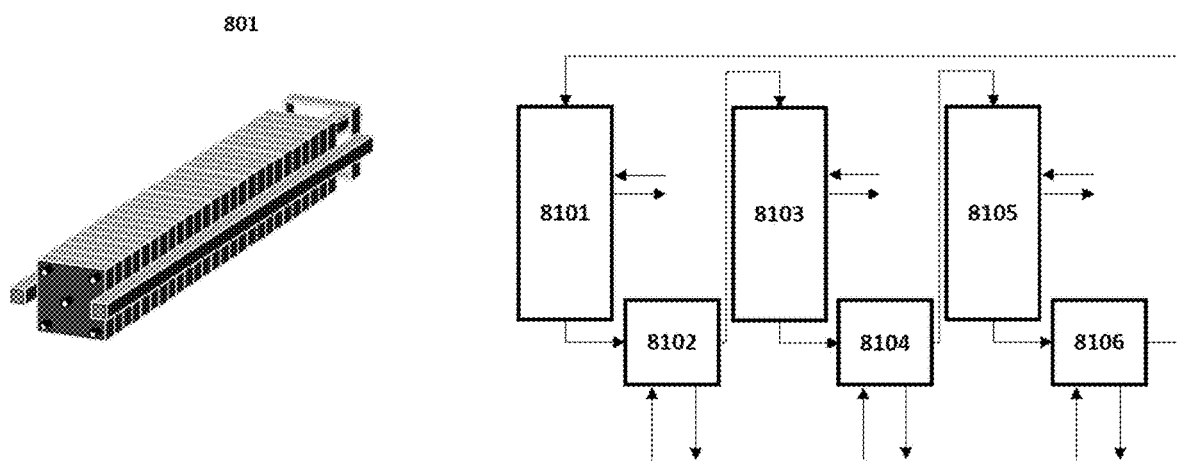
FIG. 8 illustrates a lithium extraction system comprising various lithium extraction devices, wherein said devices comprise filter presses is equipped with membrane-squeeze plates.
Figure 9:
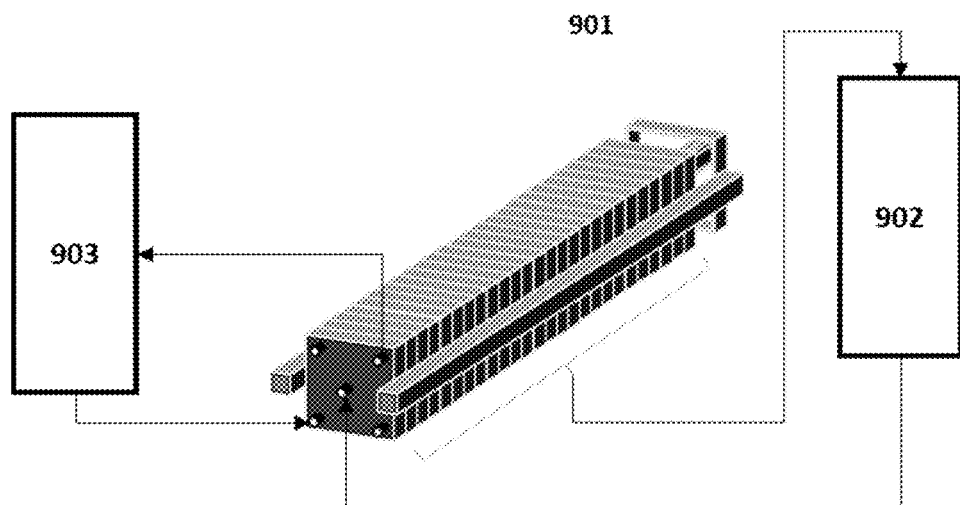
FIG. 9 illustrates a lithium extraction system comprising a lithium extraction device and an agitated vessel, wherein said devices comprise filter press.
Figure 10:
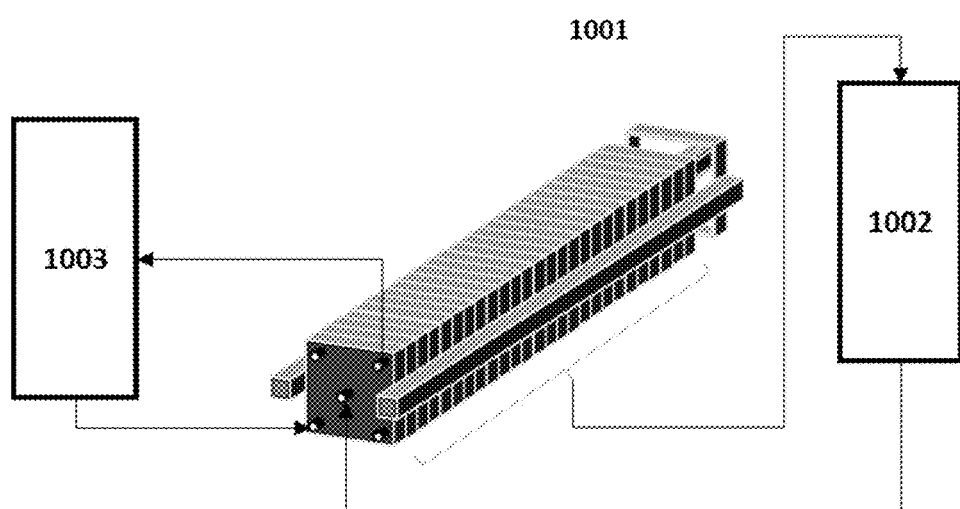
FIG. 10 illustrates a lithium extraction system comprising a lithium extraction device and an agitated vessel, wherein said devices comprise filter press.

Three such devices are connected to form a network. The devices are connected via tanks where the pH of the brine is adjusted, as illustrated in FIG. 8. The network consists of ion exchange devices (8101, 8103, 8105), and mixing tanks for base and brine (8102, 8104, 8106). For the mixing tanks in the brine circuit (8102, 8104, 8106), an aqueous base solution of NaOH is added to increase the pH of the brine to 7.5. The pH of the brine is monitored before and after each mixing tank in the brine circuit to control the rate of addition of aqueous base solution.

For the purposes of this example, a flow configuration is: a liquid resource flows into tank 802, then into device 803, into tank 804, into device 805, into tank 806 from which it leaves the system. Acid is concurrently flowed through device 801.

At any point during the operation of the network of three devices, lithium is being extracted from brine with two devices. Brine flows into a first mixing tank (e.g. 802) at pH of 6.5, and its pH is adjusted to a value of 7.5. This brine is fed to the first ion-exchange device (e.g. 802). The first device absorbs (e.g. 803) most of the lithium, releasing protons; this results in a drop in Li concentration from 1000 to 200 mg/L and a drop in pH to a value of 3.0. Subsequently, in the subsequent mixing tank (e.g. 804), the pH of said brine is raised to about 7.5, and the brine is flowed into a second column (e.g. 805) which absorbs remaining lithium, and the Li concentration drops from 200 to 90 g/L.

The third device (e.g. 801) is saturated with lithium from a previous ion-exchange cycle, and is therefore treated with hydrochloric acid to yield a lithium chloride concentrate. The acid solution flows through the ion exchange device, where the protons from the acid enter the ion exchange beads and are exchanged for lithium. Lithium is thereby released from the beads and enters the acid solution.

When the rate of lithium uptake by the ion exchange beads slows, pumping through the system is terminated, and the devices containing brine are washed with water. Then, the flows of brine, water, and acid are redirected such that a new device is treated with acid and the others with brine.

These system operations are repeated, loading lithium into each column until saturation, and redirecting flow to the next configuration of flows while the saturated column is treated with acid to release lithium. The process extracts lithium from brine and yield a lithium chloride concentrate which is then treated with sodium carbonate to precipitate a lithium carbonate product.

Mechanical compression on the ion-exchange beads in maintained during operation using the membrane-squeeze system described in Example 2. The process of applying a mechanical squeezing pressure onto the ion exchange material during lithium extraction results in more uniform flow of the liquid resource and eluent through the ion exchange material, ensuring uniform lithium loading and stripping of said material. The net effect is an increase in the uptake capacity of said material for lithium, thus improving the amount of lithium that the ion exchange device can produce.

Example 9: Lithium Extraction Device Comprising an Agitated Tank, a Acid Recirculation Tank, and a Filter Press Lithium is extracted from a liquid resource using a device containing a lithium-selective sorbent, wherein said sorbent comprises ion-exchange beads. The lithium extraction devices comprise a filter press (901). Said device is connected to an agitated vessel (902), and to a recirculation tank (903).

The filter press comprises filter banks that can be filled with ion exchange beads arranged along the length of the vessel, with parallel flow to and from each filter bank. Each filter bank acts as an individual ion-exchange compartment. The internal construction of the lithium extraction device is described in Example 3 (FIG. 3).

Lithium is extracted using ion-exchange beads. The porous ion exchange beads are comprised of ion exchange particles and a polymer matrix. The ion exchange particles are coated ion exchange particles comprised of a $Li_4Sn_5O_{12}$ core with a $ZrO_2$ coating. The particles are approximately spherical with a mean diameter of 5 microns, the coating is approximately 10 nm thick. The porous beads contain porous networks with a controlled distribution of pore sizes providing diffusion channels from the bead surface into the bead interior and to the ion exchange particles. The polymer matrix is comprised of polyvinylidene fluoride. The beads have a 200 micron average diameter.

The brine from which lithium is extracted consists of a natural aqueous chloride solution containing approximately 250 ppm Li, 20,000 mg/L Na, 500 mg/L Ca, and 20,000 mg/L Mg, and other chemical species including K and sulphates. Flow through this ion exchange material results in an outlet flow that contains approximately 50 ppm Li, 20,000 mg/L Na, 500 mg/L Ca, and 20,000 mg/L Mg, and other chemical species including K and sulphates.

To extract lithium, the liquid resource is flown into agitated vessel 902, which contains ion-exchange beads. The liquid resource and ion-exchange beads are agitated to from a suspension of the ion-exchange beads in the liquid resource. The agitated vessel is fitted with an air-delivery manifold at the bottom, and air is injected when agitation is begun. When air is co-injecting in conjunction with agitation, the suspension is fluidized in less than 30 seconds; otherwise, full agitation of the solids occurs only after 5 minutes. Agitation is achieved by means of a hydrofoil stirrer.

After said brine is agitated with the ion-exchange material in tank 902 for 1 hour, the contents of tank 902 are directed into filter press 901. The suspension of ion-exchange beads in brine flows into all filter banks simultaneously and is retained in said filter banks, while the liquid resource exits the device and is discarded. The process is continued until tank 902 is empty of a solid suspension and device 901 is filled with solid ion-exchange beads.

Following this step, a water wash solution flows from recirculation tank 903 and into the filter press, such that the solids in said filter press are washed with water to remove entrained brine. Subsequently, an acidic eluent solution comprising nitric acid is flown from recirculation tank 903 and into the ion-exchange device, and collected back in acid recirculation tank 903, where it exits the system. Thus, the lithiated ion exchange beads absorb protons while releasing lithium, yielding a lithium nitrate solution comprising the extracted lithium.

Pressure is applied into the membrane-squeeze system in filter press 901, compressing the bed of ion-exchange beads and forcing liquid eluent entrained in the beads out of said beads. Thus, an additional 5% of eluent (which would otherwise be entrained in the beads and lost) is recovered.

Following this step, the mechanical pressure holding filter plates together is released, and the solid ion-exchange beads are discharged from the filter press device. They are sent back to agitated vessel 902, where they can newly contact brine to absorb lithium, and the cycle can thus be repeated.

The cycle of lithium loading with the liquid resource and lithium release with acid is repeated to produce a lithium chloride solution.

Example 10: Lithium Extraction Device Comprising an Agitated Tank, a Acid Recirculation Tank, and a Filter Press Lithium is extracted from a liquid resource using a device containing a lithium-selective sorbent, wherein said sorbent comprises ion-exchange beads. The lithium extraction devices comprise a filter press (1001). Said device is connected to an agitated vessel (1002), and to a recirculation tank (1003).

The filter press comprises filter banks that can be filled with ion exchange beads arranged along the length of the vessel, with parallel flow to and from each filter bank. Each filter bank acts as an individual ion-exchange compartment. The internal construction of the lithium extraction device is described in Example 3 (FIG. 3).

Lithium is extracted using ion-exchange beads. The porous ion exchange beads are comprised of coated ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 5.0 microns to 25.0 microns, and the coating thickness is approximately 10.0 nm. The polymer matrix is comprised of polyvinylidene difluoride. The porous beads contain porous networks with a controlled distribution of pore sizes providing diffusion channels from the bead surface into the bead interior and to the ion exchange particles. The beads have a 600 micron average diameter.

The brine from which lithium is extracted consists of a natural aqueous chloride solution containing approximately 1000 ppm Li, 60,000 mg/L Na, 250 mg/L Ca, and 30,000 mg/L Mg, and other chemical species including K and chloride.

To extract lithium, the liquid resource is flown into agitated vessel 1002, which contains ion-exchange beads. The liquid resource an ion-exchange beads are agitated to from a suspension of the ion-exchange beads in the liquid resource. The agitated vessel is fitted with an air-delivery manifold at the bottom, and air is injected when agitation is begun. When air is co-injecting in conjunction with agitation, the suspension is fluidized in less than 30 seconds; otherwise, full agitation of the solids occurs only after 5 minutes. Agitation is achieved by means of a hydrofoil stirrer.

After said brine is agitated with the ion-exchange material in tank 1002 for 2 hours, the contents of tank 1002 are directed into filter press 1001. The suspension of ion-exchange beads in brine flows into all filter banks simultaneously and is retained in said filter banks, while the liquid resource exits the device and is discarded. The process is continued until tank 1002 is empty of a solid suspension and device 1001 is filled with solid ion-exchange beads.

Following this step, a water wash solution flows from recirculation tank 1003 and into the filter press, such that the solids in said filter press are washed with water to remove entrained brine. Pressure is applied into the membrane-squeeze system in filter press 1001, compressing the bed of ion-exchange beads and increasing the uniformity of flow through said ion-exchange beads. This leads to a decrease in the volume of water required for effective washing of said ion-exchange beads.

Following this step, the mechanical pressure holding filter plates together is released, and the solid ion-exchange beads are discharged from the filter press device. They are sent back to agitated vessel 1002. Subsequently, an acidic eluent solution comprising sulfuric acid is flown into agitated tank 1002, and the acidic sulfate solution is agitated with the ion-exchange beads. Thus, the lithiated ion exchange beads absorb protons while releasing lithium, yielding a lithium sulfate solution comprising the extracted lithium.

After said eluate solution is agitated with the ion-exchange material in tank 1002 for 1 hours, the contents of tank 1002 are directed into filter press 1001. The suspension of ion-exchange beads in eluent flows into all filter banks simultaneously and is retained in said filter banks, while the eluent solution exit the device and is sent to a product stream. The process is continued until tank 1002 is empty of a solid suspension and device 1001 is filled with solid ion-exchange beads.

Pressure is applied into the membrane-squeeze system in filter press 1001, compressing the bed of ion-exchange beads and forcing liquid eluent entrained in the beads out of said beads. Thus, an additional 2.5% of eluent (which would otherwise be entrained in the beads and lost) is recovered.

Following this step, the mechanical pressure holding filter plates together is released, and the solid ion-exchange beads are discharged from the filter press device. They are sent back to agitated vessel 1002, where they can newly contact brine to absorb lithium, and the cycle can thus be repeated.

The cycle of lithium loading with the liquid resource and lithium release with acid is repeated to produce a lithium sulfate solution.

Example 11: Lithium Extraction Device Comprising a Filter Press Loaded with a Mixture of Ion Exchange Beads and a Non-Sorbent Material, with Mechanical Compression Applied to Said Beads Lithium is extracted from a liquid resource using a device comprising filter banks containing ion exchange beads. The banks are contained between filter plates that are arranged as a "horizontal stack" that share a common flow distribution manifold.

Figures 11A, 11B, 11C:
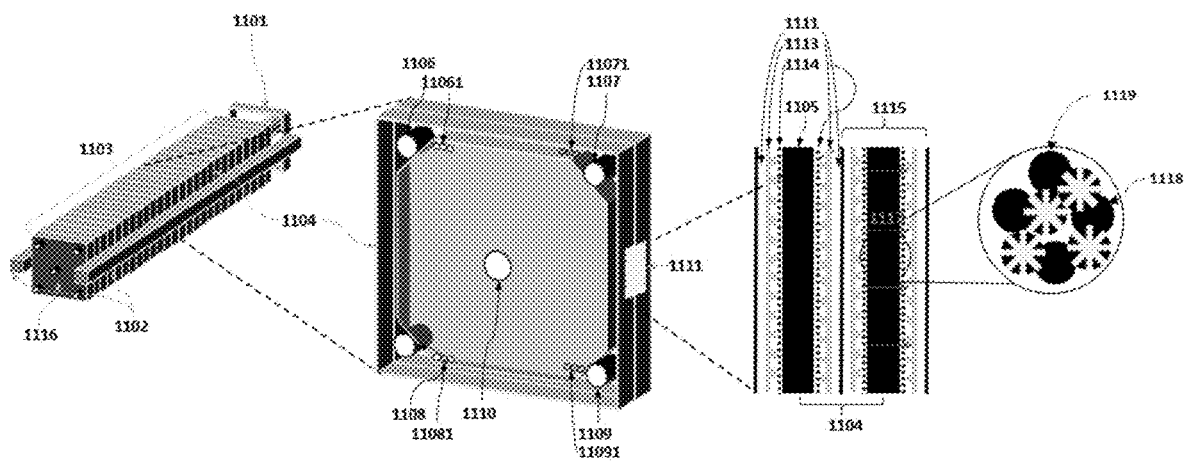
FIG. 11A-11C illustrates a lithium extraction device comprising a filter press loaded with a mixture of ion exchange beads and non-sorbent material, wherein said filter press is equipped with membrane-squeeze plates.

The device is constructed from a membrane-squeeze filter press (FIG. 11). In this device (FIG. 11A), multiple filter plates (1104) are maintained in a vertical position by structural supports (1102) comprising coated carbon-steel beams. The plates are pressed together to form a "horizontal stack" of approximately 15 plates (1103). The plates contain gasketed filter cloths that provide a total filtration area of approximately 15 square meters, and are manufactured out of polypropylene. The filter cloths are constructed of woven polypropylene. The plates can hold a total of approximately 400 L of ion exchange beads. The structural frame of the filter press comprises a hydraulic piston at one end of the device (1101), which applies 750 kN of force on the last plate in the stack, therefore squeezing the filter stack together and maintaining the stack closed. Fluid process connections are located at the opposite end of the device (1116) from said hydraulic piston; these connect to five distinct fluid conduits that direct fluid flow to and from all filter banks. These fluid conduits comprise a sorbent slurry inlet that is approximately 40 mm in diameter (1110), and four fluid flow conduits of approximately 25 mm in diameter (1106, 1107, 1108, 1109). These conduits carry liquid or gaseous flow streams including water, the liquid resource, an acidic eluent solution, or air, to each of the filter banks simultaneously.

FIG. 11B shows the detail of a filter bank. The filter bank comprises a cake of sorbent material (1105) contained between filter cloths (1114) supported on two opposing filter plates (1104). The thickness of the sorbent cake contained within this filter bank is approximately 32 mm; the filter cake is approximately a square with a length of about 750 mm, and its four corners are cut off diagonally to form an octagon. The filter plates are square, and their dimension is about 800 mm by 800 mm.

Each of the square's corners contains a circular flow conduit. When all plates in the stack of filter plates are mechanically pressed together, the fluid conduits from all plates align to form four independent pipes that span the length of the entire filter plate stack. These pipes distribute flow to and from all filter plates in parallel, thereby constituting a flow distribution manifold to and from each filter bank. Within each plate, the four fluid conduits connect to the filter bank through orifices/opening that provide fluid communication to a corner of the sorbent cake, as shown in FIG. 11B. For example, fluid conduit 1106 connects through a conduit that is 4 mm in diameter to five orifices 4 mm in diameter 11061. The configuration and diameter of pipes and orifices 1107 to 11071, 1108 to 11081, and 1109 to 11091 are identical to 1106 and 11061. The sorbent slurry inlet 1110 is present along the entirety of the device, such that port 1110 from one filter bank connects to 1110 of the following filter bank, and such that all filter banks are in fluid communication to the 1110 process connection on the end plate (1116) of the device.

FIG. 11C shows the detail of a cross section (1111) of a filter bank containing the sorbent material (1105). Each filter bank is contained between two filter cloths (1114), which conform to the shape of the filter bank (1105) and the filter plate (1104). The cloths lie flat on a flow distribution surface (1113). This surface contains textured shapes consisting of pips that protrude from said surface (1113), such that an open space is created between the surface of the filter cloth (1112) and the surface of the flow distribution surface (1113). These pips are 8 mm in thickness. This flow distribution surface is semi-rigid (1113); as such, this flow distribution surface can be expanded in the direction of the sorbent cake by applying hydraulic pressure into a chamber (1112) behind said surface, applying mechanical compression on said cake.

Each plate (1104) contains two opposing sides of a filter bank, and two opposing plates come together to form a filter bank (sorbent cake, filter cloth, membranes, and membrane hydraulic chamber), shown together as 1115.

The lithium extraction device is first loaded with a mixture of lithium-selective sorbent material with a non-sorbent material.

The sorbent material comprises ion-exchange beads. The porous ion exchange beads are comprised of ion exchange particles and a polymer matrix. The ion exchange particles are coated ion exchange particles comprised of a $Li_2MnO_3$ core with a $TiO_2$ coating. The particles are approximately spherical with a mean diameter of 5.0 microns to 50.0 microns, and the coating thickness is approximately 2.5 nm in thickness. The polymer matrix is comprised of polyvinyl chloride. The beads have an average diameter of 100 microns. The non-sorbent material comprises diatomaceous earth, with an average particle size of about 10 to about 100 microns. Said diatomaceous earth is porous.

To load the lithium extraction device with ion-exchange beads mixed with a non-sorbent material, an equal weight of ion-exchange beads and non-sorbent material are loaded into an agitated vessel, and suspended in water to form a 5% w/v slurry. The mixture of non-sorbent material and ion-exchange beads are pumped into inlet 1110 using an air-operated double-diaphragm pump. Because 1110 is in fluid communication with all filter banks, the solids flows into all filter banks simultaneously, are retained in said filter banks by filter cloths (1114), flows into the space created by the textured flow distribution surface (1113), and flows out of the top of the filter plates through orifices 11061 and 11071, through pipes 1106 and 1107, and out of the ion exchange device. This loading continues until all filter banks are filled. When the pressure required to pump the slurry increases to 25 psi, valves are opened such that fluid can flow out of all orifices in each filter bank (11061, 11071, 11081, 1191). Pumping of the slurry is continued until the pressure necessary to pump the slurry increases beyond 50 psi. After this point is reached, the loading of the lithium sorbent is considered complete, and the bed consists of a solid mixture of ion-exchange beads (1119) and porous non-sorbent material (1118).

Following this loading step, water is flowed through the cake in the filter bank by flowing water into 1108. Water is distributed through the pipe manifold 1108 and through orifices 11081, flowing into all filter banks simultaneously, across the filter cake from one flow distribution surface to another. Arrow 1117 demonstrates the direction of this flow. Flow is collected simultaneously from all filter banks from orifices 11091 and pipe manifold 1109. Flow of water is continued in this manner, at a rate that results in a pressure drop of 25 psi across the sorbent cake.

After five minutes of flow, hydraulic pressure is applied to the membrane plates in chamber 1112 at a pressure of 50 psi. This results in mechanical squeezing/compression of the sorbent cake from both opposing sides.

To extract lithium, water flow is stopped, and the liquid resource is flown into the filter bank in the same configuration and flow path; specifically, flow enters the device and filter banks through 1108, enters the cake through 11081, leaves the cake through 11071, and exits the filter bank and device through 1107. The liquid resource consists of a natural aqueous chloride brine containing approximately 500 mg/L Li, 100,000 mg/L Na, 500 mg/L Ca, and 1,000 mg/L Mg, and other chemical species including K and chloride. The pressure needed to flow said resource across all filter banks, in parallel, is 15 psi. If the non-sorbent porous diatomaceous earth material had not been co-loaded with the ion-exchange beads into the lithium extraction device, the pressure drop needed for this flow would be 50 psi. Flow through this ion exchange material results in an outlet flow that contains approximately 100 mg/L Li, 100,000 mg/L Na, 500 mg/L Ca, and 1,000 mg/L Mg, and other chemical species including K and chloride. Contacting said liquid resource with said ion exchange material results in lithium being extracted, and protons are released into solution.

After said brine is contacted with the ion exchange material for one hour, flow of brine is ceased. Air is injected through the pipe manifold 1106 and collected through outlet pipe 1109, such that air blown through all filter banks and entrained brine is removed. Following this step, and acidic eluent solution comprising sulfuric acid is flown through pipe manifold 1108 and collected thorough outlet pipe manifold 1107, such that an acidic eluent solution flows through the lithium sorbent in all filter banks. Thus, the lithiated ion exchange beads absorb protons while releasing lithium, yielding a lithium sulfate solution comprising the extracted lithium.

The cycle of lithium loading with the liquid resource and lithium release with acid is repeated to produce a lithium sulfate solution. The process of applying a mechanical squeezing pressure onto the ion exchange material during lithium extraction results in more uniform flow of the liquid resource and eluent through the ion exchange material, ensuring uniform lithium loading and stripping of said material. The net effect is an increase in the uptake capacity of said material for lithium, thus improving the amount of lithium that the ion exchange device can produce.

What is claimed is:

1. A device for lithium extraction from a liquid resource, the device comprising:
   (i) a sorbent material that selectively absorbs lithium from the liquid resource; and
   (ii) one or more filter banks;
   wherein each of the one or more filter banks comprises:
   (a) two filter plates that, when placed together, form a compartment;
   (b) one or more permeable partitions, wherein the one or more permeable partitions line the interior of the compartment and contain the sorbent material;
   (c) one or more inlets and one or more outlets, wherein the one or more inlets and the one or more outlets are each configured to allow fluid to flow through the one or more filter banks.

2. The device of claim 1, further comprising one or more flow distributors that are each optionally joined to the surface of one or both of the two filter plates to form the compartment.

3. The device of claim 2, wherein one or more of said flow distributors comprises a flow distribution surface, and
   (a) wherein said flow distribution surface is deformable, and
   (b) wherein the deformation of said flow distribution surface mechanically compresses the sorbent material.

4. The device of claim 3, wherein mechanical compression force is applied with a pressure of about 1 psi to about 250 psi.

5. The device of claim 2, wherein the device is configured to maintain fluid communication through the sorbent material, the one or more permeable partitions, the one or more flow distributors, the two filter plates, and one or more fluid conduits.

6. The device of claim 5, wherein fluid flow to and from the one or more filter banks and the one or more fluid conduits occurs from one or more locations in the one or more filter banks.

7. The device of claim 2, wherein the one or more flow distributors each comprise a textured flow distribution surface, said textured flow distribution surface comprising textured flow distribution shapes comprising grooves, dimples, pips, protrusions, stay bosses, raised surfaces, or any other geometric shape that protrudes from the surface of one or both of said two filter plates when said one or more flow distributors is joined to the surface thereof.

8. The device of claim 7, wherein the one or more permeable partitions lie on top of said textured flow distribution surface such that a void exists between the surface of the filter plate and the one or more permeable partitions, wherein the void is configured for use as a fluid conduit.

9. The device of claim 8, wherein the thickness of said void is from about 2 mm to about 15 mm, wherein the thickness of said void is defined as the distance between the bottom of the filter plate and the one or more permeable partition.

10. The device of claim 1, wherein two permeable partitions line the interior of the compartment and each permeable partition is positioned against each of the two filter plates.

11. The device of claim 10, wherein the ratio of thickness to cross-sectional length of each of the one or more filter banks is independently from about 1:1 to about 1:500, wherein the thickness of each of said one or more filter banks is defined as the average distance between the permeable partition positioned against the first of the two filter plates and the permeable partition positioned against the second of the two filter plates, and wherein the cross-sectional length of each of the one or more filter banks is the longest distance that is geometrically orthogonal to said thickness.

12. The device of claim 11, wherein the thickness of each of said one or more filter banks is from about 5 to about 75 mm and wherein the cross-sectional length of each of said one or more filter banks is from about 5 to about 5000 mm.

13. The device of claim 1, wherein the two filter plates each independently have an approximate cross-sectional length of about 100, 230, 320, 400, 470, 500, 630, 800, 900, 1000, 1100, 1200, 1300, 1400, 1500, 2000, 3000, 4000, or 5000 mm.

14. The device of claim 1, wherein said device comprises from 1 to about 250 filter banks.

15. The device of claim 1, wherein the device is configured to allow fluid to flow into the one or more filter banks from a single external fluid conduit that is an inlet to each filter bank, said fluid contacts the sorbent material, and said fluid flows out of the one or more filter banks through a single external fluid conduit that is an outlet to each filter bank, and wherein the inlet and the outlet fluid conduits are on opposing geometric corners of each filter bank.

16. The device of claim 1, wherein the device is configured to allow fluid to flow into the one or more filter banks from two or more external fluid conduits that are inlets to each filter bank, said fluid contacts the sorbent material, and said fluid flows out of the one or more filter banks through two or more external fluid conduits.

17. The device of claim 16, wherein the pressure of fluid flowing through the one or more filter banks is from about 0.1 psi to about 100 psi.

18. The device of claim 16, further comprising a manual, semi-automatic, or automatic plate shifter; a drip tray; a cake discharge tray; an end plate; a blind plate; or combinations thereof.

19. The device of claim 1, configured to allow a gas to flow through the one or more filter banks.

20. The device of claim 1, comprising a series of at least two filter banks, wherein at least two of said filter banks are joined together with structural supports, and held together with a hydraulic force, to form a filter press.

21. The device of claim 20, wherein the second filter bank and any additional filter banks are created with one or more additional interior filter plates, wherein said additional interior filter plates comprise permeable partitions, inlets, outlets, and optional flow distributors, configured to form two filter banks on either side of said additional interior filter plate when filter plates are placed on either said of said interior filter plate.

22. The device of claim 20, wherein each filter bank comprises two flow distributors each comprising a flow distribution surface, and wherein one of the two flow distribution surfaces is a deformable flow distribution surface and the second of the two flow distribution surfaces is not deformable, and wherein deformation of the deformable flow distribution surface mechanically compresses the sorbent material.

23. The device of claim 20, wherein the filter press is configured to flow fluid through a fluid inlet and out a fluid outlet, wherein the fluid inlet and fluid outlet are on opposite ends of the filter press.

24. The device of claim 20, wherein each of the filter plates are independently gasketed, non-gasketed, recessed, plate- and frame, membrane squeeze, diaphragm squeeze, or combinations thereof.

25. The device of claim 20, wherein the device is configured to maintain uniform fluid flow to and from each filter bank, and wherein the pressure required to flow said fluid across each filter bank differs by less than 10 psi across any two filter banks in said device.

26. The device of claim 20, wherein the device is configured to maintain uniform fluid flow to and from each filter bank, and wherein the pressure required to flow said fluid across each filter bank differs by 25 psi or less across all filter banks in said device.

27. The device of claim 26, wherein the configuration to uniformly distribute the flow of fluid through the sorbent material results in a lower volume of water required to remove entrained brine from the sorbent material when washing said sorbent material with water.

28. The device of claim 1, wherein the sorbent material that selectively absorbs lithium from the liquid resource comprises an ion exchange material that exchanges lithium ions and hydrogen ions, wherein said ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof.

29. The device of claim 1, wherein the sorbent material that selectively absorbs lithium from the liquid resource comprises a crystalline lithium salt aluminate, a lithium aluminum intercalate, $LiCl \cdot 2Al(OH)_3$, crystalline aluminum trihydroxide ($Al(OH)_3$), gibbsite, beyerite, nordstrandite, alumina hydrate, bauxite, amorphous aluminum trihydroxide, activated alumina layered lithium-aluminum double hydroxides, $LiAl_2(OH)_6Cl$, combinations thereof, compounds thereof, or solid solutions thereof.

30. The device of claim 1, wherein the device is configured to maintain uniform fluid flow to and from each filter bank.

* * * * *